(12) United States Patent
Mikoshiba et al.

(10) Patent No.: US 7,924,697 B2
(45) Date of Patent: Apr. 12, 2011

(54) OPTICAL INFORMATION RECORDING MEDIUM, IMAGE-RECORDING METHOD AND METHOD OF UTILIZING A DYE

(75) Inventors: Hisashi Mikoshiba, Minami-Ashigara (JP); Michihiro Shibata, Odawara (JP)

(73) Assignee: Fujifilm Corporation, Tokyo (JP)

( * ) Notice: Subject to any disclaimer, the term of this patent is extended or adjusted under 35 U.S.C. 154(b) by 655 days.

(21) Appl. No.: 11/914,770

(22) PCT Filed: Jul. 20, 2006

(86) PCT No.: PCT/JP2006/314816
§ 371 (c)(1),
(2), (4) Date: Nov. 19, 2007

(87) PCT Pub. No.: WO2007/011059
PCT Pub. Date: Jan. 25, 2007

(65) Prior Publication Data
US 2009/0092024 A1    Apr. 9, 2009

(30) Foreign Application Priority Data

Jul. 21, 2005  (JP) ............................... P2005-210880
Aug. 30, 2005  (JP) ............................... P2005-250079

(51) Int. Cl.
*G11B 3/70* (2006.01)

(52) U.S. Cl. ........................................ 369/288; 369/283

(58) Field of Classification Search .................. None
See application file for complete search history.

(56) References Cited

U.S. PATENT DOCUMENTS

| | | | |
|---|---|---|---|
| 2004/0161701 A1* | 8/2004 | Hohsaka et al. | 430/270.21 |
| 2004/0166441 A1 | 8/2004 | Akiba et al. | |
| 2005/0063292 A1 | 3/2005 | Shibata | |
| 2005/0123711 A1 | 6/2005 | Usami | |
| 2005/0180308 A1* | 8/2005 | Shibata et al. | 369/288 |
| 2005/0201244 A1* | 9/2005 | Onodera et al. | 369/59.25 |
| 2005/0265213 A1 | 12/2005 | Matsushi et al. | |
| 2006/0013116 A1 | 1/2006 | Matsuishi et al. | |
| 2007/0002721 A1 | 1/2007 | Yoshimura et al. | |

FOREIGN PATENT DOCUMENTS

| | | |
|---|---|---|
| CN | 1521747 A | 8/2004 |
| EP | 1221696 A2 | 7/2002 |
| EP | 1 513 140 A2 | 3/2005 |

(Continued)

OTHER PUBLICATIONS

Supplemental European Search Report for Counterpart Application No. 06 78 1728, dated Jun. 23, 2010.

(Continued)

*Primary Examiner* — Paul Huber
(74) *Attorney, Agent, or Firm* — Sughrue Mion, PLLC

(57) ABSTRACT

An optical information recording medium comprises: a recording layer capable of recording and reproducing information by irradiation with a laser light; and an image recording layer capable of recording a visible image and containing a dye as a major component.

3 Claims, 22 Drawing Sheets

FOREIGN PATENT DOCUMENTS

| | | | |
|---|---|---|---|
| EP | 1562196 A | 8/2005 |
| JP | 63-086175 A | 4/1988 |
| JP | 11-66617 A | 3/1999 |
| JP | 2000-113516 A | 4/2000 |
| JP | 2002-298441 A | 10/2002 |
| JP | 2004-234820 A | 8/2004 |
| JP | 2004-234821 A | 8/2004 |
| JP | 2004-246981 A | 9/2004 |
| JP | 2005-100600 A | 4/2005 |
| JP | 2005-149644 A5 | 6/2005 |
| JP | 2005-149645 A | 6/2005 |
| WO | 2005031727 A1 | 4/2005 |
| WO | 2005-083712 A1 | 9/2005 |
| WO | 2006-009301 A1 | 1/2006 |

OTHER PUBLICATIONS

Chinese First Office Action dated Jul. 24, 2009.
Office Action dated Oct. 12, 2010, issued in counterpart Japanese application No. 2005-250079.

* cited by examiner

WRITE LEVEL
SERVO LEVEL
WHEN GRADATION DEGREE IS LARGE

WRITE LEVEL
SERVO LEVEL
WHEN GRADATION DEGREE IS SMALL

WRITE LEVEL
SERVO LEVEL
SSP1
INSERTION OF OFF-PULSE FOR SERVO

WRITE LEVEL
SERVO LEVEL
SSP2
INSERTION OF ON-PULSE FOR SERVO

FIG. 14
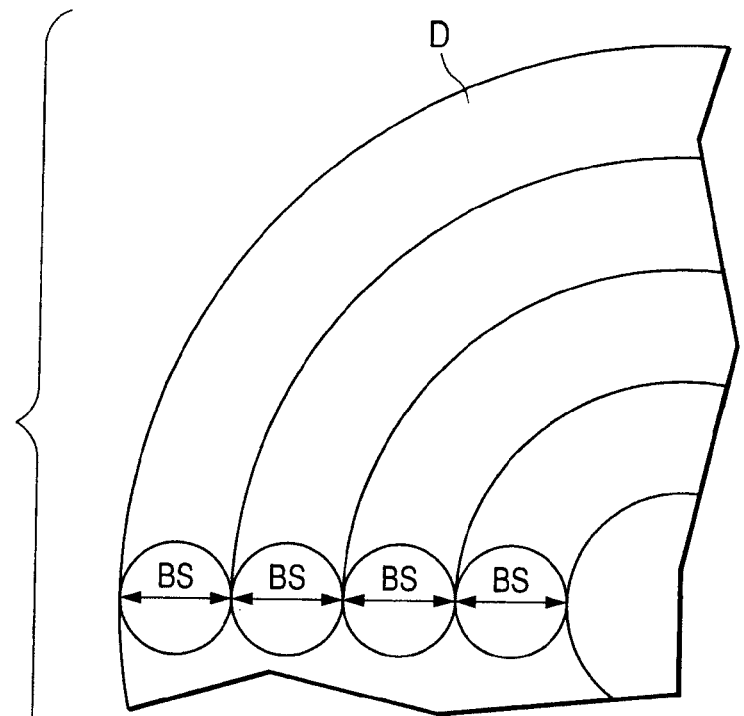
CASE WHERE SPOT DIAMETER IS LARGE
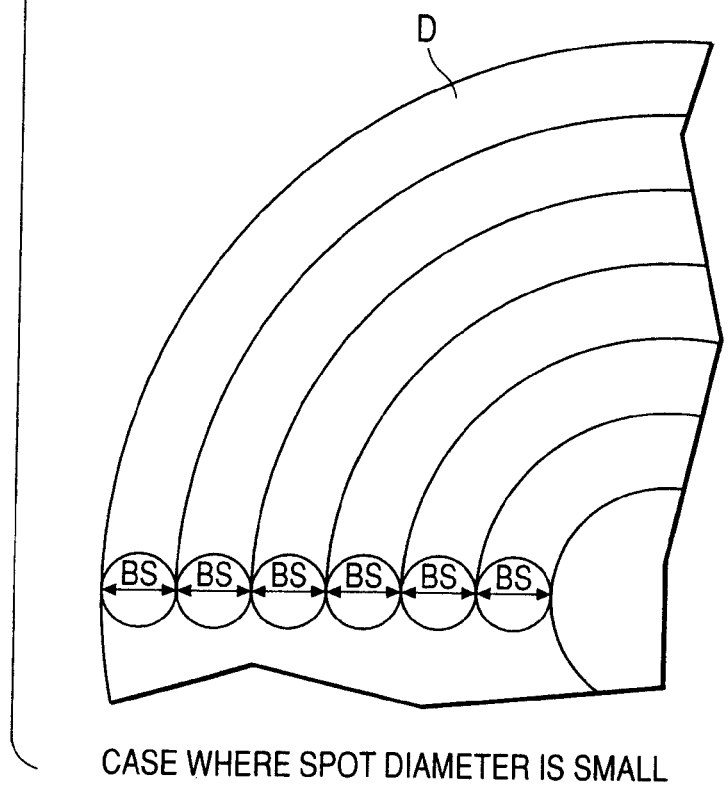
CASE WHERE SPOT DIAMETER IS SMALL $d1 \fallingdotseq d2 + 1.2mm$

OPTICAL INFORMATION RECORDING MEDIUM, IMAGE-RECORDING METHOD AND METHOD OF UTILIZING A DYE

This application is a 371 of PCT/JP2006/314816, filed Jul. 20, 2006.

TECHNICAL FIELD

The present invention relates to an optical image recording medium and, in particular, to an optical information recording medium having an image recording layer capable of recording a visible image in addition to an optical information recording layer (preferably on the opposite side to the optical information recording side), an image recording method of recording an image on the optical information recording medium, and a method of utilizing a dye in the image recording layer.

BACKGROUND ART

Optical information recording media (optical disks) capable of recording information for once using a laser light have conventionally been known. The optical disks are also referred to as write-once CDs (so-called CD-Rs) and, in a typical structure thereof, a recording layer containing an organic dye, a reflection layer containing a metal such as gold and a protective layer made of a resin are laminated successively in this order on a transparent disk-shape substrate. Information is recorded onto the CD-R by irradiating the CD-R with a laser light in a near infrared region (usually, a laser light near 780 nm in wavelength). An irradiated portion of the recording layer absorbs the light to locally increase the temperature at the portion, and the optical characteristics of the portion are changed by physical or chemical change (for example, formation of pits) to record the information. On the other hand, readout (reproduction) of information is also performed by the irradiation of the CD-R with a laser light of the same wavelength as used for recording. Information is reproduced by the detection of the difference in the reflectance between the portion where the optical characteristics of the recording layer altered (recorded portion) and the portion where the optical characteristics did not alter (non-recorded portion).

In recent years, information recording media of higher recording density are being demanded. To meat such a demand, optical disks called writable digital versatile disks (so-called DVD-Rs) have been proposed. The DVD-R has a structure comprising two disks each comprising a transparent disk-like substrate in which guide grooves (pre-grooves) for tracking of laser light to be irradiated are formed with a narrow width (from 0.74 to 0.8 μm) of one-half or less a groove width of CD-Rs, having provided thereon a recording layer comprising a dye, generally a light-reflecting layer on the recording layer and, if necessary, a protective layer, which two disks are adhered to each other with an adhesive with the recording layers disposed at the inside, or a structure wherein the disk described above and a disk-shaped protective substrate of the same shape as that of the disk are adhered to each other with an adhesive with the recording layer at the inside. The recording and reproduction of information on DVD-R are performed by irradiation with a visible laser light (generally a laser light of from 630 nm to 680 nm in wavelength), and it is believed that recording at higher density than with CD-R is possible.

Among the optical disks, there are known those optical disks having a label stuck on the opposite side to the recording side on which musical data or the like are recorded, with the label having printed thereon visible information such as a title of a music composition of music data recorded on the recording side or a tile for discriminating recorded date. Such optical disks are produced by previously printing the tile or the like on a circular label sheet using a printer and sticking the label sheet onto the opposite side of the optical disk to the recording side.

However, in the case of producing an optical disk having a desired visible image such as a title recorded on the opposite side to the recording side as described above, a printer is additionally required in addition to an optical disk drive. Thus, there is required a complicated operation wherein recording on a recording side of an optical disk is performed by using an optical disk drive, the optical disk is removed from the optical disk drive, and a label sheet having been printed by means of a separately prepared printer is stuck thereon.

Therefore, there has been proposed an optical recording medium which permits display by changing contrast between the surface and the background by using a laser marker on the opposite side to the recording side (see JP-A-11-66617). This method permits recording of a desired image on the opposite side to the recording side without separately preparing a printer. However, this method requires use of a high-power gas laser such as a carbonic acid gas laser due to low sensitivity, and a visible image formed by the laser light as described above has such a low contrast that it has an inferior viewability.

On the other hand, if the same laser light source as is employed for recording or reproducing information (digital information) can be used for recording visible information, the visible information can be displayed by using an apparatus a general user uses for recording. Also, in view of saving hardware source of a recording apparatus, it is preferred that a laser light source used for recording or reproducing information (digital information) can commonly be used as a laser light source for recording a visible image.

DISCLOSURE OF THE INVENTION

The present invention has been made in view of the above-mentioned conventional problems, and its subject is to attain the following object.

That is, an object of the invention is to provide an optical information recording medium which permits formation of a distinct, highly contrasty visible image in an image recording layer provided in addition to an optical information recording layer (preferably on the opposite side to the recording side) by using a laser light, and an image recording method of recording an image onto an image recording layer of the optical information recording medium, which method can minimize the hardware source for the recording apparatus and enables a general user to record an image with ease using the recording apparatus.

Means for solving the above-mentioned subject is as follows. That is:

(1) An optical information recording medium comprising: a recording layer capable of recording and reproducing information by irradiation with a laser light; and an image recording layer capable of recording a visible image and containing a dye as a major component.

(2) The optical information recording medium as described in (1), wherein the dye is an oxonol dye.

(3) The optical information recording medium as described in (1) or (2), wherein the dye is an oxonol dye having a structure represented by the following general formula (II):

(II)

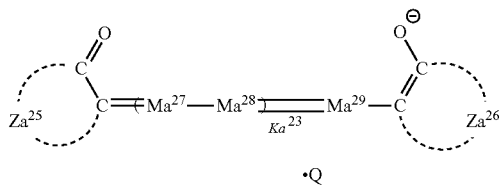

·Q wherein $Za^{25}$ and $Za^{26}$ each independently represents atoms forming an acidic nucleus, $Ma^{27}$, $Ma^{28}$ and $Ma^{29}$ each independently represents a substituted or unsubstituted methine group, $Ka^{23}$ represents an integer of from 0 to 3, Q represents a monovalent cation for neutralizing charge and, when $Ka^{23}$ represents a plural number, plural $Ma^{27}$s and $Ma^{28}$s may be the same or different from each other.

(4) The optical information recording medium as described in (1) or (2), wherein the dye is an oxonol dye having a structure represented by the following general formula (I):

(1)

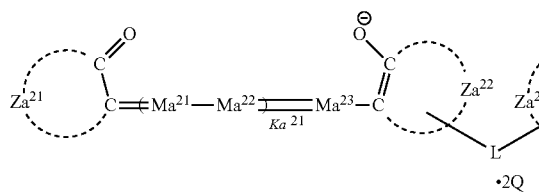

·2Q wherein $Za^{21}$, $Za^{22}$, $Za^{23}$ and $Za^{24}$ each independently represents atoms forming an acidic nucleus, $Ma^{21}$, $Ma^{22}$, $Ma^{23}$, $Ma^{24}$, $Ma^{25}$ and $Ma^{26}$ each independently represents a substituted or unsubstituted methine group, L represents a divalent linking group which does not form a π conjugation system together with the two bonds, $Ka^{21}$ and $Ka^{22}$ each independently represents an integer of from 0 to 3, Q represents a monovalent cation for neutralizing charge, or 2Q represents a divalent cation and, when $Ka^{21}$ and $Ka^{22}$ each represents a plural number, plural $Ma^{21}$s, $Ma^{22}$s, $Ma^{25}$s and $Ma^{26}$s may be the same or different from each other.

(5) The optical information recording medium as described in (1), wherein the dye is a cyanine dye.

(6) The optical information recording medium as described in (1) or (5), wherein the dye is a cyanine dye represented by the general formula (2')

(2')

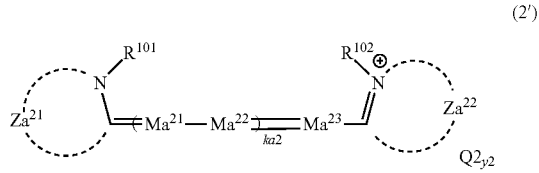

wherein $Za^{21}$ and $Za^{22}$ each independently represents atoms forming a hetero ring, $Ma^{21}$, $Ma^{22}$ and $Ma^{23}$ each independently represents a substituted or unsubstituted methine group, ka2 represents an integer of from 0 to 3, and, when ka2 represents 2 or more, plural $Ma^{21}$s and $Ma^{22}$s may be the same or different from each other, Q2 represents an ion for neutralizing charge, and y2 represents a number necessary for neutralizing charge.

(7) The optical information recording medium as described in (1), (5) or (6), wherein the dye is a cyanine dye represented by the general formula (4'):

(4')

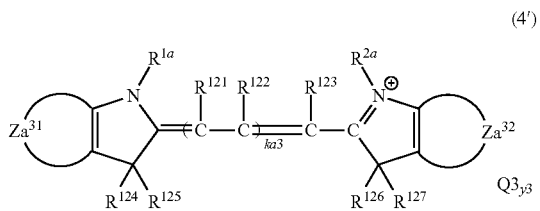

wherein $Za^{31}$ and $Za^{32}$ each independently represents atoms forming a carbon ring or a hetero ring, $R^{1a}$ and $R^{2a}$ each independently represents a substituent, $R^{121}$, $R^{122}$, $R^{123}$, $R^{124}$, $R^{125}$, $R^{126}$ and $R^{127}$ each independently represents a hydrogen atom or a substituent, ka3 represents an integer of from 0 to 3 and, when ka3 represents 2 or more, plural $R^{121}$s and $R^{122}$s may be the same or different from each other, Q3 represents an ion for neutralizing charge, and y3 represents a number necessary for neutralizing charge.

(8) The optical information recording medium as described in (1), wherein the dye is an azo dye.

(9) The optical information recording medium as described in (1) or (8), wherein the dye is an azo dye represented by the general formula (2''):

$$A-N{=}N-B \qquad (2'')$$

wherein A represents a monovalent group derived from a coupler component, and B represents a monovalent group derived from a diazonium salt.

(10) The optical information recording medium as described in (1), (8) or (9), wherein the dye is an azo dye represented by the general formula (4''):

(4'')

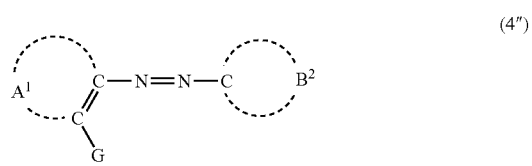

wherein $A^1$ and $B^2$ each independently represents atoms forming a substituted or unsubstituted aromatic hydrocarbon ring or a substituted or unsubstituted aromatic hetero ring, and G represent a monovalent group having the ability of coordinating to a metal ion.

(11) The optical information recording medium as described in (1), wherein the dye is a phthalocyanine dye.

(12) The optical information recording medium as described in (11), wherein the dye is a phthalocyanine dye represented by the general formula (5):

(5):

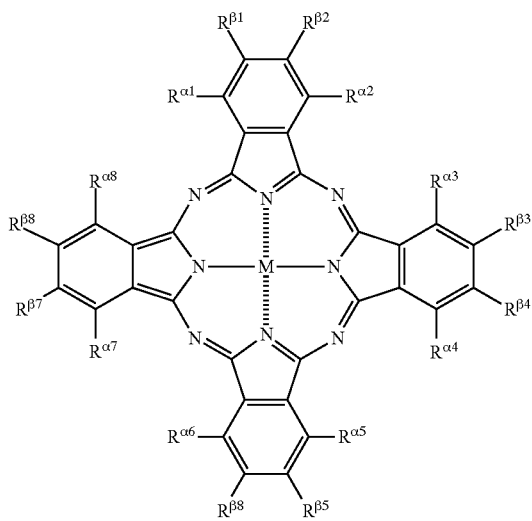

wherein $R^{\alpha 1}$ to $R^{\alpha 8}$ and $R^{\beta 1}$ to $R^{\beta 8}$ each independently represents a hydrogen atom, a halogen atom, a cyano group, a nitro group, a formyl group, a carboxyl group, a sulfo group, an alkyl group containing from 1 to 20 carbon atoms, an aryl group containing from 6 to 14 carbon atoms, an aralkyl group containing from 7 to 15 carbon atoms, a hetero ring group containing from 1 to 10 carbon atoms, an alkoxy group containing from 1 to 20 carbon atoms, an aryloxy group containing from 6 to 14 carbon atoms, an acyl group containing from 2 to 21 carbon atoms, an alkylsulfonyl group containing from 1 to 20 carbon atoms, an arylsulfonyl group containing from 6 to 20 carbon atoms, a carbamoyl group containing from 1 to 25 carbon atoms, a sulfamoyl group containing from 0 to 32 carbon atoms, an alkoxycarbonyl group containing from 2 to 21 carbon atoms, an aryloxycarbonyl group containing from 7 to 15 carbon atoms, an acylamino group containing from 2 to 21 carbon atoms, a sulfonylamino group containing from 1 to 20 carbon atoms or an amino group containing from 0 to 36 carbon atoms, M represents two hydrogen atoms, a metal, a metal oxide or a metal having a ligand.

(13) The optical information recording medium as described in (1), wherein the dye is a pyrromethene dye.

(14) The optical information recording medium as described in (1) or (13), wherein the dye is a pyrromethine dye represented by the general formula (P):

(P)

wherein A represents a chelate ring formed by a pyrromethene compound represented by the following general formula (Pa) and a metal M, B represents a chelate ring containing a nitrogen atom, an oxygen atom and/or a sulfur atom and formed together with M, and A and B may be the same or different from each other:

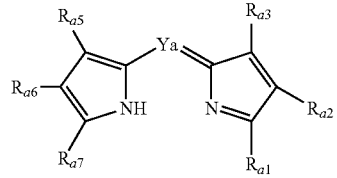

(Pa)

wherein Ya represents N or $CR_{a3}$, $R_{a1}$, $R_{a2}$, $R_{a3}$, $R_{a4}$, $R_{a5}$, $R_{a6}$ and $R_{a7}$ each represents a hydrogen atom or a substituent, $R_{a1}$ and $R_{a2}$, $R^{a2}$ and $R_{a3}$, $R_{a5}$ and $R_{a6}$, or $R_{a6}$ and $R_{a7}$ may be connected to each other to form an aromatic ring or a hetero ring, the ring may have a substituent and, further, the ring may be condensed with an aromatic ring or a hetero ring.

(15) An image recording method of recording an image in an image recording layer of the optical information recording medium described in any one of (1) to (14), wherein the same laser light as that used for recording optical information in the recording layer is used for recording a visible image in the image recording layer.

(16) A method of utilizing the dye described in any one of (1) to (14) in an image recording layer of an optical information recording medium.

The image recording layer according to the present invention (in some cases, referred to as a visual information recording layer) is preferably a visual information recording layer in which a substantially same track is irradiated with laser light several times to record visual information, or may be a visual information recording layer in which laser light swings in the radial direction of an optical disc and a substantially same track is irradiated with the laser light several times to record visual information.

The visual information recording layer of the optical recording medium according to the invention requires properties different from those required in typical digital data recording in the following respects: That is, in digital data recording, a pit is formed by one laser light irradiation. Therefore, a typical optical recording medium used in digital data recording and the optical recording medium of the invention require different properties. Typically, when a pit is formed in a dye recording layer, it is important to form a pit that provides sufficient reflectance and a sufficient degree of modulation so that a drive can recognize the pit. Therefore, those skilled in the art will not envision to use the system in which a substantially same track is irradiated with laser light several times, or the system in which laser light swings in the radial direction of an optical disc and a substantially same track is irradiated with the laser light several times. Also, for a typical optical disc, since the position where a pit is formed in the radial direction will be specified, the laser light will never be controlled to swing in the radial direction of the optical disc, or those skilled in the art will never envision to swing the laser light in the radial direction of the optical disc to form a pit. In such a system totally different from the related-art drive systems, the optical recording medium of the invention enables high contrast, high definition visual information recording (such as images) with excellent light resistance of recorded visual information.

BRIEF DESCRIPTION OF THE DRAWINGS

FIG. 14 is a view for illustrating the size of a beam spot diameter of a laser light emitted from the optical pickup of the optical disk recording apparatus to the visible image-recording layer of the optical disk;

10 denotes an optical pickup; 11 denotes a spindle motor (rotationally driving means); 12 denotes a RF amplifier; 13 denotes a servo circuit; 16 denotes a controlling unit; 17 denotes an encoder; 18 denotes a strategy circuit; 19 denotes a laser driver; 20 denotes a laser power controlling circuit; 21 denotes a frequency generator; 30 denotes a stepping motor; 31 denotes a motor driver; 32 denotes a motor controller; 33 denotes a PLL circuit; 34 denotes a FIFO memory; 35 denotes a driving pulse generating section; 36 denotes a buffer memory; 53 denotes a laser diode; 53a denotes a front monitor diode; 56 denotes a light-receiving element; 64 denotes a focus actuator; 65 denotes a tracking actuator; 100 denotes a optical disk recording apparatus; 212 denotes a substrate; 214 denotes a recording layer; 216 denotes a first reflection layer; 222 denotes a substrate (dummy); 224 denotes a image-recording layer; 226 denotes a second reflection layer; 230 denotes an adhesive layer; 270 denotes a chucking portion; 271 denotes an adaptor; 280 denotes a driving mechanism; 320 denotes an encoder; D denotes an optical disk; a denotes a curve showing absorbance change of the optical disk 1-1 of the invention; b denotes a curve showing absorbance change of the optical disk 1-2 of the invention; c denotes a curve showing absorbance change of the optical disk 1-3 of the invention; d denotes a curve showing absorbance change of the optical disk 1-4 of the invention; e denotes a curve showing absorbance change of the optical disk 1-5 of the invention; f denotes a curve showing absorbance change of the optical disk 1-6 of the invention; and g denotes a curve showing absorbance change of the optical disk 1-7 of the invention.

BEST MODE FOR CARRYING OUT THE INVENTION

The optical information recording medium of the invention is an optical information recording medium having a recording layer which permits recording and reproduction of information by irradiation with a laser light. It has an image recording layer capable of recording a visible image in addition to the aforementioned recording layer (preferably on the opposite side), with the image recording layer containing a dye as a major component. The dye has an absorbance of preferably 0.05 or more for a laser light. The dyes may be used independently or in combination of two or more thereof.

The optical information recording medium and the image recording method of the invention will be described below.

As to kind of the optical information recording medium of the invention, any of read-only type, writable type and re-writable type may be employed, with writable type being preferred. Recording type is not particularly limited, and any of phase change type, optomagnetic type and dye type may be employed, with dye type being preferred.

As to the stratum structure of the optical information recording medium of the invention, there are illustrated, for example, the following structures.

Figure 1:
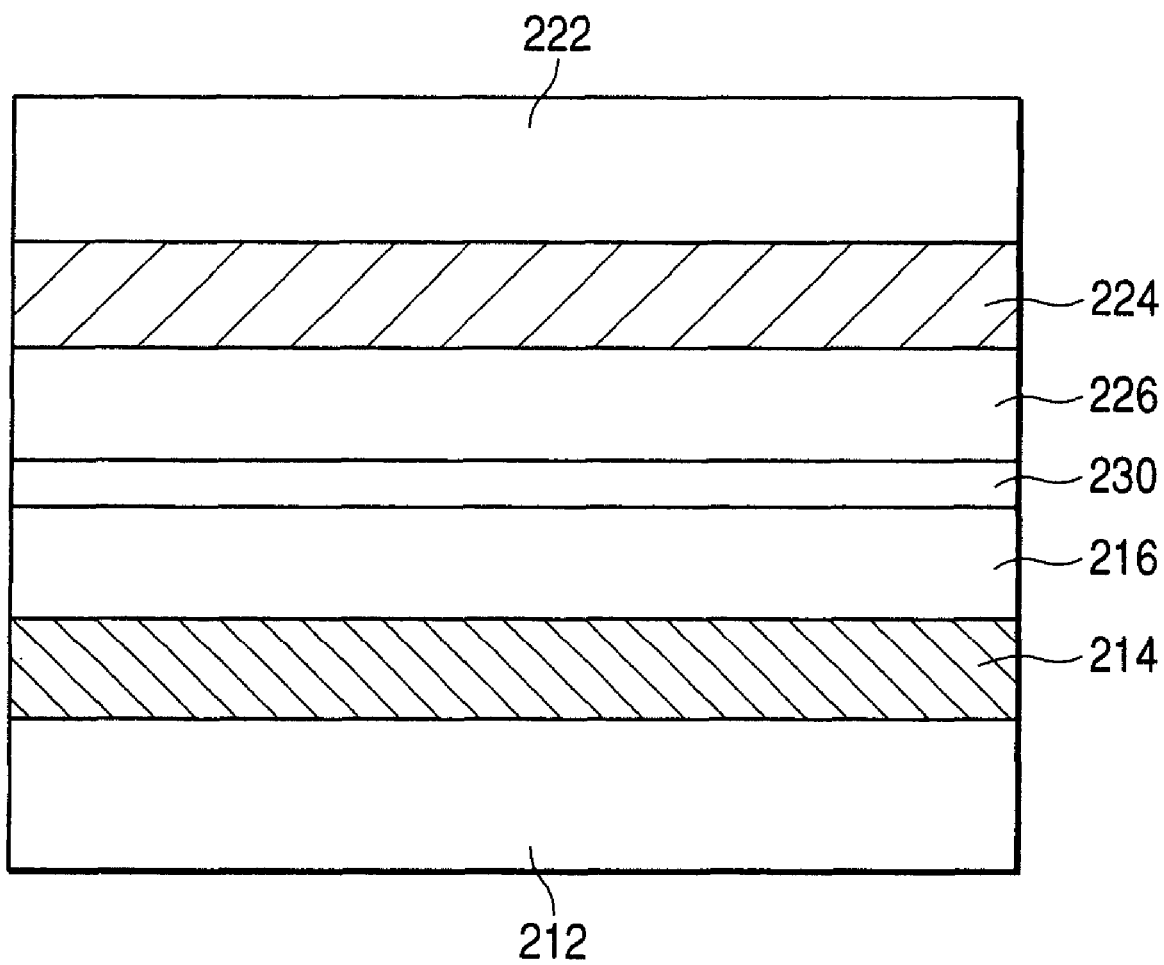
FIG. 1 is a schematic view of a layered structure of a preferred optical recording medium of the invention.

(1) A first structure comprises a substrate having provided thereon a recording layer, a reflection layer and an adhesive layer in this order, with an image recording layer and a dummy substrate being provided on the adhesive layer.
(2) A second structure comprises a substrate having provided thereon a recording layer, a reflection layer, a protective layer and an adhesive layer in this order, with an image recording layer and a dummy substrate being provided on the adhesive layer.
(3) A third structure comprises a substrate having provided thereon a recording layer, a reflection layer, a protective layer, an adhesive layer and a protective layer in this order, with an image recording layer and a dummy substrate being provided on the protective layer.
(4) A fourth structure comprises a substrate having provided thereon a recording layer, a reflection layer, a protective layer, an adhesive layer, a protective layer and a reflection layer in this order, with an image recording layer and a dummy substrate being provided on the antireflection layer.
(5) A fifth structure comprises a substrate having provided thereon a recording layer, a reflection layer, an adhesive layer and a reflection layer in this order, with an image recording layer and a dummy substrate being provided on the antireflection layer. FIG. 1 shows an example of the stratum structure.

Additionally, the stratum structures of (1) to (5) described above are merely illustrative, and the orders of the layers in the stratum structure are not limited only to the above-described orders, and one or more of the layers may be exchanged or omitted. Further, each layer may be constituted by a single layer or a plurality of layers.

The substrate and each of the layers will be described below.

[Image Recording Layer]

As has been described hereinbefore, the optical information recording medium of the invention has an image recording layer containing a dye as a major component in addition to the recording layer (preferably on the opposite side. Here, the phrase "containing a dye as a major component" means that the content of the dye based on the weight of the total solid components in the image recording layer amounts to 50% or more (preferably 80% or more).

In the image recording layer is recorded a visible image (visible information) a user desires, such as a letter, a figure or a picture pattern. Examples of the visible image include disk title, information on the content, thumbnail of the content, pattern related to the content, designing pattern, information on copyright, the recording date and time, recording method and recording format.

It suffices for the image recording layer to visibly record information such as a letter, an image or a picture pattern. In the invention, use of a dye having a maximum absorption within a light wavelength range of 400 to 850 nm and having an absorbance of 0.05 or more (preferably 0.1 or more and 1.0 or less) for a laser light to be used is preferred.

Specific examples of the dye include cyanine dyes, imidazoquinoxaline series dyes, pyrylium series or thiopyrylium series dyes, azulenium series dyes, squarylium series dyes, azo dyes, metal (Ni or Cr) complex salt series dyes (phthalocyanine dyes, azo metal chelate dyes and pyrromethene metal chelate dyes), naphthoquinone series dyes, anthraquinone series dyes, indophenol series dyes, indoaniline series dyes, triphenylmethane series dyes, merocyanine series dyes, oxonol series dyes, aminium series dyes and UV ray absorbents. Of these, cyanine series dyes, phthalocyanine series dyes, azo dyes (including metal chelate dyes), merocyanine series dyes, oxonol series dyes and UV ray absorbents are preferably used.

A dye adapted for a laser light of a wavelength used for recording can be obtained by, for example, changing the length of the dye conjugation system. That is, in the case of recording with a laser light of 750 to 850 nm in wavelength, methine chain length of, for example, a cyanine dye or a merocyanine dye is preferably from 5 to 7 and, with an oxonol series dye, methine chain length is preferably from 7 to 9.

Also, in the case of recording with a laser light of from 600 to 700 nm in wavelength, methine chain length of, for example, a cyanine dye or a merocyanine dye is preferably from 3 to 5 and, with an oxonol series dye, methine chain length is preferably from 5 to 7.

Further, in the case of recording with a laser light of from 350 to 450 nm in wavelength, it is possible to use a UV ray absorbent or a near-ultraviolet ray absorbent. However, the above-mentioned dyes having a side absorption in this laser wavelength region are preferably used. Cyanine dyes whose methine chain length is 1 and oxonol dyes whose methine chain length is 1 are preferred.

As a combination of dyes, there can preferably be illustrated a combination of an oxonol dye and a cyanine dye; a combination of an oxonol dye and an azo dye; a combination of one oxonol dye and another oxonol dye; a combination of an oxonol dye and a phthalocyanine dye; a combination of an oxonol dye and a pyrromethene dye; a combination of one cyanine dye and another cyanine dye; a combination of a cyanine dye and an azo dye, a combination of a cyanine dye and a phthalocyanine dye; a combination of a cyanine dye and a pyrromethene dye; a combination of an azo dye and a phthalocyanine dye; a combination of an azo dye and a pyrromethene dye; and a combination of a phthalocyanine dye and a pyrromethene dye.

In the case of combining the dyes, the content ratio (by weight) of the dyes is preferably from 99:1 to 1:99, more preferably from 95:5 to 30:70, still more preferably from 90:10 to 40:60.

Oxonol dyes are described below. The oxonol dyes are compounds represented by the following general formula (A) and preferably dyes having chained acidic nuclei or cyclic acidic nuclei with a methane number of from 1 to 7. In the formula, n preferably represents an integer of from 1 to 4. Rs may form a ring. Oxonol dyes represented by the foregoing general formula (II) are more preferred, dyes represented by the general formula (I) are still more preferred, and dyes represented by the general formula (III) are yet more preferred. Also, dyes represented by the general formulae (IV), (V), (VI), (VII), (II') or (1) may be used.

(A)

R: hydrogen or substituent; n: integer of 0 or more

Compound examples represented by the general formula (III) to be shown hereinafter are also included in the compounds represented by the general formula (1).

$R^{11}$, $R^{12}$, $R^{13}$ and $R^{14}$ in the general formula (1) each independently represents a hydrogen atom, a substituted or unsubstituted alkyl group, a substituted or unsubstituted aryl group or a substituted or unsubstituted hetero ring group. As the substituted or unsubstituted alkyl group represented by $R^{11}$, $R^{12}$, $R^{13}$ and $R^{14}$, there are illustrated an alkyl group containing from 1 to 20 carbon atoms (e.g., methyl, ethyl, propyl, butyl, i-butyl, t-butyl, i-amyl, cyclopropyl, cyclohexyl, benzyl or phenethyl). Also, in the case where $R^{11}$, $R^{12}$, $R^{13}$ and $R^{14}$ each represents an alkyl group, they may be connected to each other to form a carbon ring (e.g., cyclopropyl, cyclobutyl, cyclopentyl, cyclohexyl, 2-methylcyclohexyl, cycloheptyl or cyclooctyl) or a hetero ring (e.g., piperidyl, chromanyl or morpholyl). The alkyl group represented by $R^{11}$, $R^{12}$, $R^{13}$ or $R^{14}$ is preferably a chain alkyl group or a cyclic alkyl group containing from 1 to 8 carbon atoms. Most preferably, the alkyl group is a chain (straight or branched) alkyl group containing from 1 to 5 carbon atoms, two of the alkyl groups of $R^{11}$ and $R^{12}$, or $R^{13}$ and $R^{14}$, are connected to each other to form a cyclic alkyl ring containing from 1 to 8 carbon atoms (preferably a cyclohexyl ring), or the alkyl group is a substituted alkyl group containing from 1 to 20 carbon atoms (e.g., benzyl or phenethyl).

As the substituted or unsubstituted aryl group represented by $R^{11}$, $R^{12}$, $R^{13}$ and $R^{14}$, there are illustrated an aryl group containing from 6 to 20 carbon atoms (e.g., phenyl or naphthyl). The substituted or unsubstituted aryl group represented by $R^{11}$, $R^{12}$, $R^{13}$ and $R^{14}$ is preferably an aryl group containing from 6 to 10 carbon atoms.

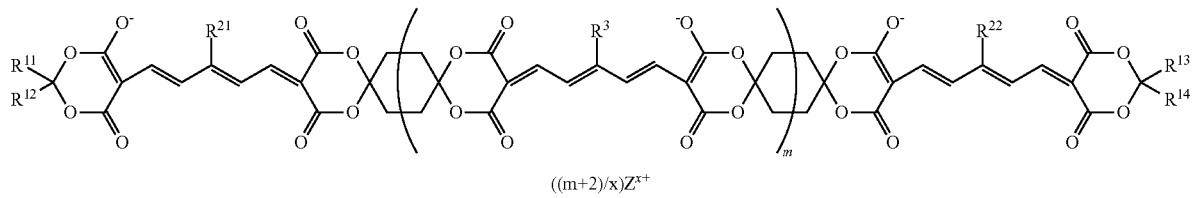

(1)

In the general formula (1), $R^{11}$, $R^{12}$, $R^{13}$ and $R^{14}$ each independently represents a hydrogen atom, a substituted or unsubstituted alkyl group, a substituted or unsubstituted aryl group or a substituted or unsubstituted hetero ring group, $R^{21}$, $R^{22}$ and $R^3$ represent any one of a hydrogen atom, a substituted or unsubstituted alkyl group, a substituted or unsubstituted alkoxy group, a substituted or unsubstituted aryl group, a substituted or unsubstituted aryloxy group, a substituted or unsubstituted hetero ring group, a halogen atom, a carboxyl group, a substituted or unsubstituted alkoxycarbonyl group, a cyano group, a substituted or unsubstituted acyl group, a substituted or unsubstituted carbamoyl group, an amino group, a substituted amino group, a sulfo group, a hydroxyl group, a nitro group, a substituted or unsubstituted alkylsulfonylamino group, a substituted or unsubstituted arylsulfonylamino group, a substituted or unsubstituted carbamoylamino group, a substituted or unsubstituted alkylsulfonyl group, a substituted or unsubstituted arylsulfonyl group, a substituted or unsubstituted alkylsulfinyl group, a substituted or unsubstituted arylsulfinyl group and a substituted or unsubstituted sulfamoyl group, m represents an integer of 0 or more and, when m represents an integer of 2 or more, plural $R^3$s may be the same or different from each other, $Z^{x+}$ represents a cation, and x represents an integer of 1 or more.

The substituted or unsubstituted hetero ring group represented by $R^{11}$, $R^{12}$, $R^{13}$ and $R^{14}$ is a 5- to 6-membered saturated or unsaturated hetero ring constituted by carbon atom, nitrogen atom, oxygen atom or sulfur atom, and examples thereof include a pyridyl group, a pyrimidyl group, a pyridazyl group, a piperidyl group, a triazyl group, a pyrrolyl group, an imidazolyl group, a triazolyl group, a furanyl group, a thiophenyl group, a thiazolyl group, an oxazolyl group, an isothiazolyl group and an isoxazolyl group. The hetero ring group may be a benzo-condensed derivative thereof (e.g., a quinolyl group, a benzimidazolyl group, a benzothiazolyl group or a benzoxazolyl group). The substituted or unsubstituted hetero ring group represented by $R^{11}$, $R^{12}$, $R^{13}$ and $R^{14}$ is preferably a substituted or unsubstituted hetero ring group containing from 6 to 10 carbon atoms.

As substituents for the substituted or unsubstituted alkyl group, substituted or unsubstituted aryl group and substituted or unsubstituted hetero ring group represented by $R^{11}$, $R^{12}$, $R^{13}$ and $R^{14}$, there are illustrated a group of substituents S to be described hereinafter.

Examples of substituents belonging to group S include an alkyl group containing from 1 to 20 carbon atoms (e.g., methyl, ethyl, propyl, carboxymethyl or ethoxycarbonylmethyl), an aralkyl group containing from 7 to 20 carbon atoms (e.g., benzyl or phenethyl), an alkoxy group containing from 1 to 8 carbon atoms (e.g., methoxy or ethoxy), an aryl group containing from 6 to 20 carbon atoms (e.g., phenyl or naphthyl), an aryloxy group containing from 6 to 20 carbon atoms (e.g., phenoxy or naphthoxy), a hetero ring (e.g., pyridyl, pyrimidyl, pyridazyl, benzimidazolyl, benzothiazolyl, benzoxazolyl, 2-pyrrolidinon-1-yl, 2-piperidon-1-yl, 2,4-dihydroxyimidazolidin-3-yl, 2,4-dihydroxyoxazolidin-3-yl, succinimido, phthalimido or maleimido), a halogen atom (e.g., fluorine, chlorine, bromine or iodine), a carboxyl group, an alkoxycarbonyl group containing from 2 to 10 carbon atoms (e.g., methoxycarbonyl or ethoxycarbonyl), a cyano group, an acyl group containing from 2 to 10 carbon atoms (e.g., acetyl or pivaloyl), a carbamoyl group containing from 1 to 10 carbon atoms (e.g., carbamoyl, methylcarbamoyl or morpholinocarbamoyl), an amino group, a substituted amino group containing from 1 to 20 carbon atoms (e.g., dimethylamino, diethylamino, bis(methylsulfonylethyl)amino, N-ethyl-N'-sulfoethylamino), a sulfo group, a hydroxyl group, a nitro group, an alkylsulfonylamino group containing from 1 to 10 carbon atoms (e.g., methylsulfonylamino), a carbamoylamino group containing from 1 to 10 carbon atoms (e.g., carbamoylamino or methylcarbamoylamino), a sulfonyl group containing from 1 to 10 carbon atoms (e.g., methanesulfonyl or ethanesulfonyl), a sulfinyl group containing from 1 to 10 carbon atoms (e.g., methanesulfinyl) and a sulfamoyl group containing from 0 to 10 carbon atoms (e.g., sulfamoyl or methanesulfamoyl). The carboxyl group and the sulfo group may be in a salt form thereof.

$R^{21}$, $R^{22}$ and $R^3$ in the general formula (1) each independently represents any one of a hydrogen atom, a substituted or unsubstituted alkyl group, a substituted or unsubstituted alkoxy group, a substituted or unsubstituted aryl group, a substituted or unsubstituted aryloxy group, a substituted or unsubstituted hetero ring group, a halogen atom, a carboxyl group, a substituted or unsubstituted alkoxycarbonyl group, a cyano group, a substituted or unsubstituted acyl group, a substituted or unsubstituted carbamoyl group, an amino group, a substituted amino group, a sulfo group, a hydroxyl group, a nitro group, a substituted or unsubstituted alkylsulfonylamino group, a substituted or unsubstituted arylsulfonylamino group, a substituted or unsubstituted carbamoylamino group, a substituted or unsubstituted alkylsulfonyl group, a substituted or unsubstituted arylsulfonyl group, a substituted or unsubstituted alkylsulfinyl group, a substituted or unsubstituted arylsulfinyl group, a substituted or unsubstituted sulfinyl group and a substituted or unsubstituted sulfamoyl group. Preferably, $R^{21}$, $R^{22}$ and $R^3$ are any of a hydrogen atom, a substituted or unsubstituted alkyl group containing from 1 to 20 carbon atoms, a substituted or unsubstituted hetero ring group containing from 2 to 20 carbon atoms, a substituted or unsubstituted alkoxy group containing from 1 to 20 carbon atoms, a substituted or unsubstituted aryl group containing from 6 to 20 carbon atoms and a halogen atom, more preferably, any of a hydrogen atom, a substituted or unsubstituted alkyl group containing from 1 to 10 carbon atoms, a substituted or unsubstituted alkoxy group containing from 1 to 10 carbon atoms, a substituted or unsubstituted hetero ring group containing from 2 to 10 carbon atoms and a halogen atom and, most preferably, any of a hydrogen atom, an unsubstituted alkyl group containing from 1 to 5 carbon atoms, an unsubstituted alkoxy group containing from 1 to 5 carbon atoms, a substituted or unsubstituted hetero ring group containing from 2 to 6 carbon atoms and a halogen atom. $R^{21}$, $R^{22}$ and $R^3$ may further have a substituent. As examples of the substituent, there are illustrated those which are included in the aforesaid substituent group S.

It is preferred that m is 0 and that both $R^{21}$ and $R^{22}$ are a hydrogen atom. It is also preferred that m is 1 and that $R^{21}$, $R^{22}$ and $R^3$ are all a hydrogen atom.

m in the general formula (1) represents an integer of 0 or more, preferably an integer of from 0 to 5 inclusive, more preferably an integer of from 0 to 3, particularly preferably an integer of from 0 to 2.

In the general formula (1), when m represents an integer of 2 or more, plural $R^3$s may be the same or different from each other, and each independently represents a hydrogen atom or the aforesaid substituent.

In the general formula (1), $Z^{x+}$ represents a cation, and x represents an integer of 1 or more.

The cation represented by $Z^{x+}$ is preferably a quaternary ammonium ion, more preferably a 4,4'-bipyridinium cation represented by the general formula (I-4) in JP-A-2000-52658 or a 4,4'-bipyridinium cation disclosed in JP-A-2002-59652. In the general formula (1), x is preferably 1 or 2.

Preferred specific examples of the compound represented by the foregoing general formula (1) are shown below which, however, do not limit the invention in any way.

(1)

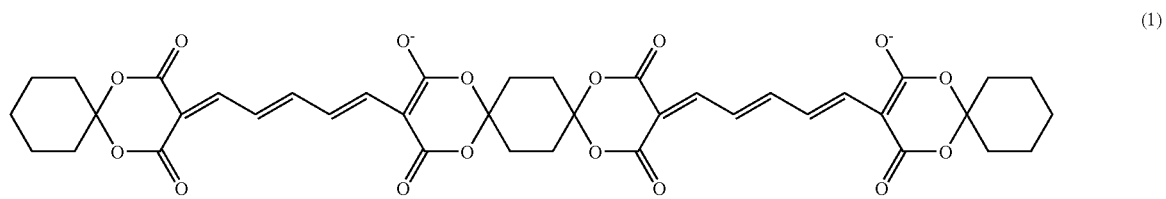

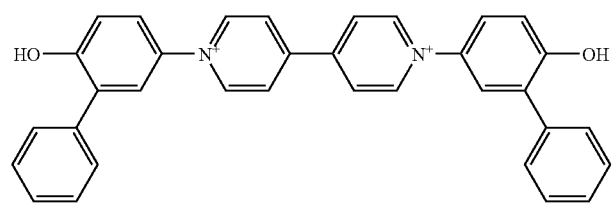

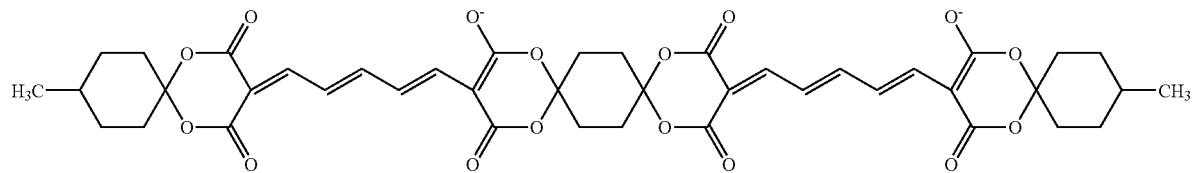
(2)
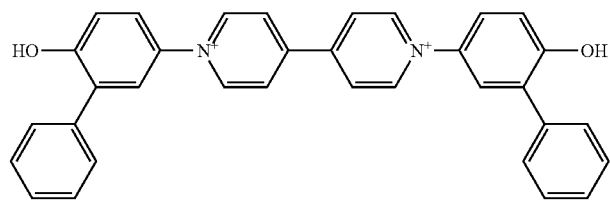
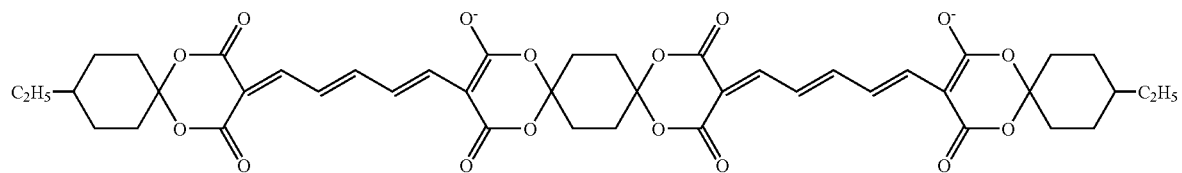
(3)
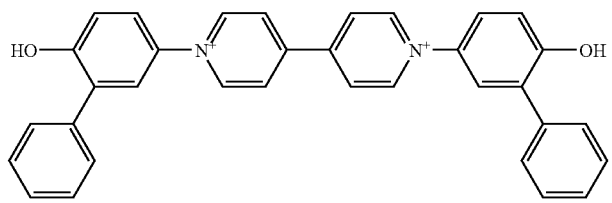
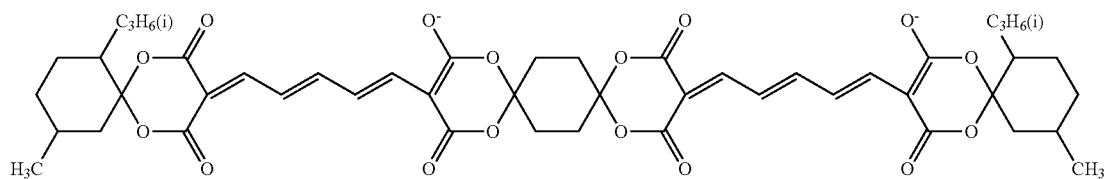
(4)
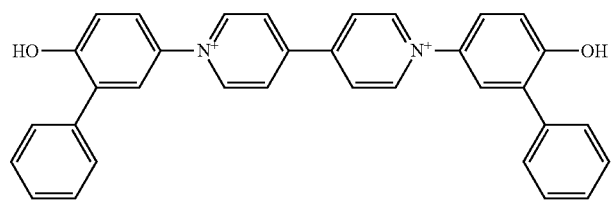

(5)
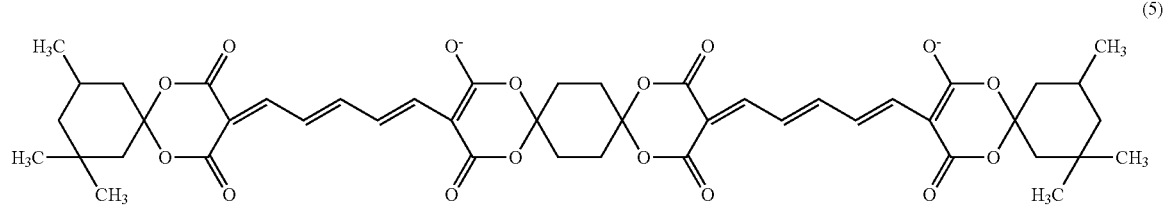
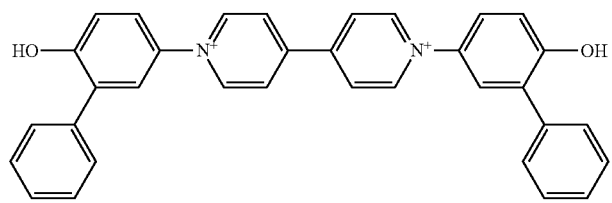
(6)
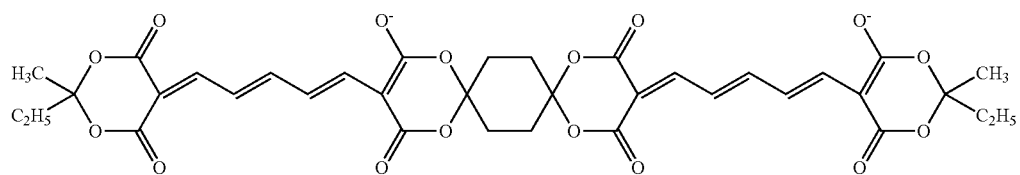
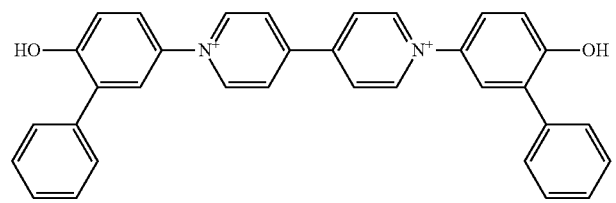
(7)
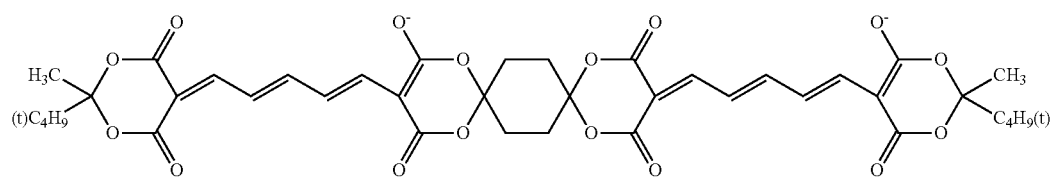
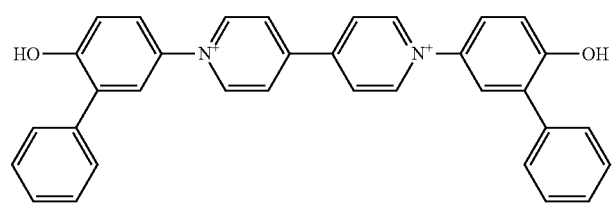

(8)
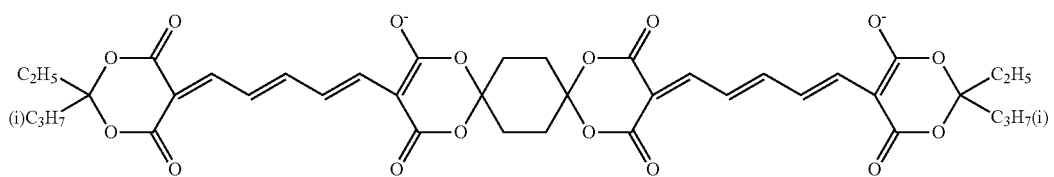
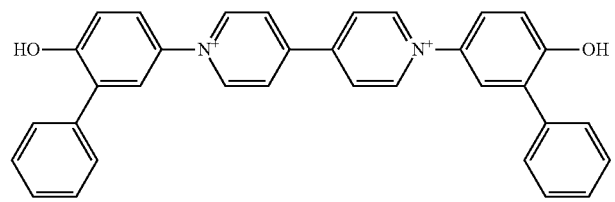
(9)
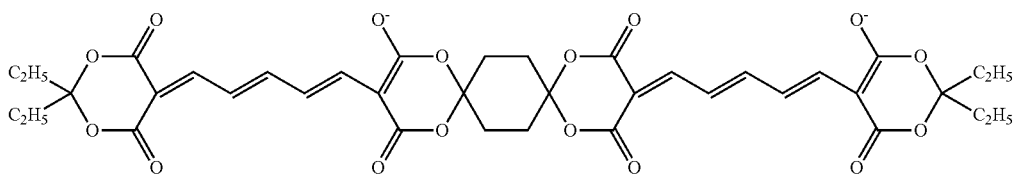
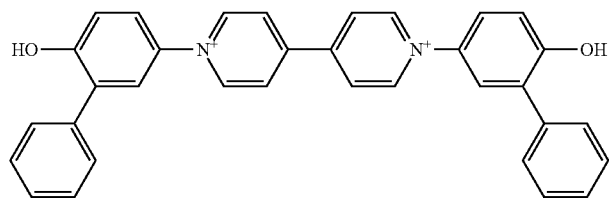
(10)
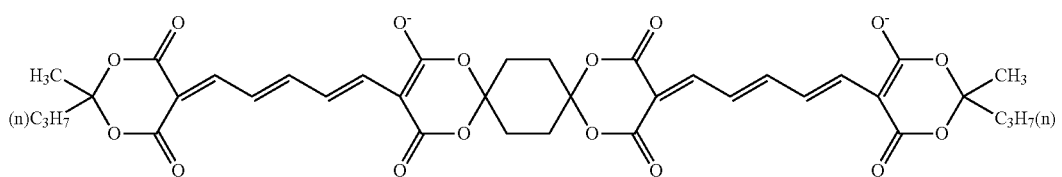
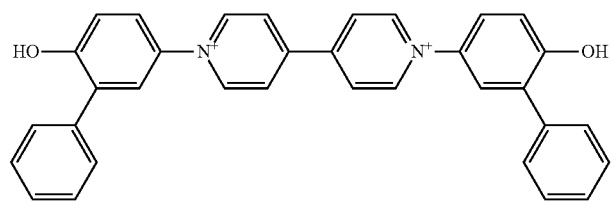

(11)
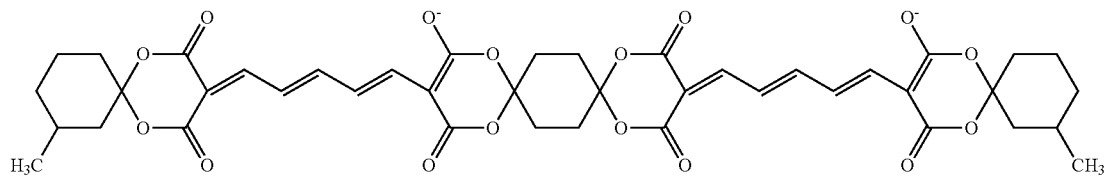
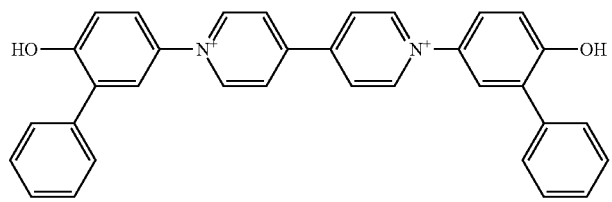
(12)
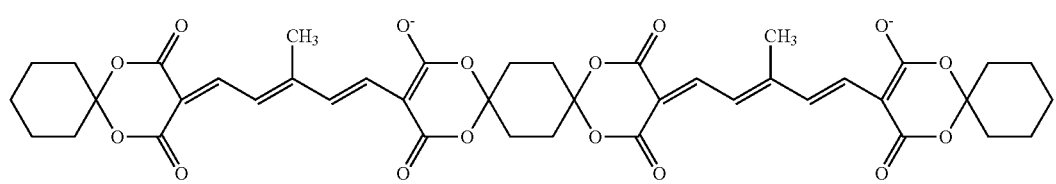
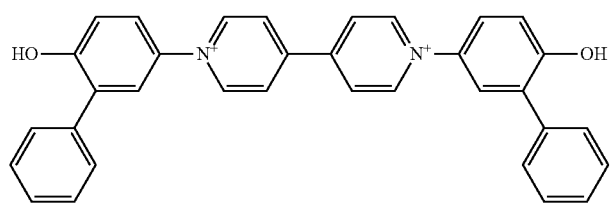
(13)
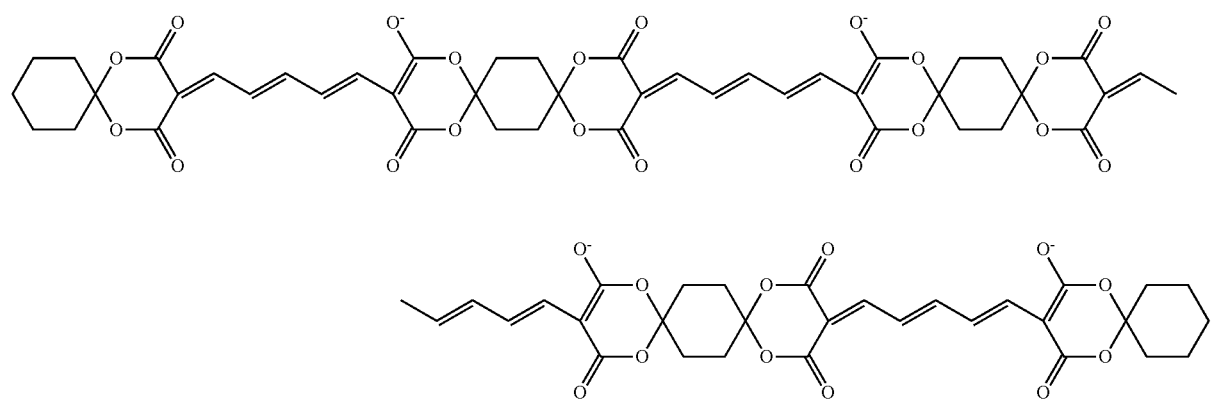
2 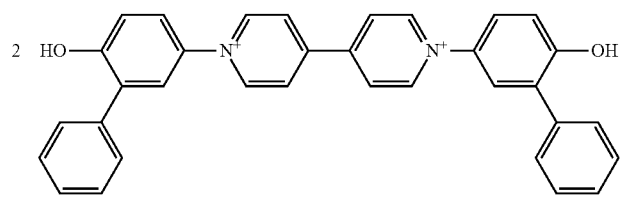

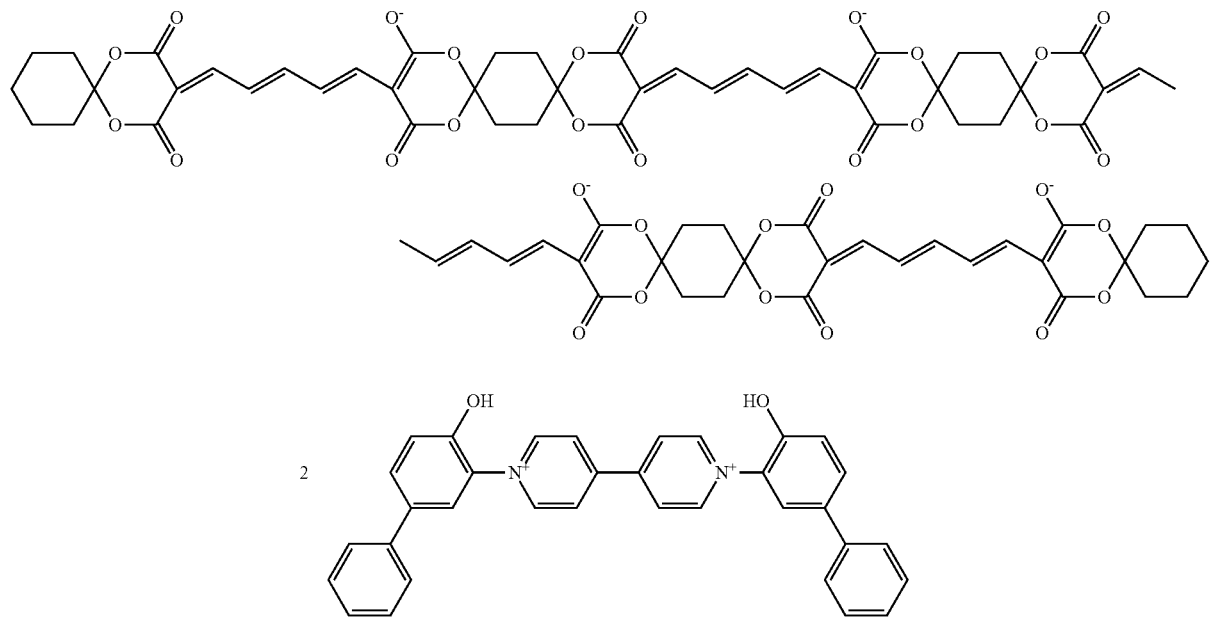
(14)
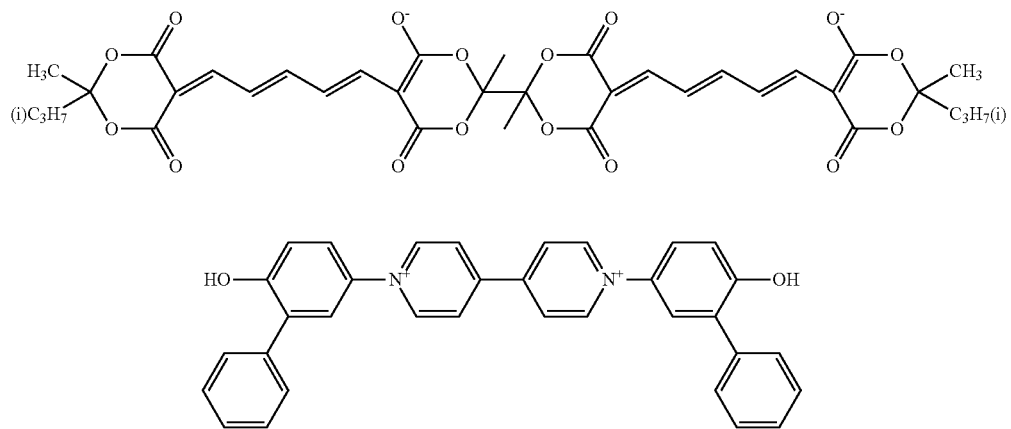
(15)
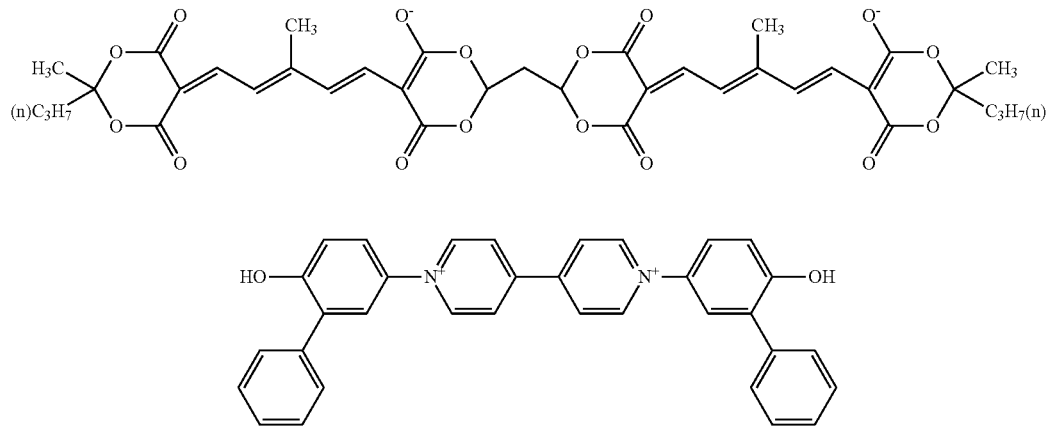
(16)

(17)
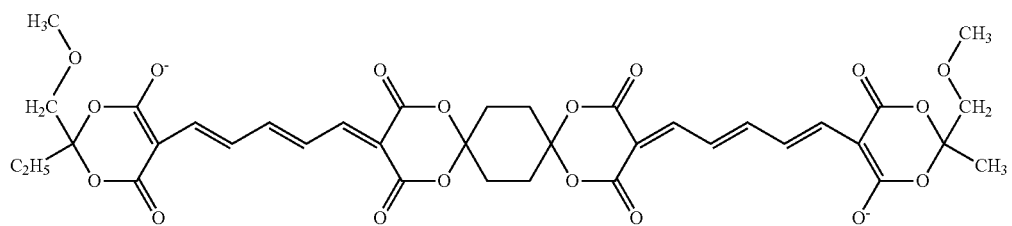
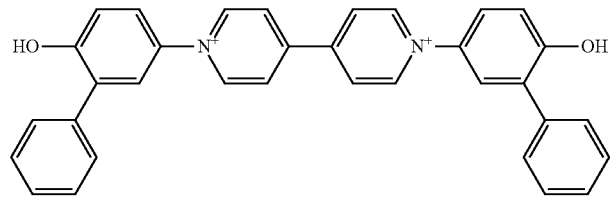
(18)
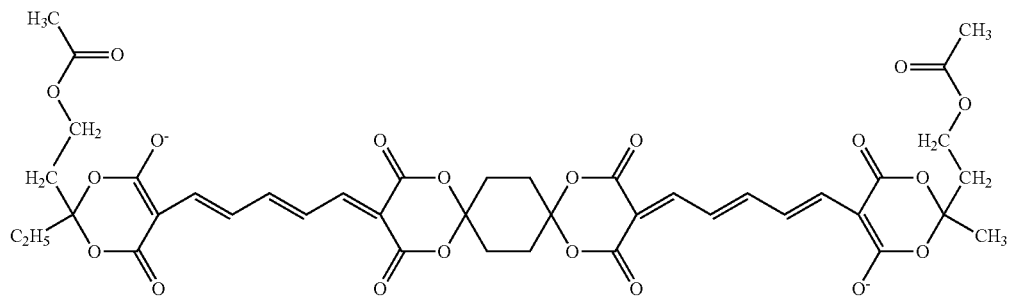
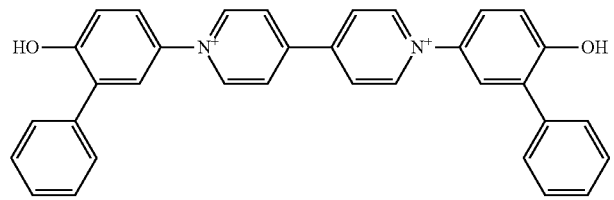
(19)
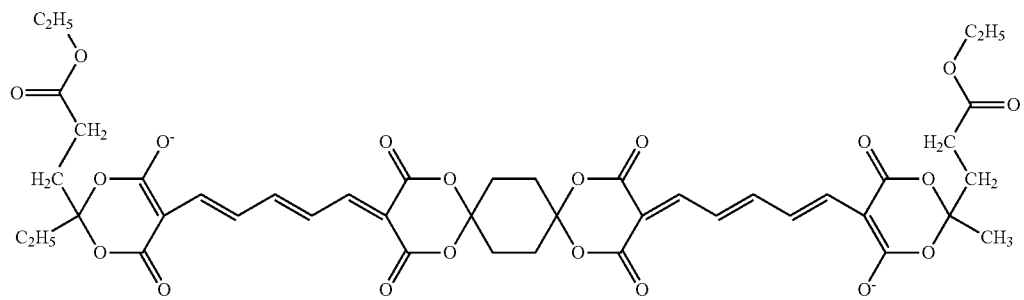
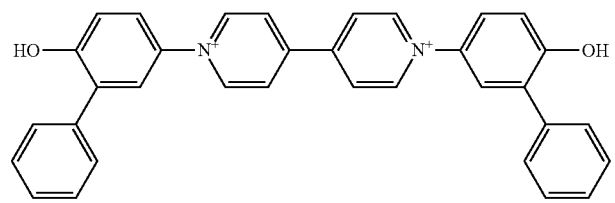

-continued
(20)
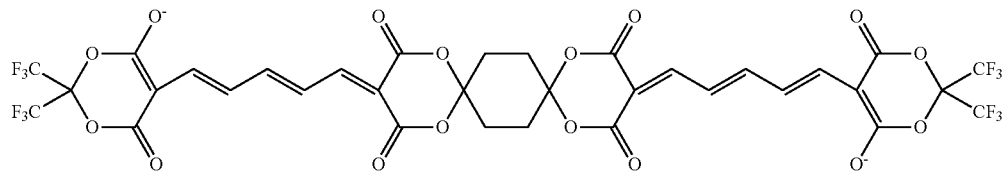
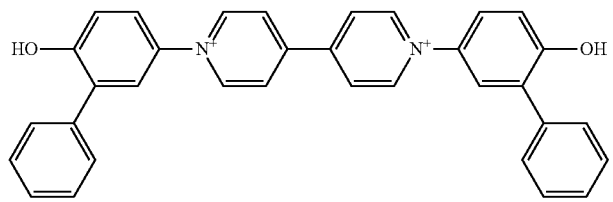
(21)
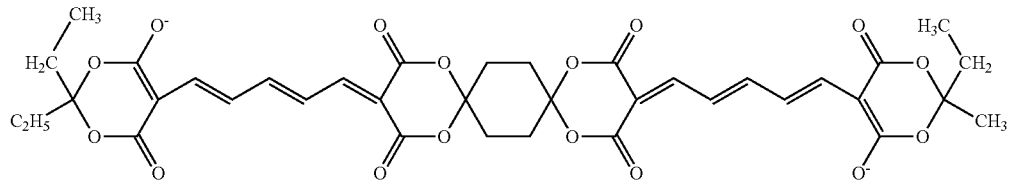
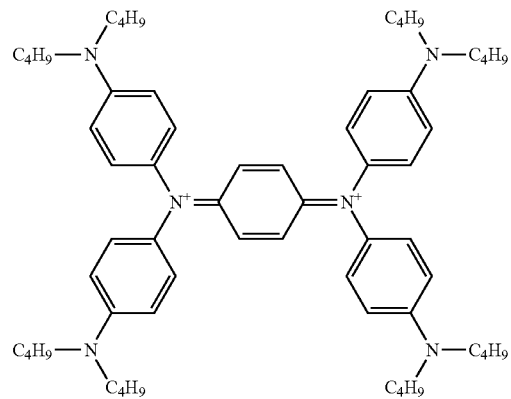
(22)
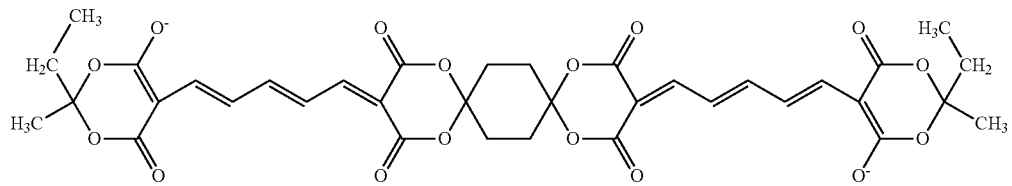
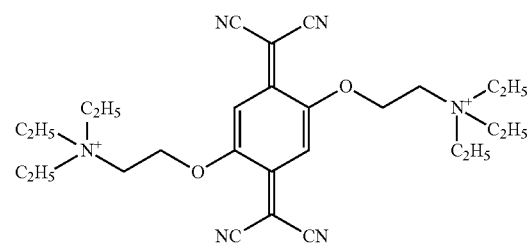

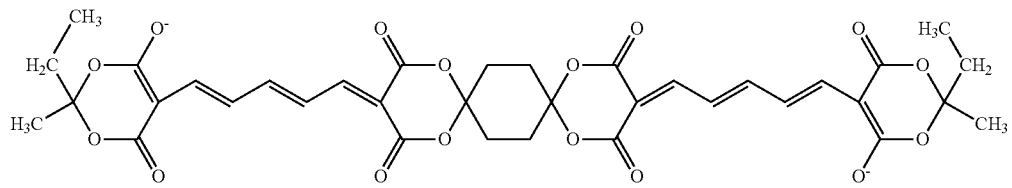
(23)
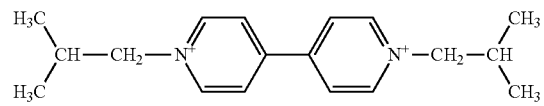
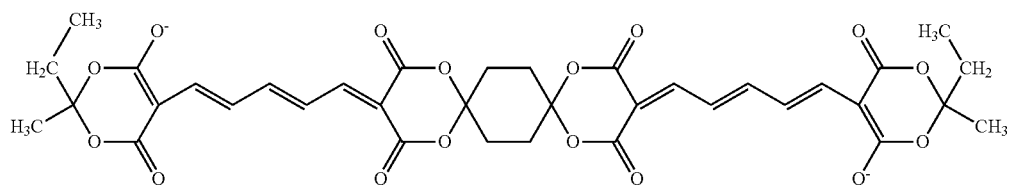
(24)
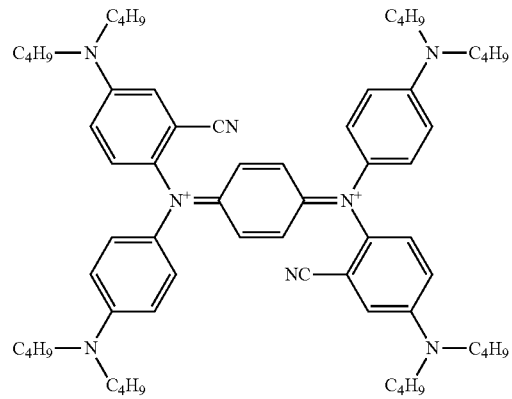
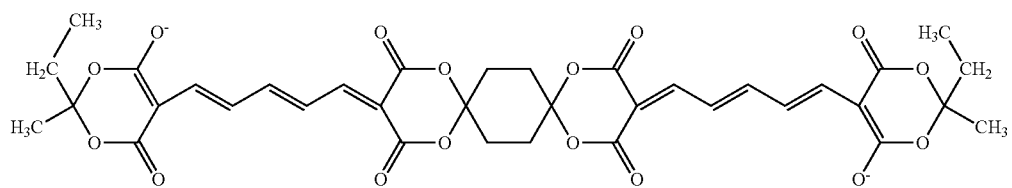
(25)
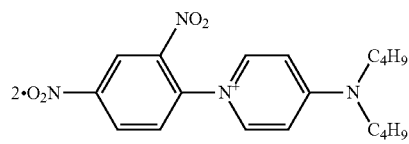

(26)
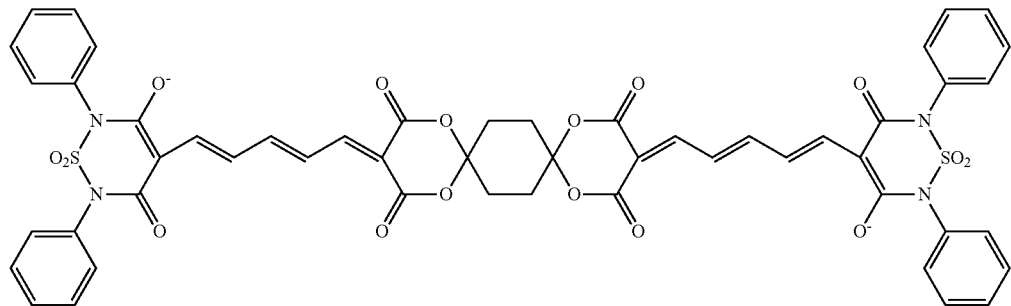
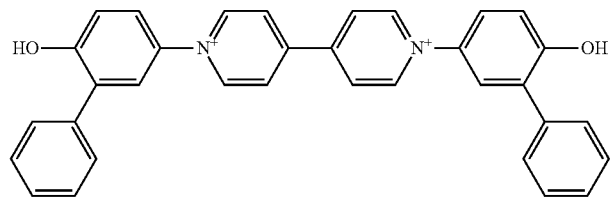
(27)
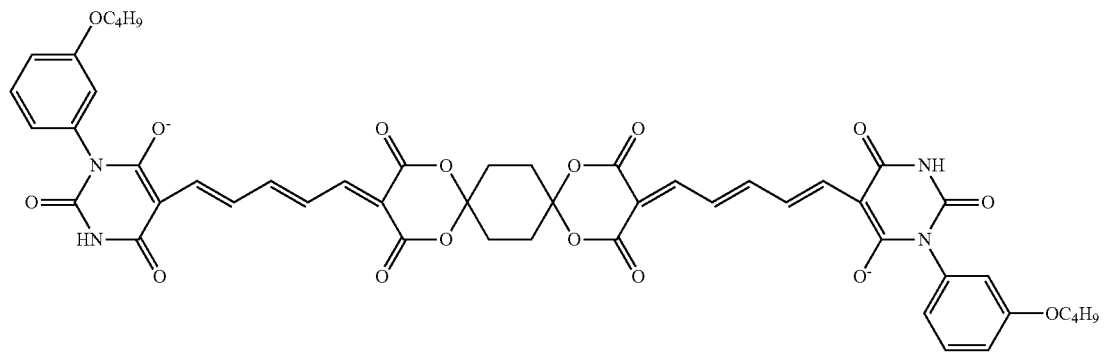
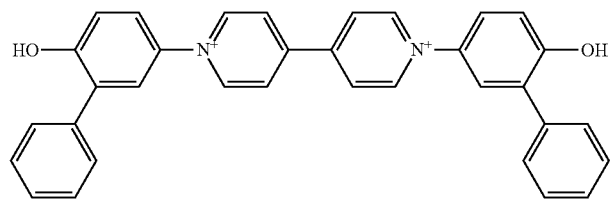
(28)
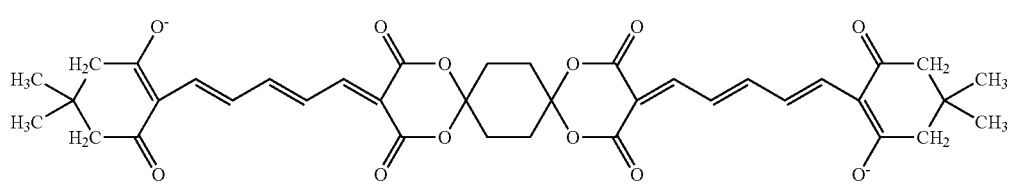
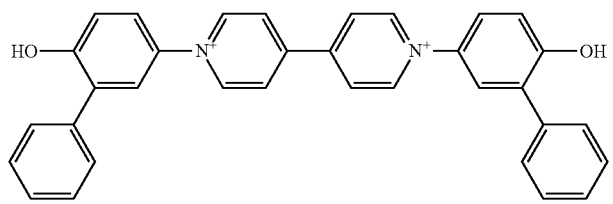

(29)
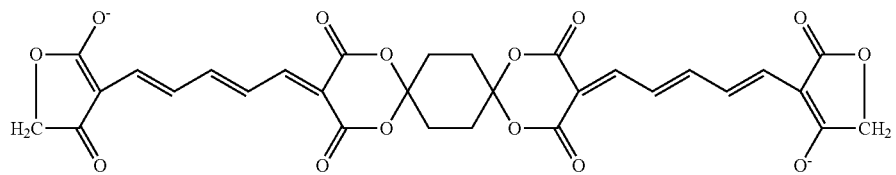
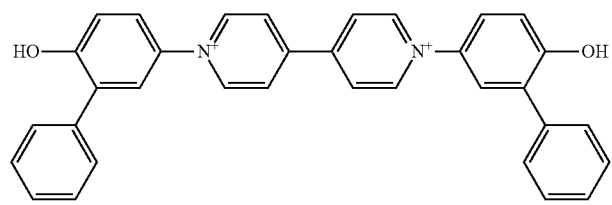
(30)
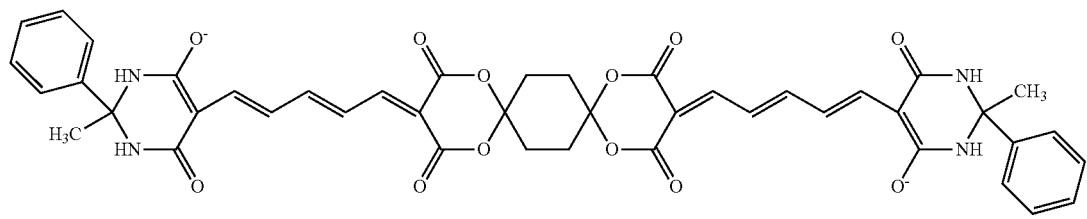
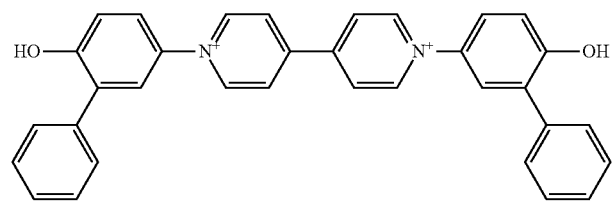
(31)
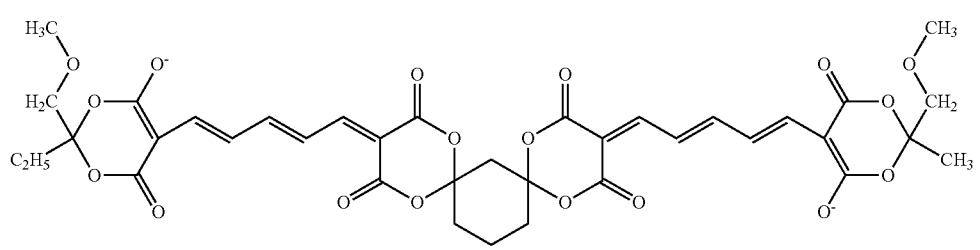
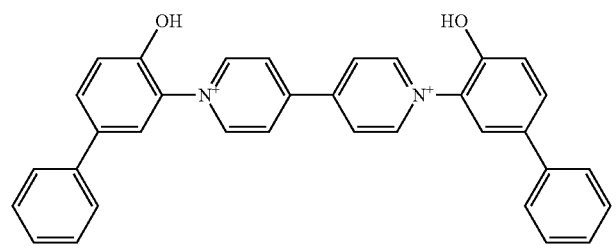

(32)
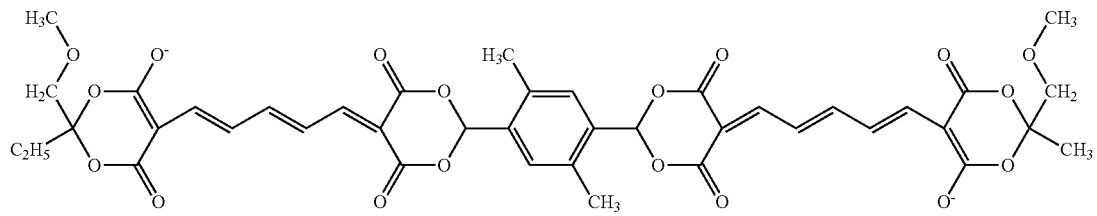
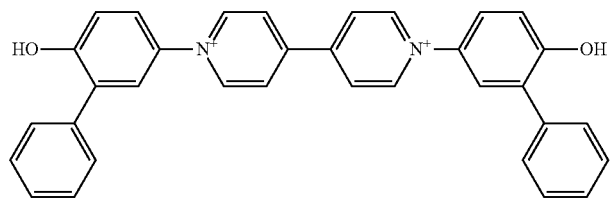
(33)
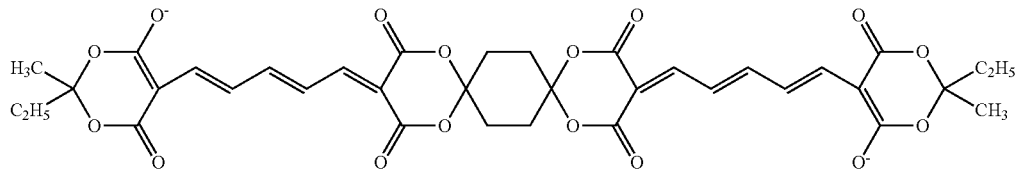
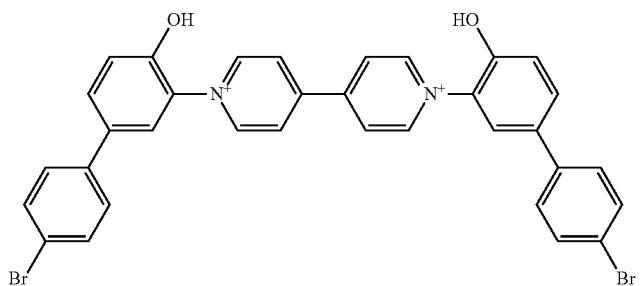
(34)
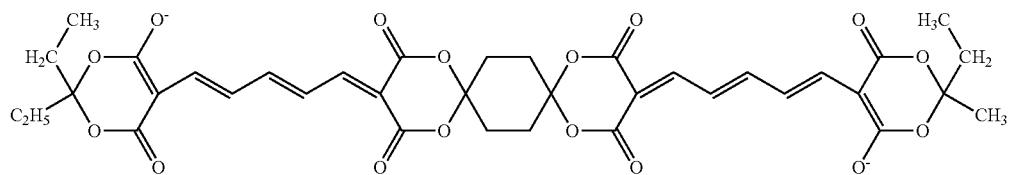
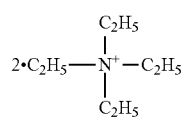
(35)
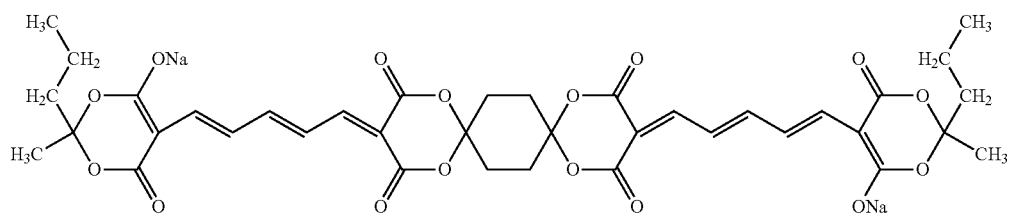

-continued
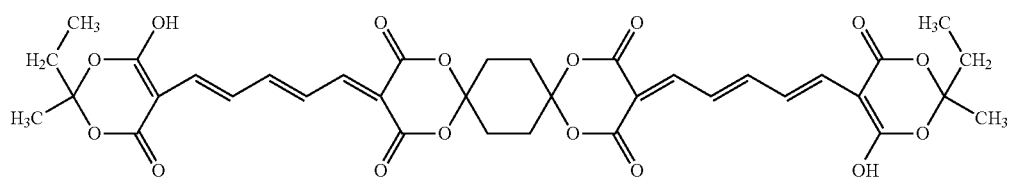
(36)
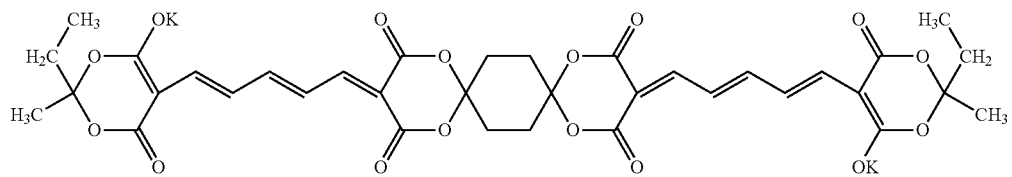
(37)
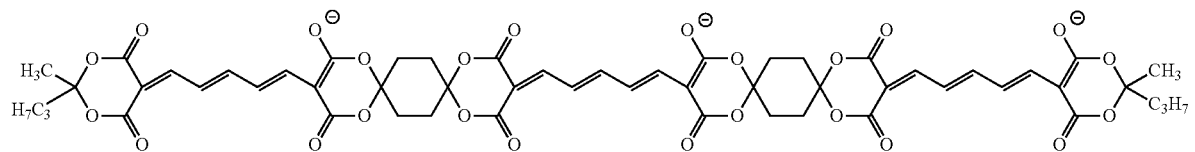
(II')-1
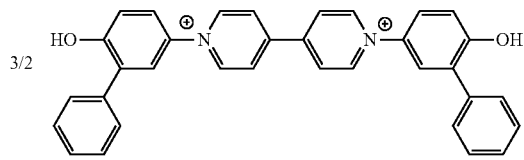
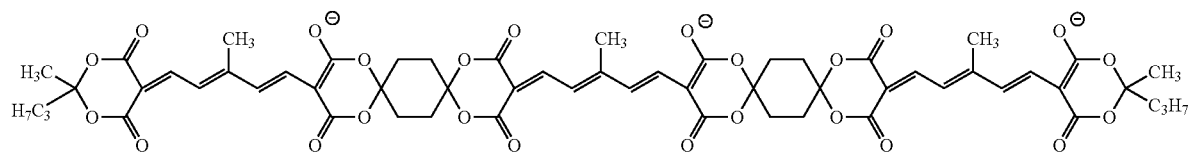
(II')-2
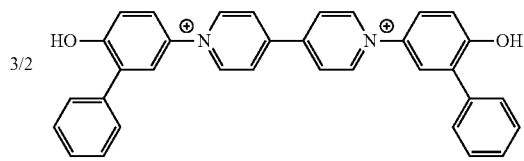
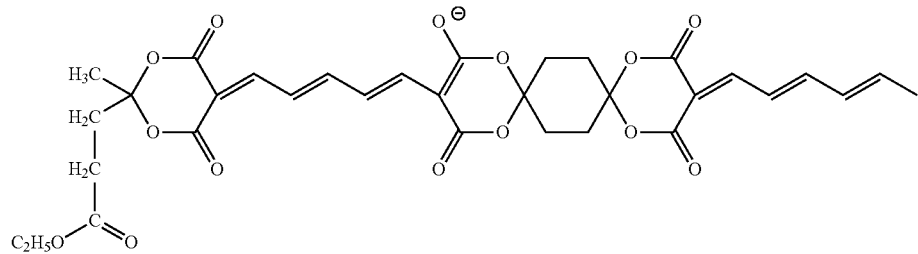
(II')-3

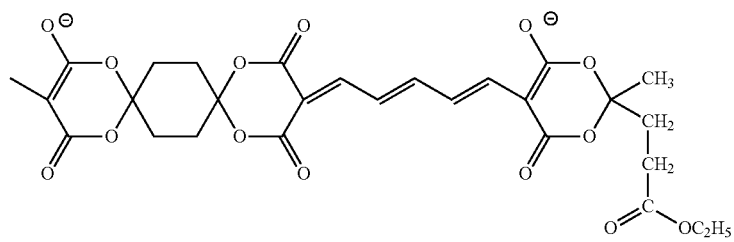
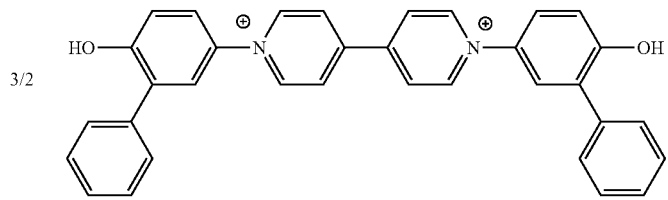
3/2
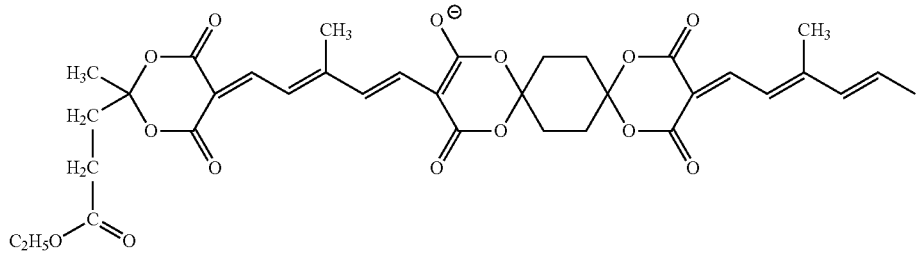
(II')-4
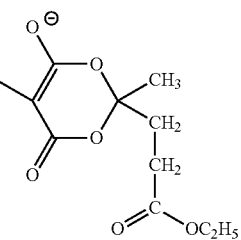
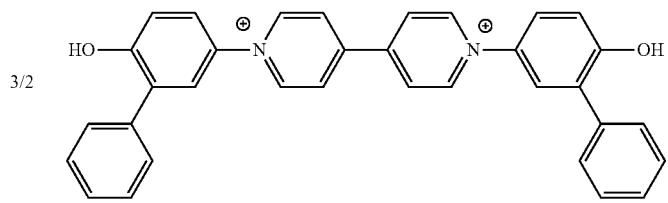
3/2
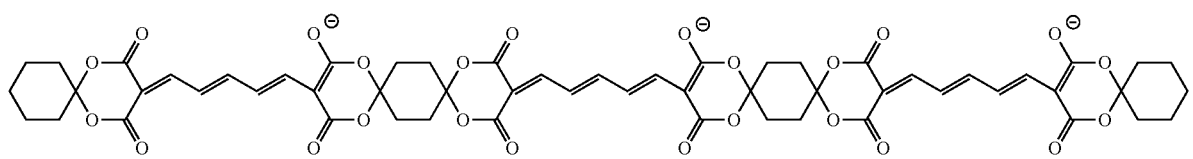
(II')-5
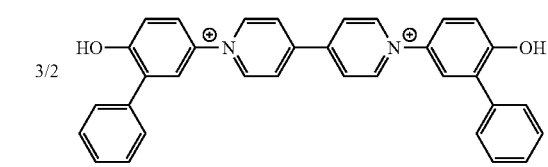
3/2

-continued
(II′)-6
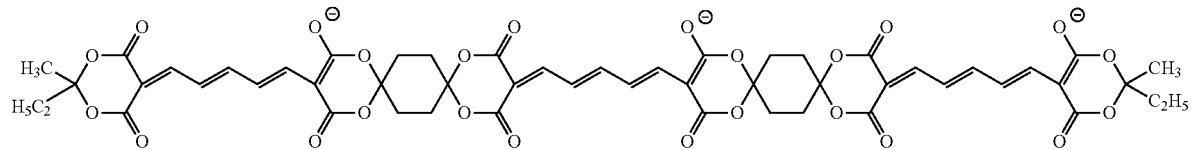
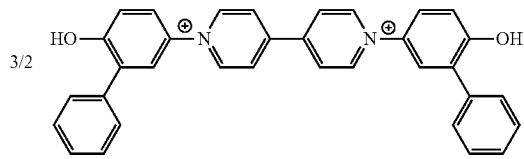
(II′)-7
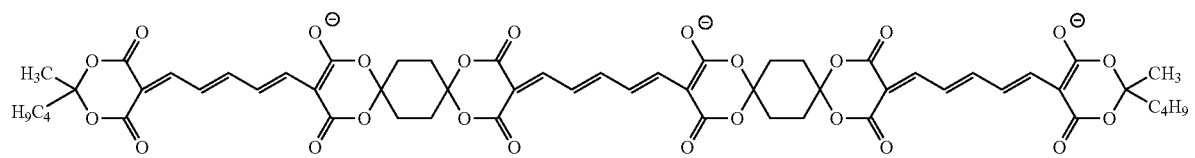
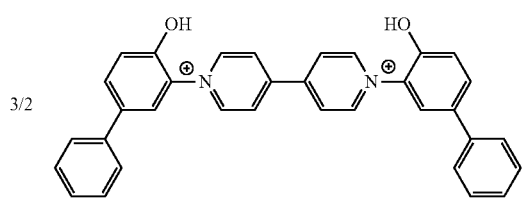
(II′)-8
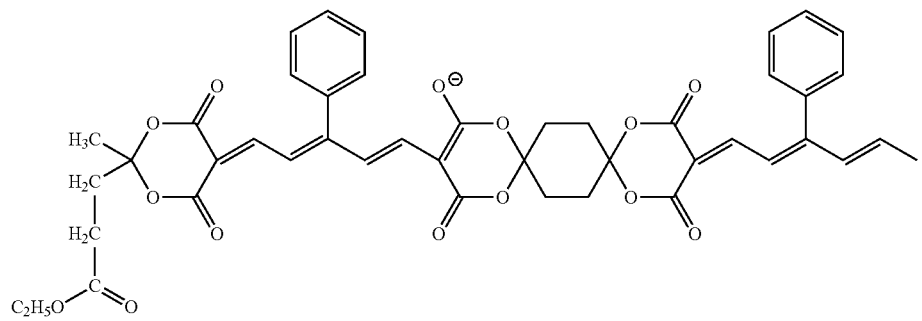
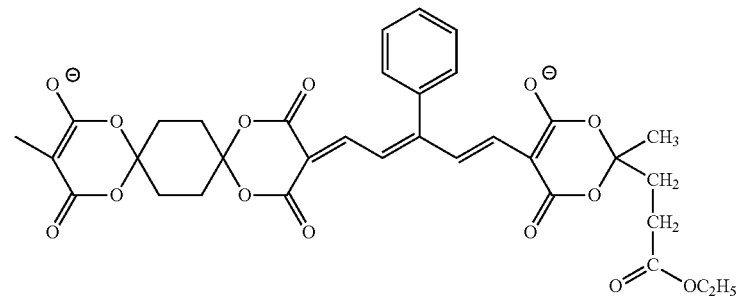
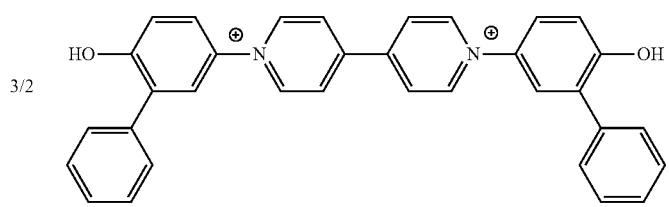

-continued
(II′)-9
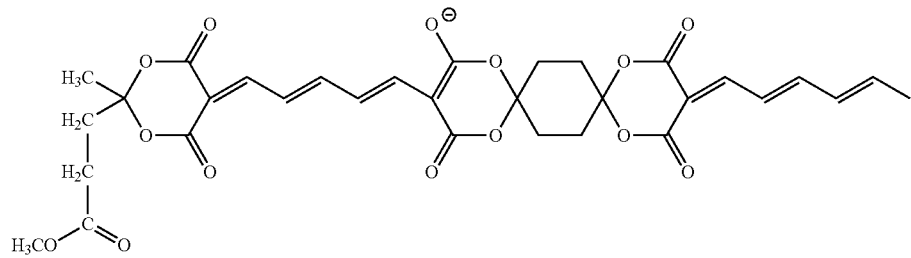
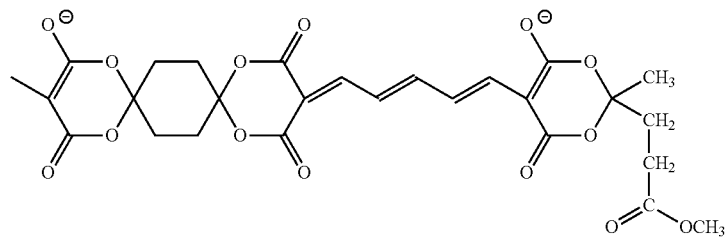
3/2 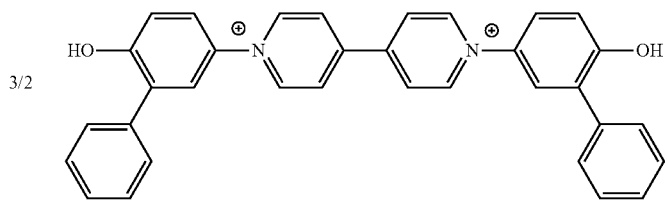
(II′)-10
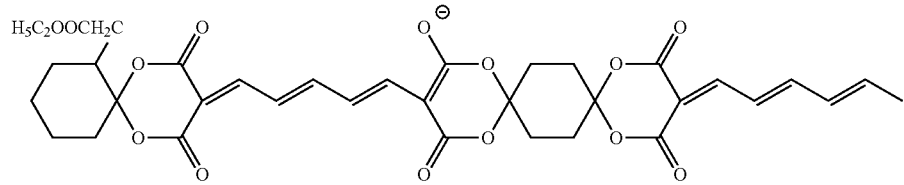
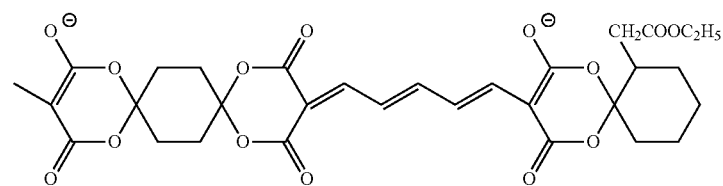
3/2 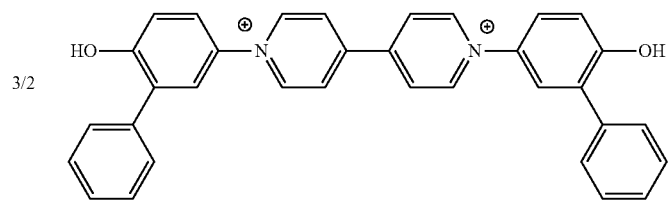
(II′)-11
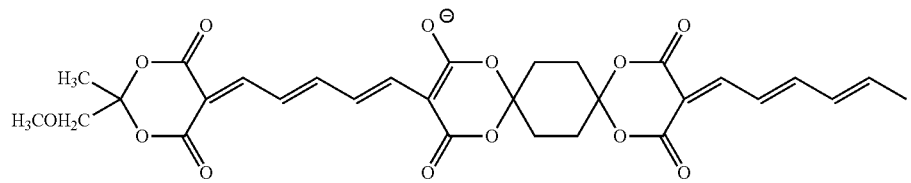

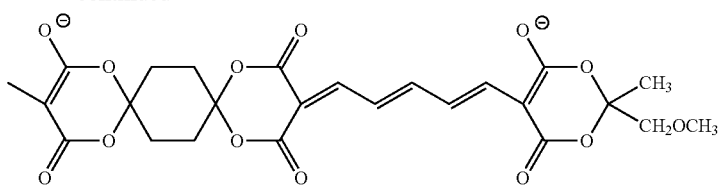
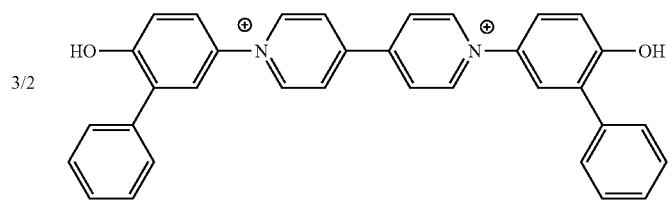
(II′)-12
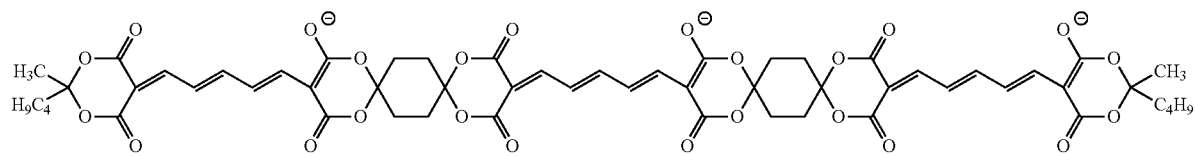
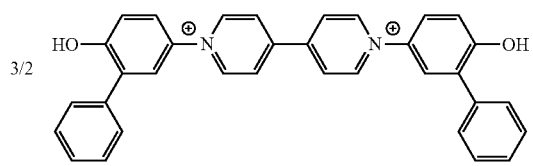
(II′)-13
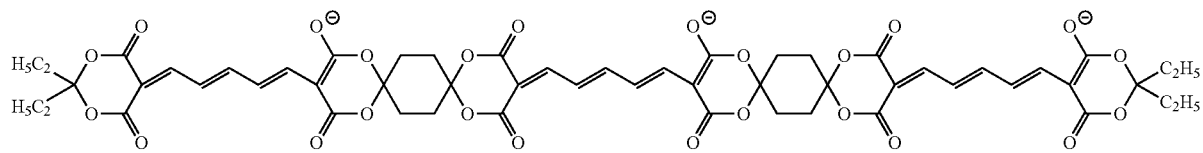
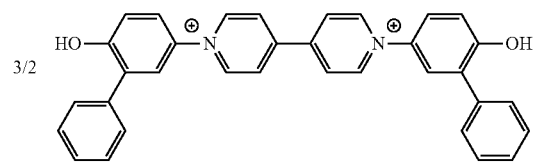
(II′)-14
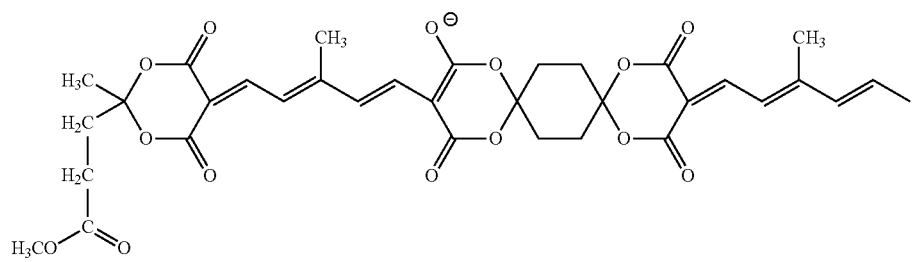

-continued
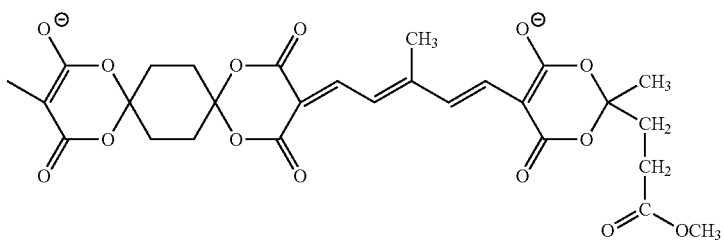
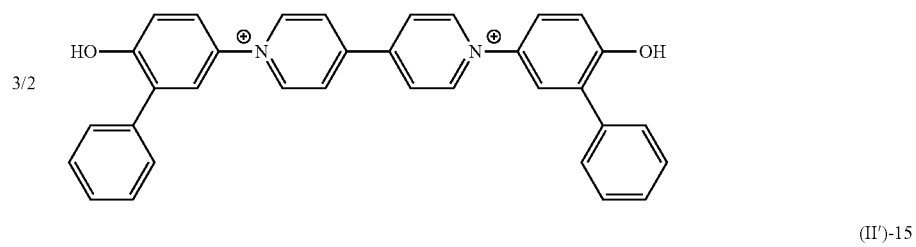
(II')-15
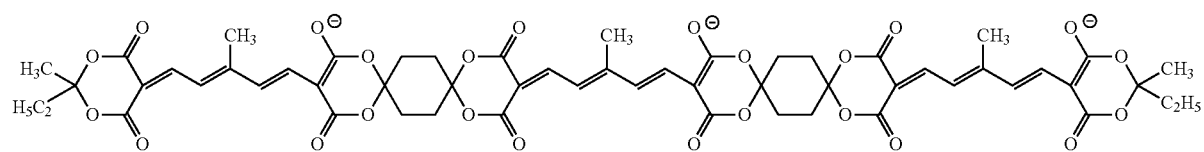
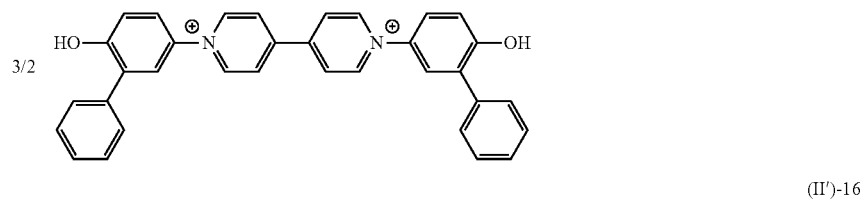
(II')-16
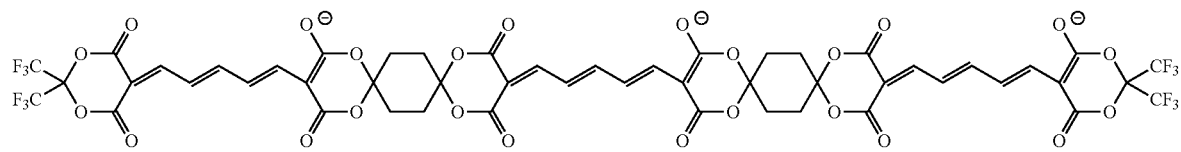
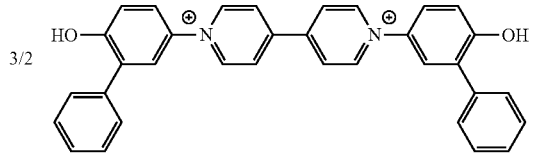
(II')-17
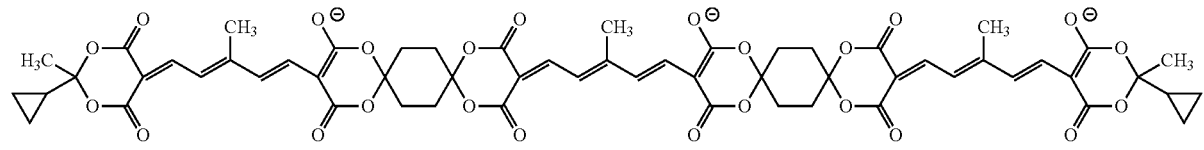
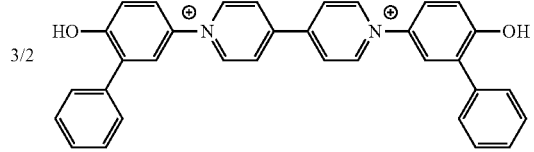

(II′)-18
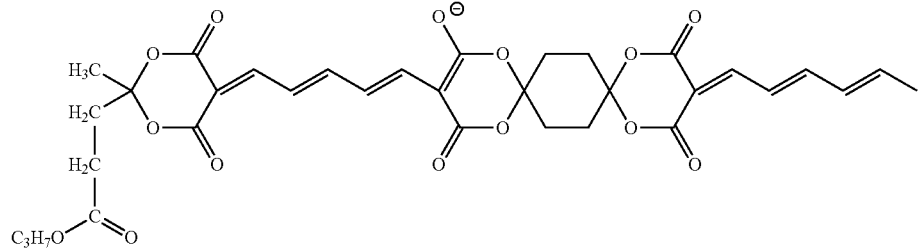
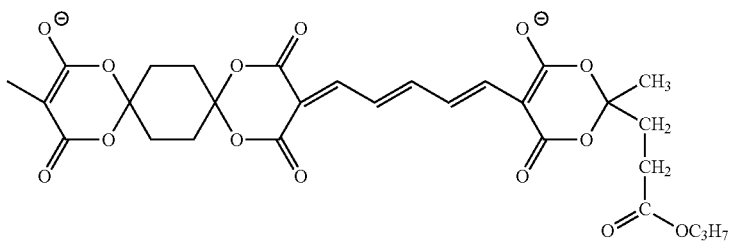
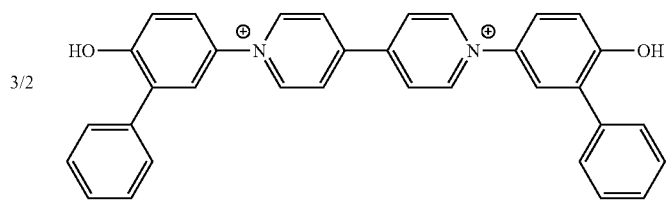
(II′)-19
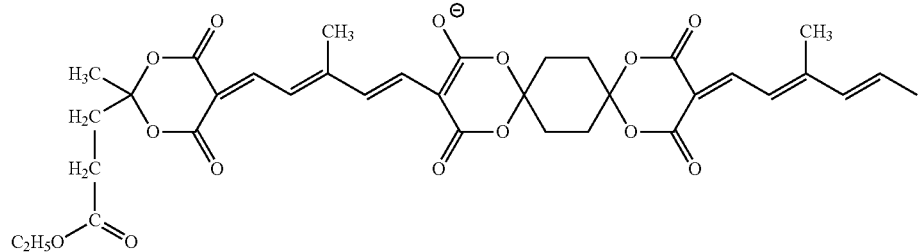
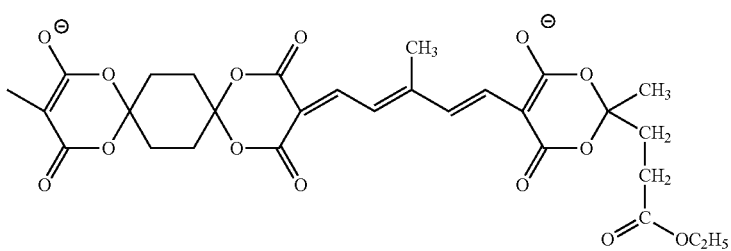
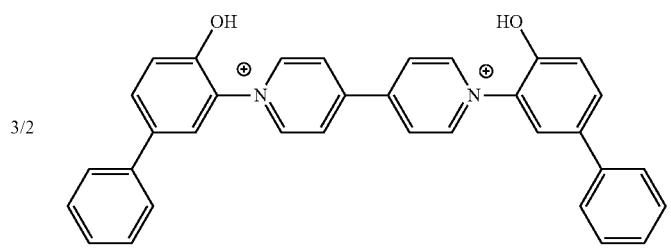

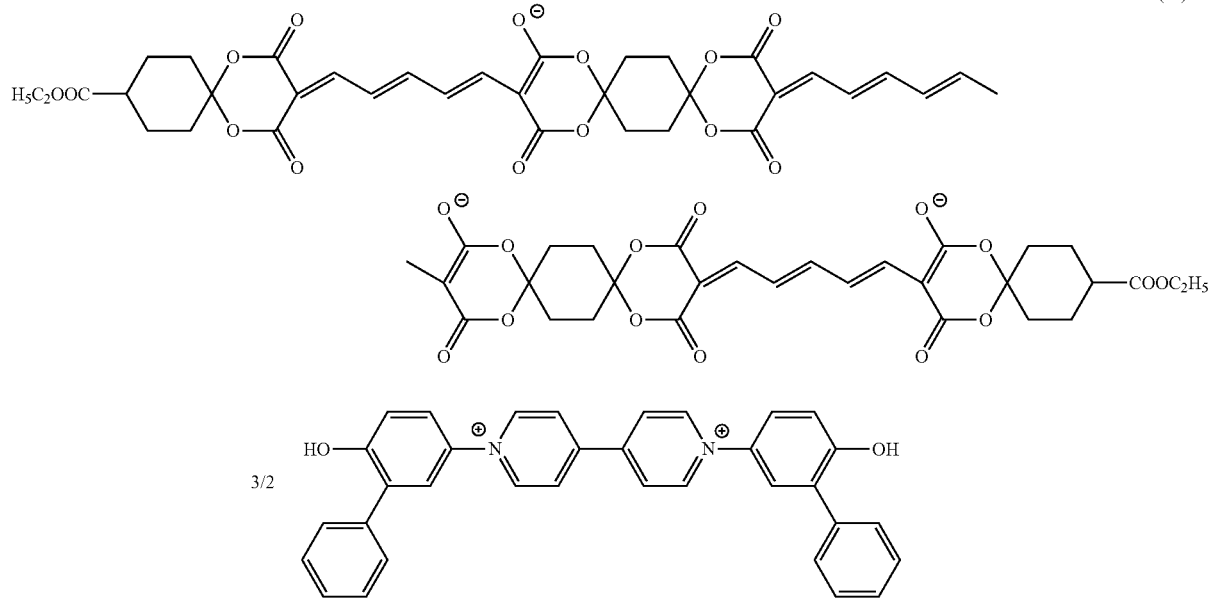
(II′)-20
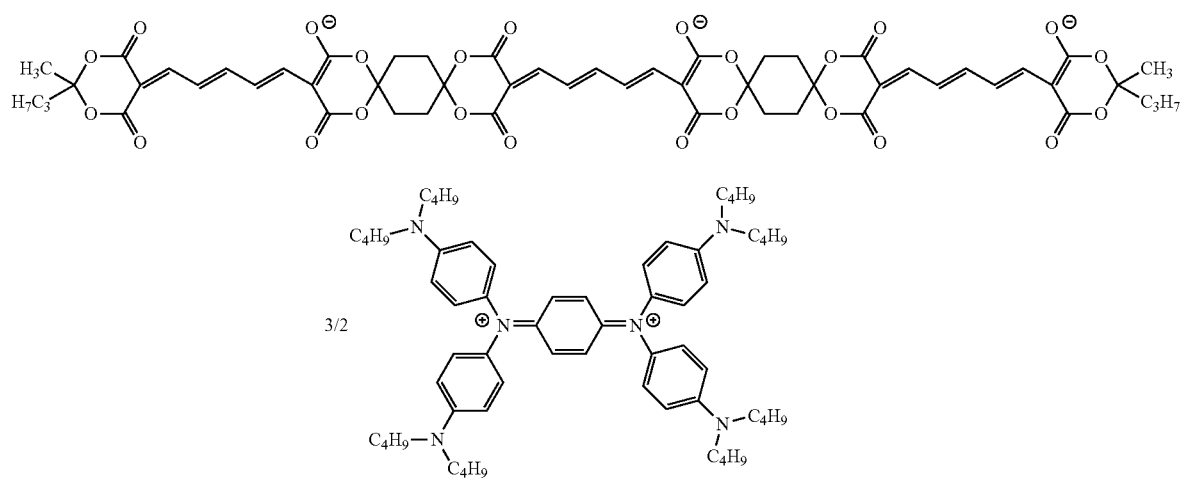
(II′)-21
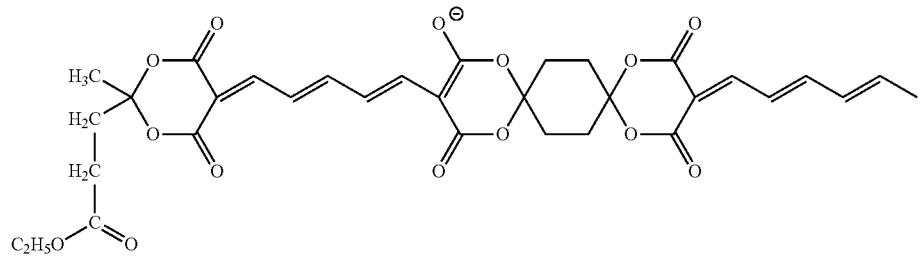
(II′)-22

-continued
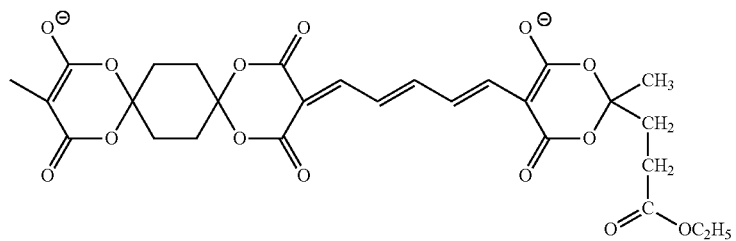
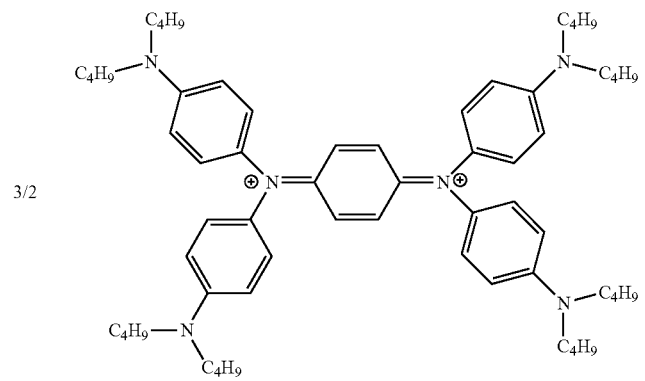
3/2
(II')-23
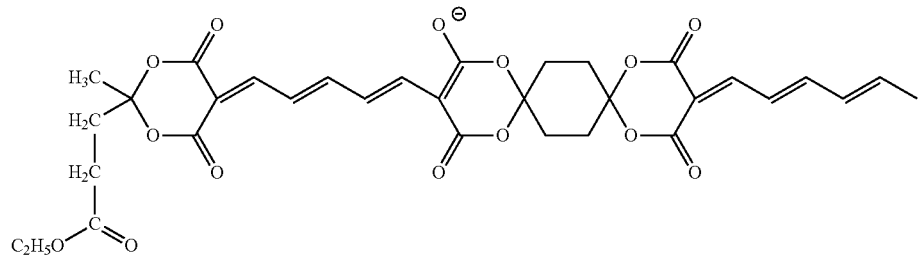
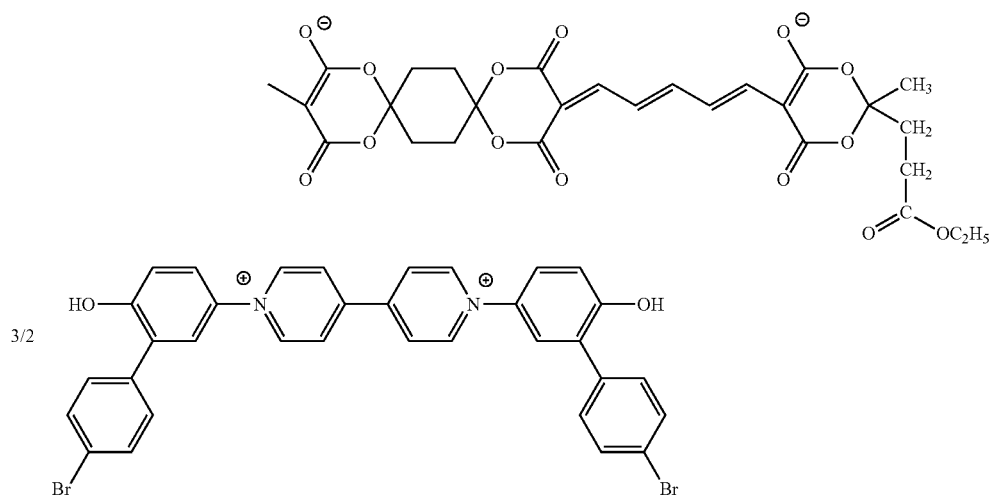
3/2

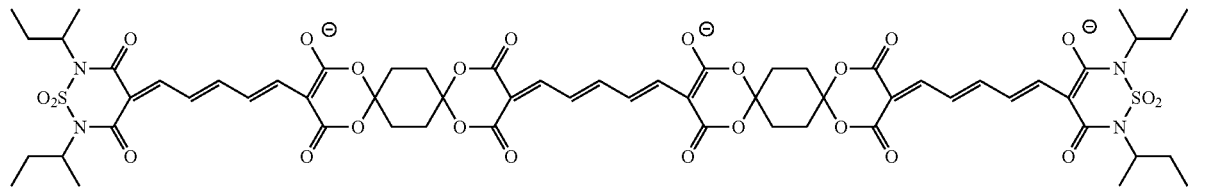

(II')-24

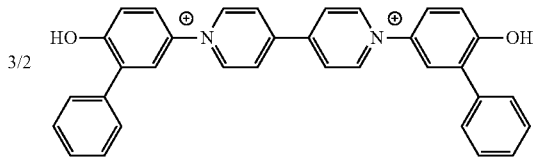

With the oxonol dyes, compounds represented by the general formula (II) are preferred.

Next, the general formula (II) will be described in detail below. In the formula (II), $Za^{25}$ and $Za^{26}$ each independently represents atoms forming an acidic nucleus.

The acidic nucleus is the same as that which $Za^{21}$, $Za^{22}$, $Za^{23}$ and $Za^{24}$ form, and the specific examples thereof are also the same as examples of that which $Za^{21}$, $Za^{22}$, $Za^{23}$ and $Za^{24}$ form. The acidic nucleus which $Za^{25}$ or $Za^{26}$ forms is preferably indandione, pyrazolone, pyrazolinedione or benzothiophenone dioxide, with pyrazolone being most preferred.

$Ma^{27}$, $Ma^{28}$ and $Ma^{29}$ each independently represents a substituted or unsubstituted methine group and are the same as defined with respect to $Ma^{21}$, $Ma^{22}$, $Ma^{23}$, $Ma^{24}$, $Ma^{25}$ and $Ma^{26}$ in the general formula (I), with examples thereof being also the same. $Ma^{27}$, $Ma^{28}$ and $Ma^{29}$ are preferably an unsubstituted methine group.

$Ka^{23}$ represents an integer of from 0 to 3 and is the same as defined with respect to $Ka^{21}$ and $Ka^{22}$ in the general formula (I). $Ka^{23}$ is preferably 2. Q represents a monovalent cation which neutralizes charge.

In the case where $Ka^{23}$ represents a plural number, plural $Ma^{27}$s, $Ma^{28}$s and $Ma^{29}$s may be the same or different from each other.

As dyes of the structure represented by the general formula (II), those dyes are preferred which are represented by the general formula (IV), (V), (VI) or (VII).

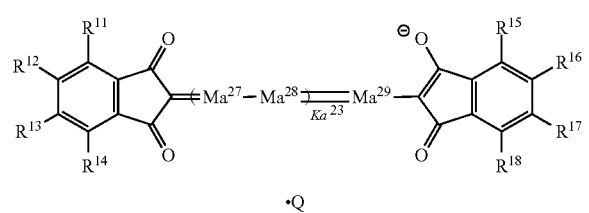

(IV)

(V)

(VI)

(VII)

In the general formulae (IV), (V), (VI) and (VII), $R^{11}$, $R^{12}$, $R^{13}$, $R^{14}$, $R^{15}$, $R^{16}$, $R^{17}$, $R^{18}$, $R^{21}$, $R^{22}$, $R^{23}$, $R^{24}$, $R^{25}$, $R^{26}$, $R^{27}$, $R^{28}$, $R^{32}$, $R^{33}$, $R^{34}$, $R^{41}$, $R^{42}$, $R^{43}$ and $R^{44}$ each independently represents a hydrogen atom or a substituent. $Ma^{27}$, $Ma^{28}$ and $Ma^{29}$ each independently represents a substituted or unsubstituted methine group. $Ka^{23}$ represents an integer of from 0 to 3. Q represents a monovalent cation which neutralizes charge. In the case where $Ka^{23}$ represent a plural number, plural $Ma^{27}$s and $Ma^{28}$ s may be the same or different from each other.

In the general formulae (IV), (V), (VI) and (VII), $R^{11}$, $R^{12}$, $R^{13}$, $R^{14}$, $R^{15}$, $R^{16}$, $R^{17}$, $R^{18}$, $R^{21}$, $R^{22}$, $R^{23}$, $R^{24}$, $R^{25}$, $R^{26}$, $R^{27}$, $R^{28}$, $R^{32}$ and $R^{33}$ (these in some cases being represented as "R") each independently represents a hydrogen atom or a substituent. Examples of the substituent include a halogen atom, a substituted or unsubstituted alkyl group (including a cycloalkyl group and a bicycloalkyl group), a substituted or unsubstituted alkenyl group (including a cycloalkenyl group and a bicycloalkenyl group), a substituted or unsubstituted alkynyl group, a substituted or unsubstituted aryl group, a substituted or unsubstituted hetero ring group, a cyano group, a hydroxyl group, a nitro group, a carboxyl group, a substituted or unsubstituted alkoxy group, a substituted or unsubstituted aryloxy group, a substituted or unsubstituted silyloxy group, a substituted or unsubstituted hetero ring oxy group, a substituted or unsubstituted acyloxy group, a substituted or unsubstituted carbamoyloxy group, a substituted or unsubstituted alkoxycarbonyloxy group, a substituted or unsubstituted aryloxycarbonyloxy group, a substituted or unsubstituted amino group (including an anilino group), a substituted or unsubstituted acylamino group, a substituted or unsubstituted aminocarbonylamino group, a substituted or unsubstituted alkoxycarbonylamino group, a substituted or unsubstituted aryloxycarbonylamino group, a substituted or unsubstituted sulfamoylamino group, a substituted or unsubstituted alkyl or arylsulfonylamino group, a substituted or unsubstituted mercapto group, a substituted or unsubstituted alkylthio group, a substituted or unsubstituted arylthio group, a substituted or unsubstituted hetero ring thio group, a substituted or unsubstituted sulfamoyl group, a sulfo group, a substituted or unsubstituted alkyl or arylsulfinyl group, a substituted or unsubstituted alkyl or arylsulfonyl group, a substituted or unsubstituted aryl group, a substituted or unsubstituted aryloxycarbonyl group, a substituted or unsubstituted alkoxycarbonyl group, a substituted or unsubstituted carbamoyl group, a substituted or unsubstituted aryl or hetero ring azo group, a substituted or unsubstituted imido group, a substituted or unsubstituted phosphino group, a substituted or unsubstituted phosphinyl group, a substituted or unsubstituted phosphinyloxy group, a substituted or unsubstituted phosphinylamino group and a substituted or unsubstituted silyl group.

More particularly, R represents a halogen atom (e.g., a chlorine atom, a bromine atom or an iodine atom), an alkyl group [a straight, branched or cyclic, substituted or unsubstituted alkyl group including an alkyl group (preferably an alkyl group containing from 1 to 30 carbon atoms, e.g., methyl, ethyl, n-propyl, isopropyl, t-butyl, n-octyl, eicosyl, 2-chloroethyl, 2-cyanoethyl or 2-ethylhexyl), a cycloalkyl group (preferably a substituted or unsubstituted cycloalkyl group containing from 3 to 30 carbon atoms, e.g., cyclohexyl, cyclopentyl or 4-n-dodecylcyclohexyl), a bicycloalkyl group (preferably a substituted or unsubstituted bicycloalkyl group containing from 5 to 30 carbon atoms, i.e., a monovalent group formed by removing one hydrogen atom from a bicycloalkane containing from 5 to 30 carbon atoms; e.g., bicyclo[1,2,2]heptan-2-yl or bicyclo[2,2,2]octan-3-yl) and, further, a tricycle structure having more ring systems; the term "an alkyl group" as used in substituents in the following descriptions (for example, an alkyl group in an alkylthio group) also representing an alkyl group of such concept], an alkenyl group [a straight, branched or cyclic, substituted or unsubstituted alkenyl group including an alkenyl group (preferably an alkenyl group containing from 2 to 30 carbon atoms, e.g., vinyl, allyl, prenyl, geranyl or oleyl), a cycloalkenyl group (preferably a substituted or unsubstituted cycloalkenyl group containing from 3 to 30 carbon atoms, i.e., a monovalent group formed by removing one hydrogen atom from a cycloalkene containing from 3 to 30 carbon atoms; e.g., 2-cyclopenten-1-yl or 2-cyclohexen-1-yl), and a bicycloalkenyl group (a substituted or unsubstituted bicycloalkenyl group, preferably a substituted or unsubstituted bicycloalkenyl group containing from 5 to 30 carbon atoms, i.e., a monovalent group formed by removing one hydrogen atom from a bicycloalkene having one double bond; e.g., bicyclo[2,2,1]hept-2-en-1-yl or bicyclo[2,2,2]oct-2-en-4-yl)], an alkynyl group (preferably a substituted or unsubstituted alkynyl group containing from 2 to 30 carbon atoms, e.g., ethynyl, propargyl or trimethylsilylethynyl), an aryl group (preferably a substituted or unsubstituted aryl group containing from 6 to 30 carbon atoms, e.g., phenyl, p-tolyl, naphthyl, m-chlorophenyl or o-hexadecanoylaminophenyl), a hetero ring group (preferably a monovalent group formed by removing one hydrogen atom from a 5- or 6-membered, substituted or unsubstituted, aromatic or non-aromatic hetero ring compound, more preferably a 5- or 6-membered aromatic hetero ring group containing from 3 to 30 carbon atoms, e.g., 2-furyl, 2-thienyl, 2-pyrimidinyl or 2-benzothiazolyl), a cyano group, a hydroxyl group, a nitro group, a carboxyl group, an alkoxy group (preferably a substituted or unsubstituted alkoxy group containing from 1 to 30 carbon atoms, e.g., methoxy, ethoxy, isopropoxy, t-butoxy, n-octyloxy or 2-methoxyethoxy), an aryloxy group (preferably a substituted or unsubstituted aryloxy group containing from 6 to 30 carbon atoms, e.g., phenoxy, 2-methylphenoxy, 4-t-butylphenoxy, 3-nitrophenoxy or 2-tetradecanoylaminophenoxy), a silyloxy group (preferably a silyloxy group containing from 3 to 20 carbon atoms, e.g., trimethylsilyloxy or t-butyldimethylsilyloxy), a hetero ring oxy group (preferably a substituted or unsubstituted hetero ring oxy group containing from 2 to 30 carbon atoms, e.g., 1-phenyltetrazol-5-oxy or 2-tetrahydropyranyloxy), an acyloxy group (preferably a formyloxy group, a substituted or unsubstituted alkylcarbonyloxy group containing from 2 to 30 carbon atoms or a substituted or unsubstituted arylcarbonyloxy group containing from 6 to 30 carbon atoms, e.g., formyloxy, acetyloxy, pivaloyloxy, stearoyloxy, benzoyloxy or p-methoxyphenylcarbonyloxy), a carbamoyloxy group (preferably a substituted or unsubstituted carbamoyloxy group containing from 1 to 30 carbon atoms, e.g., N,N-dimethylcarbamoyloxy, N,N-diethylcarbamoyloxy, morpholinocarbonyloxy, N,N-di-n-octylaminocarbonyloxy or N-n-octylcarbamoyloxy), an alkoxycarbonyloxy group (preferably a substituted or unsubstituted alkoxycarbonyloxy group containing from 2 to 30 carbon atoms, e.g., methoxycarbonyloxy, ethoxycarbonyloxy, t-butoxycarbonyloxy or n-octylcarbonyloxy), an aryloxycarbonyloxy group (preferably a substituted or unsubstituted aryloxycarbonyloxy group containing from 7 to 30 carbon atoms, e.g., phenoxycarbonyloxy, p-methoxyphenoxycarbonyloxy or p-n-hexadecyloxyphenoxycarbonyloxy), an amino group (preferably an amino group, a substituted or unsubstituted alkylamino group containing from 1 to 30 carbon atoms or a substituted or unsubstituted arylamino group containing from 6 to 30 carbon atoms, e.g., amino, methylamino, dimethylamino, aniline, N-methyl-anilino or diphenylamino), an acylamino group (preferably a formylamino group, a substituted or unsubstituted alkylcarbonylamino group containing from 1 to 30 carbon atoms or a substituted or unsubstituted arylcarbonylamino group containing from 6 to 30 carbon atoms, e.g., formylamino, acetylamino, pivaloylamino, lauroylamino, benzoylamino or 3,4,5-tri-n-octyloxyphenylcarbonylamino), an aminocarbonylamino group (preferably a substituted or unsubstituted aminocarbonylamino group containing from 1 to 30 carbon atoms, e.g., carbamoylamino, N,N-dimethylaminocarbonylamino, N,N-diethylaminocarbonylamino or morpholinocarbonylamino), an alkoxycarbonylamino group (preferably a substituted or unsubstituted alkoxycarbonylamino group containing from 2 to 30 carbon atoms, e.g., methoxycarbonylamino, ethoxycarbonylamino, t-butoxycarbonylamino, n-octadecyloxycarbonylamino or N-methylmethoxycarbonylamino), an aryloxycarbonylamino group (preferably a substituted or unsubstituted aryloxycarbonylamino group containing from 7 to 30 carbon atoms, e.g., phenoxycarbonylamino, p-chlorophenoxycarbonylamino or m-n-octyloxyphenoxycarbonylamino), a sulfamoylamino group (preferably a substituted or unsubstituted sulfamoylamino group containing from 0 to 30 carbon atoms, e.g., sulfamoylamino, N,N-dimethylaminosulfonylamino or N-n-octylaminosulfonylamino), an alkyl or arylsulfonylamino group (preferably a substituted or unsubstituted alkylsulfonylamino group containing from 1 to 30 carbon atoms or a substituted or unsubstituted arylsulfonylamino group containing from 6 to 30 carbon atoms, e.g., methylsulfonylamino, butylsulfonylamino, phenylsulfonylamino, 2,3,5-trichlorophenylsulfonylamino or p-methylphenylsulfonylamino), a mercapto group, an alkylthio group (preferably a substituted or unsubstituted alkylthio group containing from 1 to 30 carbon atoms, e.g., methylthio, ethylthio or n-hexadecylthio), an arylthio group (preferably a substituted or unsubstituted arylthio group containing from 6 to 30 carbon atoms, e.g., phenylthio, p-chlorophenylthio or m-methoxyphenylthio), a hetero ring thio group (preferably a substituted or unsubstituted hetero ring thio group containing from 2 to 30 carbon atoms, e.g., 2-benzothiazolylthio or 1-phenyltetrazol-5-ylthio), a sulfamoyl group (preferably a substituted or unsubstituted sulfamoyl group containing from 0 to 30 carbon atoms, e.g., N-ethylsulfamoyl, N-(3-dodecyloxypropyl)sulfamoyl, N,N-dimethylsulfamoyl, N-acetylsulfamoyl, N-benzoylsulfamoyl or N—(N'-phenylcarbamoyl)sulfamoyl), a sulfo group, an alkyl or arylsulfinyl group (preferably a substituted or unsubstituted alkylsulfinyl group containing from 1 to 30 carbon atoms or a substituted or unsubstituted arylsulfinyl group containing from 6 to 30 carbon atoms, e.g., methylsulfinyl, ethylsulfinyl, phenylsulfinyl or p-methylsulfinyl), an alkyl or arylsulfonyl group (preferably a substituted or unsubstituted alkylsulfonyl group containing from 1 to 30 carbon atoms or a substituted or unsubstituted arylsulfonyl group containing from 6 to 30 carbon atoms, e.g., methylsulfonyl, ethylsulfonyl, phenylsulfonyl or p-methylphenylsulfonyl), an acyl group (preferably a formyl group, a substituted or unsubstituted alkylcarbonyl group containing from 2 to 30 carbon atoms, a substituted or unsubstituted arylcarbonyl group containing from 7 to 30 carbon atoms or a hetero ring carbonyl group containing from 4 to 30 carbon atoms and being connected to a carbonyl group through a carbon atom, e.g., acetyl, pivaloyl, 2-chloroacetyl, stearoyl, benzoyl, p-n-octyloxyphenylcarbonyl, 2-pyridylcarbonyl or 2-furylcarbonyl), an aryloxycarbonyl group (preferably a substituted or unsubstituted aryloxycarbonyl group containing from 7 to 30 carbon atoms, e.g., phenoxycarbonyl, o-chlorophenoxycarbonyl, m-nitrophenoxycarbonyl or p-t-butylphenoxycarbonyl), an alkoxycarbonyl group (preferably a substituted or unsubstituted alkoxycarbonyl group containing from 2 to 30 carbon atoms, e.g., methoxycarbonyl, ethoxycarbonyl, t-butoxycarbonyl or n-octadecyloxycarbonyl), a carbamoyl group (preferably a substituted or unsubstituted carbamoyl group containing from 1 to 30 carbon atoms, e.g., carbamoyl, N-methylcarbamoyl, N,N-dimethylcarbamoyl, N,N-di-n-octylcarbamoyl or N-(methylsulfonyl)carbamoyl), an aryl or hetero ring azo group (preferably a substituted or unsubstituted arylazo group containing from 6 to 30 carbon atoms or a substituted or unsubstituted hetero ring azo group containing from 3 to 30 carbon atoms, e.g., phenylazo, p-chlorophenylazo or 5-ethylthio-1,3,4-thiadiazol-2-ylazo), an imido group (preferably N-succinimido or N-phthalimido), a phosphino group (preferably a substituted or unsubstituted phosphino group containing from 2 to 30 carbon atoms, e.g., dimethylphosphino, diphenylphosphino or methylphenyloxyphosphino), a phosphinyl group (preferably a substituted or unsubstituted phosphinyl group containing from 2 to 30 carbon atoms, e.g., phosphinyl, dioctyloxyphosphinyl or diethoxyphosphinyl), a phosphinyloxy group (preferably a substituted or unsubstituted phosphinyloxy group containing from 2 to 30 carbon atoms, e.g., diphenoxyphosphinyloxy or dioctyloxyphosphinyloxy), a phosphinylamino group (preferably a substituted or unsubstituted phosphinylamino group containing from 2 to 30 carbon atoms, e.g., dimethoxyphosphinylamino or dimethylaminophosphinylamino) or a silyl group (preferably a substituted or unsubstituted silyl group containing from 3 to 30 carbon atoms, e.g., trimethylsilyl, t-butyldimethylsilyl or phenyldimethylsilyl).

Most preferably, $R^{11}$, $R^{12}$, $R^{13}$, $R^{14}$, $R^{15}$, $R^{16}$, $R^{17}$, $R^{18}$, $R^{21}$, $R^{22}$, $R^{23}$, $R^{24}$, $R^{25}$, $R^{26}$, $R^{27}$ and $R^{28}$ each represents a hydrogen atom.

As substituents of $R^{31}$, $R^{34}$, $R^{41}$, $R^{42}$, $R^{43}$ and $R^{44}$, there may be illustrated the same ones as defined with respect to R, with a hydrogen atom, a substituted or unsubstituted alkyl group or a substituted or unsubstituted aryl group being preferred. Among them, a substituted or unsubstituted aryl group is more preferred.

$Ma^{27}$, $Ma^{28}$ and $Ma^{29}$ each independently represents a substituted or unsubstituted methine group and are the same as defined with respect to $Ma^{27}$, $Ma^{28}$ and $Ma^{29}$ in the general formula (II), with specific examples and preferred ones thereof being also the same as described there. $Ka^{23}$s each independently represents an integer of from 0 to 3. $Ka^{23}$ is preferably 2. Q represents a monovalent cation which neutralizes the charge. In the case where $Ka^{23}$ is the plural number, plural $Ma^{27}$s and $Ma^{28}$s may be the same or different from each other.

Of the dyes of the structure represented by the general formula (II), dyes of the structure represented by the following general formula (VIII) are preferred.

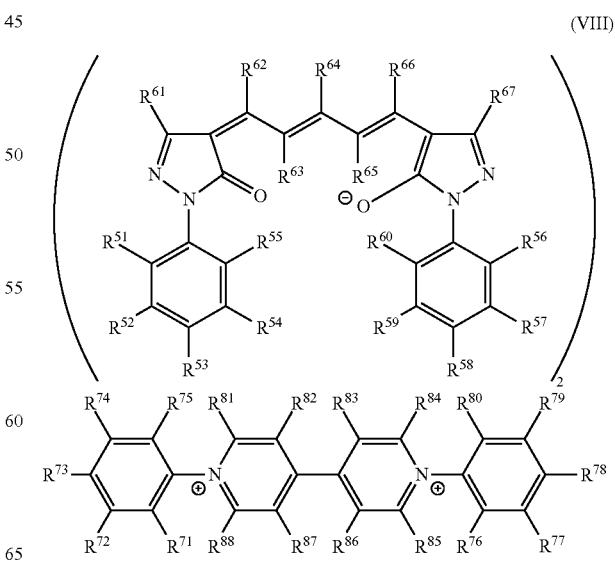

The dyes represented by the general formula (VIII) will be described in detail below.

In the general formula (VIII), $R^{51}$, $R^{52}$, $R^{53}$, $R^{54}$, $R^{55}$, $R^{56}$, $R^{57}$, $R^{58}$, $R^{59}$ and $R^{60}$ each independently represents a hydrogen atom or a substituent. As the substituent, a substituted or unsubstituted alkyl group, a substituted or unsubstituted alkoxy group, a halogen atom, a substituted or unsubstituted carbamoyl group or a substituted or unsubstituted acylamino group is preferred. Among them, those wherein all of them represent a hydrogen atom and those wherein $R^{51}$, $R^{53}$, $R^{55}$, $R^{56}$, $R^{58}$ and $R^{60}$ are a halogen atom and $R^{52}$, $R^{54}$, $R^{57}$ and $R^{59}$ are a hydrogen atom are preferred. $R^{61}$ and $R^{67}$ each represents a hydrogen atom, a substituted or unsubstituted alkyl group, a substituted or unsubstituted aryl group, a cyano group, a substituted or unsubstituted carbamoyl group, a substituted or unsubstituted alkoxy group, a substituted or unsubstituted alkoxycarbonyl group, a substituted or unsubstituted aryloxycarbonyl group or a substituted or unsubstituted acylamino group. Of these, a substituted or unsubstituted alkoxycarbonyl group is preferred, with an unsubstituted alkoxycarbonyl group being most preferred.

$R^{62}$, $R^{63}$, $R^{64}$, $R^{65}$ and $R^{66}$ each independently represents a hydrogen atom, s substituted or unsubstituted alkyl group, a substituted or unsubstituted aryl group, a substituted or unsubstituted acylamino group or a substituted or unsubstituted hetero ring group. Preferably, all of $R^{62}$, $R^{63}$, $R^{65}$ and $R^{66}$ are a hydrogen atom. $R^{64}$ is preferably a hydrogen atom or a substituted or unsubstituted aryl group.

$R^{71}$, $R^{72}$, $R^{73}$, $R^{74}$, $R^{75}$, $R^{76}$, $R^{77}$, $R^{78}$, $R^{79}$, $R^{80}$, $R^{81}$, $R^{82}$, $R^{83}$, $R^{84}$, $R^{85}$, $R^{86}$, $R^{87}$ and $R^{88}$ each independently represents a hydrogen atom or a substituent. As the substituent, a substituted or unsubstituted alkyl group, a substituted or unsubstituted aryl group, a hydroxyl group or a substituted or unsubstituted acylamino group is preferred. Preferably, all of $R^{71}$, $R^{75}$, $R^{76}$, $R^{77}$ and $R^{80}$ are a hydrogen atom. $R^{73}$ and $R^{78}$ each preferably represents a hydroxyl group. $R^{74}$ and $R^{79}$ each preferably represents a phenyl group.

Preferably, all of $R^{81}$, $R^{82}$, $R^{83}$, $R^{84}$, $R^{85}$, $R^{86}$, $R^{87}$ and $R^{88}$ are a hydrogen atom.

The dyes of the structure represented by the general formula (I) will be described in detail below. In the general formula (I), $Za^{21}$, $Za^{22}$, $Za^{23}$ and $Za^{24}$ each independently represents atoms forming an acidic nucleus. Examples thereof are described in James; The Theory of the Photographic Process, 4$^{th}$ ed., published by McMillan Co., 1977, p. 198. Specifically, there are illustrated nuclei such as pyrazol-5-one, pyrazolidine-3,5-dione, imidazolin-5-one, hydantoin, 2- or 4-thiohydantoin, 2-iminooxazolidin-4-one, 2-oxazolin-5-one, 2-thioxazoline-2,4-dione, isorhodanine, rhodanine, thiophen-3-one, thiophen-3-one-1,1-dioxide, 3,3-dioxo[1,3]oxathiolan-5-one, indolin-2-one, indolin-3-one, 2-oxoindazolium, 5,7-dioxo-6,7-dihydrothiazolo[3,2a]pyrimidine, 3,4-dihydroisoquinolin-4-one, 1,3-dioxane-4,6-dione (e.g., merdramic acid), barbituric acid, 2-thiobarbituric acid, coumarin-2,4-dione, indazolin-2-one, pyrido[1,2-a]pyrimidine-1,3-dione, pyrazolo[1,5-b]quinazolone, pyrazolopyridone and 5- or 6-membered hydrocarbon ring (e.g., hexane-1,3-dione, pentane-1,3-dione or indane-1,3-dione), with pyrazol-5-one, pyrazolidine-3,5-dione, barbituric acid, 2-thiobarbituric acid, 1,3-dioxane-4,6-dione or 3,3-dioxo[1,3]oxathiolan-5-one being preferred.

Most preferably, $Za^{21}$, $Za^{22}$, $Za^{23}$ and $Za^{24}$ each represents a 1,3-dioxane-4,6-dione which may be substituted.

Examples of the substituent for the acidic nucleus include a halogen atom, an alkyl group (including a cycloalkyl group and a bicycloalkyl group), an alkenyl group (including a cycloalkenyl group and a bicycloalkenyl group), an alkynyl group, an aryl group, a hetero ring group, a cyano group, a hydroxyl group, a nitro group, a carboxyl group, an alkoxy group, an aryloxy group, a silyloxy group, a hetero ring oxy group, an acyloxy group, a carbamoyloxy group, an alkoxycarbonyloxy group, an aryloxycarbonyloxy group, an amino group (including an anilino group), an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a hetero ring thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an aryl or hetero ring azo group, an imido group, a phosphino group, a phosphinyl group, a phosphinyloxy group, a phosphinylamino group or a silyl group. Among them, a substituted or unsubstituted alkyl group containing from 1 to 20 carbon atoms and a substituted or unsubstituted aryl group containing from 6 to 20 carbon atoms are preferred.

As the acidic nucleus, unsubstituted acidic nuclei, acidic nuclei substituted by a substituted or unsubstituted alkyl group containing from 1 to 20 carbon atoms and acidic nuclei substituted by a substituted or unsubstituted aryl group are preferred.

As the acidic nucleus formed by $Za^{21}$, $Za^{22}$, $Za^{23}$ or $Za^{24}$, indanedione, pyrazolone, pyrazolinedione and benzothiophenedioxide are preferred, with pyrazolone being most preferred.

$Ma^{21}$, $Ma^{22}$, $Ma^{23}$, $Ma^{24}$, $Ma^{25}$ and $Ma^{26}$ each independently represents a substituted or unsubstituted methine group. Preferred examples of the substituent include an alkyl group containing from 1 to 20 carbon atoms (e.g., methyl, ethyl or propyl), a halogen atom (e.g., chlorine, bromine, iodine or fluorine), an alkoxy group containing from 1 to 20 carbon atoms (e.g., methoxy, ethoxy or isopropoxy), an aryl group containing from 6 to 26 carbon atoms (e.g., phenyl or 2-naphthyl), a hetero ring group containing from 0 to 20 carbon atoms (e.g., 2-pyridyl or 3-pyridyl), an aryloxy group containing from 6 to 20 carbon atoms (e.g., phenoxy, 1-naphthoxy or 2-naphthoxy), an acylamino group containing from 1 to 20 carbon atoms (e.g., acetylamino or benzoylamino), a carbamoyl group containing from 1 to 20 carbon atoms (e.g., N,N-dimethylcarbamoyl), a sulfo group, a hydroxyl group, a carboxyl group, an alkylthio group containing from 1 to 20 carbon atoms (e.g., methylthio) and a cyano group. Also, they may be connected to other methine group to form a ring structure or may be connected to atoms represented by $Za^{21}$ to $Za^{24}$ to form a ring structure.

Preferably, $Ma^{21}$, $Ma^{22}$, $Ma^{23}$, $Ma^{24}$, $Ma^{25}$ and $Ma^{26}$ each independently represents an unsubstituted methine group or a methine group substituted by an ethyl group, a methyl group or a phenyl group, with an unsubstituted methine group being most preferred.

L is a divalent linking group not forming a Π conjugation system with the two bonds. The divalent linking group is not particularly limited except for not forming a Π conjugation system with a chromophore to which it is connected, and preferably represents a linking group containing from 0 to 100, preferably from 1 to 20, carbon atoms and being constituted by one of, or a combination of, an alkylene group (containing from 1 to 20 carbon atoms, e.g., methylene, ethylene, propylene, butylenes or pentylene), an arylene group (containing from 6 to 26 carbon atoms, e.g., phenylene or naphthylene), an alkenylene group (containing from 2 to 20 carbon atoms, e.g., ethenylene or propenylene), an alkynylene group (containing from 2 to 20 carbon atoms, e.g., ethynylene or propynylene), —CO—N($R^{101}$)—, —CO—

O—, $SO_2$—N($R^{102}$)—, —$SO_2$—O—, —N($R^{103}$)—CO—N($R^{104}$)—, —$SO_2$—, —SO—, —S—, —O—, —CO—, —N($R^{105}$)—, a heterylene group (containing from 1 to 26 carbon atoms, e.g., 6-chloro-1,3,5-triazine-2,4-diyl group or a pyrimidine-2,4-diyl group). $R^{101}$, $R^{102}$, $R^{103}$, $R^{104}$ and $R^{105}$ each independently represents any of a hydrogen atom, a substituted or unsubstituted alkyl group and a substituted or unsubstituted aryl group. Also, one or more of the linking groups may exist between two chromophores which they link to each other, and two or more (preferably two) of the linking groups may be connected to each other to form a ring.

As L, a linking group wherein two alkylene groups (preferably ethylene) are respectively connected to form a ring is preferred. Of them, a linking group wherein a 5- or 6-membered ring (preferably a cyclohexyl ring) is formed is more preferred.

In the general formula (I), $Ka^{21}$ and $Ka^{22}$ each independently represents an integer of from 0 to 3. In the case where $Ka^{21}$ and $Ka^{22}$ are the plural number, plural $Ma^{21}$, $Ma^{22}$, $Ma^{25}$ and $Ma^{26}$ may be the same or different from each other.

$Ka^{21}$ and $Ka^{22}$ both preferably represent 2.

Q represents a monovalent cation which neutralizes the charge. Therefore, 2Q represents a divalent cation. The ion represented by Q is not particularly limited, and may be an ion comprising an inorganic compound or an ion comprising an organic compound. Examples of the cation represented by Q include a metal ion such as sodium ion or potassium ion and an onium ion such as a quaternary ammonium ion, an oxonium ion, a sulfonium ion, a phosphonium ion, a selenonium ion or an iodonium ion.

As the cation represented by Q, an onium ion is preferred, with a quaternary ammonium ion being more preferred. Of the quaternary ammonium ions, 4,4'-bipyridinium cations represented by the general formula (I-4) in JP-A-2000-52658 and 4,4'-bipyridinium cations disclosed in JP-A-2002-59652 are particularly preferred. With dication compounds such as 4,4'-bipyridinium cation, Q corresponds to ½ (dication compound).

Of the dyes represented by the general formula (I), those dyes are preferred wherein acidic nuclei which $Za^{21}$, $Za^{22}$, $Za^{23}$ and $Za^{24}$ form each independently represents pyrazol-5-one, pyrazoline-3,5-dione, barbituric acid, 2-thiobarbituric acid, 1,3-dioxane-4,6-dione or 3,3-dioxo[1,3]oxathiolan-5-one, which is unsubstituted or substituted by a substituted or unsubstituted alkyl group containing from 1 to 20 carbon atoms or by s substituted or unsubstituted aryl group containing from 6 to 20 carbon atoms, $Ma^{22}$, $Ma^{23}$, $Ma^{24}$, $Ma^{25}$ and $Ma^{26}$ each independently represents an unsubstituted methine group or a methine group substituted by an ethyl group, a methyl group or a phenyl group, L represents a linking group wherein two alkylene groups (preferably ethylene) are connected to form a 5- or 6-membered ring, $Ka21$ and $Ka22$ both represent 2, and the cation represented by 2Q represents a 4,4'-bipyridinium cation represented by the general formula (I-4) in JP-A-2000-52658 or a 4,4'-bipyridinium cation disclosed in JP-A-2002-59652. Of the dyes represented by the general formula (I), dyes represented by the general formula (III) are preferred.

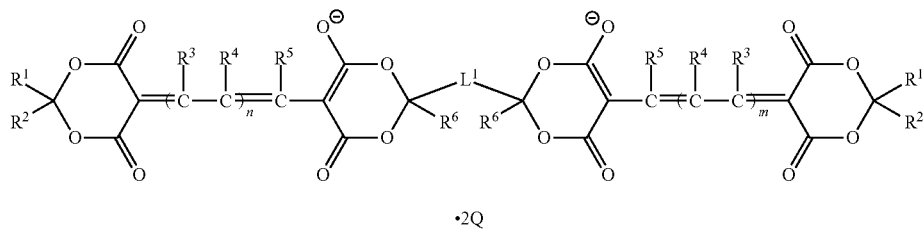

(III)

In formula (III), $R^1$ and $R^2$ each independently represents a hydrogen atom, a substituted or unsubstituted alkyl group or a substituted or unsubstituted aryl group. $R^3$, $R^4$ and $R^5$ each independently represents a hydrogen atom or a substituent. $R^1$ and $R^2$ may be connected to each other to form a ring structure. $R^6$s each independently represents a hydrogen atom, a substituted or unsubstituted alkyl group or a substituted or unsubstituted aryl group. $L^1$ represents a divalent linking group. Two $R^6$s may be connected to each other to form a divalent linking group. n and m each independently represents an integer of from 0 to 2. Q represents a monovalent cation which neutralizes the charge. In the case where n and m represent the plural number, plural $R^3$s and $R^4$s may be the same or different from each other.

Formula (III) will be described in detail below. $R^1$ and $R^2$ each independently represents a hydrogen atom, a substituted or unsubstituted alkyl group or a substituted or unsubstituted aryl group. $R^1$ and $R^2$ may be connected to each other to form a ring structure. Preferably, $R^1$ and $R^2$ each independently represents a substituted or unsubstituted alkyl group. More preferably, $R^1$ and $R^2$ respectively represent unsubstituted alkyl groups containing from 1 to 6 carbon atoms and being different from each other in number of carbon atoms. $R^3$, $R^4$ and $R^5$ each independently represents a hydrogen atom or a substituent. $R^3$, $R^4$ and $R^5$ each preferably represents a hydrogen atom, a substituted or unsubstituted alkyl group, a substituted or unsubstituted aryl group or a substituted or unsubstituted hetero ring group, with a hydrogen atom, an ethyl group, a methyl group or a phenyl group being more preferred. Most preferably, all of $R^3$, $R^4$ and $R^5$ represent a hydrogen atom. $R^6$ represents a hydrogen atom, a substituted or unsubstituted alkyl group or a substituted or unsubstituted aryl group. Particularly preferably, two $R^6$s are connected to each other to form a divalent linking group. $L^1$ represents a divalent linking group. Preferably, $L^1$ represents a substituted or unsubstituted alkylene group. Most preferably, $L^1$ and two $R^6$s are connected to each other to form a ring structure. In such case, the ring structure is preferably a 5- or 6-membered ring (more preferably a 6-membered ring). n and m each independently represents an integer of from 0 to 2. Preferably, both n and m represent 2. Q represents a monovalent cation which neutralizes the charge. Accordingly, 2Q represents a divalent cation. In the case where n and m each represents the plural number, plural $R^3$s and $R^4$s may be the same or different from each other.

Preferred examples of the compounds of the invention represented by the general formula (I), (II) or (III) will be illustrated below which, however, are not to be construed as limiting the invention in any way.

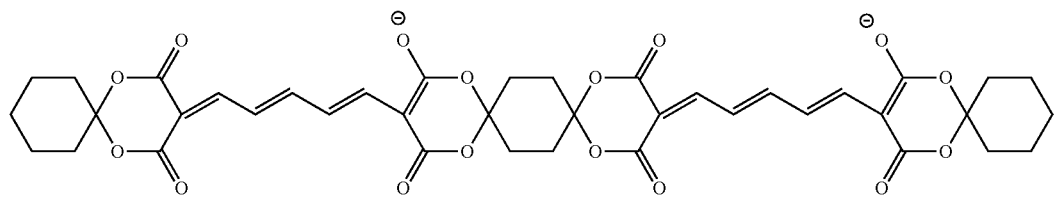
(I)-1
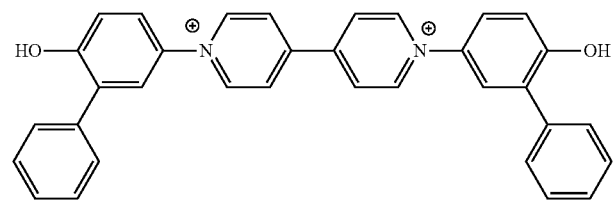
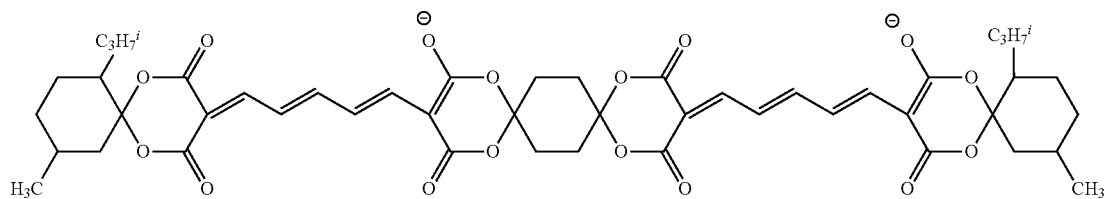
(I)-2
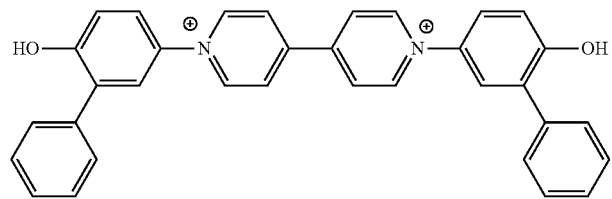
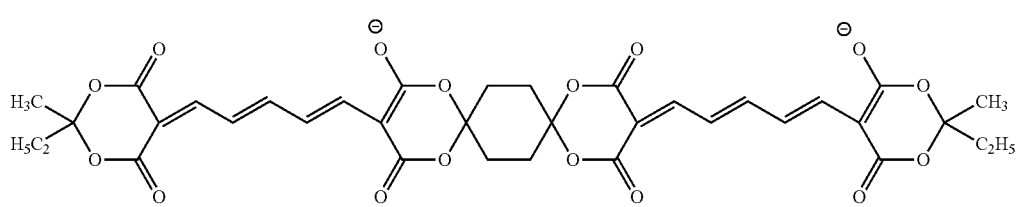
(I)-3
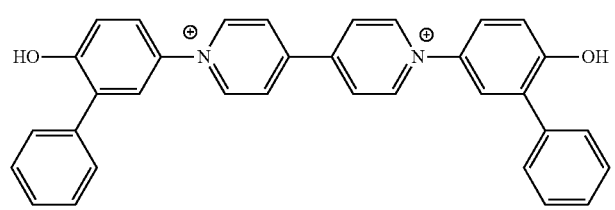

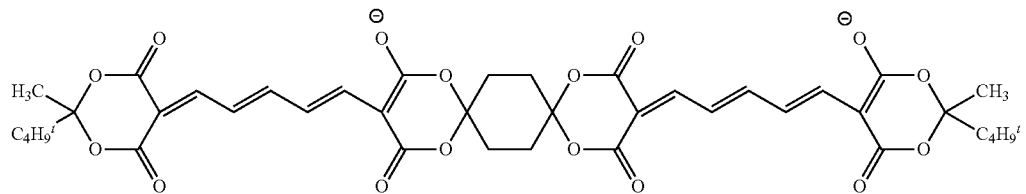
(I)-4
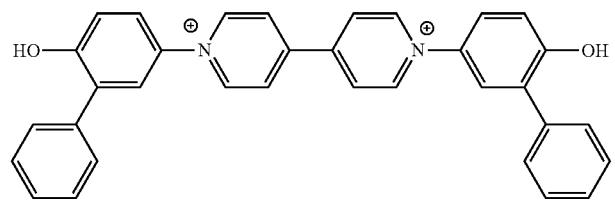
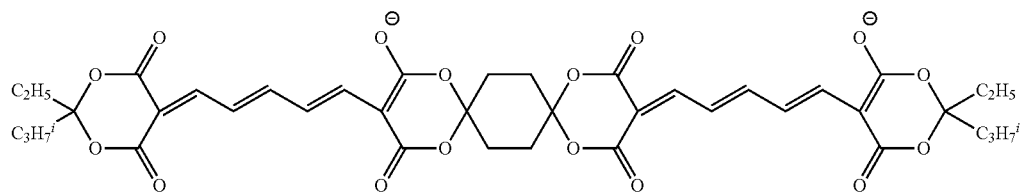
(I)-5
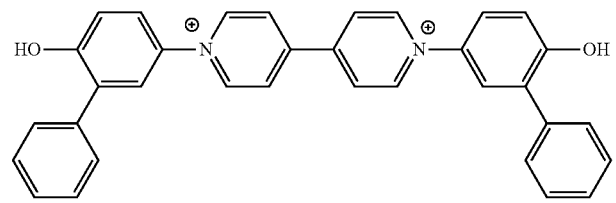
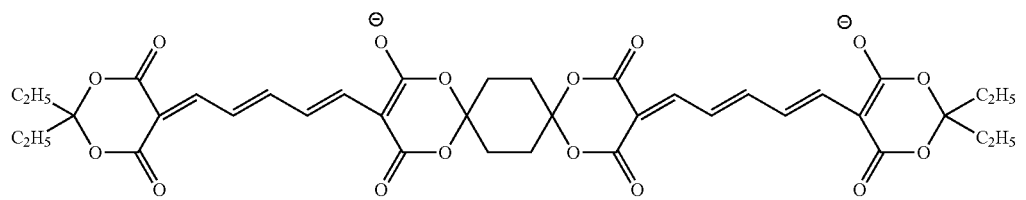
(I)-6
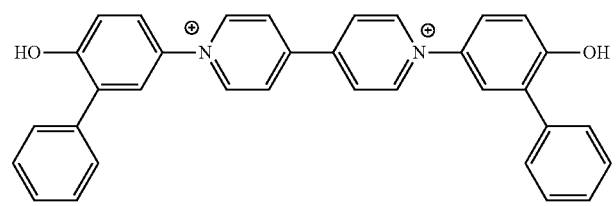

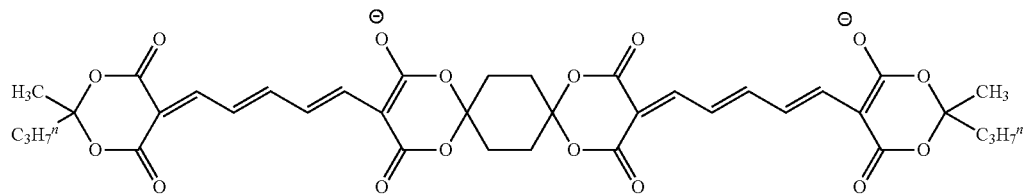
(I)-7
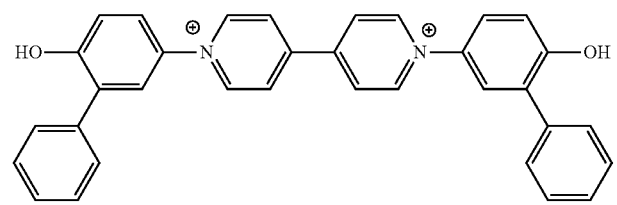
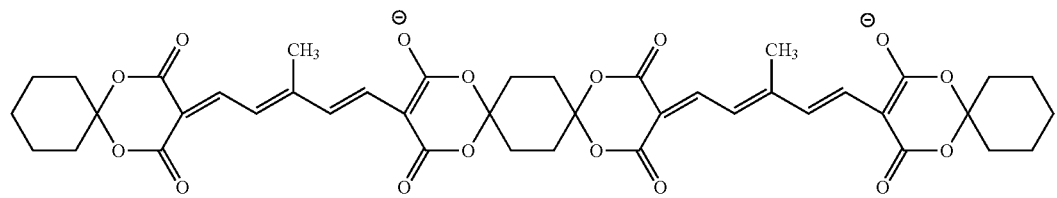
(I)-8
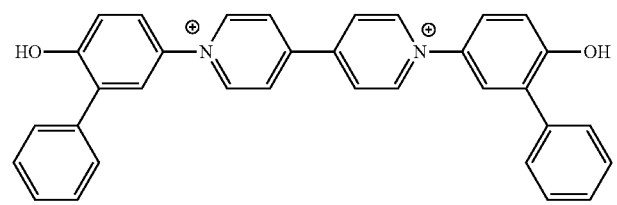
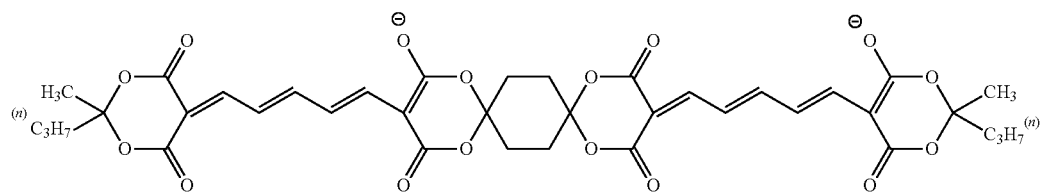
(I)-9
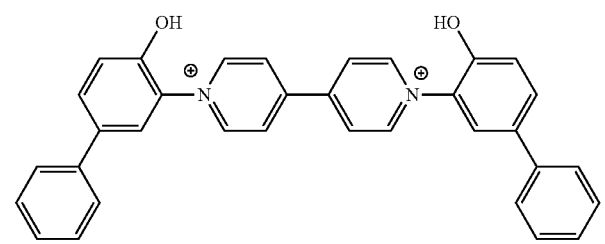

(I)-10
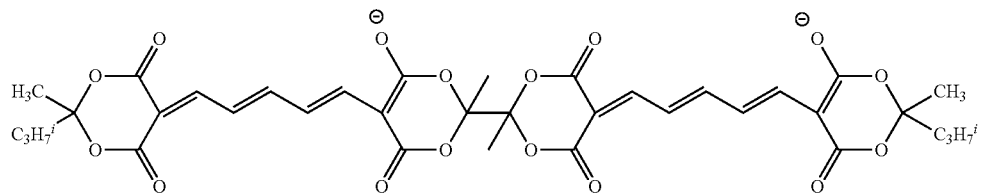
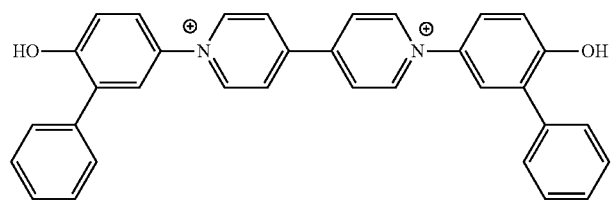
(I)-11
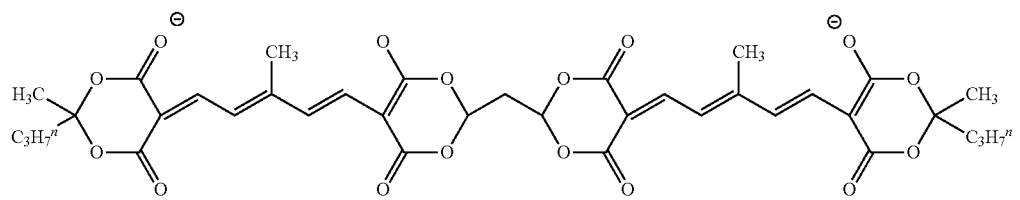
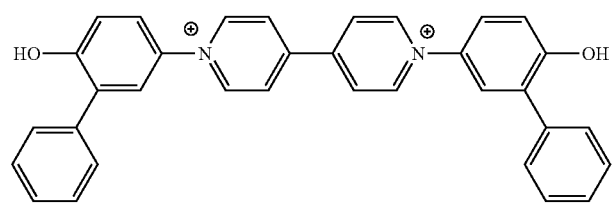
(I)-12
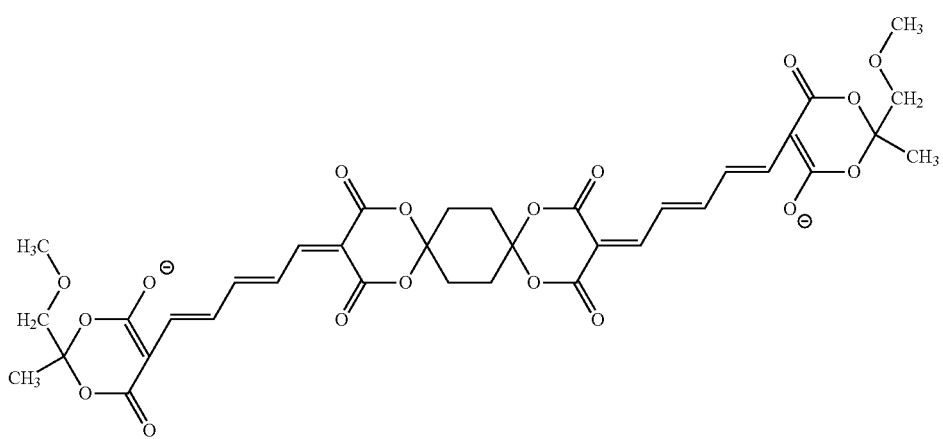
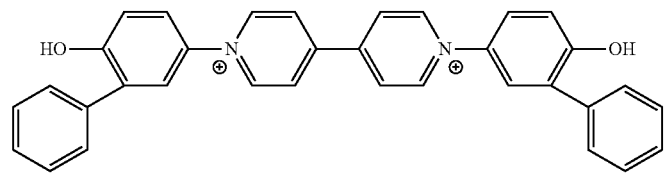

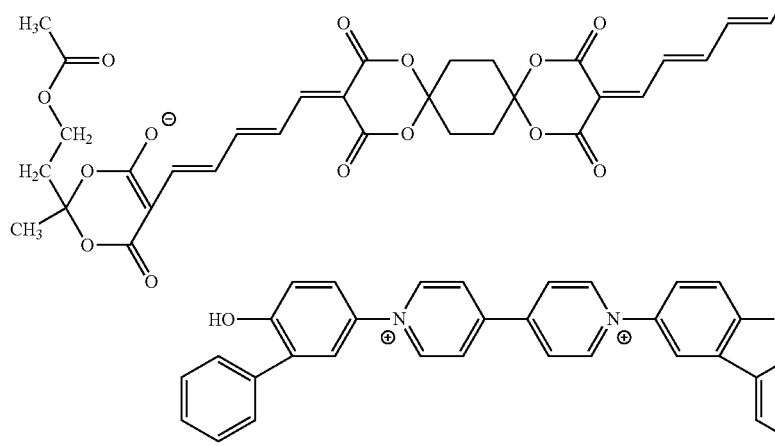
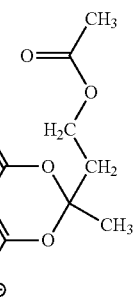
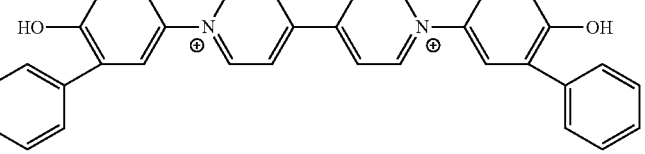
(I)-13
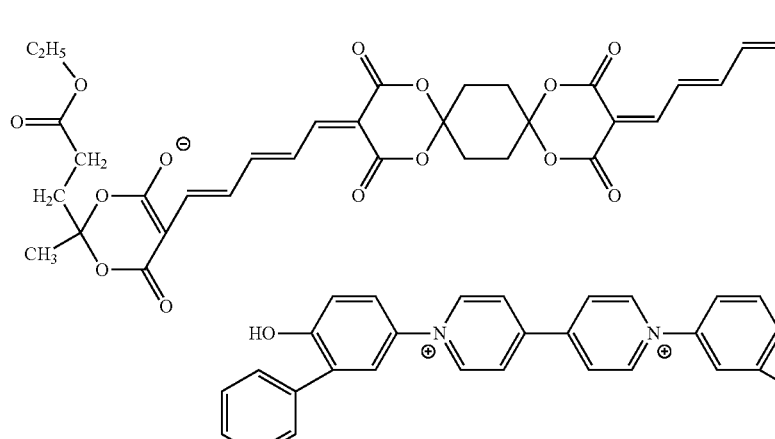
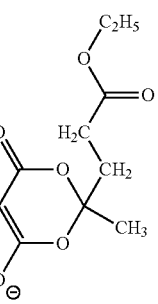
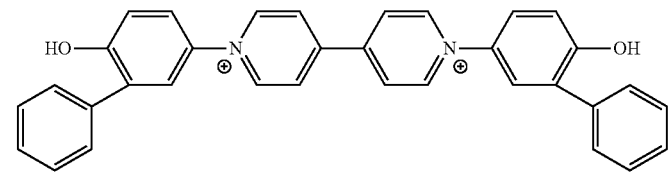
(I)-14

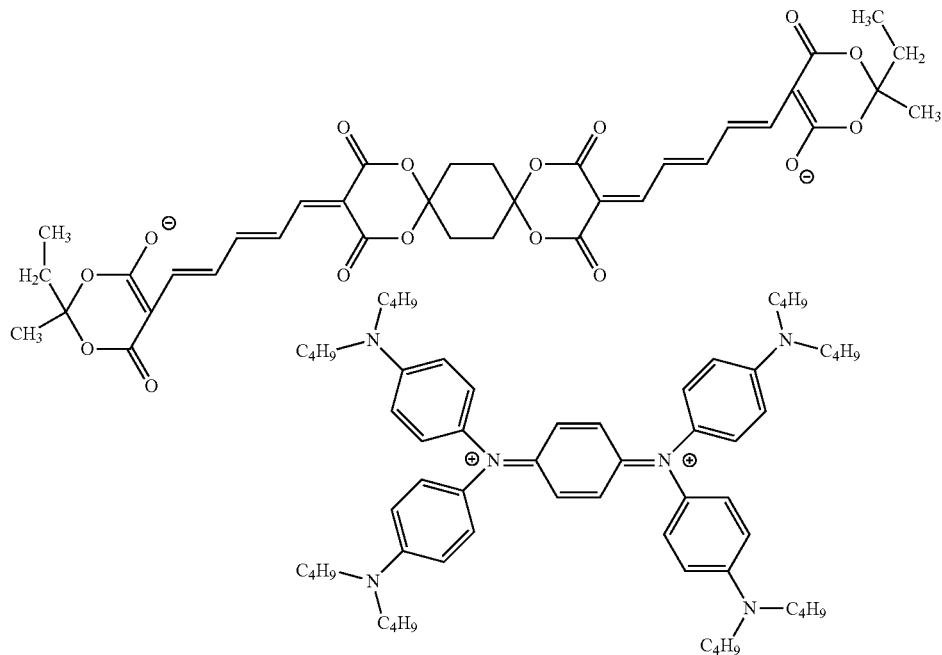
(I)-15
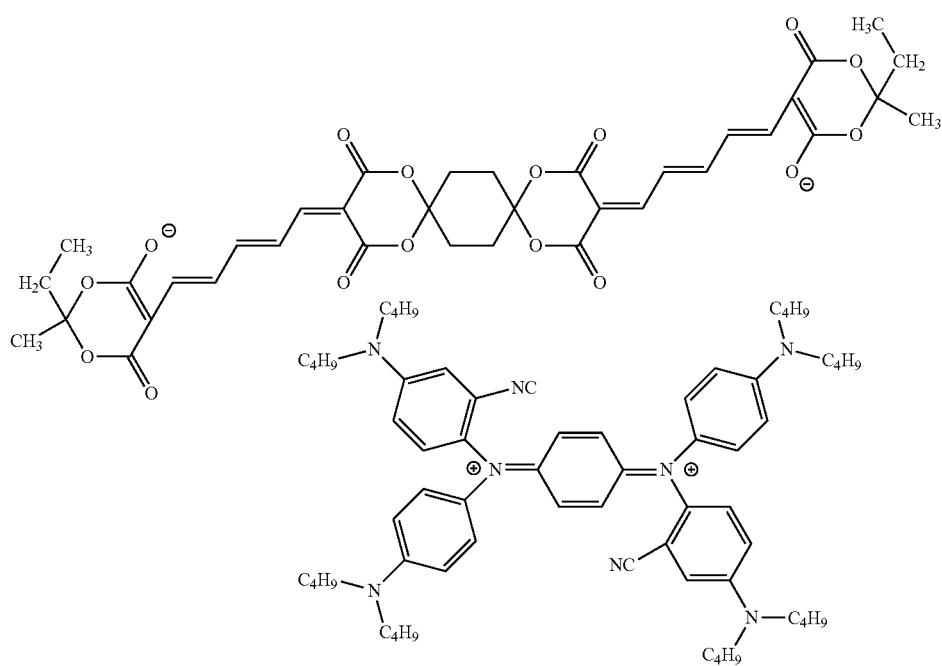
(I)-16

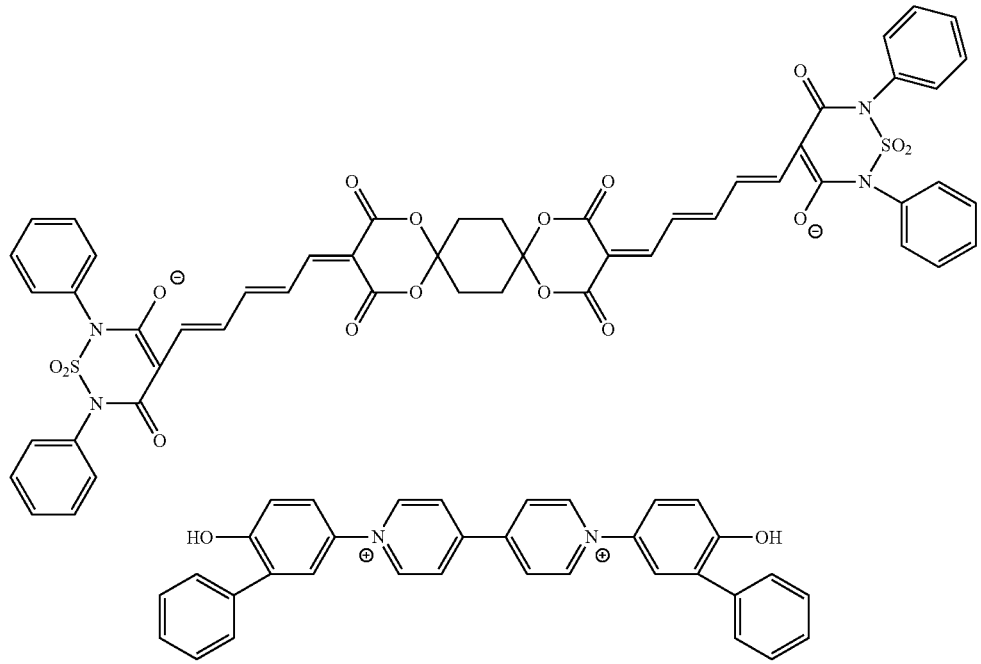
(I)-17
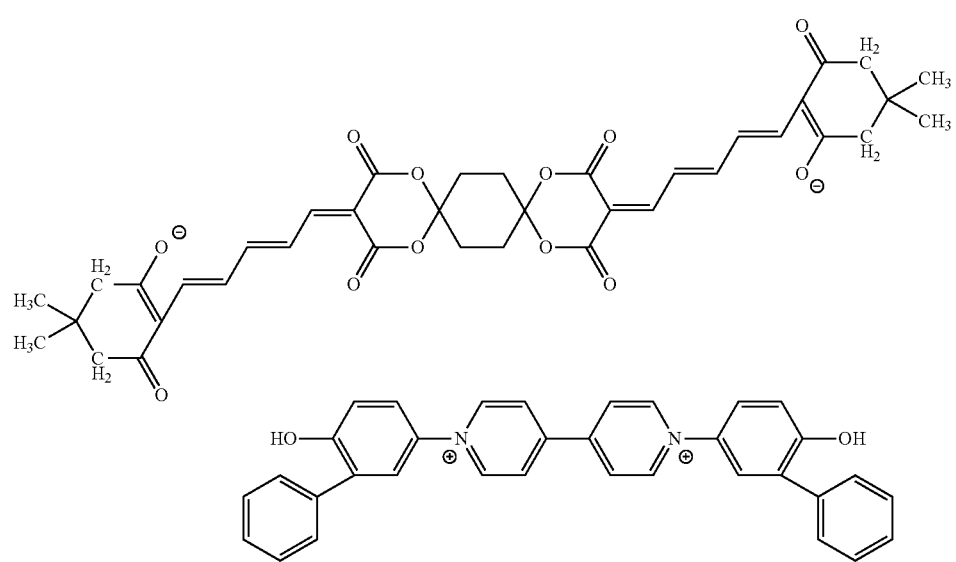
(I)-18

(I)-19
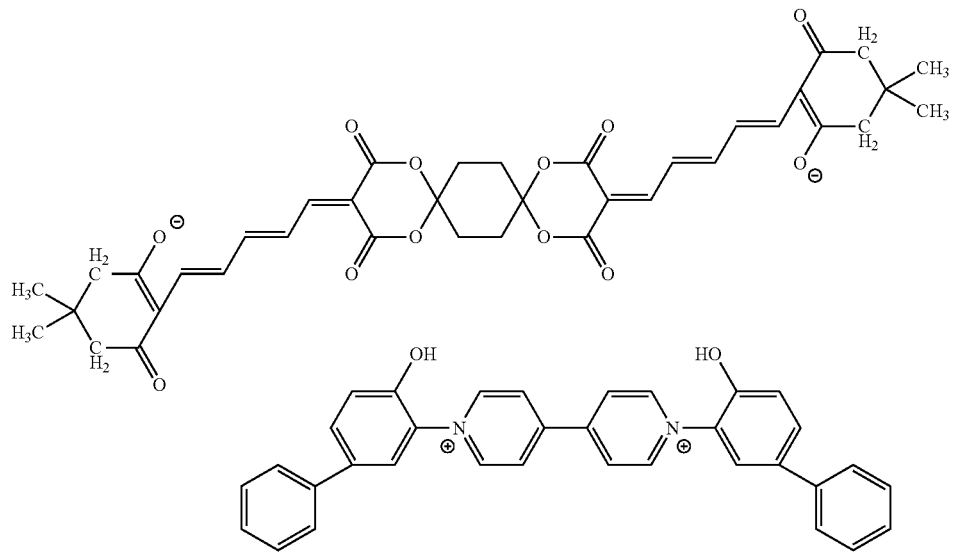
(I)-20
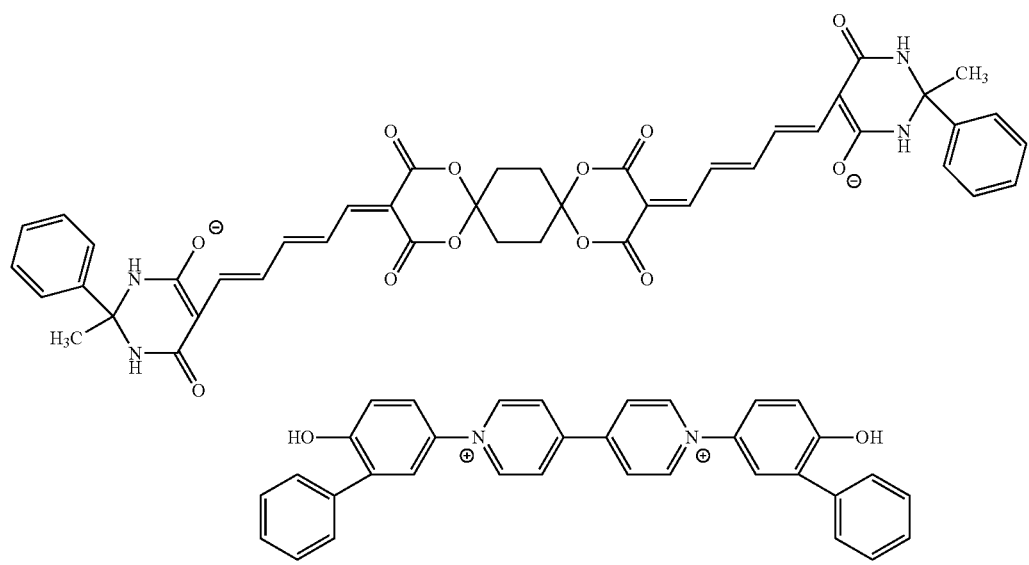

(I)-21
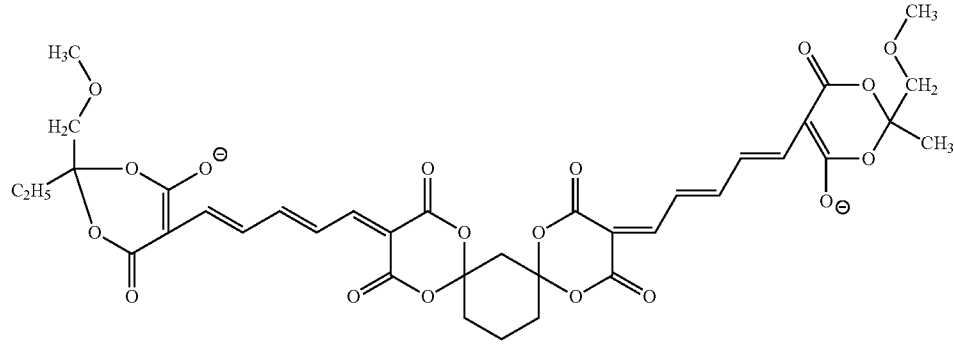
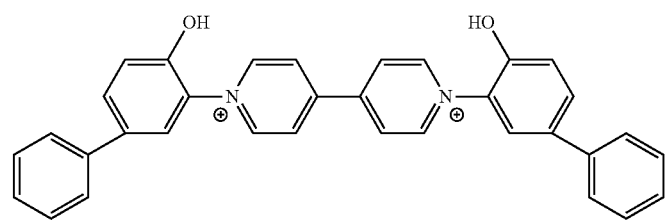
(I)-22
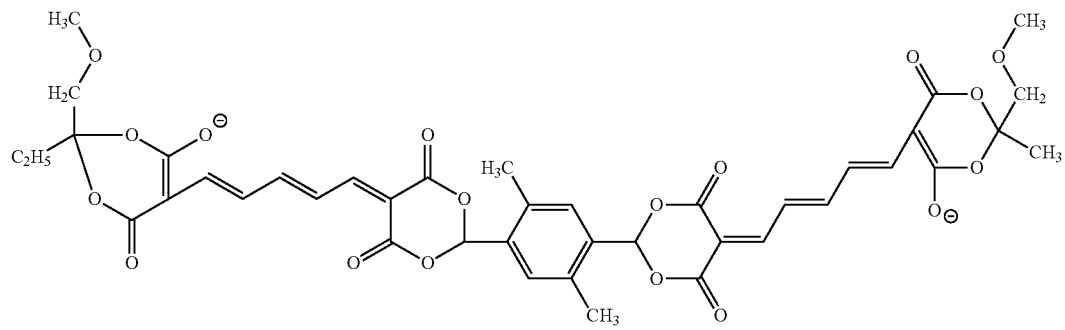
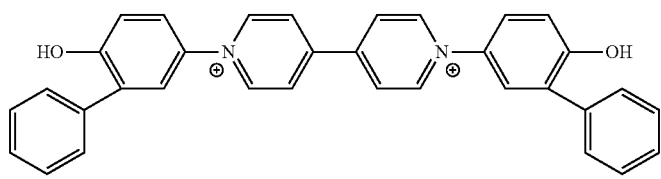
(I)-123
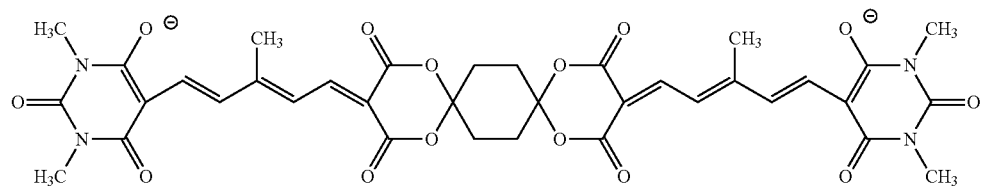
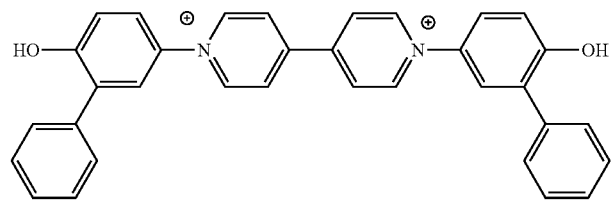

(I)-124
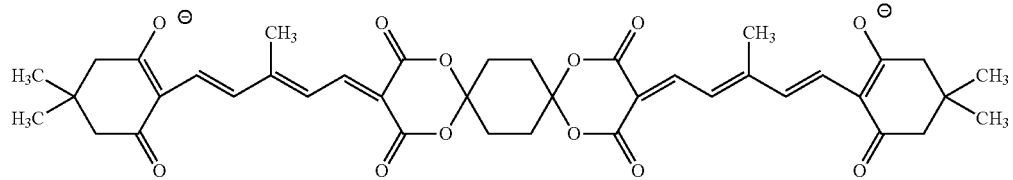
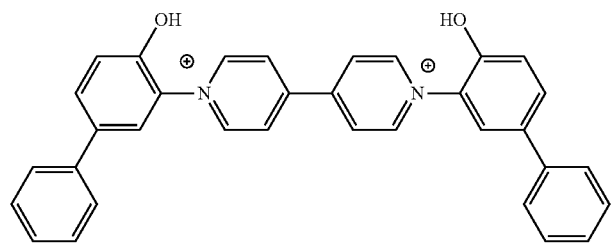
(I)-125
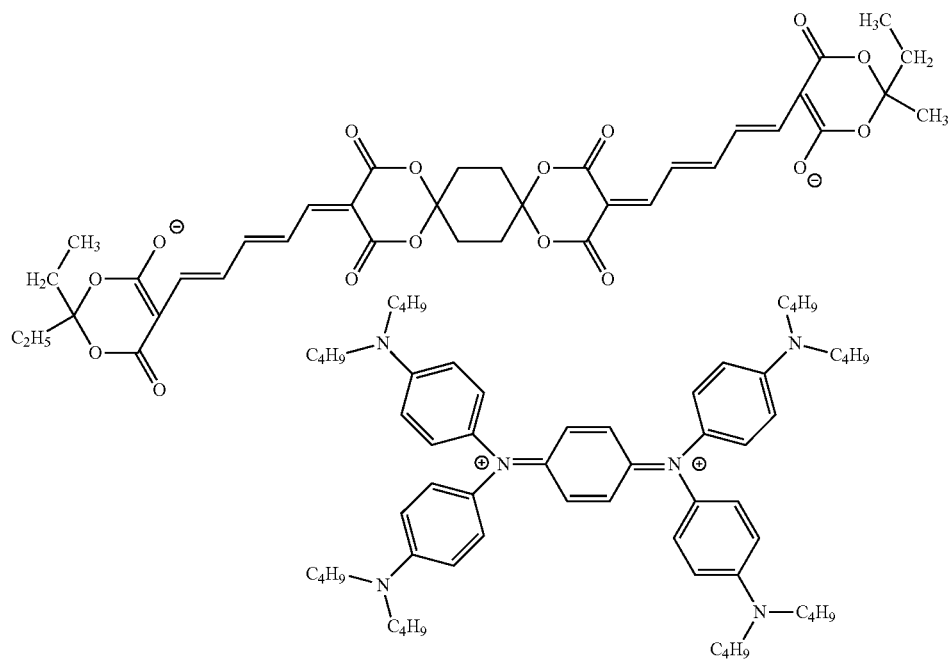
(II)-1
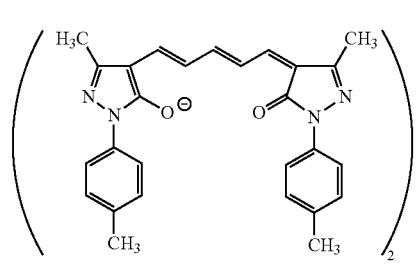
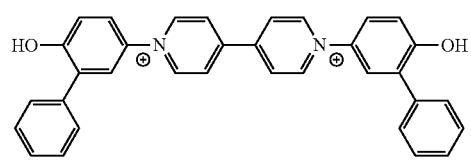
(II)-2
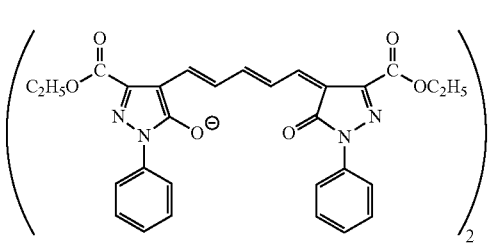
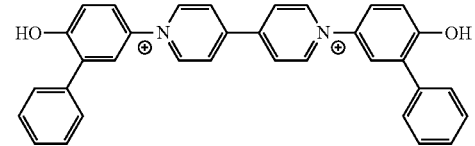

-continued
(II)-3
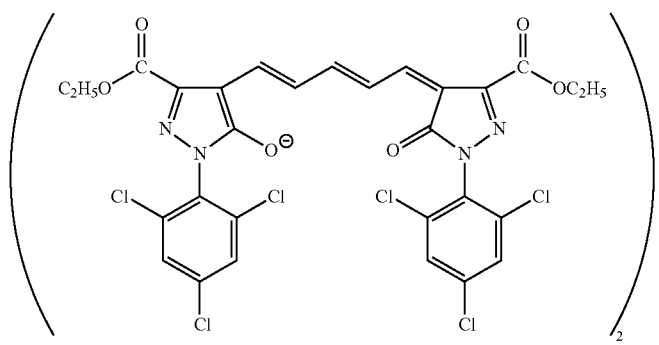
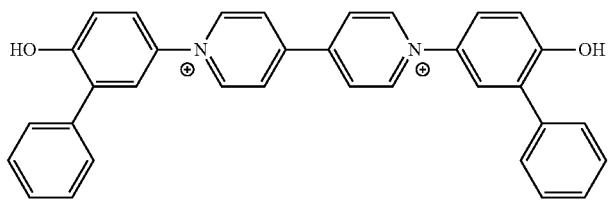
(II)-4
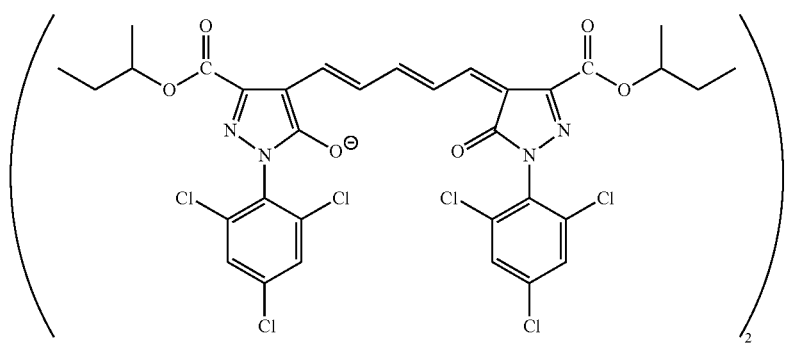
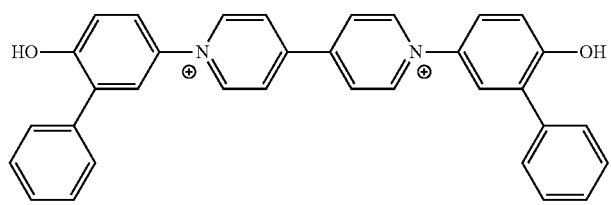
(II)-5
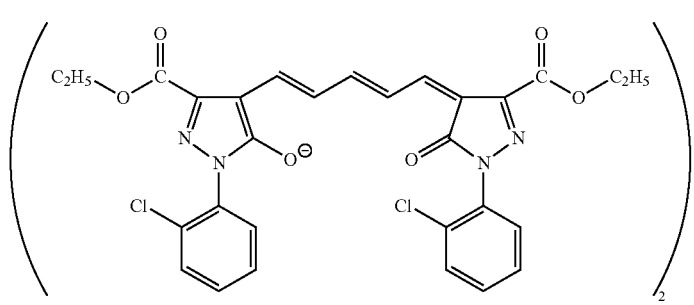
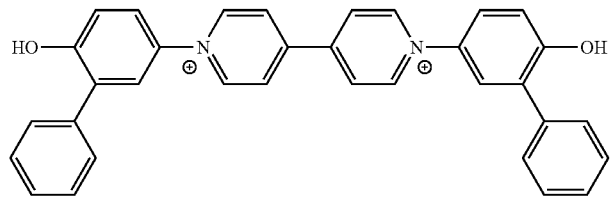

-continued
(II)-6
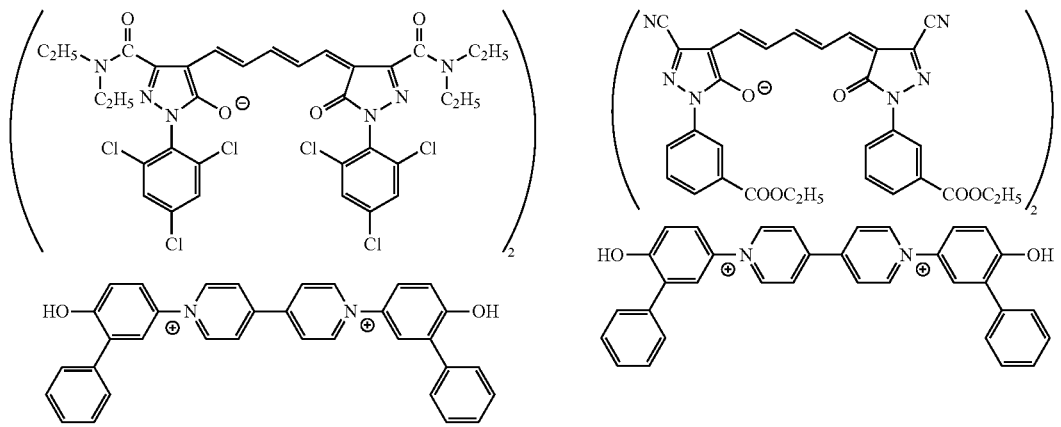
(II)-7
(II)-8
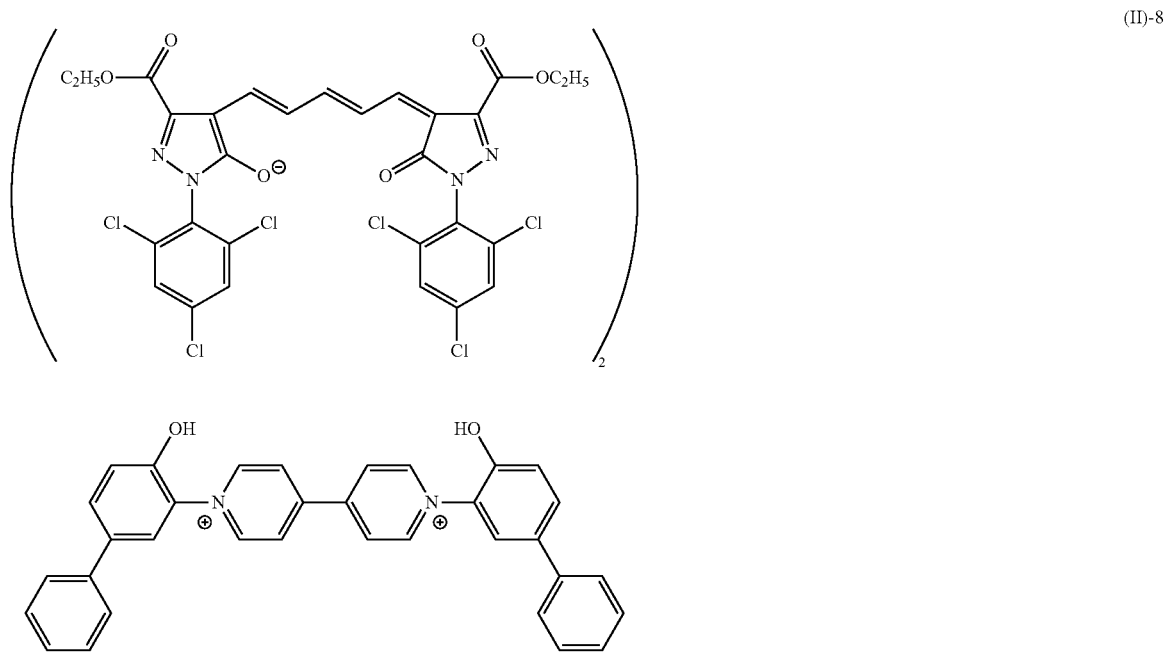

(II)-9
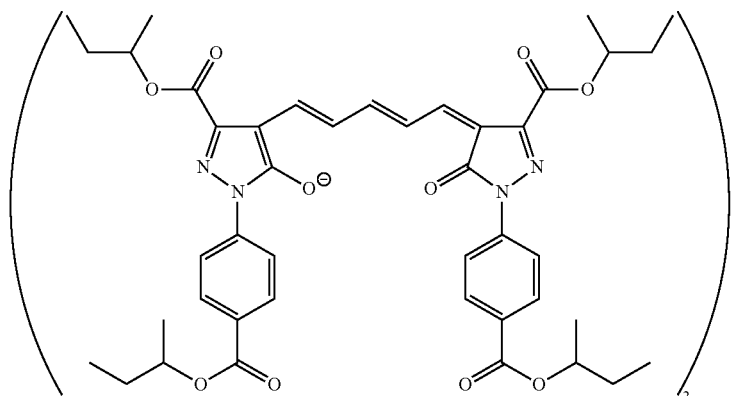
(II)-10
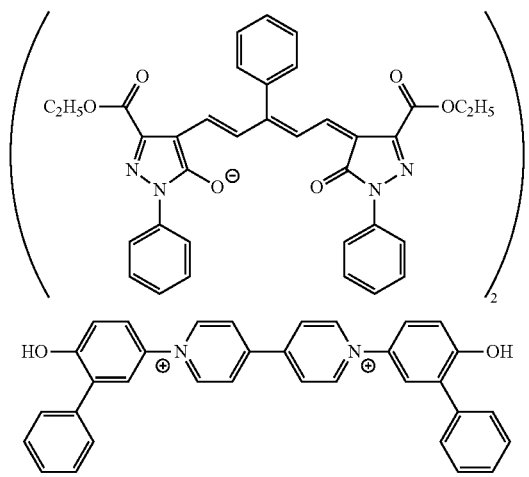
(II)-11
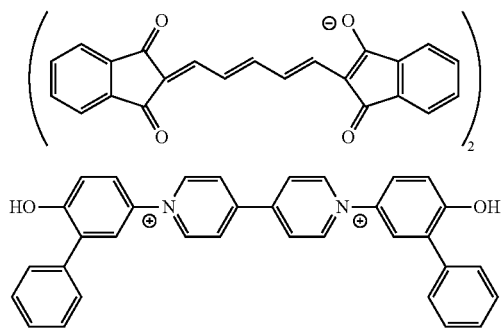
(II)-12
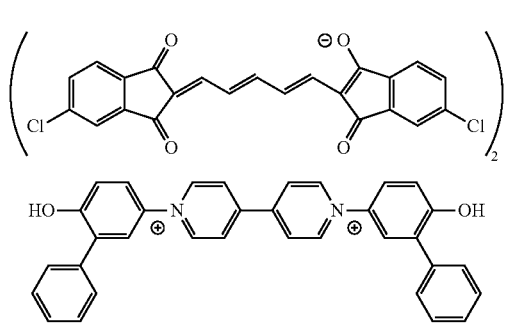
(II)-13
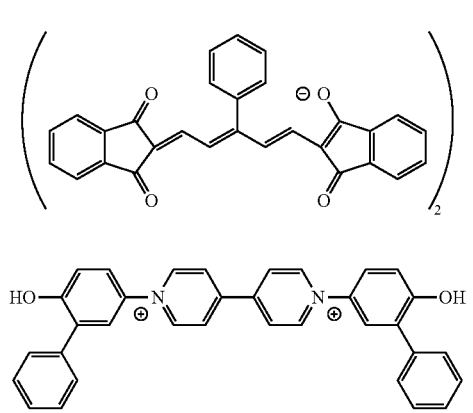

(II)-14
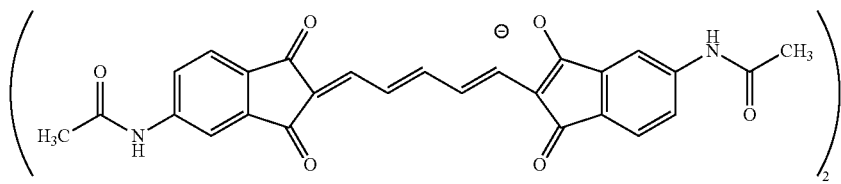
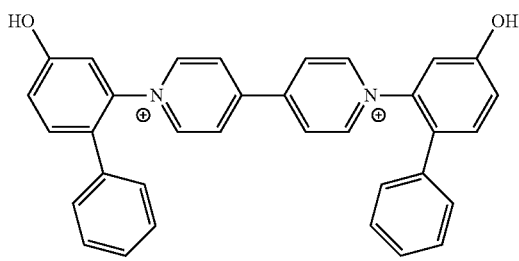
(II)-15
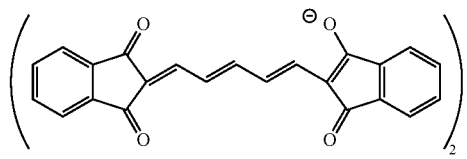
(II)-16
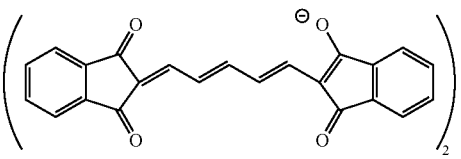
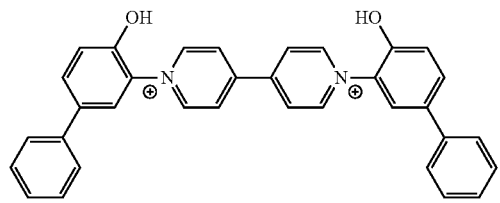
(II)-17
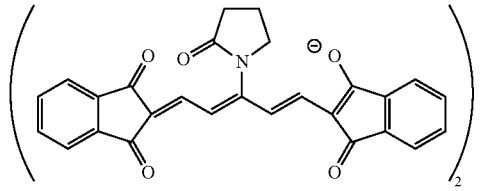
(II)-18
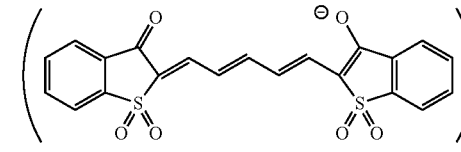
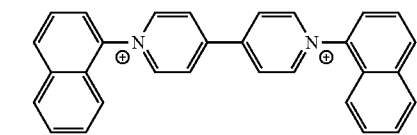
(II)-19
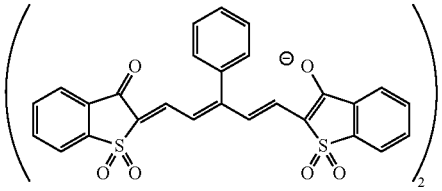
(II)-20
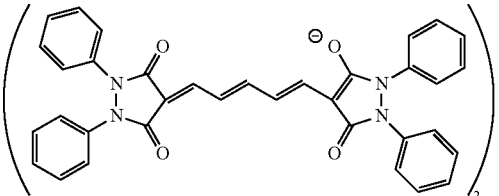
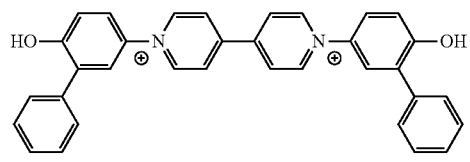
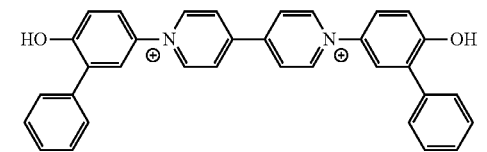

-continued
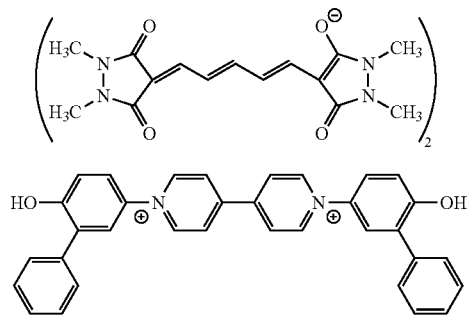
(II)-21
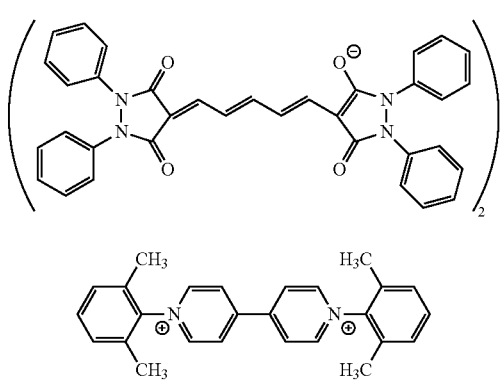
(II)-22
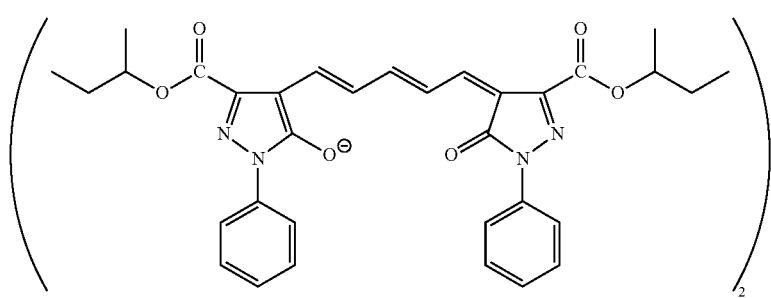
(II)-23
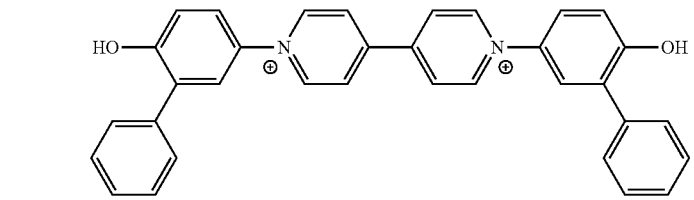
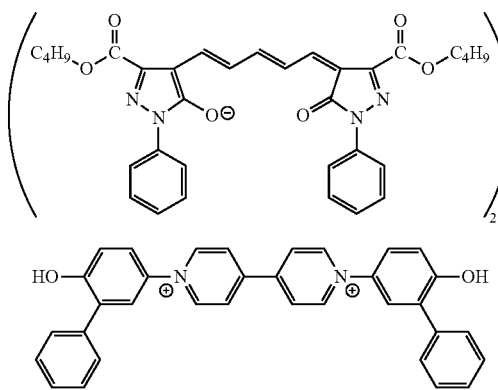
(II)-24 (II)-25

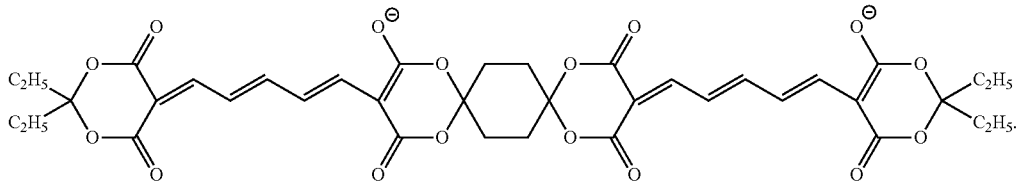
1
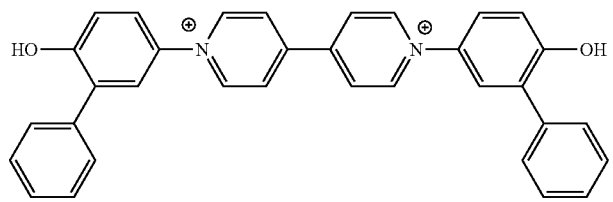
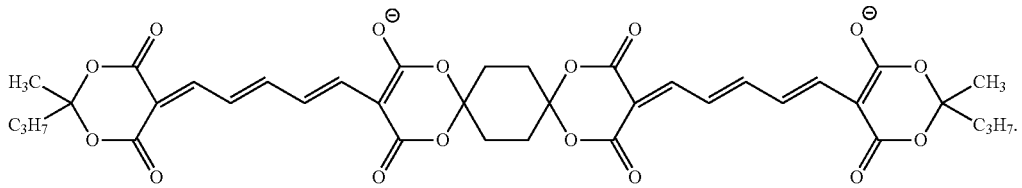
2
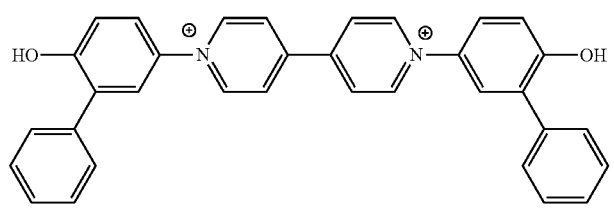
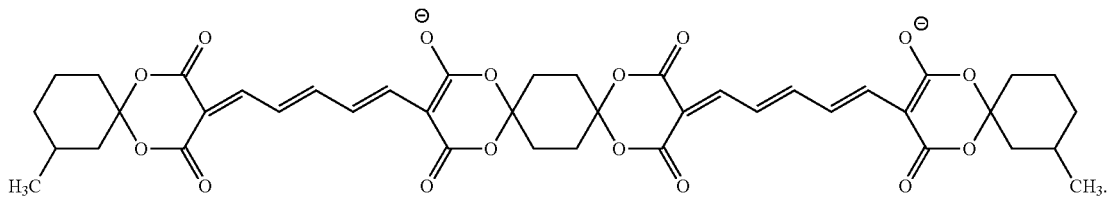
3
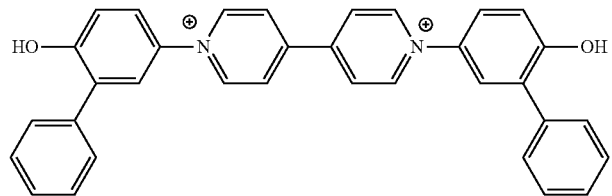

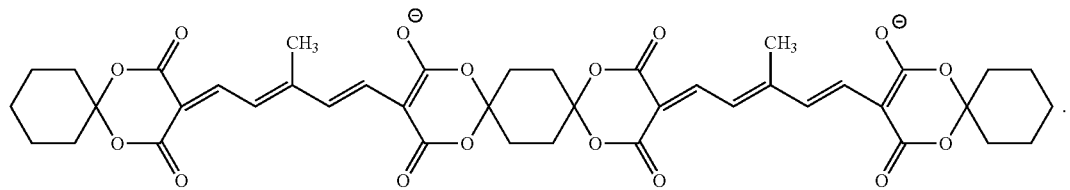
4
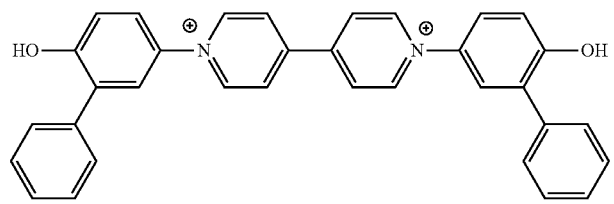
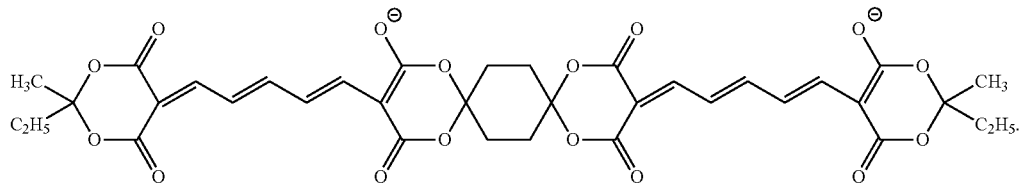
5
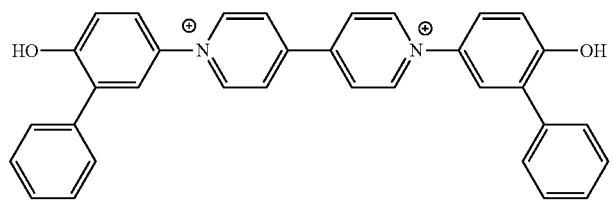
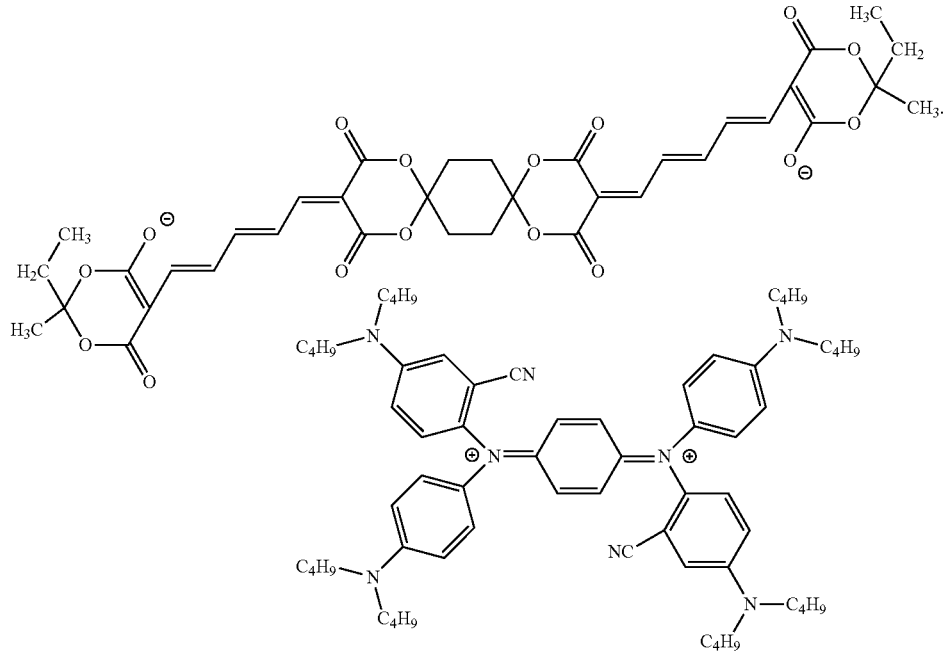
6

-continued
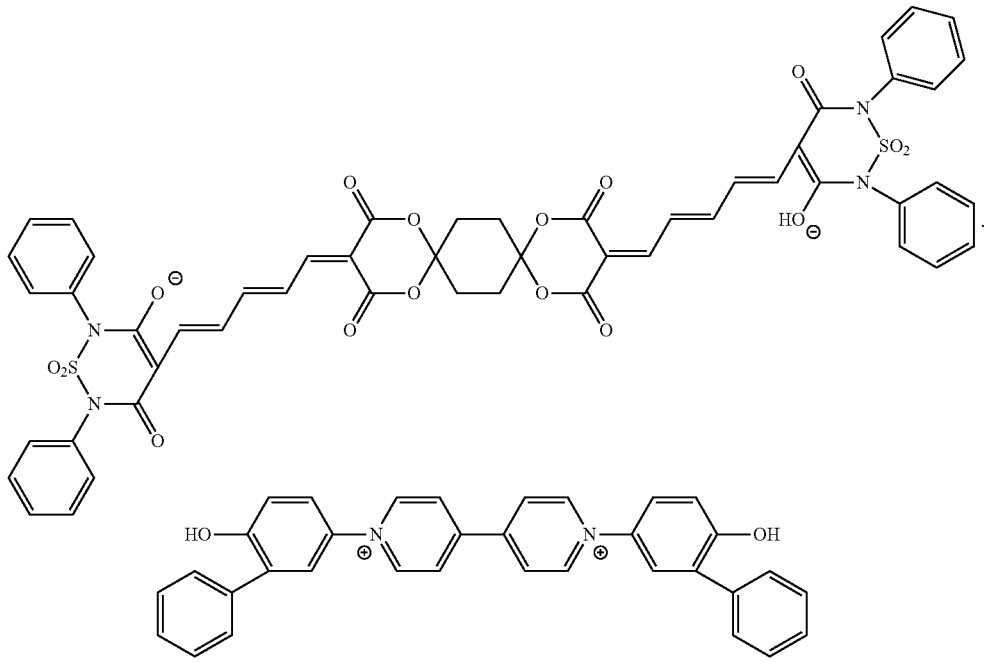
7
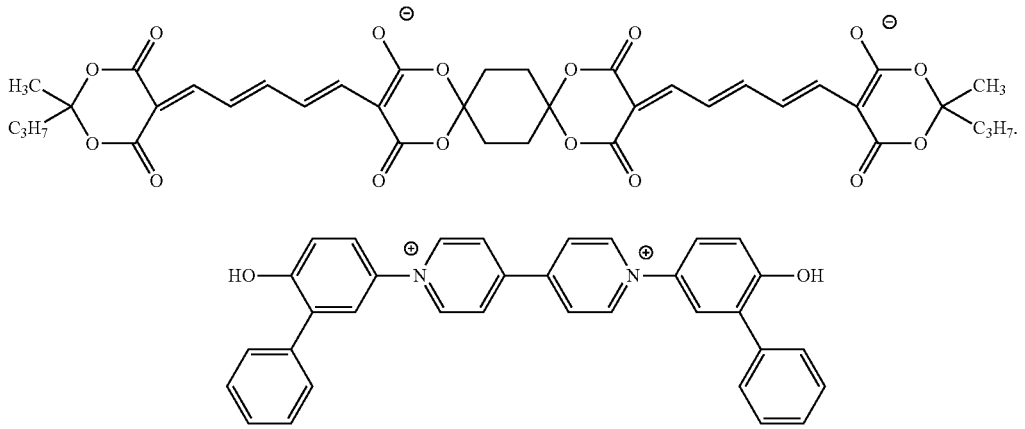
8
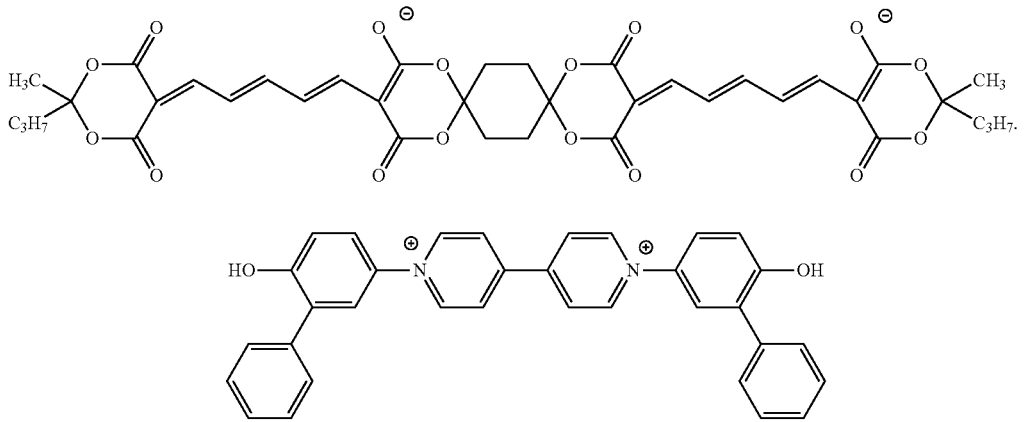
9

-continued
10
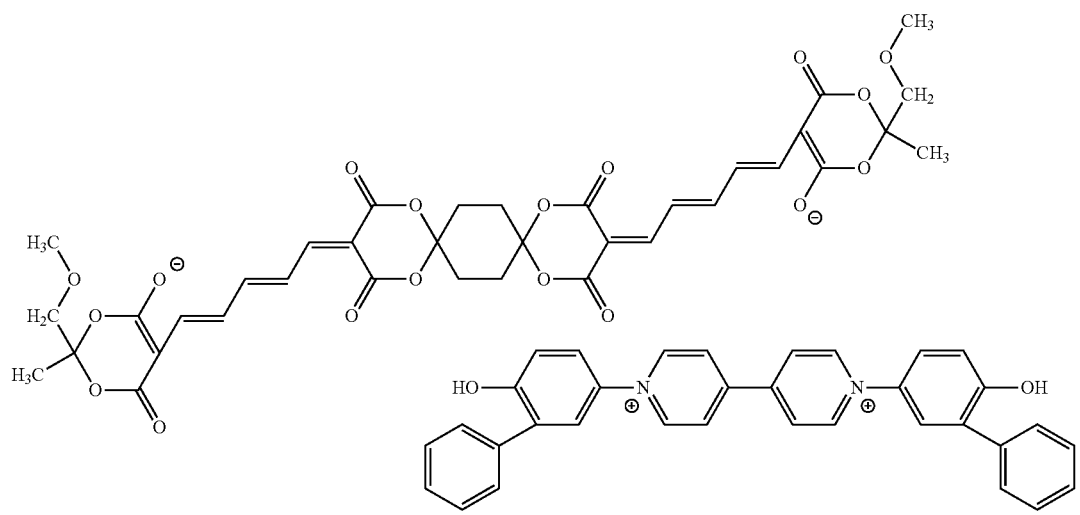
11
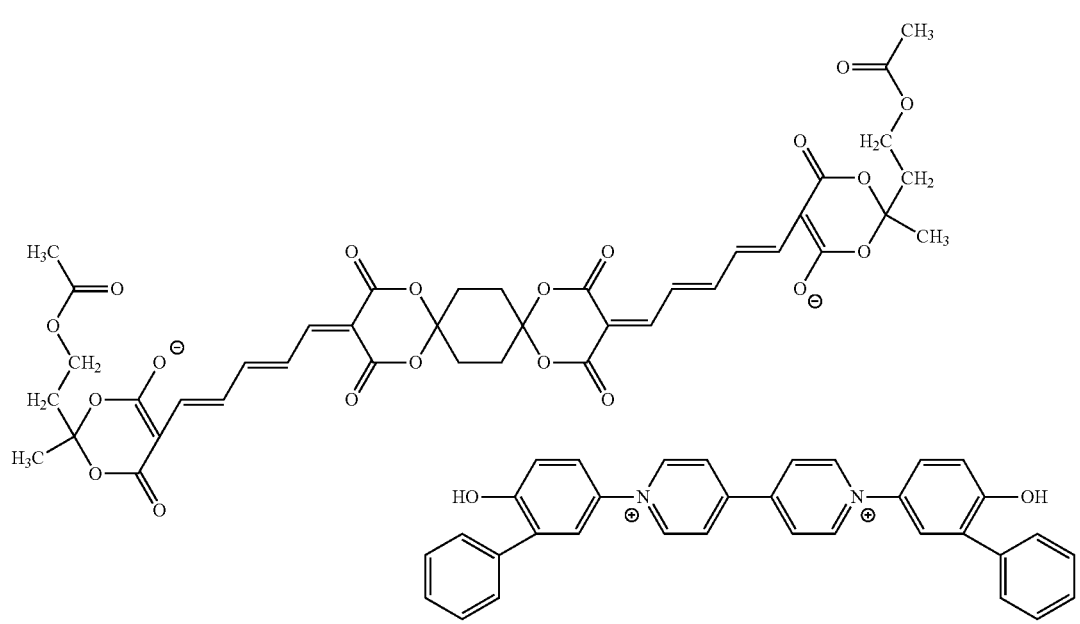

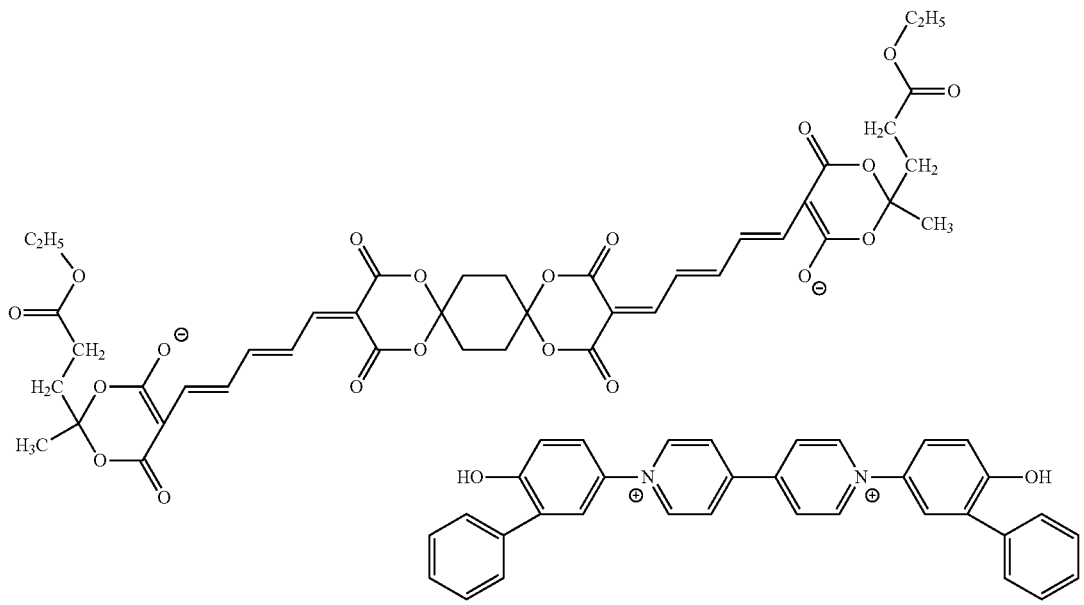
12
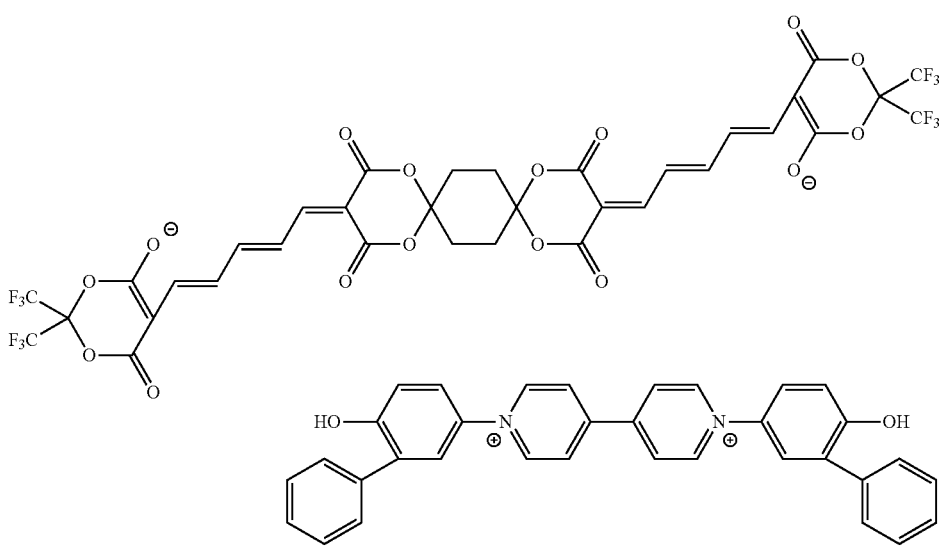
13

14
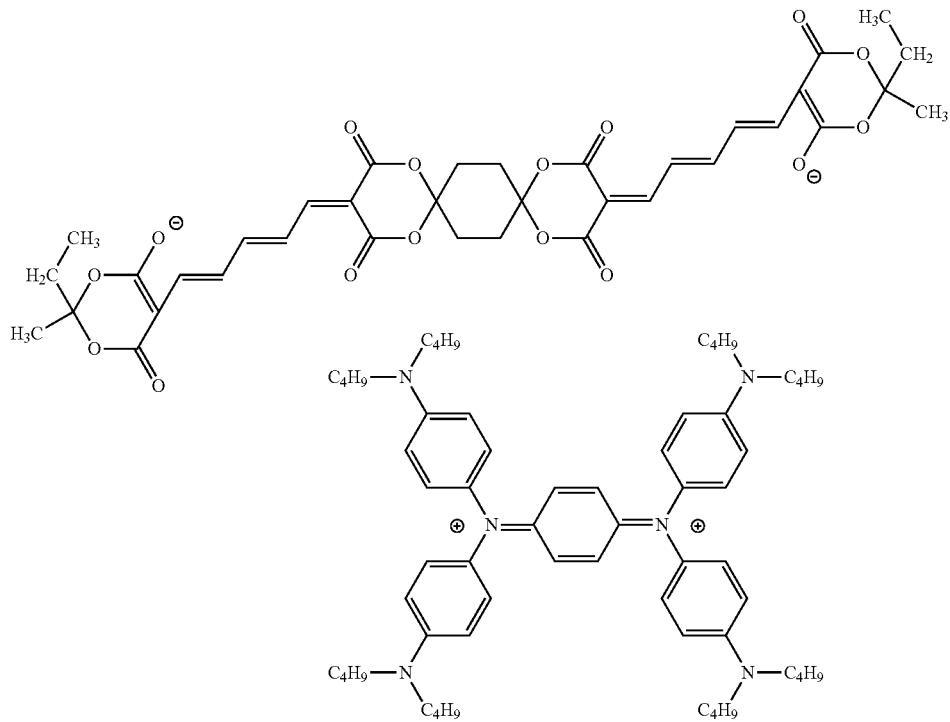

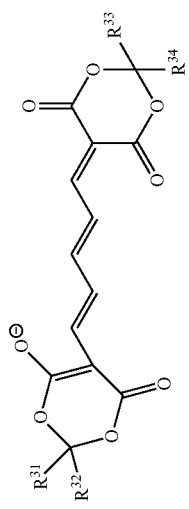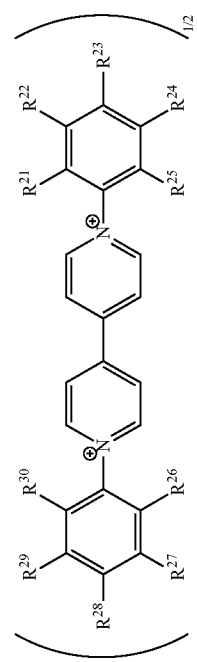
| Compound | $R^{21}$ | $R^{22}$ | $R^{23}$ | $R^{24}$ | $R^{25}$ | $R^{26}$ | $R^{27}$ | $R^{28}$ | $R^{29}$ | $R^{30}$ | $R^{31}$ | $R^{32}$ | $R^{33}$ | $R^{34}$ |
|---|---|---|---|---|---|---|---|---|---|---|---|---|---|---|
| (I)-23 | H | phenyl | —OH | H | H | H | phenyl | —OH | H | H | phenyl | $CH_3$ | phenyl | $CH_3$ |
| (I)-24 | " | " | " | " | " | " | " | " | " | " | $C_2H_5$ $CH_3$ | $C_2H_5$ $CH_3$ | " | " |
| (I)-25 | " | " | " | " | " | " | " | " | " | " | cyclopentyl | cyclopentyl | " | " |

-continued

| Compound | R³¹ | R³² | R³³ | R³⁴ | R²¹ | R²² | R²³ | R²⁴ | R²⁵ | R²⁶ | R²⁷ | R²⁸ | R²⁹ | R³⁰ |
|---|---|---|---|---|---|---|---|---|---|---|---|---|---|---|
| (I)-26 | 4-methylcyclohexyl | 4-methylcyclohexyl | 4-methylcyclohexyl | 4-methylcyclohexyl | " | " | " | " | " | " | " | " | " | " |
| (I)-27 | cyclohexyl | cyclohexyl | cyclohexyl | cyclohexyl | H | 4-methylphenyl | H | H | —OH | H | phenyl | H | H | —OH |
| (I)-28 | " | " | " | " | H | 4-methylphenyl-3-Br | H | H | —OH | H | 4-methylphenyl-3-Br | H | H | —OH |

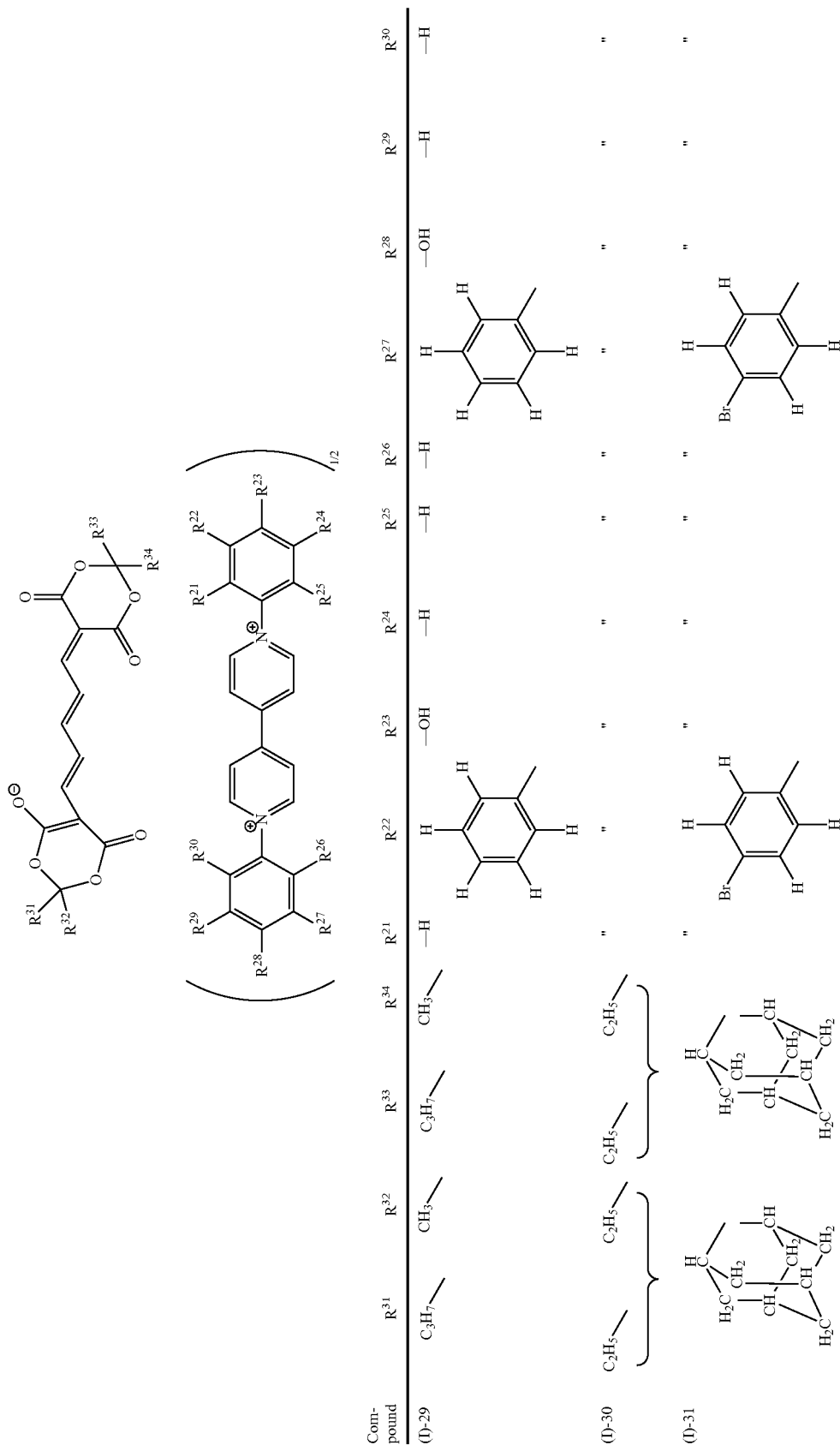

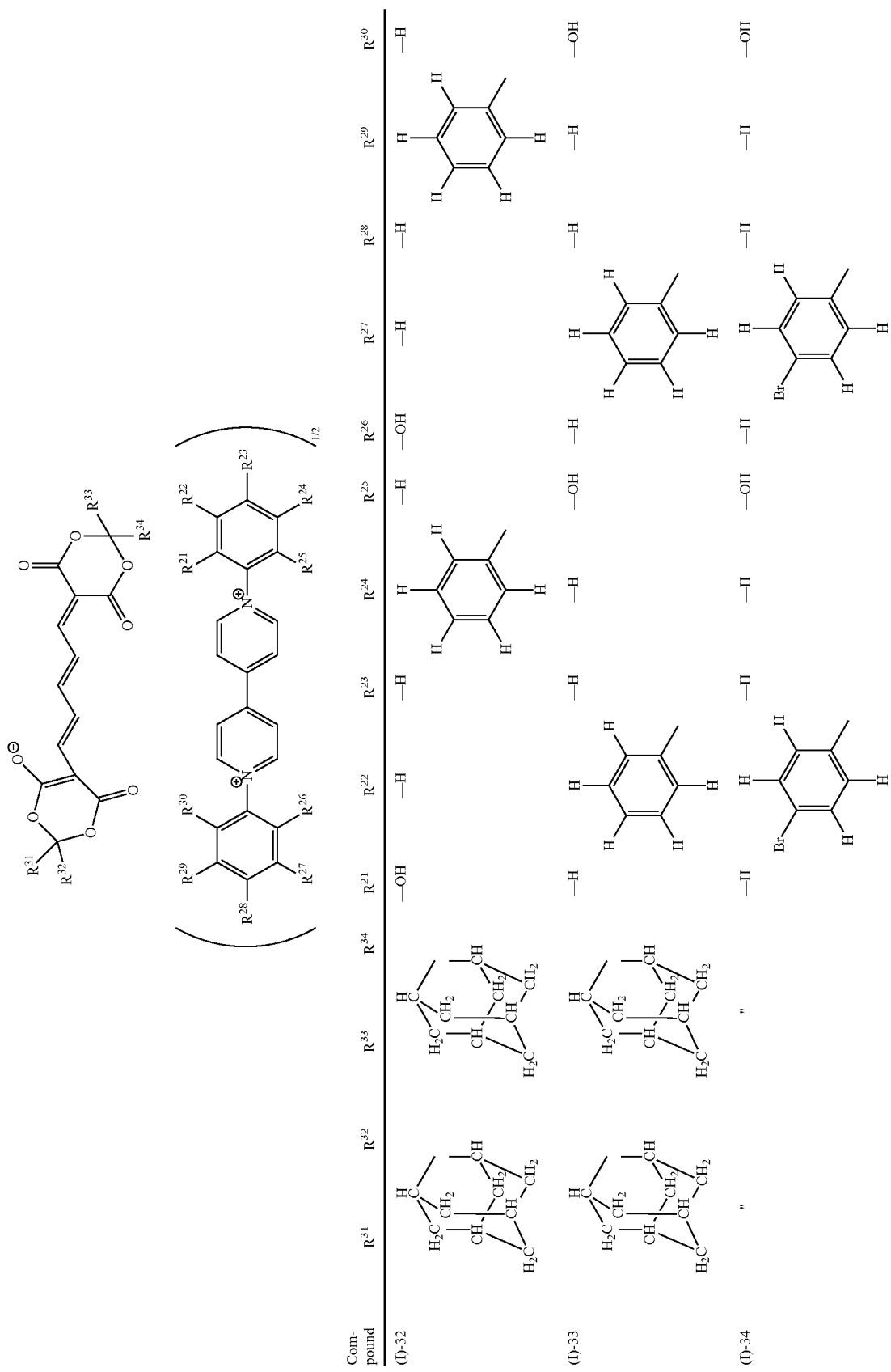

-continued

| Compound | $R^{21}$ | $R^{22}$ | $R^{23}$ | $R^{24}$ | $R^{25}$ | $R^{26}$ | $R^{27}$ | $R^{28}$ | $R^{29}$ | $R^{30}$ | $R^{31}$ | $R^{32}$ | $R^{33}$ | $R^{34}$ |
|---|---|---|---|---|---|---|---|---|---|---|---|---|---|---|
| (I)-35 | | | | | | | | | | | | | | |

General oxonol dyes can be synthesized by condensation reaction between a corresponding active methylene compound and a methine source (a compound to be used for introducing a methine group into a methine dye). As to detailed descriptions on this kind of compounds, reference may be made to JP-B-39-22069, JP-B-43-3504, JP-B-52-38056, JP-B-54-38129, JP-B-55-10059, JP-B-58-35544, JP-A-49-99620, JP-A-52-92716, JP-A-59-16834, JP-A-63-316853, JP-A-64-40827, BP No. 1,133,986, U.S. Pat. Nos. 3,247,127, 4,042,397, 4,181,225, 5,213,956 and 5,260,179. Descriptions thereon are also given in JP-A-63-209995, JP-A-10-309871 and JP-A-2002-249674.

A process for synthesizing the bis type oxonol dyes is disclosed in EP No. 1,424,691 A2.

Next, embodiments of an optical information recording medium wherein the dye in the recording layer is a cyanine dye will be described below.

Dyes represented by the general formula (2') will be described below. $Ma^{21}$, $Ma^{22}$ and $Ma^{23}$ in the general formula (2') are the same as defined with respect to $Ma^{11}$, $Ma^{12}$ and $Ma^{13}$ in the general formula (1'), and preferred examples thereof are also the same as described there. $R^{101}$ and $R^{102}$ each independently represents a substituent, preferably a substituted or unsubstituted alkyl group, a substituted or unsubstituted aryl group, a substituted or unsubstituted alkenyl group, a substituted or unsubstituted alkynyl group, or a substituted or unsubstituted hetero ring group. These substituents may further be substituted, and examples of such substituent are the same as described in group S in the general formula (1). Preferably, $R^{101}$ and $R^{102}$ each represents a substituted or unsubstituted alkyl group, more preferably a substituted or unsubstituted alkyl group containing from 1 to 8 carbon atoms, still more preferably an unsubstituted alkyl group containing from 1 to 8 carbon atoms. $R^{101}$ and $R^{102}$ may be different from each other or may be the same, preferably are the same. ka2 is the same as defined with ka1 in the general formula (1'), and preferred examples thereof are also the same as described there.

Q2 represents an ion which neutralizes the charge, and y2 represents a number necessary for neutralizing the charge. The ion represented by Q2 is an anion in accordance with the charge of the dye molecule. The ion represented by Q2 is not particularly limited, and may be an ion comprising an inorganic compound or an ion comprising an organic compound. The charge of the ion represented by Q2 may be monovalent or polyvalent. Examples of the anion represented by Q2 include a halide anion such as a chloride ion, a bromide ion or a fluoride ion, a heteropolyacid ion such as a sulfate ion, a phosphate ion or a hydrogenphosphate ion, an organic polyvalent anion such as a succinate ion, a maleate ion, a fumarate ion or an aromadic disulfonate ion, a tetrafluoroborate ion and a hexafluorophosphate ion.

y2 represents a number necessary for neutralizing the charge and is the same as defined with respect to y1 in the general formula (1'). In the case where Q2 represents a divalent anion, entire $Q2_{y2}$ can be considered as a monovalent anion when y2 is reduced to ½.

Next, dyes represented by the general formula (4') will be described below. $R^{121}$, $R^{122}$ and $R^{123}$ each represents a hydrogen atom or a substituent. The substituent is the same as defined with respect to the substituent for $Ma^{11}$, $Ma^{12}$ and $Ma^{13}$, and preferred examples thereof are also the same as described there. $R^{124}$, $R^{125}$, $R^{126}$ and $R^{127}$ each represents a hydrogen atom or a substituent. The substituent is the same as defined with respect to $R^{1a}$ and $R^{2a}$ to be described hereinafter, and preferred examples thereof are also the same as described there. $R^{1a}$ and $R^{2a}$ are the same as defined with respect to $R^{101}$ and $R^{102}$ in the general formula (2') and preferred examples thereof are also the same as described there. ka3 is the same as defined with ka2 in the general formula (2'), and preferred examples thereof are also the same as described there.

Q3 represents an ion which neutralizes the charge, and y3 represents a number necessary for neutralizing the charge. The ion represented by Q3 is an anion in accordance with the charge of the dye molecule. The ion represented by Q3 is not particularly limited, and may be an ion comprising an inorganic compound or an ion comprising an organic compound. The charge of the ion represented by Q3 may be monovalent or polyvalent. Examples of the anion represented by Q3 include a halide anion such as a chloride ion, a bromide ion or a fluoride ion, a heteropolyacid ion such as a sulfate ion, a phosphate ion or a hydrogenphosphate ion, an organic polyvalent anion such as a succinate ion, a maleate ion, a fumarate ion or an aromatic disulfonate ion, a tetrafluoroborate ion and a hexafluorophosphate ion.

y3 represents a number necessary for neutralizing the charge and is the same as defined with respect to y2 in the general formula (2'). In the case where Q3 represents a divalent anion, entire $Q3_{y3}$ can be considered as a monovalent anion when y3 is reduced to ½.

With the cyanine dye to be used in the invention represented by the above general formula (2') or (4'), $Ma^{21}$, $Ma^{22}$ and $Ma^{23}$ each preferably represents an unsubstituted methine group, $R^{101}$ and $R^{102}$ each independently represents preferably an unsubstituted alkyl group containing from 1 to 8 carbon atoms, $R^{124}$, $R^{125}$, $R^{126}$ and $R^{127}$ each independently represents preferably a substituted or unsubstituted alkyl group, ka3 preferably represents 1 or 2, Q3 preferably represents an inorganic or organic anion, and y3 preferably represents 1. Most preferred dyes are those which satisfy all of the above-mentioned preferred embodiments.

Specific examples of the cyanine compound to be used in the invention having a structure represented by the general formula (2') are illustrated below which, however, are not to be construed as limiting the invention in any way.

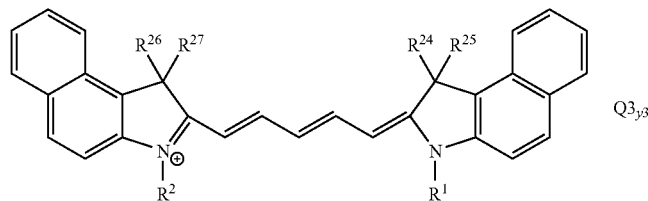

| | R¹ | R² | R²⁴ | R²⁵ | R²⁶ | R²⁷ | Q3$_{y3}$ |
|---|---|---|---|---|---|---|---|
| C-1 | —CH$_3$ | —CH$_3$ | —CH$_3$ | —CH$_3$ | —CH$_3$ | —CH$_3$ | ClO$_4^-$ |
| C-2 | —C$_2$H$_5$ | —C$_2$H$_5$ | —CH$_3$ | —CH$_3$ | —CH$_3$ | —CH$_3$ | ClO$_4^-$ |
| C-3 | —C$_3$H$_7^{(n)}$ | —C$_3$H$_7^{(n)}$ | —CH$_3$ | —CH$_3$ | —CH$_3$ | —CH$_3$ | ClO$_4^-$ |
| C-4 | —C$_4$H$_9^{(n)}$ | —C$_4$H$_9^{(n)}$ | —CH$_3$ | —CH$_3$ | —CH$_3$ | —CH$_3$ | ClO$_4^-$ |
| C-5 | —C$_4$H$_4^{(n)}$ | —CH$_3$ | —CH$_3$ | —CH$_3$ | —CH$_3$ | —CH$_3$ | ClO$_4^-$ |
| C-6 | —CH$_3$ | —CH$_3$ | —CH$_3$ | —CH$_3$ | —CH$_3$ | —CH$_3$ | I$^-$ |
| C-7 | —CH$_3$ | —CH$_3$ | —CH$_3$ | —CH$_3$ | —CH$_3$ | —CH$_3$ | H$_3$C—C$_6$H$_4$—SO$_3^-$ |
| C-8 | —CH$_3$ | —CH$_2$—C$_6$H$_5$ | —CH$_3$ | —CH$_3$ | —CH$_3$ | —CH$_3$ | H$_3$C—C$_6$H$_4$—SO$_3^-$ |
| C-9 | —CH$_3$ | —CH$_3$ | —CH$_3$ | —CH$_3$ | —CH$_3$ | —CH$_3$ | BF$_4^-$ |
| C-10 | —C$_2$H$_5$ | —C$_2$H$_5$ | —CH$_3$ | —CH$_3$ | —CH$_3$ | —CH$_3$ | BF$_4^-$ |
| C-11 | —C$_3$H$_7^{(n)}$ | —C$_3$H$_7^{(n)}$ | —CH$_3$ | —CH$_3$ | —CH$_3$ | —CH$_3$ | ClO$_4^-$ |
| C-12 | —C$_4$H$_9^{(n)}$ | —C$_4$H$_9^{(n)}$ | —CH$_3$ | —CH$_3$ | —CH$_3$ | —CH$_3$ | Cl$^-$ |
| C-13 | —C$_4$H$_9^{(n)}$ | —CH$_3$ | —CH$_3$ | —CH$_3$ | —CH$_3$ | —CH$_3$ | H$_3$C—C$_6$H$_4$—SO$_3^-$ |
| C-14 | —CH$_3$ | —CH$_3$ | —CH$_3$ | —C$_2$H$_5$ | —CH$_3$ | —C$_2$H$_5$ | I$^-$ |
| C-15 | —CH$_3$ | —CH$_3$ | —CH$_3$ | —CH$_3$ | —CH$_3$ | —CH$_3$ | H$_3$C—C$_6$H$_4$—SO$_3^-$ |
| C-16 | —CH$_3$ | —CH$_2$—C$_6$H$_5$ | —CH$_3$ | —CH$_3$ | —CH$_3$ | —CH$_3$ | H$_3$C—C$_6$H$_4$—SO$_3^-$ |
| C-17 | —CH$_3$ | —CH$_3$ | —CH$_3$ | —C$_2$H$_5$ | —CH$_3$ | —CH$_3$ | ClO$_4^-$ |
| C-18 | —C$_2$H$_5$ | —C$_2$H$_5$ | —CH$_3$ | —CH$_3$ | —CH$_3$ | —CH$_3$ | BF$_4^-$ |
| C-19 | —C$_3$H$_7^{(n)}$ | —C$_3$H$_7^{(n)}$ | —CH$_3$ | —CH$_3$ | —CH$_3$ | —CH$_3$ | ClO$_4^-$ |
| C-20 | —C$_4$H$_9^{(n)}$ | —C$_4$H$_9^{(n)}$ | —CH$_3$ | —CH$_3$ | —CH$_3$ | —CH$_3$ | Cl$^-$ |
| C-21 | —C$_4$H$_9^{(n)}$ | —CH$_3$ | —CH$_3$ | —CH$_3$ | —CH$_3$ | —CH$_3$ | H$_3$C—C$_6$H$_4$—SO$_3^-$ |
| C-22 | —CH$_3$ | —CH$_3$ | —CH$_3$ | —CH$_3$ | —CH$_3$ | —CH$_3$ | I$^-$ |
| C-23 | —CH$_3$ | —CH$_3$ | —CH$_3$ | —CH$_3$ | —CH$_3$ | —CH$_3$ | H$_3$C—C$_6$H$_4$—SO$_3^-$ |

-continued

[Structure: bis-benzoindole pentamethine cyanine dye with R$^{26}$, R$^{27}$ on left quaternary carbon, R$^{24}$, R$^{25}$ on right quaternary carbon, R$^2$ on left N$^+$, R$^1$ on right N, counterion Q3$_{y3}$]

| | R$^1$ | R$^2$ | R$^{24}$ | R$^{25}$ | R$^{26}$ | R$^{27}$ | Q3$_{y3}$ |
|---|---|---|---|---|---|---|---|
| C-24 | —CH$_3$ | —CH$_2$—C$_6$H$_5$ | —CH$_3$ | —CH$_3$ | —CH$_3$ | —CH$_3$ | H$_3$C—C$_6$H$_4$—SO$_3^-$ |
| C-25 | —C$_4$H$_9$ | —C$_2$H$_5$ | —CH$_3$ | —C$_2$H$_5$ | —CH$_3$ | —CH$_3$ | ClO$_4^-$ |
| C-26 | —C$_2$H$_5$ | —C$_2$H$_5$ | —CH$_3$ | —CH$_3$ | —CH$_3$ | —CH$_3$ | naphthalene-1,5-disulfonate |
| C-27 | —C$_3$H$_7^{(n)}$ | —C$_3$H$_7^{(n)}$ | —CH$_3$ | —CH$_3$ | —CH$_3$ | —CH$_3$ | ClO$_4^-$ |
| C-28 | —C$_4$H$_9^{(n)}$ | —C$_4$H$_9^{(n)}$ | —CH$_3$ | —CH$_3$ | —CH$_3$ | —CH$_3$ | Cl$^-$ |
| C-29 | —C$_4$H$_9^{(n)}$ | —CH$_3$ | —CH$_3$ | —CH$_3$ | —CH$_3$ | —CH$_3$ | H$_3$C—C$_6$H$_4$—SO$_3^-$ |
| C-30 | —CH$_3$ | —CH$_3$ | —CH$_3$ | —C$_3$H$_7^{(n)}$ | —CH$_3$ | —C$_3$H$_7^{(n)}$ | I$^-$ |
| C-31 | —CH$_3$ | —C$_4$H$_9^{(n)}$ | —CH$_3$ | —CH$_3$ | —CH$_3$ | —CH$_3$ | H$_3$C—C$_6$H$_4$—SO$_3^-$ |
| C-32 | —CH$_3$ | —CH$_2$—C$_6$H$_5$ | —CH$_3$ | —CH$_3$ | —CH$_3$ | —CH$_3$ | H$_3$C—C$_6$H$_4$—SO$_3^-$ |
| C-33 | —CH$_3$ | —CH$_3$ | —CH$_3$ | —CH$_3$ | —CH$_3$ | —CH$_3$ | H$_3$C—C$_6$H$_4$—SO$_3^-$ |
| C-34 | —C$_2$H$_5$ | —C$_2$H$_5$ | —CH$_3$ | —CH$_3$ | —CH$_3$ | —CH$_3$ | ClO$_4^-$ |
| C-35 | —C$_3$H$_7^{(n)}$ | —C$_3$H$_7^{(n)}$ | —CH$_3$ | —CH$_3$ | —CH$_3$ | —CH$_3$ | ClO$_4^-$ |
| C-36 | —C$_4$H$_9^{(n)}$ | —C$_4$H$_9^{(n)}$ | —CH$_3$ | —CH$_3$ | —CH$_3$ | —CH$_3$ | ClO$_4^-$ |
| C-37 | —C$_4$H$_9^{(n)}$ | —CH$_3$ | —CH$_3$ | —CH$_3$ | —CH$_3$ | —CH$_3$ | ClO$_4^-$ |
| C-38 | —CH$_3$ | —CH$_3$ | —CH$_3$ | —CH$_3$ | —CH$_3$ | —CH$_3$ | (naphthalene-1,5-disulfonate)$_{1/2}$ |

-continued
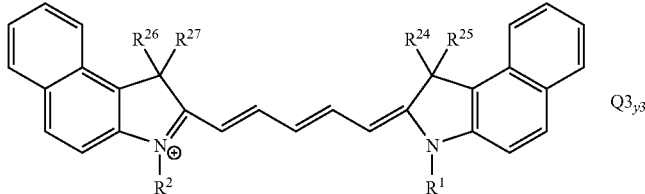
| | R¹ | R² | R²⁴ | R²⁵ | R²⁶ | R²⁷ | Q3$_{y3}$ |
|---|---|---|---|---|---|---|---|
| C-39 | —CH$_3$ | —CH$_3$ | —CH$_3$ | —CH$_3$ | —CH$_3$ | —CH$_3$ | 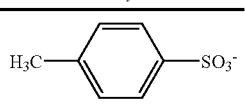 |
| C-40 | —CH$_3$ | —CH$_2$—C$_6$H$_5$ | —CH$_3$ | —CH$_3$ | —CH$_3$ | —CH$_3$ |  |
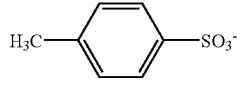
C-41
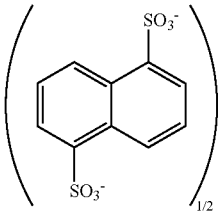
C-42
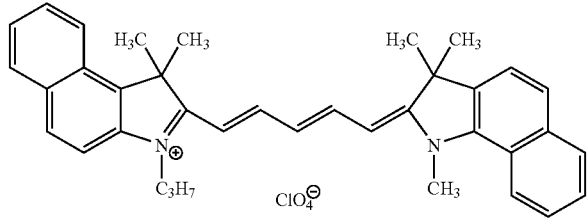
C-43
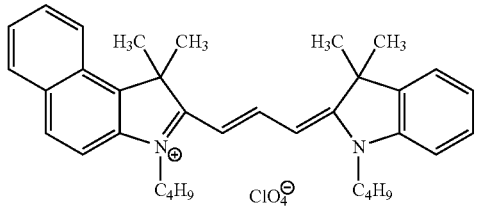
C-44
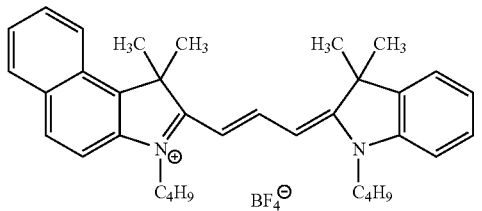

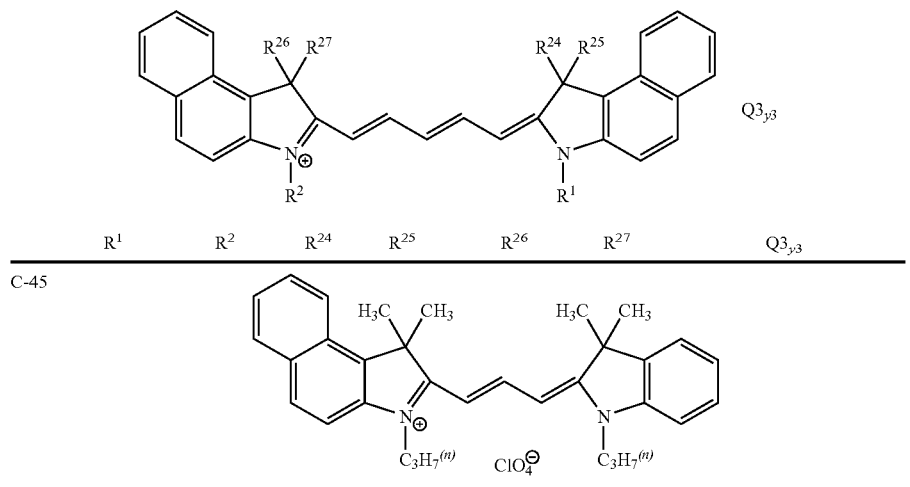

C-45

As to general cyanine dyes, descriptions are given in The Chemistry of Heterocyclic Compound series, Cyanine Dyes and Related Compounds, John Wiley & Sons, New York, London, 1964.

With the cyanine dyes in accordance with the invention (preferably dye compounds shown by the general formula (2')), the coefficient n of complex refractive index (real part: refractive index) at the wavelength of a recording laser light and k (imaginary part: extinction coefficient) are preferably $1.50 \leq 3.0$ and $0.9 \leq k \leq 3.00$, more preferably $1.50 \leq n \leq 2.00$ and $0.90 \leq k \leq 2.00$, most preferably $1.60 \leq n \leq 1.90$ and $1.20 \leq k \leq 1.50$ in view of optical characteristic properties of the amorphous film.

The dye has a thermal decomposition temperature of preferably from 100° C. to 350° C., more preferably from 150° C. to 300° C., still more preferably from 200° C. to 300° C.

The optical information recording medium of the invention is used preferably as a high-speed recording medium permitting 8-fold speed or faster recording, more preferably as a high-speed recording medium permitting 10-fold speed or faster recording, still more preferably as a high-speed recording medium permitting 12-fold speed or faster recording, most preferably as a high-speed recording medium permitting 16-fold speed or faster recording.

The data-transporting speed is preferably 80 Mbps or more, more preferably 110 Mbps or more, still more preferably 130 Mbps or more, most preferably 170 Mbps or more.

The azo dyes to be used in the invention will be described in detail below. The azo dyes are dyes synthesized by reacting an aryl or heteroaryl diazonium salt (diazo component) with a compound (coupler component) capable of undergoing azo coupling reaction with the diazonium salt and having an acidic hydrogen atom. The azo dyes to be used in the invention are preferably dyes of the structure represented by the general formula (2").

The dyes of the structure represented by the general formula (2") or (4") will be described below. The dyes of the structure represented by the general formula (2") are preferably the dyes represented by the general formula (4"). A in the general formula (2") represents a residue of a compound (coupler component) capable of undergoing azo coupling reaction with the diazonium salt to generate a dye and having an acidic hydrogen atom, i.e., a monovalent group 0 derived from the coupler component. A preferably represents a substituted or unsubstituted aryl group, a 5-membered hetero ring group containing a nitrogen atom and 1 to 20 carbon atoms, or a 6-membered hetero ring group containing a nitrogen atom and 2 to 20 carbon atoms. With dyes of the structure represented by the general formula (4"), the ring formed by $A^1$ is preferably an aromatic hydrocarbon ring having a substituent (preferably a benzene ring having a substituent), a 5-membered hetero ring containing a nitrogen atom and 1 to 20 carbon atoms, or a 6-membered hetero ring containing a nitrogen atom and 2 to 20 carbon atoms, with an aromatic hydrocarbon ring having a substituent (preferably a benzene ring having a substituent) being preferred.

Examples of the structure formed by substituent A or $A^1$ are illustrated below.

(IV)

(V)

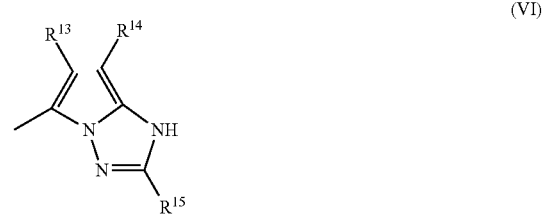

(VI)

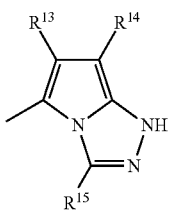 (VII)

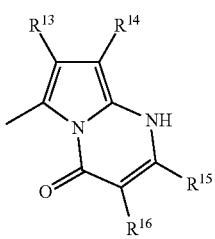 (VIII)

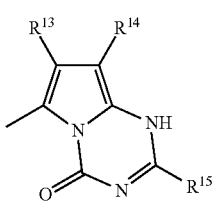 (IX)

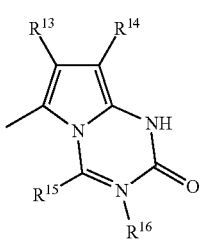 (X)

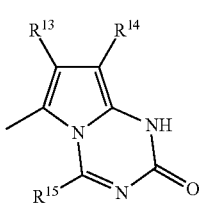 (XI)

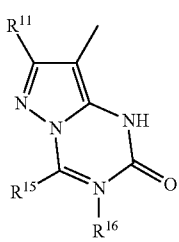 (XII)

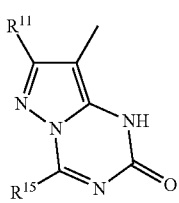 (XIII)

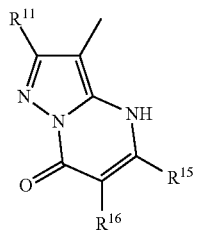 (XIV)

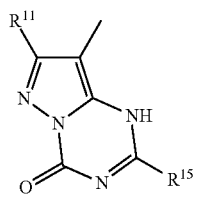 (XV)

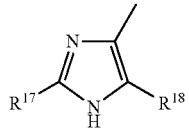 (XVI)

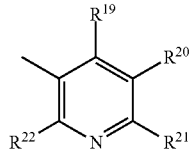 (XVII)

$R^{11}$, $R^{12}$, $R^{13}$, $R^{14}$, $R^{15}$, $R^{16}$, $R^{17}$, $R^{18}$, $R^{19}$ and $R^{20}$ each independently represents a hydrogen atom or a substituent. Examples of such substituent are the same as described in group S in the general formula (1).

Of the above-described ring structures, those which are represented by formulae (IV), (V) and (VI) are preferred.

In the above general formulae, $R^{11}$ and $R^{13}$ each preferably represents a substituted or unsubstituted alkyl group containing from 1 to 20 carbon atoms, a substituted or unsubstituted aryl group containing from 6 to 20 carbon atoms, a cyano group, a substituted or unsubstituted alkoxycarbonyl group containing from 1 to 20 carbon atoms, or a substituted or unsubstituted aminocarbonyl group containing from 2 to 20 carbon atoms. $R^{14}$ preferably represents a cyano group, s substituted or unsubstituted alkoxycarbonyl group containing from 1 to 20 carbon atoms, a substituted or unsubstituted aryloxy group containing from 6 to 20 carbon atoms, or a substituted or unsubstituted aminocarbonyl group containing from 2 to 20 carbon atoms. $R^{15}$ represents a substituted or unsubstituted alkyl group containing from 1 to 20 carbon atoms, an aryl group containing from 6 to 20 carbon atoms, or a substituted or unsubstituted aminocarbonylamino group containing from 1 to 20 carbon atoms.

Particularly preferably, $R^{13}$ represents a cyano group, $R^{14}$ represents an alkoxycarbonyl group containing from 1 to 20 carbon atoms, and $R^{15}$ represents a substituted or unsubstituted alkyl group containing from 1 to 20 carbon atoms, or a substituted or unsubstituted aryl group containing from 6 to 20 carbon atoms.

B represents a monovalent group derived from a diazonium salt, preferably a substituted or unsubstituted aryl group, or a substituted or unsubstituted hetero ring group. That is, B is a diazo component. The diazo component means a partial structure which can be introduced by converting a hetero ring compound or benzene derivative having an amino group as a substituent to a diazo compound (diazonium salt) and conducting diazo coupling reaction with a coupler, and is a concept popularly employed in the field of azo dyes. In other words, the diazo component means a monovalent substituent which is formed by removing the amino group of an amino-substituted hetero ring compound or benzene derivative capable of undergoing the diazo reaction. B is preferably formed by $B^2$. $B^2$ represents atoms forming a substituted or unsubstituted aromatic hydrocarbon ring or a substituted or unsubstituted aromatic hetero ring. As the ring formed by $B^2$, an aromatic hydrocarbon ring having a substituent (preferably a benzene ring having a substituent), a nitrogen atom-containing 5-membered hetero ring containing from 1 to 20 carbon atoms and a nitrogen-containing 6-membered hetero ring containing from 2 to 20 carbon atoms are preferred, with a nitrogen atom-containing 5-membered hetero ring containing from 1 to 20 carbon atoms and a nitrogen-containing 6-membered hetero ring containing from 2 to 20 carbon atoms are preferred being more preferred. A nitrogen atom-containing 5-membered hetero ring containing from 1 to 20 carbon atoms is still more preferred.

As examples of the monovalent hetero ring group represented by A or B, there can be illustrated (AB-1) to (AB-25) shown below.

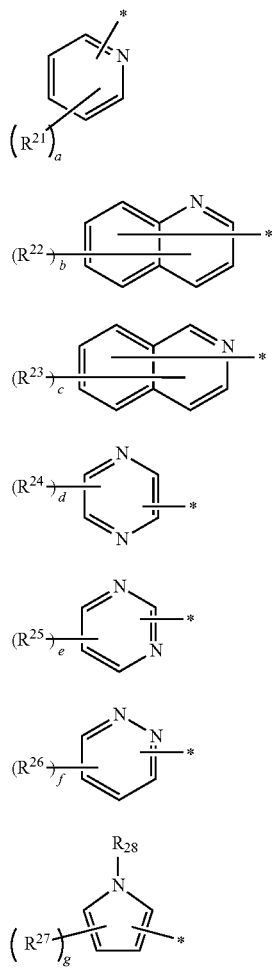
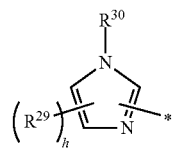
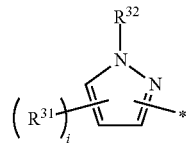
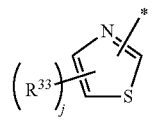
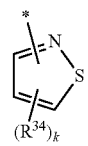
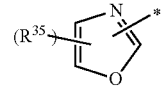
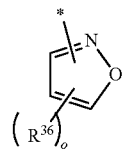
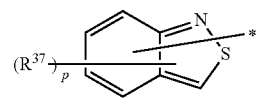
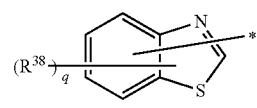
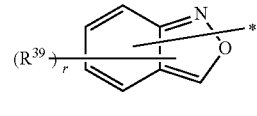
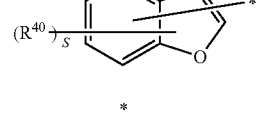
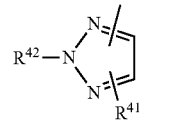
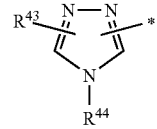

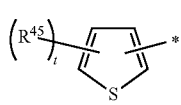 (AB-20)

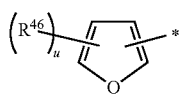 (AB-21)

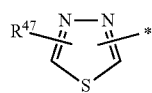 (AB-22)

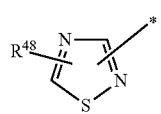 (AB-23)

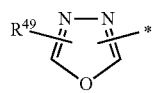 (AB-24)

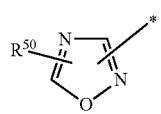 (AB-25)

In the above formulae, $R^{21}$ to $R^{50}$ each independently represents a hydrogen atom or a substituent. Examples of such substituent are the same as described in group S in the general formula (1).

b and c each represents an integer of from 0 to 6.

a, p, q and r each represents an integer of from 0 to 4.

d, e, f, g, t and u each represents an integer of from 0 to 3.

h, I, j, k, l and o each represents an integer of from 0 to 2.

In the case where a to u each represents an integer of 2 or more, two or more $R^{21}$s to $R^{50}$s may be the same or different from each other.

Of the structures represented by B, structures (a)-1, (a)-2, and (b) to (l) are preferred.

(a)-1

<br>

(a)-2

<br>

(b)

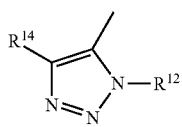 (c)

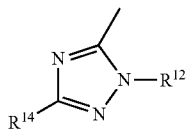 (d)

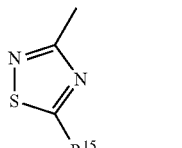 (e)

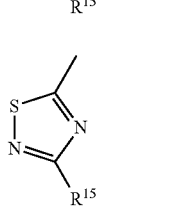 (f)

(g)

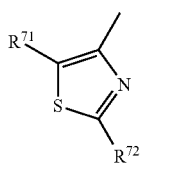 (h)

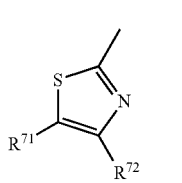 (i)

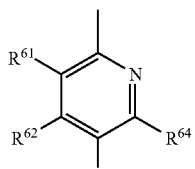 (j)

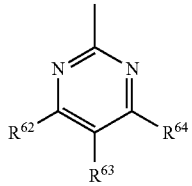 (k)

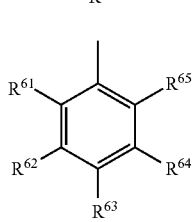

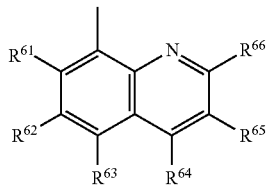
(I)

In the above formulae, $R^{11}, R^{12}, R^{13}, R^{14}, R^{15}, R^{61}$ to $R^{66}$, $R^{71}$ and $R^{72}$ each independently represents a hydrogen atom or a substituent. Examples of such substituent are the same as described in group S in the general formula (1).

G represents a monovalent group capable of coordinating to a metal ion. Examples of G include a hydroxyl group, a carboxyl group, an amino group (including an alkylamino group), an acylamino group, an aminocarbonylamino group, an alkoxycarbonylamino group, an aryloxycarbonylamino group, a sulfamoylamino group, an alkyl- or aryl-sulfonylamino group, a mercapto group, a sulfamoyl group, a sulfo group, an alkyl- or aryl-sulfinyl group, a carbamoyl group, an aryl or hetero ring azo group, a phosphino group and a phosphinyl group. G preferably represents an alkylsulfonylamino group.

As the azo dye compound in accordance with the invention, those wherein the azo dye coordinates to a metal ion to form an azo metal chelate dye are also preferred. In particular, the chelate dyes have a better light resistance, thus being preferred. As a metal to be used for the metal chelate dye, Ni, Cu, Zn, Al, Ti, Fe, B, Cr and Co are preferred, with Ni, Co and Al being more preferred.

In the case where the dye forms the chelate structure and ligands are insufficient with respect to the central metal to form a stable complex, it is also preferred to add other molecule than the dye of the general formula (2″) to form a stable chelate dye. As the ligand to be separately added, compounds containing nitrogen, oxygen or sulfur atom are preferred. Among them, an amine compound (including aniline) and a hetero ring compound containing at least one nitrogen atom are preferred. A 5- or 6-membered amine compound containing from 3 to 20 carbon atoms is the most preferred.

Specific examples of the azo dyes to be used in the invention are shown below which, however, are not to be construed as limiting the invention.

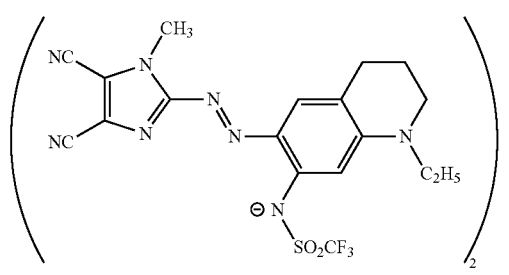
A-1

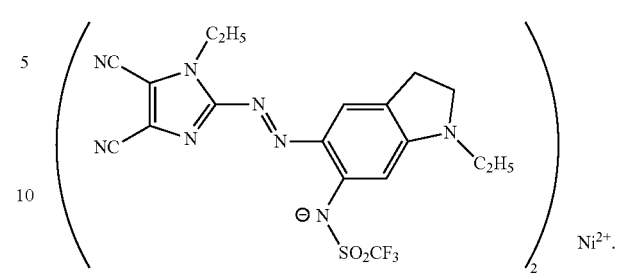
A-2

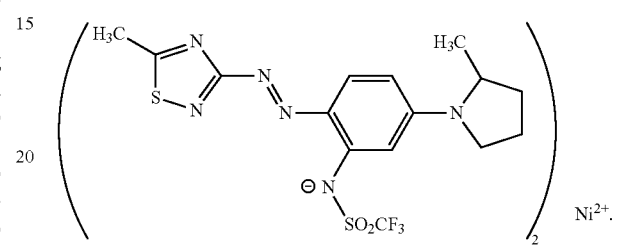
A-3

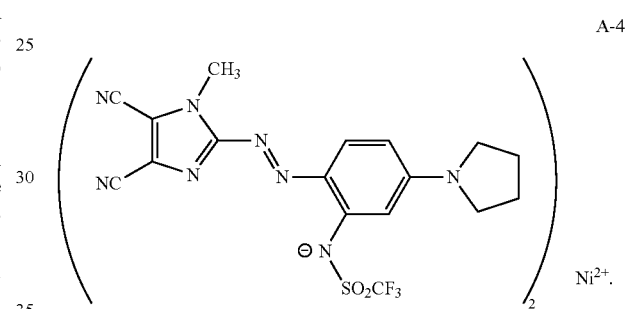
A-4

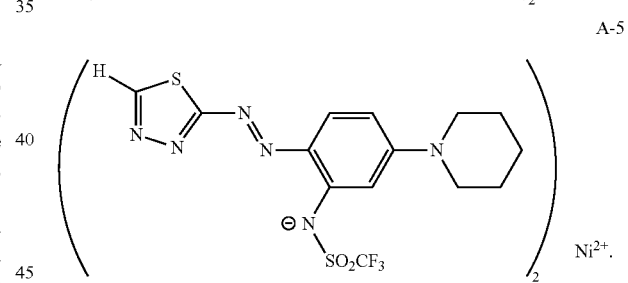
A-5

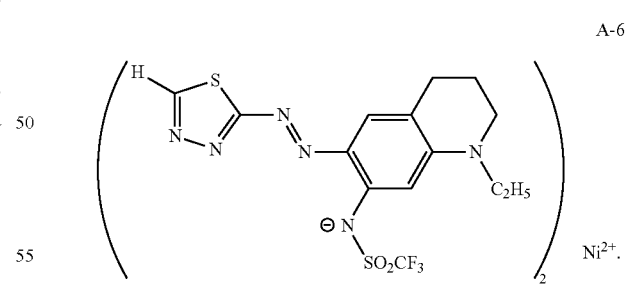
A-6

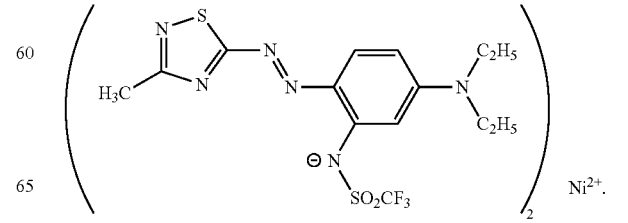
A-7

A-8
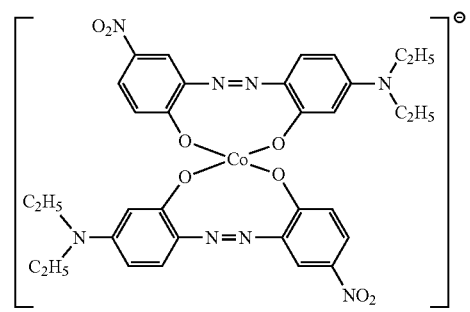
A-9
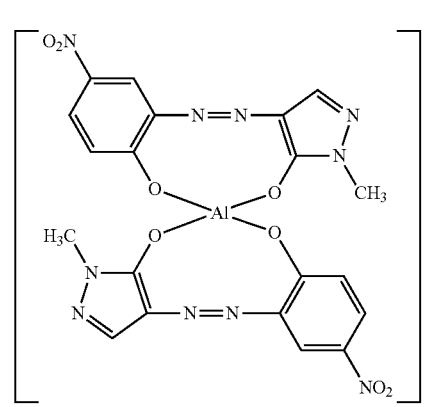
A-10
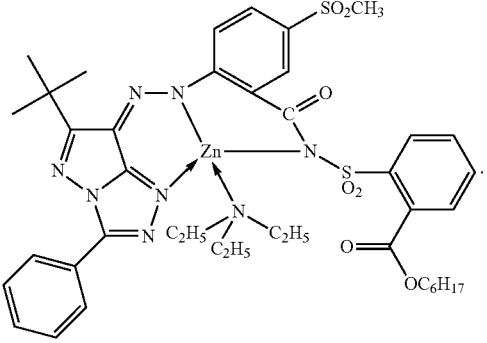
A-11
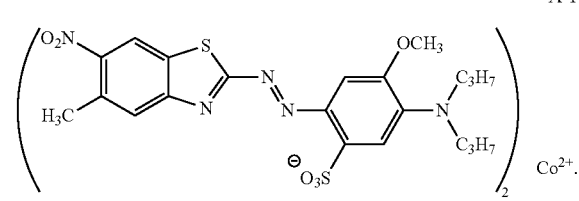
A-12
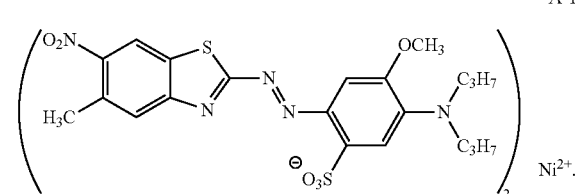
A-13
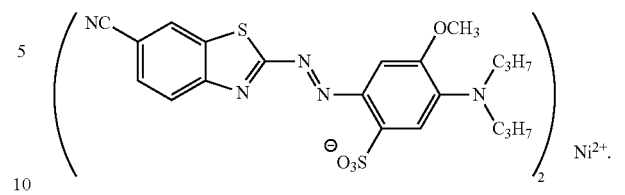
A-14
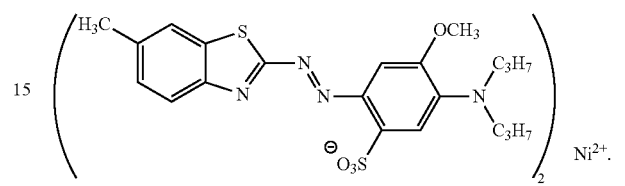
A-15
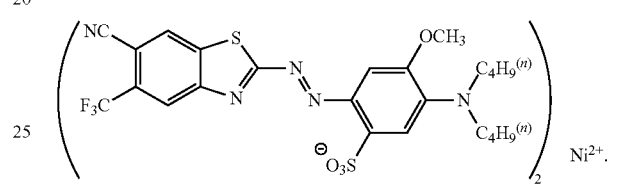
A-16
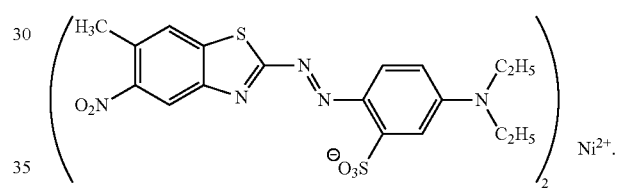
A-17
A-18
A-19
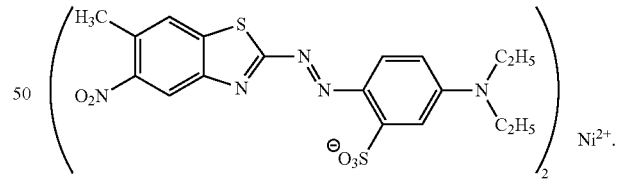

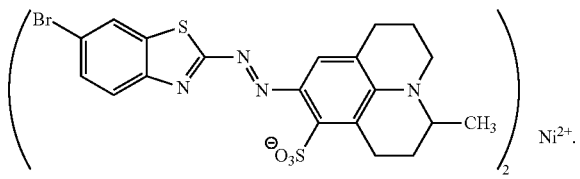

A-20

Processes for synthesizing the azo dyes are described in JP-A-3-268994, JP-A-3-61088, JP-A-7-161069, JP-A-7-251567, JP-A-10-204070, JP-A-11-12483, JP-A-11-166125, JP-A-2001-199169, JP-A-2001-152040 and JP-A-2002-114922.

With the dye compounds in accordance with the invention shown by the general formula (1'), the coefficient n of complex refractive index (real part: refractive index) at the wavelength of a recording laser light and k (imaginary part: extinction coefficient) are preferably $2.0 \leq 3.0$ and $0.00 \leq k \leq 0.20$, more preferably $2.1 \leq n \leq 2.7$ and $0.00 \leq k \leq 0.10$, most preferably $2.15 \leq n \leq 2.50$ and $0.00 \leq k \leq 0.05$ in view of optical characteristic properties of the amorphous film.

The azo dye compound in accordance with the invention has a thermal decomposition temperature of preferably from 100° C. to 350° C., more preferably from 150° C. to 300° C., still more preferably from 200° C. to 300° C.

The phthalocyanine dyes will be described below.

Phthalocyanine dyes represented by the general formula (5) are preferred.

In the general formula (5), $R^{\alpha 1}$ to $R^{\alpha 8}$ and $R^{\beta 1}$ to $R^{\beta 8}$ each independently represents a hydrogen atom, a halogen atom, a cyano group, a nitro group, a formyl group, a carboxyl group, a sulfo group, an alkyl group containing from 1 to 20 carbon atoms, an aryl group containing from 6 to 14 carbon atoms, an aralkyl group containing from 7 to 15 carbon atoms, a hetero ring group containing from 1 to 10 carbon atoms, an alkoxy group containing from 1 to 20 carbon atoms, an aryloxy group containing from 6 to 14 carbon atoms, an acyl group containing from 2 to 21 carbon atoms, an alkylsulfonyl group containing from 1 to 20 carbon atoms, an arylsulfonyl group containing from 6 to 20 carbon atoms, a carbamoyl group containing from 1 to 25 carbon atoms, a sulfamoyl group containing from 0 to 32 carbon atoms, an alkoxycarbonyl group containing from 2 to 21 carbon atoms, an aryloxycarbonyl group containing from 7 to 15 carbon atoms, an acylamino group containing from 2 to 21 carbon atoms, a sulfonylamino group containing from 1 to 20 carbon atoms or an amino group containing from 0 to 36 carbon atoms, M represents two hydrogen atoms, a metal, a metal oxide or a metal having a ligand.

In the general formula (5), it is preferred that all of $R^{\alpha 1}$ to $R^{\alpha 8}$ do not represent a hydrogen atom at the same time. It is more preferred that either of $R^{\alpha 1}$ and $R^{\alpha 2}$, either of $R^{\alpha 3}$ and $R^{\alpha 4}$, either of $R^{\alpha 5}$ and $R^{\alpha 6}$ and either of $R^{\alpha 7}$ and $R^{\alpha 8}$, totally 4 substituents, do not represent a hydrogen atom at the same time. In this case, it is particularly preferred that all of $R^{\beta 1}$ to $R^{\beta 8}$ represent a hydrogen atom at the same time.

In the general formula (5), preferred examples of $R^{\alpha 1}$ to $R^{\alpha 8}$ and $R^{\beta 1}$ to $R^{\beta 8}$ include a hydrogen atom, a halogen atom, a carboxyl group, a sulfo group, an alkyl group containing from 1 to 16 carbon atoms, an aryl group containing from 6 to 10 carbon atoms, an alkoxy group containing from 1 to 16 carbon atoms, an aryloxy group containing from 6 to 10 carbon atoms, an alkylsulfonyl group containing from 1 to 16 carbon atoms, an arylsulfonyl group containing from 6 to 16 carbon atoms, a sulfamoyl group containing from 2 to 20 carbon atoms, an alkoxycarbonyl group containing from 2 to 17 carbon atoms, an aryloxycarbonyl group containing from 7 to 11 carbon atoms, an acylamino group containing from 2 to 18 carbon atoms and a sulfonylamino group containing from 1 to 18 carbon atoms. More preferred examples thereof include a hydrogen atom, a halogen atom, a carboxyl group, a sulfo group, an alkoxy group containing from 1 to 16 carbon atoms, an aryloxy group containing from 6 to 10 carbon atoms, an alkylsulfonyl group containing from 1 to 14 carbon atoms, an arylsulfonyl group containing from 6 to 14 carbon atoms, a sulfamoyl group containing from 2 to 16 carbon atoms, an alkoxycarbonyl group containing from 2 to 13 carbon atoms, an acylamino group containing from 2 to 14 carbon atoms and a sulfonylamino group containing from 1 to 14 carbon atoms. Still more preferably, $R^{\alpha 1}$ to $R^{\alpha 8}$ each represents a hydrogen atom, a halogen atom, a sulfo group, an alkoxy group containing from 8 to 16 carbon atoms, a sulfonyl group containing from 1 to 12 carbon atoms, a sulfamoyl group containing from 1 to 12 carbon atoms, an acylamino group containing from 2 to 12 carbon atoms or a sulfonylamino group containing from 1 to 12 carbon atoms, and $R^{\beta 1}$ to $R^{\beta 8}$ each represents a hydrogen atom or a halogen atom. Particularly preferably, at least one of $R^{\alpha 1}$ to $R^{\alpha 8}$ represents a sulfo group, a sulfonyl group containing from 1 to 10 carbon atoms or a sulfamoyl group containing from 1 to 10 carbon atoms, and $R^{\beta 1}$ to $R^{\beta 8}$ represent a hydrogen atom.

In the general formula (5), $R^{\alpha 1}$ to $R^{\alpha 8}$ and $R^{\beta 1}$ to $R^{\beta 8}$ may further have a substituent, and examples of such substituent are the following: a chain or cyclic alkyl group containing from 1 to 20 carbon atoms (e.g., a methyl group, an ethyl group, an isopropyl group or a cyclohexyl group), an aryl group containing from 6 to 18 carbon atoms (e.g., a phenyl group, a chlorophenyl group, a 2,4-di-t-amylphenyl group or a 1-naphthyl group), an aralkyl group containing from 7 to 18 carbon atoms (e.g., a benzyl group or an anisyl group), an alkenyl group containing from 2 to 20 carbon atoms (e.g., a vinyl group or a 2-methylvinyl group), an alkynyl group containing from 2 to 20 carbon atoms (e.g., an ethynyl group, a 2-methylethynyl group or a 2-phenylethynyl group), a halogen atom (e.g., F, Cl Br or I), a cyano group, a hydroxyl group, a carboxyl group, an acyl group containing from 2 to 20 carbon atoms (e.g., an acetyl group, a benzoyl group, a salicyloyl group or a pivaloyl group), an alkoxy group containing from 1 to 20 carbon atoms (e.g., a methoxy group, a butoxy group or a cyclohexyloxy group), an aryloxy group containing from 6 to 20 carbon atoms (e.g., a phenoxy group, a 1-naphthoxy group or a toluoyl group), an alkylthio group containing from 1 to 20 carbon atoms (e.g., a methylthio group, a butylthio group, a benzylthio group or a 3-methoxypropylthio group), an arylthio group containing from 6 to 20 carbon atoms (e.g., a phenylthio group or a 4-chlorophenylthio group), an alkylsulfonyl group containing from 1 to 20 carbon atoms (e.g., a methanesulfonyl group or a butanesulfonyl group), an arylsulfonyl group containing from 6 to 20 carbon atoms (e.g., a benzenesulfonyl group or a p-toluenesulfonyl group), a carbamoyl group containing from 1 to 17 carbon atoms (e.g., an unsubstituted carbamoyl group, a methylcarbamoyl group, an ethylcarbamoyl group, a n-butylcarbamoyl group or a dimethylcarbamoyl group), an amido group containing from 1 to 16 carbon atoms (e.g., an acetamido group or a benzamido group), an acyloxy group containing from 2 to 10 carbon atoms (e.g., an acetoxy group or a benzoyloxy group), an alkoxycarbonyl group containing from 2 to 10 carbon atoms (e.g., a methoxycarbonyl group or an ethoxycarbonyl group), and a 5- or 6-membered hetero ring group (e.g., an aromatic hetero ring group such as a pyridyl group, a thienyl group, a furyl group, a thiazolyl group, an imidazolyl group or a pyrazolyl group; a hetero ring group such as a pyrrolidine ring group, a piperidine ring group, a morpholine ring group, a pyran ring group, a thiopyran ring group, a dioxane ring group or a dithiolane ring group).

In the general formula (5), preferred examples of the substituent for $R^{\alpha 1}$ to $R^{\alpha 8}$ and $R^{\beta 1}$ to $R^{\beta 8}$ include a chain or cyclic alkyl group containing from 1 to 16 carbon atoms, an aryl group containing from 6 to 14 carbon atoms, an aralkyl group containing from 7 to 15 carbon atoms, an alkoxy group containing from 1 to 16 carbon atoms, an aryloxy group containing from 6 to 14 carbon atoms, a halogen atom, an alkoxycarbonyl group containing from 2 to 17 carbon atoms, a carbamoyl group containing from 1 to 10 carbon atoms and an amido group containing from 1 to 10 carbon atoms. Of these, more preferred examples thereof include a chain or cyclic alkyl group containing from 1 to 10 carbon atoms, an aralkyl group containing from 7 to 13 carbon atoms, an aryl group containing from 6 to 10 carbon atoms, an alkoxy group containing from 1 to 10 carbon atoms, an aryloxy group containing from 6 to 10 carbon atoms, an alkoxycarbonyl group containing from 2 to 11 carbon atoms, a carbamoyl group containing from 1 to 7 carbon atoms, and an amido group containing from 1 to 8 carbon atoms. Particularly preferred examples thereof include a chain or cyclic alkyl group containing from 1 to 8 carbon atoms, an aralkyl group containing from 7 to 11 carbon atoms, an alkoxy group containing from 1 to 8 carbon atoms, an alkoxycarbonyl group containing from 3 to 9 carbon atoms, a phenyl group and a chlorine atom. Still more preferred and excellent examples thereof include an alkoxy group containing from 1 to 6 carbon atoms.

In the general formula (5), M preferably represents a metal. Particularly, zinc, magnesium, copper, nickel or palladium is preferred, with copper or nickel being more preferred. Copper is particularly preferred.

Specific examples of the phthalocyanine dyes are shown below.

TABLE 1

| No. | Position and Name of substituent | M |
|---|---|---|
| (I-1) | $R^{\alpha 1}/R^{\alpha 2}$, $R^{\alpha 3}/R^{\alpha 4}$, $R^{\alpha 5}/R^{\alpha 6}$, $R^{\alpha 7}/R^{\alpha 8}$ —SO$_2$N(C$_5$H$_{11}$-i)$_2$ | Cu |
| (I-2) | $R^{\alpha 1}/R^{\alpha 2}$, $R^{\alpha 3}/R^{\alpha 4}$, $R^{\alpha 5}/R^{\alpha 6}$, $R^{\alpha 7}/R^{\alpha 8}$ —SO$_2$NH(2-s-butoxy-5-t-amylphenyl) | Cu |
| (I-3) | $R^{\alpha 1}/R^{\alpha 2}$, $R^{\alpha 3}/R^{\alpha 4}$, $R^{\alpha 5}/R^{\alpha 6}$ —SO$_2$NH(CH$_2$)$_3$O(2,4-di-t-amylphenyl) $R^{\alpha 7}/R^{\alpha 8}$ —SO$_3$H | Cu |
| (I-4) | $R^{\alpha 1}/R^{\alpha 2}$, $R^{\alpha 3}/R^{\alpha 4}$, $R^{\alpha 5}/R^{\alpha 6}$, $R^{\alpha 7}/R^{\alpha 8}$ —SO$_2$N(3-methoxypropyl)$_2$ | Ni |
| (I-5) | $R^{\alpha 1}/R^{\alpha 2}$, $R^{\alpha 3}/R^{\alpha 4}$, $R^{\alpha 5}/R^{\alpha 6}$, $R^{\alpha 7}/R^{\alpha 8}$ —SO$_2$NMe(cyclohexyl) | Ni |
| (I-6) | $R^{\alpha 1}/R^{\alpha 2}$, $R^{\alpha 3}/R^{\alpha 4}$, $R^{\alpha 5}/R^{\alpha 6}$, $R^{\alpha 7}/R^{\alpha 8}$ —SO$_2$N(3-i-propoxyphenyl)$_2$ | Ni |
| (I-7) | $R^{\alpha 1}/R^{\alpha 2}$, $R^{\alpha 3}/R^{\alpha 4}$, $R^{\alpha 5}/R^{\alpha 6}$, $R^{\alpha 7}/R^{\alpha 8}$ —SO$_2$NH(2-i-amyloxycarbonylphenyl) | Pd |
| (I-8) | $R^{\alpha 1}/R^{\alpha 2}$, $R^{\alpha 3}/R^{\alpha 4}$, $R^{\alpha 5}/R^{\alpha 6}$, $R^{\alpha 7}/R^{\alpha 8}$ —SO$_2$NH(2,4,6-trimethylphenyl) | Pd |
| (I-9) | $R^{\alpha 1}/R^{\alpha 2}$, $R^{\alpha 3}/R^{\alpha 4}$, $R^{\alpha 5}/R^{\alpha 6}$, $R^{\alpha 7}/R^{\alpha 8}$ —SO$_2$(4-morpholino) | Co |
| (I-10) | $R^{\alpha 1}/R^{\alpha 2}$, $R^{\alpha 3}/R^{\alpha 4}$, $R^{\alpha 5}/R^{\alpha 6}$, $R^{\alpha 7}/R^{\alpha 8}$ —SO$_2$N(C$_2$H$_5$)(4-fluorophenyl) | Fe |
| (I-11) | $R^{\alpha 1}/R^{\alpha 2}$, $R^{\alpha 3}/R^{\alpha 4}$, $R^{\alpha 5}/R^{\alpha 6}$ —SO$_2$NH(CH$_2$)$_3$N(C$_2$H$_5$)$_2$ | Cu |
| (I-12) | $R^{\alpha 1}/R^{\alpha 2}$, $R^{\alpha 3}/R^{\alpha 4}$, $R^{\alpha 5}/R^{\alpha 6}$, $R^{\alpha 7}/R^{\alpha 8}$ —SO$_2$(2-n-propoxyphenyl) | Cu |

TABLE 1-continued

| No. | Position and Name of substituent | M |
|---|---|---|
| (I-13) | $R^{\alpha 1}/R^{\alpha 2}$, $R^{\alpha 3}/R^{\alpha 4}$, $R^{\alpha 5}/R^{\alpha 6}$, $R^{\alpha 7}/R^{\alpha 8}$ —SO$_2$(2-n-butoxy-5-t-butylphenyl) | Ni |
| (I-14) | $R^{\alpha 1}/R^{\alpha 2}$, $R^{\alpha 3}/R^{\alpha 4}$, $R^{\alpha 5}/R^{\alpha 6}$, $R^{\alpha 7}/R^{\alpha 8}$ —SO$_2$(2-methoxycarbonylphenyl) | Co |

TABLE 2

| No. | Position and Name of substituent | M |
|---|---|---|
| (I-15) | $R^{\alpha 1}/R^{\alpha 2}$, $R^{\alpha 3}/R^{\alpha 4}$, $R^{\alpha 5}/R^{\alpha 6}$, $R^{\alpha 7}/R^{\alpha 8}$ —SO$_2$(CH$_2$)$_4$O(2-chloro-4-t-amylphenyl) | Cu |
| (I-16) | $R^{\alpha 1}/R^{\alpha 2}$, $R^{\alpha 3}/R^{\alpha 4}$, $R^{\alpha 5}/R^{\alpha 6}$, $R^{\alpha 7}/R^{\alpha 8}$ —SO$_2$(CH$_2$)$_2$CO$_2$C$_4$H$_9$-i | Pd |
| (I-17) | $R^{\alpha 1}/R^{\alpha 2}$, $R^{\alpha 3}/R^{\alpha 4}$, $R^{\alpha 5}/R^{\alpha 6}$ —SO$_2$(cyclohexyl) | Cu |
| (I-18) | $R^{\alpha 1}/R^{\alpha 2}$, $R^{\alpha 3}/R^{\alpha 4}$, $R^{\alpha 5}/R^{\alpha 6}$, $R^{\alpha 7}/R^{\alpha 8}$ —SO$_2${4-(2-s-butoxybenzoylamino)phenyl} | Ni |
| (I-19) | $R^{\alpha 1}/R^{\alpha 2}$, $R^{\alpha 3}/R^{\alpha 4}$, $R^{\alpha 5}/R^{\alpha 6}$ —SO$_2$(2,6-dichloro-4-methoxyphenyl) | Pd |
| (I-20) | $R^{\alpha 1}/R^{\alpha 2}$, $R^{\alpha 3}/R^{\alpha 4}$, $R^{\alpha 5}/R^{\alpha 6}$ —SO$_2$CH(Me)CO$_2$CH$_2$CH(C$_2$H$_5$)C$_4$H$_9$-n | Mg |
| (I-21) | $R^{\alpha 1}/R^{\alpha 2}$, $R^{\alpha 3}/R^{\alpha 4}$, $R^{\alpha 5}/R^{\alpha 6}$, $R^{\alpha 7}/R^{\alpha 8}$ —SO$_2${2-(2-ethoxyethoxy)-phenyl} $R^{\beta 1}/R^{\beta 2}$, $R^{\beta 3}/R^{\beta 4}$, $R^{\beta 5}/R^{\beta 6}$, $R^{\beta 7}/R^{\beta 8}$ —C$_2$H$_5$ | Zn |
| (I-22) | $R^{\alpha 1}/R^{\alpha 2}$, $R^{\alpha 3}/R^{\alpha 4}$, $R^{\alpha 5}/R^{\alpha 6}$, $R^{\alpha 7}/R^{\alpha 8}$ —SO$_2$N(CH$_2$CH$_2$OMe)$_2$ | Cu |
| (I-23) | $R^{\alpha 1}/R^{\alpha 2}$, $R^{\alpha 3}/R^{\alpha 4}$, $R^{\alpha 5}/R^{\alpha 6}$, $R^{\alpha 7}/R^{\alpha 8}$ —OCH$_2$CH(C$_2$H$_5$)C$_4$H$_9$-n | Ni |
| (I-24) | $R^{\alpha 1}/R^{\alpha 2}$, $R^{\alpha 3}/R^{\alpha 4}$, $R^{\alpha 5}/R^{\alpha 6}$, $R^{\alpha 7}/R^{\alpha 8}$ —OCHMe(phenyl) | Zn |
| (I-25) | $R^{\alpha 1}/R^{\alpha 2}$, $R^{\alpha 3}/R^{\alpha 4}$, $R^{\alpha 5}/R^{\alpha 6}$, $R^{\alpha 7}/R^{\alpha 8}$ —OCH$_2$(s-butyl) | Cu |
| (I-26) | $R^{\alpha 1}/R^{\alpha 2}$, $R^{\alpha 3}/R^{\alpha 4}$, $R^{\alpha 5}/R^{\alpha 6}$, $R^{\alpha 7}/R^{\alpha 8}$ —OCH$_2$CH$_2$OC$_3$H$_7$-i | SiCl$_2$ |
| (I-27) | $R^{\alpha 1}/R^{\alpha 2}$, $R^{\alpha 3}/R^{\alpha 4}$, $R^{\alpha 5}/R^{\alpha 6}$, $R^{\alpha 7}/R^{\alpha 8}$-t-amyl $R^{\beta 1}/R^{\beta 2}$, $R^{\beta 3}/R^{\beta 4}$, $R^{\beta 5}/R^{\beta 6}$, $R^{\beta 7}/R^{\beta 8}$ —Cl | Ni |

TABLE 3

| No. | Position and Name of substituent | M |
|---|---|---|
| (I-28) | $R^{\alpha 1}/R^{\alpha 2}$, $R^{\alpha 3}/R^{\alpha 4}$, $R^{\alpha 5}/R^{\alpha 6}$, $R^{\alpha 7}/R^{\alpha 8}$-(2,6-di-ethoxyphenyl) | Zn |
| (I-29) | $R^{\alpha 1}/R^{\alpha 2}$, $R^{\alpha 3}/R^{\alpha 4}$, $R^{\alpha 5}/R^{\alpha 6}$ —SO$_2$NHCH$_2$CH$_2$OC$_3$H$_7$-i $R^{\alpha 7}/R^{\alpha 8}$ —SO$_3$H | Cu |
| (I-30) | $R^{\alpha 1}/R^{\alpha 2}$, $R^{\alpha 3}/R^{\alpha 4}$, $R^{\alpha 5}/R^{\alpha 6}$ —CO$_2$CH$_2$CH$_2$OC$_2$H$_5$ $R^{\alpha 7}/R^{\alpha 8}$ —CO$_2$H | Cu |
| (I-31) | $R^{\alpha 1}/R^{\alpha 2}$, $R^{\alpha 3}/R^{\alpha 4}$, $R^{\alpha 5}/R^{\alpha 6}$, $R^{\alpha 7}/R^{\alpha 8}$ —CO$_2$CH(Me)CO$_2$C$_3$H$_7$-i | Co |
| (I-32) | $R^{\alpha 1}/R^{\alpha 2}$, $R^{\alpha 3}/R^{\alpha 4}$, $R^{\alpha 5}/R^{\alpha 6}$, $R^{\alpha 7}/R^{\alpha 8}$ —CONHCH$_2$CH$_2$OC$_3$H$_7$-i | Cu |
| (I-33) | $R^{\alpha 1}/R^{\alpha 2}$, $R^{\alpha 3}/R^{\alpha 4}$, $R^{\alpha 5}/R^{\alpha 6}$ —CON(CH$_2$CH$_2$OC$_4$H$_9$-n)$_2$ $R^{\alpha 7}/R^{\alpha 8}$ —CO$_2$H | Pd |
| (I-34) | $R^{\alpha 1}/R^{\alpha 2}$, $R^{\alpha 3}/R^{\alpha 4}$, $R^{\alpha 5}/R^{\alpha 6}$, $R^{\alpha 7}/R^{\alpha 8}$ —NHCOCH(C$_2$H$_5$)C$_4$H$_9$-n | Co |
| (I-35) | $R^{\alpha 1}/R^{\alpha 2}$, $R^{\alpha 3}/R^{\alpha 4}$, $R^{\alpha 5}/R^{\alpha 6}$, $R^{\alpha 7}/R^{\alpha 8}$ —NHCO(2-n-butoxycarbonylphenyl) | Mg |
| (I-36) | $R^{\alpha 1}/R^{\alpha 2}$, $R^{\alpha 3}/R^{\alpha 4}$, $R^{\alpha 5}/R^{\alpha 6}$, $R^{\alpha 7}/R^{\alpha 8}$ —NHSO$_2$(2-i-propoxyphenyl) | Pd |
| (I-37) | $R^{\alpha 1}/R^{\alpha 2}$, $R^{\alpha 3}/R^{\alpha 4}$, $R^{\alpha 5}/R^{\alpha 6}$, $R^{\alpha 7}/R^{\alpha 8}$ —NHSO$_2$(2-n-butoxy-5-t-amylphenyl) | Zn |

TABLE 4

| No. | Position and Name of substituent | M |
|---|---|---|
| (I-38) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$ —$SO_2CH_3$ | Ni |
| (I-39) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$ —$SO_2CH(CH_3)_2$ | Cu |
| (I-40) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$ —$SO_2C_4H_9$-s | Cu |
| (I-41) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$ —$SO_2CH_2CO_2CH(CH_3)_2$ | Zn |
| (I-42) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$ —$SO_2CH(CH_3)CO_2CH_3$ | Cu |
| (I-43) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$ —$SO_2C_6H_5$ | Cu |
| (I-44) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$ —$SO_2N(C_5H_{11}$-i$)_2$ | Cu |
| (I-45) | $R^{\alpha 1}/R^{\alpha 2}, R^{\alpha 3}/R^{\alpha 4}, R^{\alpha 5}/R^{\alpha 6}, R^{\alpha 7}/R^{\alpha 8}$ —$SO_2CH(CH_3)_2$ | Cu |

The phthalocyanine derivatives to be used in the invention can be synthesized according to the processes described or cited in, e.g., Shirai & Kobayashi, Phthalocyanine-Kagaku to Kino, published by K.K. IPC, pp. 1 to 62, and C. C. Leznoff & A. B. P. Lever, Phthalocyanines-Properties and Applications, published by VCH, pp. 1 to 54, and processes analogous to them.

The pyrromethene dyes will be described below.

The pyrromethene dyes are preferably pyrromethene metal chelate compounds represented by the general formula (P).

(P)

In the above formula, A represents a chelate ring formed by a pyrromethene compound represented by the general formula (Pa) and a metal M, and B represents a chelate ring containing nitrogen atom, oxygen atom and/or sulfur atom and formed together with M. A and B may be the same or different from each other.

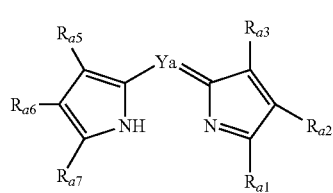

(Pa)

In the formula, Ya represents N or $CR_{a3}$. $R_{a1}$, $R_{a2}$, $R_{a3}$, $R_{a4}$, $R_{a5}$, $R_{a6}$ and $R_{a7}$ each represents a hydrogen atom or a substituent, $R_{a1}$ and $R_{a2}$, $R_{a2}$ and $R_{a3}$, $R_{a5}$ and $R_{a6}$, or $R_{a6}$ and $R_{a7}$ may be connected to each other to form an aromatic ring or a hetero ring which may have a substituent or may further be condensed with an aromatic ring or a hetero ring.

In formula (a), $R_{a1}$, $R_{a2}$, $R_{a3}$, $R_{a4}$, $R_{a5}$, $R^{a6}$ and $R_{a7}$ each independently represents a hydrogen atom or a substituent, preferably a halogen atom, a nitro group, a cyano group, a hydroxyl group, a carboxyl group, a sulfonic acid group, an alkyl group containing from 1 to 20 carbon atoms, an aryl group, a hetero aryl group, an alkenyl group containing from 2 to 20 carbon atoms, an aralkyl group, an alkoxy group, a hydroxyalkoxy group, an alkoxyalkoxy group, an alkylthioalkoxy group, an aryloxy group, a hetero aryloxy group, an alkylaminoalkoxy group, a dialkylaminoalkoxy group, an alkenyloxy group containing from 2 to 20 carbon atoms, an alkylthio group, an alkylthioalkyl group, an arylthio group, a hetero arylthio group, an alkylsulfonyl group, an arylsulfonyl group, a hetero arylsulfonyl group, an alkylsulfonylalkyl group, an amino group, an alkylamino group, a dialkylamino group, a hydroxyalkylamino group, a di(hydroxyalkyl)amino group, an alkoxyalkylamino group, a di(alkoxyalkyl)amino group, an arylamino group, a diarylamino group, a hetero arylamino group, a dihetero arylamino group, an alkylcarbonylamino group, an arylcarbonylamino group, a halogenoalkyl group, an aminoalkyl group, an alkylaminoalkyl group, a dialkylaminoalkyl group, a dhydroxyalkylaminoalkyl group, a di(hydroxyalkyl)aminoalkyl group, an alkoxyalkylaminoalkyl group, a di(alkoxyalkyl)aminoalkyl group, a hydroxyalkyl group, an alkoxyalkyl group, an alkylcarbonylalkyl group, an arylcarbonylalkyl group, an aminocarbonyl group, an alkylaminocarbonyl group, a dialkylaminocarbonyl group, a hydroxyalkylaminocarbonyl group, a di(hydroxyalkyl)aminocarbonyl group, an alkoxyalkylaminocarbonyl group, a di(alkoxyalkyl)aminocarbonyl group, an arylaminocarbonyl group, an acyl group, an alkoxycarbonyl group, an aryloxycarbonyl group, an alkenyloxycarbonyl group containing from 2 to 20 carbon atoms, an alkoxycarbonylalkoxycarbonyl group, an alkylcarbonylalkoxycarbonyl group or an aralkyloxycarbonyl group. Also, $R_{a1}$ and $R_{a2}$, $R_{a2}$ and $R_{a3}$, $R_{a5}$ and $R_{a6}$, or $R_{a6}$ and $R_{a7}$ may be connected to each other to form an aromatic ring or a hetero ring which may have a substituent.

As the pyrromethene dyes, those pyrromethene dyes are used which are described in JP-A-10-226172, JP-A-10-162430, JP-A-10-287819, JP-A-11-43491, JP-A-11-92479, JP-A-11-92682, JP-A-11-165465, JP-A-11-227332, JP-A-11-227333, JP-A-11-255774, JP-A-11-256056, JP-A-11-256057, JP-A-11-302551, JP-A-11-302253, JP-A-2000-48406, JP-A-2000-260064, JP-A-2002-212456, JP-A-2002-154271, JP-A-2002-155076, JP-A-2002-211136, JP-A-2002-363437, JP-A-2003-64274, JP-A-2003-73574, JP-A-2003-140300, JP-A-2003-182219, JP-A-2003-286415, JP-A-2003-266947, JP-A-2003-204-66459, JP-A-2004-114394, JP-A-2004-122585 and WO03/0825939A. As to specific examples and synthesizing processes, those which are described in these patent documents can be employed.

The information recording medium of the invention is not particularly limited as long as it contains the dye as an image recording layer (preferably a recording layer as well). However, in the case of applying the optical information recording medium of the invention to CD-R, it is preferred for the medium to have a constitution comprising a transparent disk-shaped substrate of 1.2±0.2 mm in thickness in which pre-grooves of 1.4 to 1.8 μm in tracking pitch are formed, having provided thereon a recording layer containing the aforesaid dye, a light reflection layer, a protective layer, an adhesive layer, a reflection layer, an image recording layer containing the aforesaid dye and a dummy substrate in this order. Also, in the case of applying to DVD-R, the information recording medium is preferably in the following two embodiments.

(1) An optical information recording medium of 1.2±0.2 mm in thickness wherein two laminates each comprising a transparent disk-shaped substrate of 0.6±0.1 mm in thickness in which pre-grooves of 0.6 to 0.9 μm in tracking pitch are formed, having provided thereon a recording layer containing the aforesaid dye and a light reflection layer are adhered to each other with each recording layer disposed at the inside, and wherein an image recording layer is formed on at least either of the substrates.

(2) An optical information recording medium of 1.2±0.2 mm in thickness wherein a laminate comprising a transparent disk-shaped substrate of 0.6±0.1 mm in thickness in which pre-grooves of 0.6 to 0.9 μm in tracking pitch are formed, having provided thereon a recording layer containing the aforesaid dye and a light reflection layer is adhered to a transparent disk-shaped protective substrate of the same shape as the disk with the recording layer disposed at the inside, and wherein an image recording layer is formed on at least either of the substrates. Additionally, in the DVD-R type optical information recording medium, a protective layer may further bed provided on the light reflection layer.

The visible image recorded on the image recording layer means an image which can visually be recognized, and includes all visually recognizable information such as letters (a row of letters), picture patterns and figures. The letter information includes authorized user-designating information, usable period-designating information, information of designating number of usable times, rental information, resolving power-designating information, layer-designating information, user-designating information, information on copyright holder, information on copyright number, information on manufacturer, information on manufacturing date, information on sales date, information on sales shop or salesclerk, information on used set number, area-designating information, language-designating information, use-designating information, information on product user and information on using number.

The image recording layer can be formed by dissolving the dye in a solvent to prepare a coating solution, and coating the resulting coating solution. As the solvent, the same solvent as that to be used for preparing a coating solution for forming a recording layer which is described hereinafter can be used. As to other additives and coating method, the same ones can be employed as are employed for the recording layer to be described hereinafter.

The thickness of the image recording layer is preferably from 0.01 to 200 μm, more preferably from 0.05 to 100 μm, still more preferably from 0.1 to 50 μm.

The thickness ratio of image recording layer/recording layer is preferably from 1/100 to 100/1, more preferably from 1/10 to 10/1.

[Recording Layer]

The recording layer is a layer in which code information such as digital information is recorded and is not particularly limited, including a dye type layer, a write-once type layer, a phase-change type layer and an optomagnetic type layer. Of these, a dye type layer is preferred.

Specific examples of the dye contained in the dye type recording layer include cyanine dyes, oxonol dyes, metal complex series dyes, azo dyes and phthalocyanine dyes.

Also, those dyes can preferably be used which are described in JP-A-4-74690, JP-A-8-127174, JP-A-11-53758, JP-A-11-334204, JP-A-11-334205, JP-A-11-334206, JP-A-11-334207, JP-A-2000-43423, JP-A-2000-108513 and JP-A-2000-158818.

Further, the recording substances are not limited to dyes, and organic compounds such as triazole compounds, triazine compounds, cyanine compounds, merocyanine compounds, aminobutadiene compounds, phthalocyanine compounds, cinnamic acid compounds, viologen compounds, azo compounds, oxonol compounds, benzoxazole compounds and benzotriazole compound can also be preferably used. Of these compounds, cyanine compounds, aminobutadiene compounds, oxonol compounds, benzotriazole compounds and phthalocyanine compounds are particularly preferred.

As the dye in the recording layer, a dye or a combination of dyes used for the aforementioned image recording layer is preferably used.

The recording layer can be formed by dissolving a recording substance such as a dye together with a proper binder in an adequate solvent to prepare a coating solution and then coating this coating solution on a substrate. The concentration of the recording substance in the coating solution is in the range of generally from 0.01 to 15% by weight, preferably from 0.1 to 10% by weight, more preferably from 0.5 to 5% by weight, most preferably from 0.5 to 3% by weight.

The recording layer can be formed by a method of vapor deposition, sputtering, CVD or solvent coating. In this case, the recording layer can be formed by dissolving the dye or the like and, as needed, a quencher and a binder in a solvent to prepare a coating solution, and then coating this coating solution on the surface of a substrate to form a coat, followed by drying.

Examples of the solvent for the coating solution include esters such as butyl acetate, ethyl lactate and cellosolve acetate; ketones such as methyl ethyl ketone, cyclohexanone and methyl isobutyl ketone; chlorinated hydrocarbons such as dichloromethane, 1,2-dichloroethan and chloroform; amides such as dimethylformamide; hydrocarbons such as methylcyclohexane; ethers such as dibutyl ether, diethyl ether, tetrahydrofuran and dioxane; alcohols such as ethanol, n-propanol, isopropanol, n-butanol and diacetone alcohol; fluorine-containing solvents such as 2,2,3,3-tetrafluoropropanol; and glycol ethers such as ethylene glycol monomethyl ether, ethylene glycol monoethyl ether and propylene glycol monomethyl ether.

The solvents can be used alone or in combination of two or more thereof in consideration of the solubility of a dye to be used. To the coating solution may further be added various additives such as an antioxidant, a UV ray absorbent, a plasticizer and a lubricant according to the purpose.

In the case of using a binder, examples of the binder include natural organic high molecular substances such as gelatin, cellulose derivative, dextran, rosin and rubber, and synthetic organic high polymers such as hydrocarbon series resins (e.g., polyethylene, polypropylene, polystyrene and polybutylene); vinyl series resins (e.g., polyvinyl chloride, polyvinylidene chloride and polyvinyl chloride-polyvinyl acetate copolymer); acrylic resins (e.g., polymethyl acrylate and polymethyl methacrylate); polyvinyl alcohol; chlorinated polyethylene; and initial condensates of thermosetting resins (e.g., epoxy resin, butyral resin, rubber derivative and phenol/formaldehyde resin).

In the case of using a binder at the same time as a material for the recording layer, the amount of the binder to be used is in the range of generally from a 0.01-fold amount to a 50-fold amount based on the weight of the dye, preferably from a 0.1-fold amount to 5-fold amount.

As a coating method to be employed in the solvent coating, there can be illustrated a spraying method, a spin-coating method, a dip-coating method, a roll-coating method, a blade-coating method, a doctor roll-coating method and a screen printing method. The recording layer may be a single layer or of a two- or more layered structure. The thickness of the recording layer is in the range of generally from 10 to 500 nm, preferably from 15 to 300 nm, more preferably from 20 to 150 nm.

Various anti-fading agents may be incorporated in the recording layer in order to improve light fastness of the recording layer. As the anti-fading agent, a singlet oxygen quencher is generally used. As the singlet oxygen quencher, already known quenchers described in published documents such as patent specifications can be utilized. Specific examples thereof include those which are described in JP-A-58-175693, JP-A-59-31194, JP-A-60-18387, JP-A-60-19586, JP-A-60-19587, JP-A-60-35054, JP-A-60-36190, JP-A-60-36191, JP-A-60-44554, JP-A-60-44555, JP-A-60-44389, JP-A-60-44390, JP-A-60-54892, JP-A-60-47069, JP-A-68-209995, JP-A-4-25492, JP-B-1-38680, JP-A-6-26028, German Patent No. 350399, and NIPPON KAGAKU KAISHI, No. 10, p. 1141 (1992).

The amount of the anti-fading agent to be used such as the singlet oxygen quencher is in the range of usually from 0.1 to 50%, preferably from 0.5 to 45% by weight, more preferably from 3 to 40% by weight, particularly preferably from 5 to 25% by weight, based on the weight of the dye.

As specific examples of the material for constituting the phase change type recording layer, there are illustrated Sb—Te alloy, Ge—Sb—Te alloy, Pd—Ge—Sb—Te alloy, Nb—Ge—Sb—Te alloy, Pd—Nb—Ge—Sb—Te alloy, Pt—Ge—Sb—Te alloy, Co—Ge—Sb—Te alloy, In—Sb—Te alloy, Ag—In—Sb—Te alloy, Ag—V—In—Sb—Te alloy and Ag—Ge—In—Sb—Te alloy. Among them, Ge—Sb—Te alloy and Ag—In—Sb—Te alloy are preferred since they are rewritable many times.

The thickness of the phase-change type recording layer is preferably from 10 to 50 nm, more preferably from 15 to 30 nm.

The phase-change type recording layer can be formed by, for example, a sputtering method or a gas phase thin film-depositing method such as a vacuum deposition method.

(Substrate)

A substrate for the optical recording medium of the invention can freely be selected from among various materials having conventionally been used as substrates for optical recording media.

As the substrate material, there can be illustrated, for example, glass, polycarbonate, acrylic resins (e.g., polymethyl methacrylate), vinyl chloride series resins (e.g., polyvinyl chloride and vinyl chloride copolymer), epoxy resin, amorphous polyolefin and polyester. These materials may be used in combination thereof as needed.

Additionally, these materials can be used as a film-shaped substrate or a rigid substrate. Of these materials, polycarbonate is preferred in view of moistureproofness, dimensional stability and price.

The thickness of the substrate is preferably from 0.1 to 1.2 mm, more preferably from 0.2 to 1.1 mm. Also, in order to attain a higher recording density, it is preferred to use a substrate wherein grooves with a track pitch narrower than in the conventional CD-Rs or DVD-Rs. In this case, the track pitch of the grooves is in the range of preferably from 200 to 400 µm, more preferably from 250 to 350 nm. Also, the depth of the groove is in the range of preferably from 20 to 150 nm, more preferably from 50 to 100 nm.

The width of the groove is in the range of preferably from 50 to 250 nm, more preferably from 100 to 200 nm. The slant angle of the groove is in the range of preferably from 20 to 80°, more preferably from 30 to 70°.

In order to improve flatness and adhesion force and prevent deterioration of the recording layer, an undercoat layer may be provided on the surface side (wherein grooves are formed) of the substrate disposed on the side on which the recording layer is to be provided.

Examples of the material for the undercoat layer include high molecular substances such as polymethyl methacrylate, acrylic acid/methacrylic acid copolymer, styrene/maleic anhydride copolymer, polyvinyl alcohol, N-methylolacrylamide, styrene/vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, polyethylene, polypropylene and polycarbonate; and surface modifiers such as a silane coupling agent. The undercoat layer can be formed by dissolving or dispersing the above-mentioned substances in an appropriate solvent to prepare a coating solution, and then coating the coating solution on the surface of the substrate according to a coating method such as a spin coating method, a dip coating method or an extrusion coating method.

The thickness of the undercoat layer is in the range of generally from 0.005 to 20 µm, preferably from 0.01 to 10 µm.

(Reflection Layer)

In order to improve reflectance upon reproduction of information, a reflection layer is in some cases provided adjacent to the recording layer. A light-reflecting substance to be used as a material for the reflection layer is a substance which has a high reflectance for a laser light, and examples thereof include metals and semimetals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn and Bi; and stainless steel. These substances may be used independently or in combination of two or more thereof, or as an alloy. Of these, Cr, Ni, Pt, Cu, Ag, Au, Al and stainless steel are preferred. Au metal, Ag metal, Al metal and the alloy thereof are particularly preferred, with Ag metal, Al metal and the alloy thereof being most preferred. The reflection layer can be formed on the substrate or on the recording layer by, for example, vapor-depositing, sputtering or ion-plating the light-reflecting substance. The thickness of the reflection layer is in the range of generally from 10 to 300 nm, preferably from 50 to 200 nm.

(Adhesive Layer)

The adhesive layer is an optional layer to be formed for improving adhesion properties between the reflection layer and a dummy substrate.

As a material for constituting the adhesive layer, photo-curable resins are preferred. Among them, those which have small cure shrinkage are preferred. As such photo-curable resins, there can be illustrated UV-curable resins (UV-curable adhesives) such as "SD-640" and "SD-347" manufactured by Dainippon Ink & Chemicals, Inc. In order to exhibit enough elasticity, the thickness of the adhesive layer is in the range of preferably from 1 to 1000 µm, more preferably from 5 to 500 µm, particularly preferably from 10 to 100 µm.

(Dummy Substrate)

A dummy substrate (protective substrate) may be constituted by the same substance as that for the aforementioned substrate.

A protective layer to be employed in other constitution will be described below.

(Protective Layer)

A protective layer is in some cases provided for the purpose of physically and chemically protecting the reflection layer or the recording layer.

Additionally, in the case of employing the same embodiment as with production of the DVD-R type optical recording medium, that is, employing a structure wherein two substrates (including the case where one of them is a dummy substrate) are stuck to each other with disposing the recording layer at the inside, the protective layer is not necessarily be provided.

Examples of the material to be used for the protective layer include inorganic substances such as ZnS, ZnS—$SiO_2$, SiO, $SiO_2$, $MgF_2$, $SnO_2$ and $Si_3N_4$; and organic substances such as thermoplastic resins, thermosetting resins and UV-curable resins. The protective layer can be formed by, for example, laminating a film obtained by extrusion processing of plastic on the reflection layer with an adhesive therebetween. Alternatively, it may be provided by a method of, for example, vacuum deposition, sputtering or coating.

With the protective layer of the thermoplastic resin or the thermosetting resin, the protective layer can also be formed by dissolving them in an appropriate solvent to prepare a coating solution, and then coating this coating solution and drying it. With the UV-curable resin, the protective layer can also be formed by coating the resin as such or as a coating solution prepared by dissolving the resin in an appropriate solvent and then irradiating it with a UV light to cure. To the coating solution may further be added various additives such as an antistatic agent, antioxidant and a UV ray absorbent according to the purpose. The thickness of the protective layer is in the range of generally from 0.1 μm to 1 mm.

As other constitution, a constitution may be employed which comprises a substrate having formed thereon a reflection layer, a recording layer and a cover layer in this order. The cover layer is preferably formed on the recording layer with an adhesive layer therebetween. In this case, as to other constituents than the cover layer, the same as has been described hereinbefore applies.

(Cover Layer)

The cover layer is formed in order to prevent the interior of the optical recording medium from an impact. Materials for the layer are not particularly limited as long as they are transparent. However, polycarbonate and cellulose triacetate are preferred, with materials having a moisture absorption ratio of 5% or less at 23° C. and 50% RH being more preferred.

Additionally, the term "transparent" as used herein means to transmit a recording light and a reproducing light (transmittance: 90% or more).

The cover layer is formed by dissolving an adhesive layer-constituting, photo-curable resin in an appropriate solvent to prepare a coating solution, coating this coating solution on a recording layer at a predetermined temperature to form a coated film, laminating on the coated film a cellulose triacetate film (TAC film) having been obtained by extrusion processing of a plastic, and irradiating with light from above the laminated TAC film to thereby cure the coated film. The TAC film preferably contains a UV ray absorbent. The thickness of the cover layer is in the range of from 0.01 to 0.2 mm, preferably from 0.03 to 0.1 mm, more preferably from 0.05 to 0.095 mm.

Also, as the cover sheet, a polycarbonate sheet may be used.

The cover layer can be provided, for example, in the following manner. The cover layer is formed by dissolving a photo-curable resin in an appropriate solvent to prepare a coating solution, coating this coating solution on a recording layer at a predetermined temperature to form a coated film, laminating on the coated film a cellulose triacetate film (TAC film) having been obtained by extrusion processing of a plastic, and irradiating with light from above the laminated TAC film to thereby cure the coated film. The TAC film preferably contains a UV ray absorbent. The thickness of the transparent sheet is in the range of from 0.01 to 0.2 mm, preferably from 0.03 to 0.1 mm, more preferably from 0.05 to 0.095 mm.

Additionally, as the cover layer, a polycarbonate sheet may be used. In the case where an adhesive is provided on the laminating side of the transparent sheet, the above-mentioned adhesive is not necessary.

Further, a light-transmitting layer comprising a UV ray-curable resin may be formed in place of the cover layer.

Also, a hard coat layer may be formed on the cover layer. The hard coat layer can be formed by forming a reflection layer and a recording layer on a substrate, forming thereon a cover layer, and forming the hard coat layer on the cover layer by, for example, coating. In the case where the cover layer is a transparent sheet, it may be possible to form the hard coat layer on the transparent sheet before laminating the transparent sheet on the recording sheet, and laminate the transparent sheet on the recording layer so that the hard coat layer constitutes the outermost layer, to thereby prepare the optical recording medium of the invention.

As has been described hereinbefore, the optical recording medium of the invention can be applied to a so-called read-only type optical recording medium which has recording portions (pits) where information capable of being reproduced by a laser light is recorded.

[Image Recording Method]

The image recording method of the invention is a recording method of recording an image on an image recording layer of the optical recording medium of the invention, and is characterized in that the same laser light as the laser light used for recording the recording layer is used for recording a visible image on the image recording layer.

The image recording method of the invention is performed by using the optical recording medium of the invention and a recording apparatus which can at least record image information on an image recording layer of the optical recording medium.

In the image recording method of the invention, an image is recorded on the image recording layer by using the same laser light as the laser light used for recording information on the recording layer. Thus, the laser light source can be shared in one apparatus between the two recordings, which serves to minimize the necessary hardware source of the recording apparatus and, at the same time, enables general users to record an image with ease using the apparatus.

Additionally, it is most preferred to conduct recording of an image on the image recording layer of the optical recording medium of the invention according to the image recording method of the invention. However, recording of an image on the image recording layer of the optical recording medium of the invention is not limited only to it.

First, a recording apparatus to be used for recording information on the optical recording medium of the invention will be described below.

(Recording Apparatus)

With the optical recording medium of the invention, recording of an image on the image recording layer and recording of optical information on the recording layer can be conducted in one optical disk drive (recording apparatus) having the ability of recording on both layers. In the case of using one optical disk drive, it is possible to conduct recording on one of the image recording layer and the recording layer and then turn the disk upside down and conduct recording on the other layer. The optical disk drive having the ability of recording a visible image on the image recording layer is described in, for example, JP-A-2003-203348 and JP-A-2003-242750.

Upon recording a visible image on the image recording layer, the recording apparatus allows the optical recording medium and the laser pickup to relatively move and, in synchronicity with the relative movement, irradiates toward the image recording layer a laser light modulated according to an image data such as a letter or a picture to be recorded. Such constitution is described in, for example, JP-A-2002-203321.

The recording apparatus for recording optical information on the recording layer has at least a laser pickup emitting a laser light and a rotation mechanism for rotating an optical recording medium. Recording on and reproduction from the recording layer are performed by emitting a laser light from the laser pickup toward the recording layer of the optical recording medium in a rotated state. The constitution itself of such recording apparatus is well known.

Next, recording of information (digital information) on the recording layer will be described below. With a dye type recording layer, a laser light is first emitted from a laser pickup while rotating an unrecorded optical recording medium of the aforesaid constitution at a predetermined recording linear velocity. The dye in the recording layer absorbs the emitted laser light to locally cause a rise in temperature and generate desired pits. Thus, optical characteristics of the laser light-irradiated portion are changed to record information.

In forming one pit, the recording waveform of the laser light may be a pulse row or one pulse. It is the proportion to the length of actual recording (length of pit) that matters.

The pulse width of the laser light is in the range of preferably from 20 to 95%, more preferably from 30 to 90%, still more preferably from 35 to 85%, based on the length of actual recording. Here, in the case where the recording waveform is a pulse row, the above description means that the sum of pulses is within the above-described range.

The power of the laser light varies depending upon the recording linear velocity. When the recording linear velocity is 3.5 m/s, the power is in the range of preferably from 1 to 100 mW, more preferably from 3 to 50 mW, still more preferably from 5 to 20 mW. In the case where the recording linear velocity becomes 2 times, the preferred ranges of the laser light power become 2½ times, respectively.

NA of an object lens used for the pickup is preferably 0.55 or more, more preferably 0.60 or more.

In the invention, a semiconductor layer which emits a recording light in the range of from 350 to 850 nm in oscillation wavelength can be used.

A phase change type recording layer will be described below. With the phase change type, the recording layer is constituted by the aforementioned material, and can repeatedly undergo phase change between crystal phase and amorphous phase upon irradiation with a laser light.

Upon recording information, a focused laser light pulse is emitted for a short time to partially melt the phase change recording layer. The molten portion is rapidly cooled due to diffusion of heat and solidifies to form an amorphous-state, recording mark. Upon erasing, the recording mark portion is irradiated with the laser light to heat the portion to a temperature of the melting point or lower than that of the recording layer and the crystallizing temperature or higher than that, and then is gradually cooled to thereby crystallize the amorphous-state recording mark and restore to the former non-recorded state.

The optical information recording medium of the invention which has a visible image recording layer is particularly adapted for recording a visible image to be described hereinafter. In the case of using such method, a visible image showing a good visibility can be recorded. That is, the optical information recording medium of the invention having the visible image recording layer can be particularly preferably used for the following apparatus and method described below.

For example, an optical disk recording apparatus in which the optical information recording medium of the invention can preferably be used has the characteristic (1) that it is an optical disk recording apparatus wherein information is recorded by irradiating a recording side (e.g., dye-containing recording layer (recording layer)) of an optical disk with a laser light, and which has an optical pickup for emitting a laser light toward the optical disk, an irradiation position-adjusting means for adjusting the irradiation position of the laser light emitted from the optical pickup on the optical disk, an image formation-controlling means which, when the optical disk having the recording layer formed on one side thereof and the visible image-recording layer on the other side is mounted so that the visible image-recording layer faces the optical pickup, controls the optical pickup and the irradiation position-adjusting means so that a visible image in accordance with image information is formed on the visible image-recording layer of the optical disk, and a beam spot-controlling means which controls the optical pickup so that, upon formation of the visible image, the beam spot diameter of the laser light emitted from the optical pickup toward the visible image-recording layer becomes larger than the beam spot diameter of the laser light emitted from the optical pickup toward the recording side upon conducting information recording.

This constitution enables one to form a visible image in accordance with image data by irradiating the visible image recording layer of the optical disk with a laser light according to the image data to thereby change the color of the visible image-recording layer. Upon formation of such visible image, the beam spot diameter of the laser light emitted toward the visible image-recording layer of the optical disk is made larger, which serves to shorten the time required for forming a visible image. The optical information recording medium of the invention can record a good visible image even by such method.

An optical disk recording apparatus of other embodiment has the characteristic (2) that it is an optical disk recording apparatus wherein information is recorded by irradiating a recording side of an optical disk with a laser light, and which has an optical pickup for emitting a laser light toward the optical disk, an irradiation position-adjusting means for adjusting the irradiation position of the laser light emitted from the optical pickup on the optical disk, an image formation-controlling means which, when the optical disk having the recording layer formed on one side thereof and the visible image-recording layer on the other side is mounted so that the visible image-recording layer faces the optical pickup, controls the optical pickup and the irradiation position-adjusting means so that a visible image in accordance with image information is formed on the visible image-recording layer of the optical disk, with the intensity of the laser light to be emitted from the optical pickup toward the visible image-recording layer based on the image information being controlled to be either of the first intensity which causes scarce change in the visible image-recording layer and the second intensity which causes change in the visible image-recording layer, and a servo means which detects information on the laser light emitted from the optical pickup toward the optical disk and controls the optical pickup based on the detected result so that a desired laser light is emitted, with the image formation-controlling means controlling so that the period where the laser light emitted from the optical pickup based on the image information is continuously at a level of the second intensity exceeds a predetermined length, the intensity of the laser light emitted from the optical pickup becomes at a level of the first intensity for a predetermined period regardless of the content of the image information, and the servo means controlling the optical pickup based on the detected result on information relating to the laser light emitted with the first intensity.

This constitution enables one to form a visible image in accordance with image data by irradiating the visible image recording layer of the optical disk with a laser light according to the image data to thereby change the color of the visible image-recording layer. Upon formation of such visible image, even when the period lasts long where the laser light in accordance with the image data is at a level of the second intensity which can change the visible image-recording layer, the laser light-controlling means functions to emit a laser light of the first intensity which scarcely change the visible image-recording layer regardless of the image data, whereby a laser light can be controlled based on the irradiation result. Also, the optical information recording medium of the invention can record a good visible image even by such method.

An optical disk recording apparatus of other embodiment has the characteristic (3) that it is an optical disk recording apparatus wherein information is recorded by irradiating a recording side of an optical disk with a laser light, and which has an optical pickup for emitting a laser light toward the optical disk, an irradiation position-adjusting means for adjusting the irradiation position of the laser light emitted from the optical pickup on the optical disk, an image formation-controlling means which controls the optical pickup and the irradiation position-adjusting means so that a visible image in accordance with image information is formed on the visible image-recording layer of the optical disk, with the intensity of the laser light to be emitted from the optical pickup toward the visible image-recording layer based on the image information being controlled to be either of the first intensity which causes scarce change in the visible image-recording layer and the second intensity which causes change in the visible image-recording layer, and a servo means which detects information on the laser light emitted from the optical pickup toward the optical disk and controls the optical pickup based on the detected result so that a desired laser light is emitted, with the image formation-controlling means controlling so that the period where the laser light emitted from the optical pickup based on the image information is continuously at a level of the second intensity exceeds a predetermined length, the intensity of the laser light emitted from the optical pickup becomes at a level of the first intensity for a predetermined period regardless of the content of the image information, and the servo means controlling the optical pickup based on the detected result on information relating to the laser light emitted with the first intensity.

This constitution enables one to form a visible image in accordance with image data by irradiating the visible image-recording layer of the optical disk with a laser light in accordance with the image data to thereby change the color of the visible image-recording layer. Upon formation of such visible image, even when the period lasts long where the laser light in accordance with the image data is at a level of the second intensity which can change the recording side, the laser light-controlling means functions to emit a laser light of the first intensity which scarcely change the recording side regardless of the image data, whereby a laser light can be controlled based on the irradiation result. Also, the optical information recording medium of the invention can record a good visible image even by such method.

An optical disk recording apparatus of other embodiment has the characteristic (4) that it is an optical disk recording apparatus wherein information is recorded by irradiating a recording side of an optical disk with a laser light, and which has an optical pickup for emitting a laser light toward the optical disk, an irradiation position-adjusting means for adjusting the irradiation position of the laser light emitted from the optical pickup on the optical disk, an image formation-controlling means which, when the optical disk having the recording layer formed on one side thereof and the visible image-recording layer on the other side is mounted so that the visible image-recording layer faces the optical pickup, controls the optical pickup and the irradiation position-adjusting means so that a visible image in accordance with image information is formed in the visible image-recording layer of the optical disk, and a relative position-adjusting means which functions to adjust the relative relation between the side of the optical disk facing the optical pickup and the optical pickup based on whether the side of the optical disk facing the optical pickup is the visible image-recording layer or the recording side when the optical disk is mounted on the optical disk recording apparatus.

This constitution enables one to form a visible image in accordance with image data by irradiating the visible image recording layer of the optical disk with a laser light in accordance with the image data to thereby change the color of the visible image-recording layer. When the optical disk is mounted thereon, it can adjust the positional relationship between the optical pickup and the side facing the optical pickup depending upon which one of the visible image-recording layer and the recording side faces the optical pickup. Therefore, even in the case where the distance between the optical pickup and the side facing the optical pickup differs between the case of mounting so that the recording side faces the optical pickup and the case of mounting so that the visible image-recording layer faces the optical pickup, such problems as that various controls (e.g., focus control) become impossible due to the difference in distance can be suppressed. Also, the optical information recording medium of the invention can record a good visible image even by such method.

An optical disk recording apparatus of other embodiment has the characteristic (5) that it is an optical disk recording apparatus wherein information is recorded by irradiating a recording side of an optical disk with a laser light, and which has an optical pickup for emitting a laser light toward the optical disk, an irradiation position-adjusting means for adjusting the irradiation position of the laser light emitted from the optical pickup on the optical disk, a servo means which, when the optical disk having the recording side formed on one side thereof with a guide groove formed thereon in a spiral form and the visible image-recording layer on the other side is mounted so that the visible image-recording layer faces the optical pickup, controls the irradiation position-controlling means so that the laser light is emitted along the guide groove based on the reflection light of the laser light emitted from the optical disk reflected by the optical disk, and an image formation-controlling means which controls the laser light emitted from the optical pickup so that a visible image in accordance with image information is formed on the visible image-recording layer of the optical disk while the irradiation position is moved along the guide groove by the servo means. Also, the optical information recording medium of the invention can record a good visible image even by such method.

This constitution enables one to form a visible image in accordance with image data by irradiating the visible image-recording layer of the optical disk with a laser light according to the image data to thereby change the color of the visible image-recording layer. In this occasion, a visible image can be formed without conducting complicated control of laser light irradiation position in comparison with the case of conducting recording on the recording side where the guide groove formed on the recording side is detected and the laser irradiation position is moved along the detected guide groove.

An optical disk recording apparatus of other embodiment has the characteristic (6) that it is an optical disk recording apparatus wherein information is recorded by irradiating a recording side of an optical disk with a laser light, and which has an optical pickup for emitting a laser light toward the optical disk, a rotationally driving means which rotates the optical disk, a clock signal-outputting means for outputting a clock signal of a frequency in accordance with the rotation speed of the optical disk rotated by the rotation driving means, an image formation-controlling means which, when the optical disk having the recording side formed on one side thereof and the visible image-recording layer on the other side is mounted so that the visible image-recording layer faces the optical pickup, controls the optical pickup so that a visible image in accordance with image information is formed on the visible image-recording layer of the optical disk, with the laser light emitted from the optical pickup being controlled based on the image information at every period of the clock signal generated by the signal-outputting means, a rotation-detecting means for detecting that the optical disk is rotated one rotation from a predetermined standard position by the rotation driving means, and an irradiation position-adjusting means which, when it is detected by the rotation-detecting means that the optical disk is rotated one rotation from the standard position in the state of being irradiated with the laser light emitted from the optical pickup for forming the visible image on the visible image-recording layer of the optical disk, functions to move the irradiation position of the laser light emitted from the optical pickup with a predetermined distance in the predetermined diameter direction of the disk having been mounted on the optical disk recording apparatus.

This constitution enables one to form a visible image in accordance with image data by irradiating the visible image-recording layer of the optical disk with a laser light according to the image data to thereby change the color of the visible image-recording layer. Upon formation of the visible image, irradiation with the laser light is controlled every period of the clock signal having the frequency in accordance with the rotation speed of the optical disk, that is, every time the optical disk rotates with a definite angle, and hence a visible image of the content in accordance with the image data (e.g., density) can be formed at definite angle intervals of the optical disk. Also, the optical information recording medium of the invention can record a good visible image even by such method.

An optical disk recording apparatus of other embodiment has the characteristic (7) that it is an optical disk recording apparatus wherein information is recorded by irradiating a recording side of an optical disk with a laser light, and which has an optical pickup for emitting a laser light toward the optical disk, a rotation driving means which rotates the optical disk, an image formation-controlling means which, when the optical disk having the recording side formed on one side thereof and the visible image-recording layer on the other side is mounted so that the visible image-recording layer faces the optical pickup, controls the optical pickup so that a visible image in accordance with image information is formed on the visible image-recording layer of the optical disk, and irradiation position-adjusting means which, when it is detected by the rotation-detecting means that the optical disk is rotated one rotation from the standard position in the state of being irradiated with the laser light emitted from the optical pickup for forming the visible image on the visible image-recording layer of the optical disk, functions to move the irradiation position of the laser light emitted from the optical pickup with a predetermined distance in the predetermined diameter direction of the disk having been mounted on the optical disk recording apparatus, with the image formation-controlling means controlling the optical pickup so that it starts to emit the laser light toward the optical disk from the predetermined standard position for forming the visible image on the visible image-recording layer of the optical disk rotated by the rotation driving means while a region ranging from the position a predetermined length before the standard position of the optical disk to the standard position is not irradiated with the laser light for forming the visible image.

This constitution enables one to form a visible image in accordance with image data by irradiating the visible image-recording layer of the optical disk with a laser light according to the image data to thereby change the color of the visible image-recording layer. Upon formation of the visible image, the optical disk is irradiated with the laser light starting from the standard position of the optical disk while rotating the optical disk to thereby form the visible image whereas, when the laser irradiation position reaches the region immediately before the standard position, irradiation with the laser light for forming the visible image is not conducted. Thus, even when control of the laser light irradiation position is disordered by some reason such as unstable rotation of the optical disk and, as a result, the laser light is forced to continuously irradiate starting from the standard position till one rotation of the optical disk and the irradiation position again passes the standard position, that is, even when the laser light irradiation position moves to the position coinciding with the position having been irradiated with the laser light, irradiation of the position with the laser light for forming the visible image can be suppressed. As a result, deterioration of the quality of the formed visible image can be prevented.

An optical disk recording apparatus of other embodiment has the characteristic (8) that it is an optical disk recording apparatus wherein information is recorded by irradiating a recording side of an optical disk with a laser light, and which has an optical pickup for emitting a laser light toward the optical disk, an irradiation position-adjusting means for adjusting the irradiation position of the laser light emitted from the optical pickup toward the optical disk, a disk-discriminating means for obtaining disk-discriminating information for discriminating kind of the optical disk mounted on the optical disk-recording apparatus, and an image formation-controlling means which, when the optical disk having the recording side formed on one side thereof and the visible image-recording layer on the other side is mounted so that the visible image-recording layer faces the optical pickup, controls the optical pickup and the irradiation position-adjusting means so that a visible image in accordance with image information is formed on the visible image-recording layer of the optical disk according to the kind of the optical disk discriminated by the disk-discriminating means.

This constitution enables one to form a visible image in accordance with image data by irradiating the visible image-recording layer of the optical disk with a laser light according to the image data to thereby change the color of the visible image-recording layer. Upon formation of the visible image, control for forming the visible image can be conducted according to the kind of the mounted disk.

An optical disk recording apparatus of other embodiment is an optical disk recording apparatus which is equipped with an optical pickup for emitting a laser light toward the optical disk, a modulating means for modulating information supplied from outside and a laser light-controlling means for controlling the laser light emitted from the optical pickup according to the information supplied from the modulating means, and which has the characteristic (9) that it has a prohibiting means which, when the optical disk having the recording side formed on one side thereof and the visible image-recording layer on the other side is mounted so that the visible image-recording layer faces the optical pickup, prohibits modulation of image information supplied from outside by the modulating means, and an image formation-controlling means which, when the optical disk is mounted so that the visible image-recording layer of the optical disk faces the optical pickup, controls the laser light-controlling means so that the visible image in accordance with non-modulated image information supplied from the modulating means is formed on the visible image-recording layer of the optical disk.

This constitution enables one to form a visible image in accordance with image data by irradiating the visible image-recording layer of the optical disk with a laser light according to the image data to thereby change the color of the visible image-recording layer. Upon formation of the visible image, modulation by the modulating means which modulates recording data upon recording information on the recording side is prohibited, and hence image data are not modulated. Therefore, the data-transmitting constitution for recording information on the recording side can be used without providing a special data-transmitting constitution for forming the visible image according to image data.

An optical disk recording apparatus of other embodiment has the characteristic (10) that it is an optical disk recording apparatus wherein information is recorded by irradiating a recording side of an optical disk with a laser light, and which has an optical pickup for emitting a laser light toward the optical disk, an irradiation position-adjusting means for adjusting the irradiation position of the laser light emitted from the optical pickup toward the optical disk, and an image formation-controlling means which, when the optical disk having the recording side formed on one side thereof and the visible image-recording layer on the other side is mounted so that the visible image-recording layer faces the optical pickup, controls the optical pickup and the irradiation position-adjusting means so that a visible image in accordance with image information is formed on the visible image-recording layer of the optical disk, with the image formation-controlling means controlling the laser light emitted from the optical pickup according to the gradation degree shown by the image information.

This constitution enables one to form a visible image in accordance with image data by irradiating the visible image-recording layer of the optical disk with a laser light according to the image data to thereby change the color of the visible image-recording layer. Upon formation of the visible image, the laser light can be controlled according to the gradation degree at each position (coordinates) on the visible image-recording layer shown by the image data, thus a visible image with gradation being formed.

An optical disk recording apparatus of the other embodiment has the characteristic (11) that it is an optical disk recording apparatus wherein information is recorded by irradiating a recording side of an optical disk with a laser light, and which has a rotation means for rotating the optical disk, an optical pickup which emits a laser light toward one side of the optical disk rotated by the rotation means and which can move almost in the radius direction of the optical disk, and a laser write level-controlling means which can adjust the level of the laser light emitted from the optical pickup so that the level is either of the first intensity at which the recording layer scarcely changes the recording layer and the visible image-recording layer and the second intensity at which the recording layer scarcely changes whereas coloration of the visible image-recording layer changes, based on image data in accordance with a visible image to be formed.

This constitution enables one to record information on the recording layer by irradiating with the laser light in the same manner as the conventional manner, and a visible image can be formed in the visible image-recording layer. Further, both recording of information and formation of a visible image can be conducted by irradiating the same side of the optical disk with the laser light, and hence users are not required complicated operations such as to turn the optical disk over for re-mounting.

Also, the image-forming method in accordance with the invention is a method of forming a visible image in the visible image-recording layer formed on the opposite side of the optical disk to the side of the recording side using an optical disk recording apparatus equipped with an optical pickup for conducting recording of information by irradiating the recording side of the optical disk with a laser light, which is characterized in that the laser light from the optical pickup is controlled so that a visible image in accordance with image information is formed in the visible image-recording layer of the optical disk with the irradiation position of the laser light from the optical pickup being moved along the given spiral or concentric route formed in the visible image-recording layer and that, in the controlling of the laser light, irradiation timing of the laser light irradiated toward the route belonging to each unit area, which area is a fan-shaped area formed by dividing the optical disk into a given number of (plural) fan-shaped adjacent portions including the route, is controlled so that high or low density of the unit area in the visible image can be expressed.

According to this method, a visible image in accordance with image data can be formed by irradiating the visible image-recording layer of the optical disk with the laser light according to image date to thereby change the color of the visible image-recording layer. Upon formation of such visible image, laser light irradiation timing can be controlled according to the gradation degree of each position (coordinates) on the visible image-recording layer shown by the image data, thus a visible image with gradation being formed.

A. CONSTITUTION OF AN EMBODIMENT OF THE OPTICAL DISK RECORDING APPARATUS

The invention is an optical disk recording apparatus for recording information by irradiating the recording side of the optical disk with a laser light, which has the function of not only recording information on the recording side but recording a visible image in accordance with image data by irradiating a visible image-recording layer (or a visible information-recording layer) formed on the opposite side of the optical disk to the recording side with the laser light. Additionally, with an optical disk using a given dye, such apparatus can record a visible image not only in the visible image-recording layer but in the recording layer which records ordinary digital data.

Constitution of the Optical Disk Recording Apparatus

Figure 2:
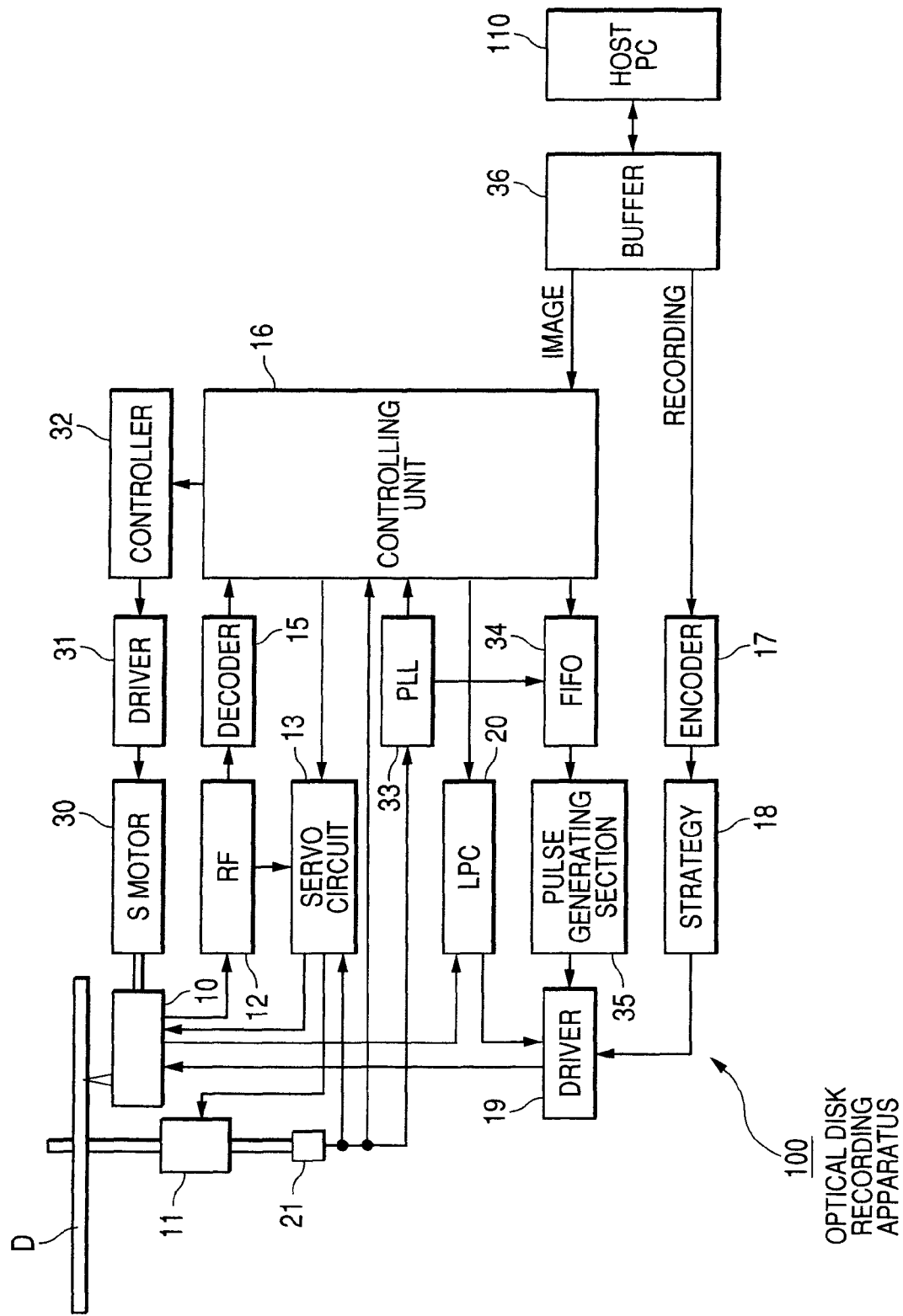
FIG. 2 is a block diagram showing the constitution of an optical disk recording apparatus in accordance with one embodiment of the invention.

Next, FIG. 2 is a block diagram showing the constitution of the optical disk recording apparatus. As is shown in FIG. 2, this optical disk recording apparatus 100 is connected to a host personal computer (PC) 110, and is equipped with an optical pickup 10, a spindle motor 11, an RF (Radio Frequency) amplifier 12, a servo circuit 13, a decoder 15, a controlling unit 16, an encoder 17, a strategy circuit 18, a laser driver 19, a laser power controlling circuit 20, a frequency generator 21, a stepping motor 30, a motor driver 31, a motor controller 32, a PLL (Phase Locked Loop) circuit 33, a FIFO (First In First Out) memory 34, a driving pulse generating unit 35, and a buffer memory 36.

The spindle motor 11 is a motor for rotating the optical disk D on which data are to be recorded, the rotation number thereof being controlled by the servo circuit 13. In the optical disk recording apparatus 100 of this embodiment, recording is designed to be conducted according to CAV (Constant Angular Velocity) system, the spindle motor 11 is designed to rotate at a constant angular velocity determined by the order from the controlling unit 16 or the like.

Figure 3:
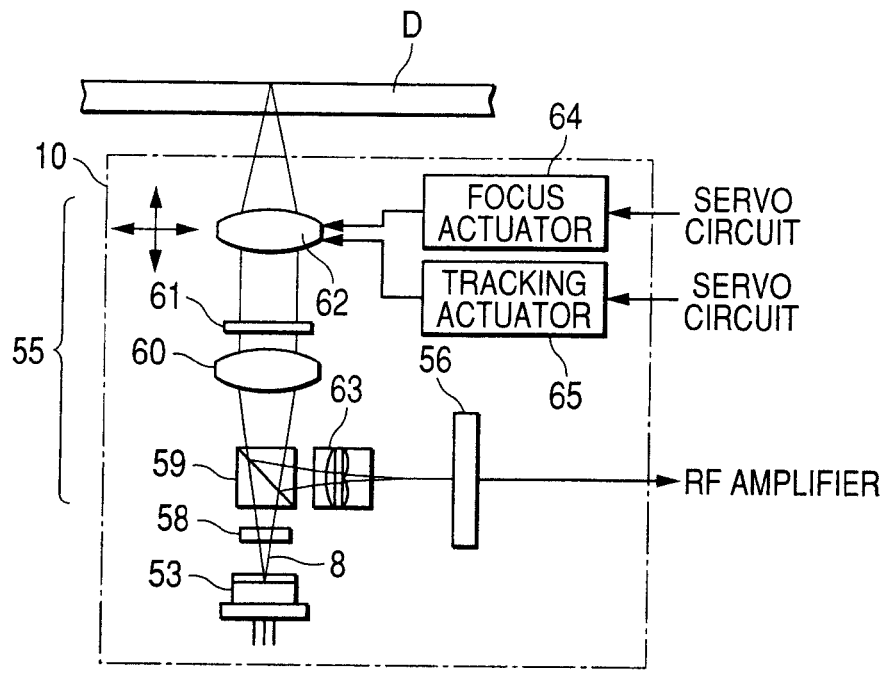
FIG. 3 is a view showing the structure of an optical pickup which is a constituent of the optical disk recording apparatus.

The optical pickup 10 is a unit which irradiates the optical disk D rotated by the spindle motor 11 with a laser light and has the constitution shown in FIG. 3. As is shown in FIG. 3, the optical pickup 10 is equipped with a laser diode 53 which emits a laser beam B, a diffraction grating 58, an optical system 55 for focusing the laser beam B on the side of the optical disk, and a light-accepting element 56 for accepting a reflected light.

In the optical pickup 10, the laser diode 53 emits the laser beam B with an intensity in accordance with the driving current supplied from the laser driver 19 (see FIG. 2). Optical pickup 10 separates the laser beam B emitted from the laser diode 53 into a main beam, a preceding beam and a following beam, and focuses the three beams on the side of the optical disk D through a polarizing beam splitter 59, a collimator lens 60, a ¼ wavelength plate 61 and an objective lens 62. The three beams reflected on the side of the optical disk D are again allowed to transmit through the objective lens 62, the ¼ wavelength plate 61 and the collimator lens 60 and are reflected by the polarizing beam splitter 59, then passed through a cylindrical lens 63 and introduced into the light-accepting element 56. The light-accepting element 56 outputs the accepted signal to the RF amplifier 12 (see FIG. 2) so that the accepted light signal can be fed to the controlling unit 16 and the servo circuit 13 through the RF amplifier.

The objective lens 62 is held by the focus actuator 64 and the tracking actuator 65 so that it can be moved in the direction of the optical axis of the laser beam B and in the diameter direction of the optical disk D. The focus actuator 64 and the tracking actuator 65 move the objective lens 62 in the direction of the optical axis and in the direction of the diameter, respectively, according to a focus error signal and a tracking error signal fed from the servo circuit 13 (see FIG. 2). Additionally, the servo circuit 13 performs focus control and tracking control by generating the focus error signal and the tracking error signal based on the accepted light signal fed through the light-accepting element 56 and the RF amplifier 12, which signals are used to move the objective lens 62 as described above.

Also, the optical pickup 10 has a front monitor diode not shown and is designed so that, while the laser diode 53 emits the laser light, an electric current is generated in the front monitor diode having received the emitted light, and the electric current is fed from the optical pickup 10 to the laser power controlling circuit 20 shown in FIG. 2.

The FR amplifier 12 amplifies an EFM (Eight to Fourteen Modulation)-modified RF signal fed from the optical pickup 10 and outputs the amplified RF signal to the servo circuit 13 and the decoder 15. Upon reproduction, the decoder 15 demodulates the EFM-modulated RF signal fed from the RF amplifier 12 to generate a reproduction data.

The servo circuit 13 is supplied with an order signal from the controlling unit, an FG pulse signal in accordance with the rotation number of the spindle motor 11 fed from the frequency generator 21, and an RF signal from the RF amplifier 12. The servo circuit performs control of rotation of the spindle motor 11, and focus control and tracking control of the optical pickup 10. As a system of driving the spindle motor 11 upon recording information on the recording side (see FIG. 1) of the optical disk D or upon forming a visible image in the visible image-recording layer (see FIG. 1) of the optical disk D, there may be employed either of a system of driving the optical disk D at a constant angular velocity (CAV: Constant Angular Velocity) and a system of rotating the optical disk D at a constant recording linear velocity (CLV: Constant Linear Velocity). The optical disk recording apparatus 100 of this embodiment employs the CAV system, and the servo circuit 13 functions to rotate the spindle motor 11 at a constant angular velocity ordered by the controlling unit 16.

The buffer memory 36 stores the information to be recorded on the recording side of the optical disk D (hereinafter referred to as "recording data") and the information in accordance with a visible image to be formed in the visible image-recording layer of the optical disk (hereinafter referred to as "image data"), fed from the host PC 110. The recording data stored in the buffer memory 36 are outputted to the encoder 17, and the image data are outputted to the controlling unit 16.

The encoder 17 EFM-modulates the recording data fed from the buffer memory 36 and outputs to the strategy circuit 18. The strategy circuit 18 performs time base-correcting processing on the EFM signal fed from the encoder 17 and output it to the laser driver 19.

The laser driver 19 drives the laser diode 53 (see FIG. 3) in the optical pickup 10 according to the signal modulated according to the recording data fed from the strategy circuit 18 and according to the control of laser power controlling circuit 20.

The laser power controlling circuit 20 controls the laser power emitted from the laser diode 53 (see FIG. 3) in the optical pickup 10. Specifically, the laser power controlling circuit 20 controls the laser driver 19 so that a laser light with an intensity coinciding with the target level of the optimal laser power directed by the controlling unit 16 is to be emitted from the optical pickup 10. The laser power control performed here by the laser power controlling circuit 20 is a feed-back control wherein an electric current value fed from the front monitor diode of the optical pickup is used to emit a laser light with a target intensity from the optical pickup 10.

Figure 4:
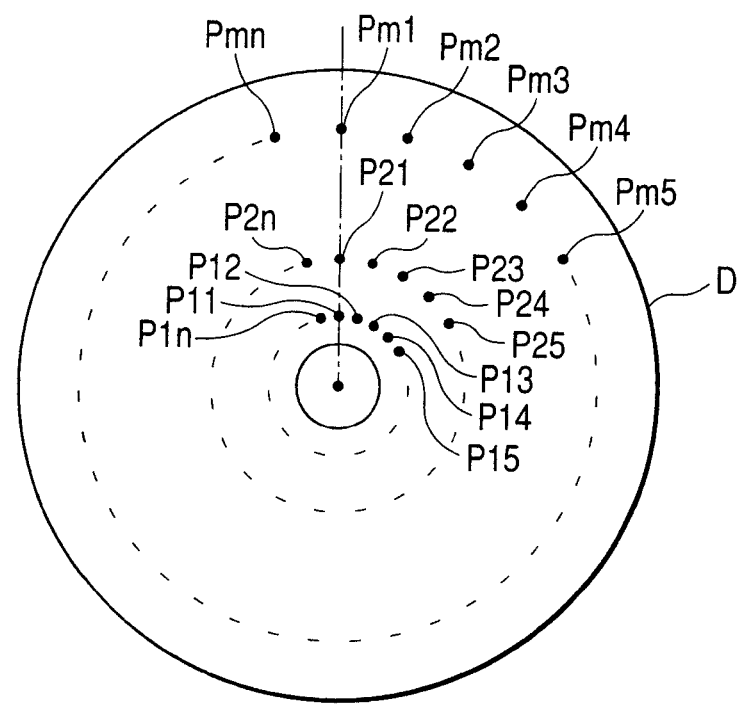
FIG. 4 is a view for illustrating the contents of image data to be used for forming a visible image in a visible image-recording layer of the optical disk by the optical disk recording apparatus.

Image data fed from the host PC 110 and stored in the buffer memory 36 are in turn fed to the FIFO memory 34 through the controlling unit 16 and successively stored therein. Here, the image date stored in the FIFO memory 34, i.e., image data fed from the host PC 110 to the optical disk recording device 100, include the following information. This image data are data for forming a visible image on the side of the disk-shaped optical disk D and, as is shown in FIG. 4, describe information on gradation degree (high or low density) at each of n coordinates (shown by black dots in FIG. 4) on many concentric circles with the center O of the optical disk D being the center. The image data are data which describes information on gradation degree at each of the coordinate points $P11, P12, \ldots, P1n$ on the innermost circle, then each of the coordinate points $P21, P22, \ldots, P2n$ on the circle next to the innermost circle, and thus to each coordinate point $Pmn$ on the outermost circle. Thus, information on the gradation degree of each coordinate in the polar coordinates is fed to the FIFO memory 34 in the above-mentioned order. Additionally, FIG. 4 is a schematic diagram for distinctly showing the positional relation among respective coordinates, and actual coordinates are disposed more thickly than are shown in FIG. 4. Also, in the host PC110, in the case where the image data to be formed on the light-sensitive side of the optical disk D are prepared in the commonly employed bit-map form, it suffices that the bit-map data be converted to the polar coordinate form as described above, and the converted image data be fed from the host PC 110 to the optical disk recording apparatus 100.

Upon forming a visible image in the visible image-forming layer of the optical disk D based on the image data fed as described above, a clock signal for image recording is to be fed the FIFO memory 34 from the PLL circuit 33. The FIFO memory 34 is designed so that it outputs information showing the gradation degree of one coordinate having been first stored to the driving pulse-generating unit 35 every time a clock pulse of the clock signal for image recording is fed thereto.

Figure 5:
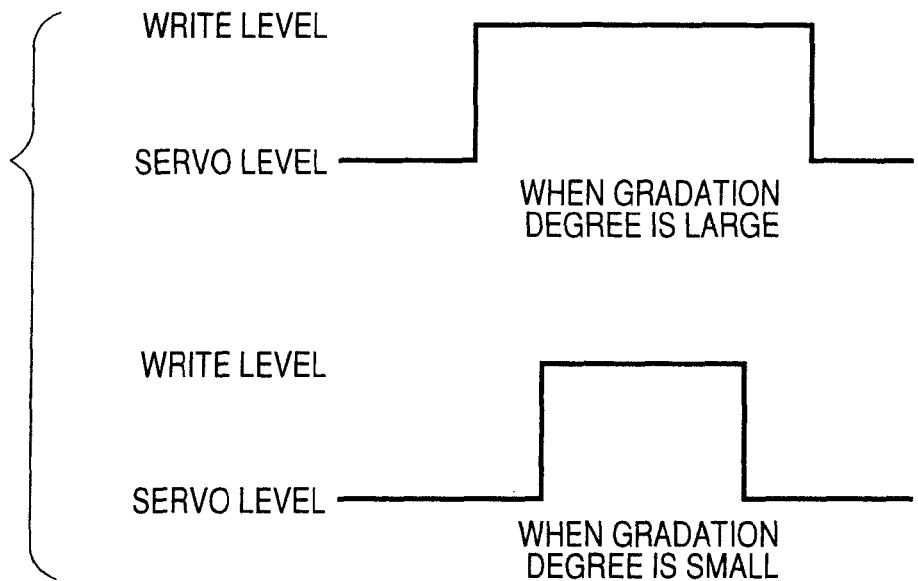
FIG. 5 is a view for illustrating the contents of controlling irradiation with a laser light for expressing high or low density of the image upon formation of the visible image in the visible image-recording layer of the optical disk by the optical disk recording apparatus.

The driving pulse-generating unit 35 generates a driving pulse for controlling irradiation timing of the laser light to be emitted from the optical pickup 10. Here, the driving pulse-generating unit 35 generates a driving pulse with a width in accordance with the information showing gradation degree of each coordinate and fed from the FIFO memory 34. For example, in the case where the gradation degree of a particular coordinate is comparatively large (density being large), it generates a driving pulse having a larger pulse width of a write level (second intensity) as shown in the upper portion of FIG. 5 whereas, with a coordinate having a comparatively small gradation degree, it generates a driving pulse having a smaller pulse width of the write level as shown in the lower portion of FIG. 5. Here, the term "write level" as used herein means a power level which causes a clear change in color of the visible image-recording layer when the optical disk D is irradiated with the laser power of the level. In the case where such driving pulse is fed to the laser driver 19, a laser light at the write level is emitted from the optical pickup 10 for the time in accordance with the pulse width. Therefore, when the gradation degree is large, the laser light at the write level is emitted for a longer period and, thus, a larger region in the unit area of the visible image-recording layer of the optical disk D is to be changed in color. As a result, a user can visually recognize that this region is a region with a larger density. In this embodiment, gradation degree shown by the image data is designed to be expressed by making variable the length of the color-changed region in the unit area (unit length). Additionally, the servo level (first intensity) is a power level which scarcely changes the visible image-recording layer of the optical disk D when the optical disk D is irradiated with the laser power of the level. It suffices that regions which are not required to be changed in color be irradiated with a laser light of the servo level in place of irradiating with a laser light of the write level.

Figure 6:
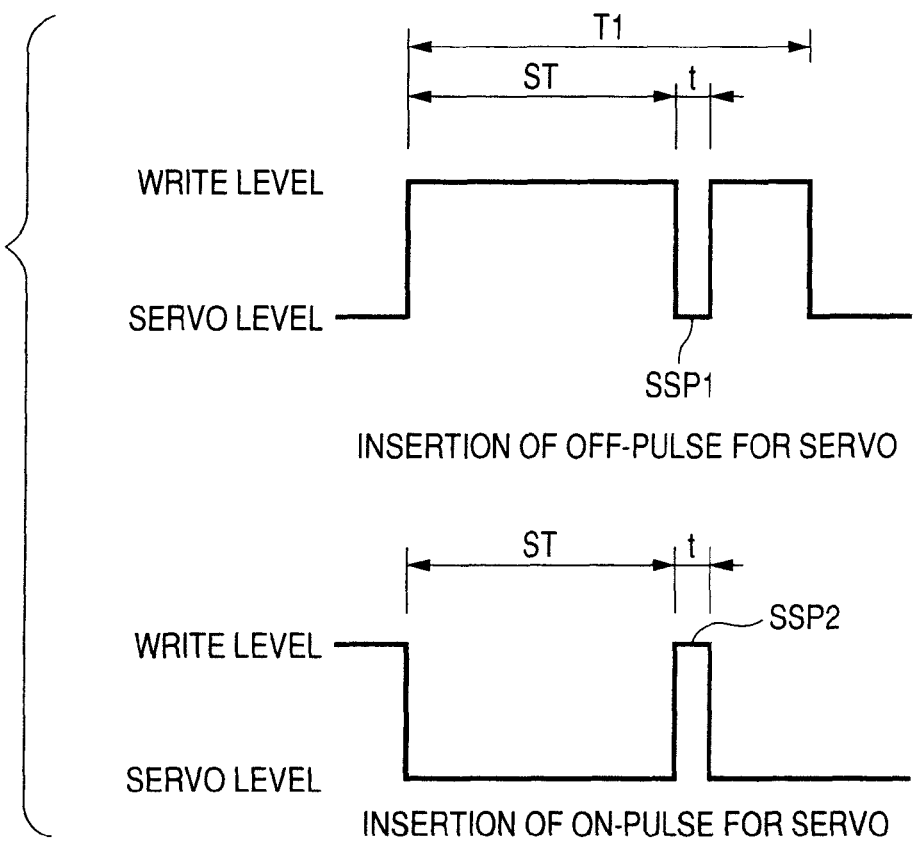
FIG. 6 is a view for illustrating the method of controlling a laser light upon formation of a visible image in the visible image-recording layer of the optical disk by the optical disk recording apparatus.

In addition to generating the driving pulse based on information showing gradation degree of each coordinate, the driving pulse generating unit 35 inserts, if necessary for performing the laser power control by the laser power controlling circuit 20 or performing the focus control and the tracking control by the servo circuit 13, an extremely short-period write level pulse or servo level pulse irrespective of the information showing the gradation degree. For example, as is shown in the upper part of FIG. 6, in the case where it is necessary to irradiate with a write level laser light for a period of T1 for expressing a visible image according to the gradation degree of a particular coordinate in the image data and the period T1 is longer than the given servo period ST for controlling the laser power, an off pulse for servo of an extremely short period t (SSP1) is inserted at the point where the servo period ST is passed from the generation of the write level pulse. On the other hand, as is shown in the lower part of FIG. 6, in the case where it is necessary to irradiate with a servo-level laser light for a period of the servo period ST or longer for expressing a visible image according to the gradation degree of a particular coordinate in the image data, an on pulse for servo (SSP2) is inserted at the point where the servo period ST is passed from the generation of the servo-level pulse.

Figure 7:
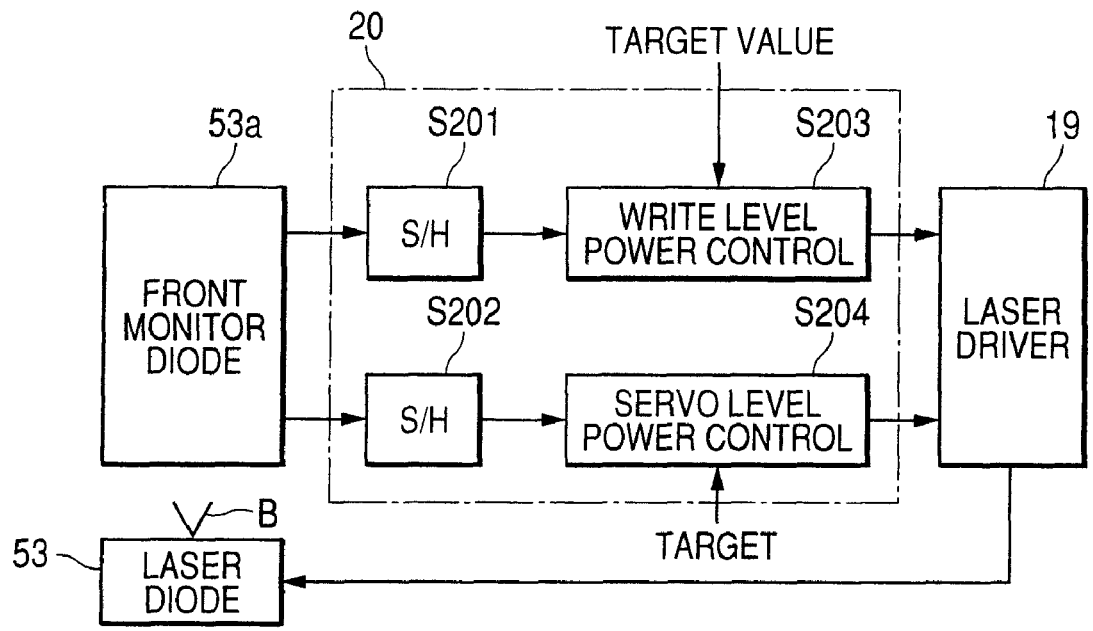
FIG. 7 is a view for illustrating the contents of laser power control by a laser power control circuit which is a constituent of the optical disk recording apparatus.

As has been described hereinbefore, laser power control by the laser power controlling circuit 20 is performed based on the electric current (electric current in accordance with the intensity of the laser light for irradiation) fed from the front monitor diode having been irradiated with the laser light emitted from the laser diode 53 (see FIG. 3) in the optical pickup 10. More specifically, as is shown in FIG. 7, the laser power controlling circuit 20 sample-holds the values (S201, S202) in accordance with the intensity of irradiated laser light received by the front monitor diode 53a. The laser poser control (S203) is conducted so that the laser light of a write level target value fed from the controlling unit 16 based on the result sample-held when irradiation is performed with the write level being the target value, that is, when the write level driving pulse (see FIGS. 5 and 6) is generated. Also, The laser poser control (S204) is conducted so that the laser light of a servo level target value fed from the controlling unit 16 based on the result sample-held when irradiation is performed with the servo level being the target value, that is, when the servo-level driving pulse (see FIGS. 5 and 6) is generated. Therefore, in the case where the write level or servo-level pulse is not continuously outputted for a period longer than the given servo period ST (sampling period), the off pulse SSP1 and the on pulse SSP2 for the servo are forcibly inserted irrespective of the content of the image data to thereby perform the laser power control according to the respective levels.

Figure 8:
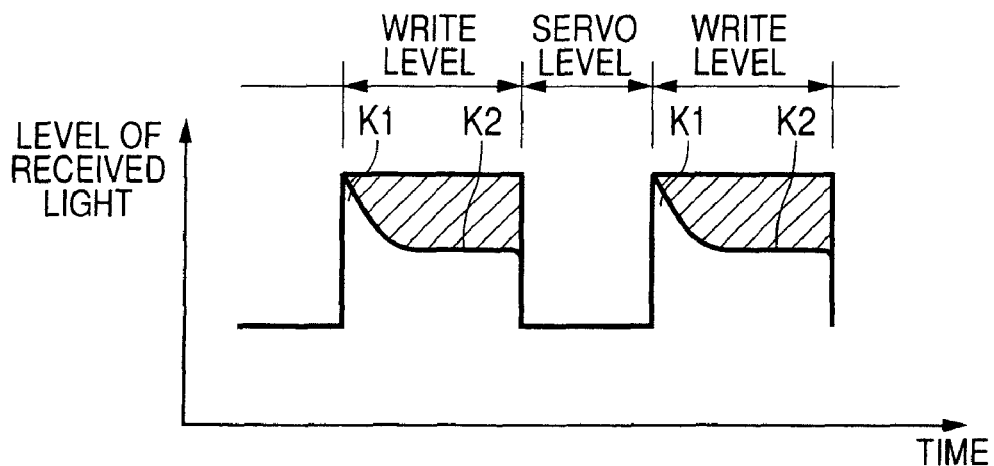
FIG. 8 is a view showing a return light of a laser light emitted to the visible image-recording layer of the optical disk from an optical pickup of the optical disk recording apparatus.

Also, insertion of the off pulse SSP1 for servo as described above is performed not only for controlling the laser power but for performing focus control and tracking control by the servo circuit 13 as well. That is, tracking control and focus control are performed based on the RF signal generated by the light-receiving element 56 (see FIG. 3) in the optical pickup 10, i.e., the reflected light of the laser light emitted from the laser diode 53 reflected from the optical disk D. FIG. 8 shows one example of a signal generated by the light-receiving element 56 upon being irradiated with the laser light. As is shown in FIG. 8, the reflected light upon irradiation of a write level laser light includes a peak portion K1 upon rise of the laser light and a shoulder portion K2 of the subsequent depression to a definite level. The hatched portion in FIG. 8 is considered to express an energy used for changing the color of the visible image-recording layer. This energy used for changing the color of the visible image-recording layer is not necessarily at an always constant level, but is considered to vary depending upon various conditions. Therefore, the shape of the hatched portion is considered to vary depending upon various conditions. That is, the reflected light of the laser light involves many noises and, therefore, a stable reflected light is not always obtained. Hence, employment of this reflected light might prevent accurate focus control and tracking control. Therefore, in the case of irradiation with a write level laser light is continuously performed for a long period, a reflected light of the servo-level laser light cannot be obtained, thus accurate focus control and tracking control not being performed.

Thus, the off pulse SSP1 for servo is inserted as described above to thereby periodically obtain a reflected light of the servo-level laser light and perform the focus control and the tracking control based on the thus-obtained reflected light. Upon forming a visible image in the visible image-recording layer of the optical disk D, it is not necessary to trace along the previously formed pre-grooves (guide grooves) as is different from recording on the recording side. Therefore, in this embodiment, the target value for the tracking control is a fixed value (setting a constant offset voltage). Additionally, such controlling method can be applied not only to the case of forming image information in the visible image-recording layer but to the case of forming image information on the recording side. That is, an image can be formed on the recording side as well as in the visible image-recording layer by using a substance which undergoes change in not only reflectance but coloration upon being irradiated with a laser light in the recording side (recording layer 202). When a visible image is formed on the recording side as described above, data recording cannot naturally be conducted in the visible image-formed portion, and hence it is preferred to previously separate an area for recording data from an area for forming a visible image.

Additionally, the period of inserting the off pulse SSP1 for servo or the on pulse SSP2 for servo is preferably as short as possible within the range of not causing troubles in performing various servo controls such as laser power control, tracking control and focus control. The various servo controls can be performed with almost no influences on a visible image to be formed by extremely shortening the insertion period.

Figure 9:
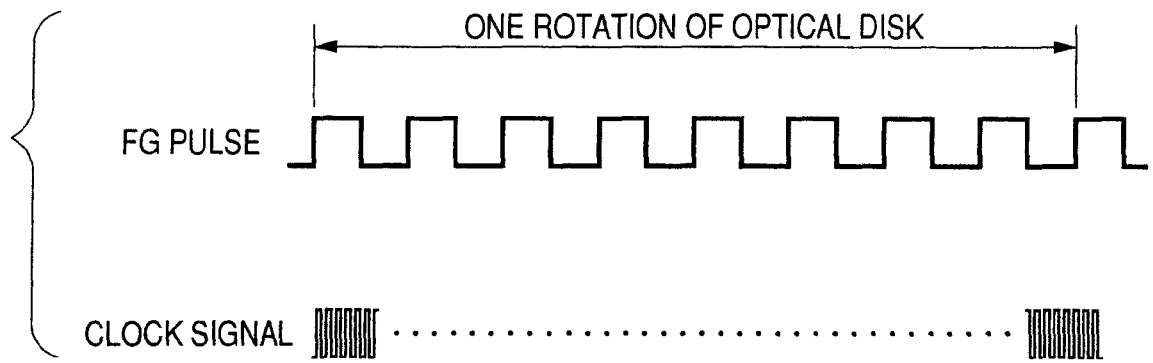
FIG. 9 is a view showing FG pulses generated by a frequency generator 21 which is a constituent of the optical disk recording apparatus in accordance with the amount of rotation of a spindle motor and a clock signal generated based on the FG pulses.

Getting back to FIG. 2, the PLL circuit (signal-outputting means) multiplies the FG pulse signal having the frequency in accordance with the rotation speed of the spindle motor 11 and fed from the frequency generator 21 and output a clock signal described hereinafter to be used for forming the visible image. The frequency generator 21 outputs the FG pulse signal having the frequency in accordance with the rotation number of the spindle mortar utilizing the counter-electromotive current obtained by the motor driver of the spindle motor 11. For example, in the case where the frequency generator 21 generates 8 FG pulses per one rotation of the spindle motor 11, i.e., per one rotation of the optical disk D as is shown in the upper part of FIG. 9, the PLL circuit 33 outputs a clock signal obtained by multiplying the FG pulses as shown in the lower part of FIG. 9 (for example, a frequency 5 times as much as the FG pulse signal; 40 pulses of H level per rotation of the optical disk D). That is, the PLLO circuit 33 outputs a clock signal of a frequency in accordance with the rotation speed of the optical disk D rotated by the spindle motor 11. The clock signal obtained by multiplying the FG pulse signal is outputted from the PLL circuit 33 to the FIFO memory 34, and the FIFO memory 34 in turn outputs data showing the gradation degree of one coordinate to the driving pulse generating unit 35 every period of the clock signal, i.e., every time the disk D is rotated with a definite angle. Additionally, though it is possible to generate a clock signal by multiplying the FG pulses by using the PLL circuit 33 as described above but, in the case where a motor having a sufficiently stable rotating ability is used as the spindle motor 11, it may also be possible to provide a quartz oscillator in place of the PLL circuit 33 and generate a clock signal obtained by multiplying the FG pulses, i.e., a clock signal of the frequency in accordance with the rotation speed of the optical disk D.

The stepping motor 30 is a motor for moving the optical pickup 10 in the diameter direction of the optical disk D mounted on the optical disk recording apparatus 100. The motor driver 31 rotates the stepping motor 30 in a degree in accordance with a pulse signal fed from the motor controller 32. The motor controller 32 generates the pulse signal in accordance with the migration amount and migration direction according to the order of migration-initiating order from the controlling unit 16 including the migration direction migration amount in the diameter direction of the optical pickup 10, and outputs the pulse signal to the motor driver 31. The laser light irradiation position of the optical pickup 10 can be moved to various positions of the optical disk D by moving the optical pickup 10 in the diameter direction of the optical disk D through the stepping motor 30 and by rotating the optical disk D through spindle motor 11. These constituents constitute the irradiation position-adjusting means.

The controlling unit 16 comprises CPU (Central Processing Unit), ROM (Read Only Memory) and RAM (Random Access Memory), and is constituted so that it controls every section in the optical disk recording apparatus according to the program contained in the ROM and centrally controls the processing for recording on the recording side of the optical disk D and processing for forming an image in the visible image-recording layer of the optical disk D. The above-described constitution is the constitution of the optical disk recording apparatus 100 of this embodiment.

B. OPERATION OF THE EMBODIMENT

Figure 10:
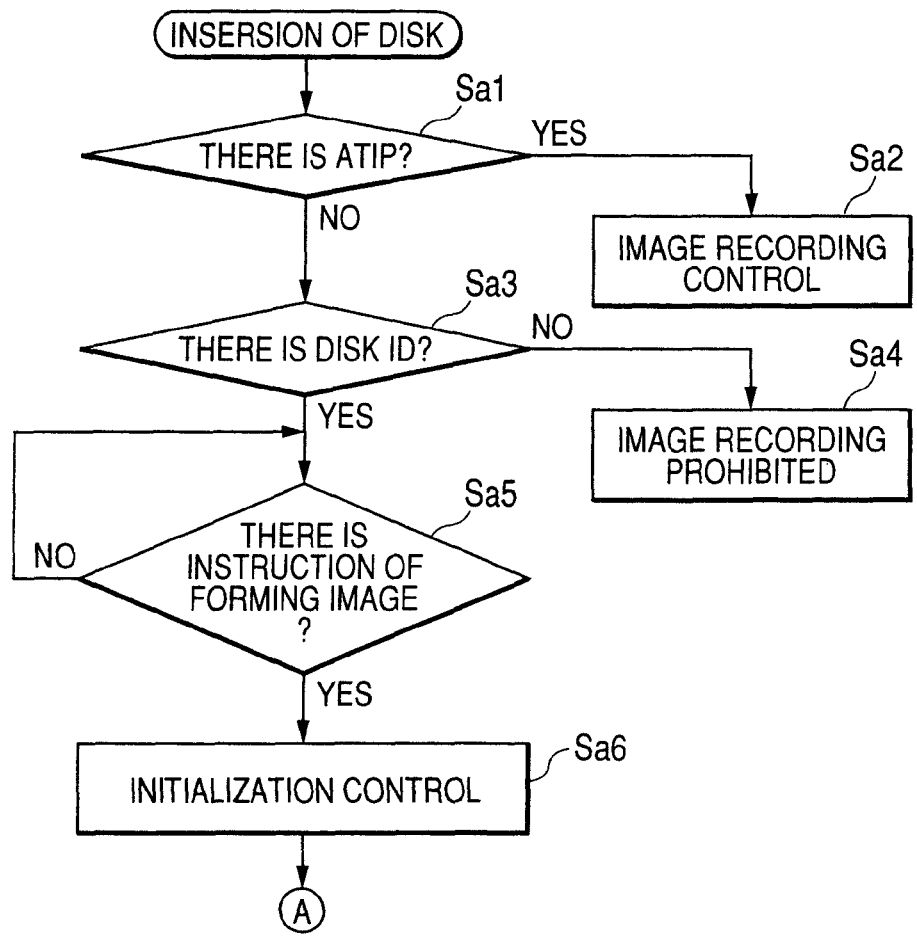
FIG. 10 is a flow chart for illustrating operation of the optical disk recording apparatus.

Next, operation of the optical disk recording apparatus 100 having the above-mentioned constitution will be described below. As has been described hereinbefore, this optical disk recording apparatus 100 is constituted so that information of music data or the like fed from the host PC 110 can be recorded on the recording side of the optical disk D and that a visible image in accordance with image data fed from the host PC 110 can be formed in the visible image-recording layer of the optical disk D. Hereinafter, operation of the optical disk recording apparatus 100 capable of performing such processing as recording of information and formation of a visible image will be described below by reference to FIGS. 10 and 11.

First, when the optical disk D is mounted on the optical disk recording apparatus 100, the controlling unit 16 controls the optical pickup 10 to detect whether ATIP (Absolute Time In Pre-groove) is recorded on the side of the optical disk D facing the optical pickup 10 (step Sa1). As is well known, the ATIP information is an information previously recorded on pre-grooves formed on the recording side of CD-R, and it is seen that, in the case where the ATIP information is recorded as described above, the optical disk D is mounted so that its recording side faces the optical pickup 10. On the other hand, it is seen that, in the case where no ATIP information is recorded, the optical disk D is mounted so that its visible image-recording layer faces the optical pickup 10. That is, the controlling unit 16 detects which side of the mounted optical disk D faces the optical pickup 10 by detecting presence or absence of the ATIP information as described above. Additionally, in addition to the method of detecting which side of the mounted optical disk D faces the optical pickup 10 by detecting presence or absence of the ATIP information as described above, there may be employed other methods such as a method of detecting which side of the mounted optical disk D faces the optical pickup 10 in accordance with the servo contents upon performing focus servo. That is, since the distance between the optical pickup and the side of the optical disk D facing the optical pickup largely differs depending upon which side of the optical disk D faces the optical pickup 10, this difference in distance appears as difference in the controlling amount upon performing focus servo. Thus, this difference in distance enables to detect which side of the mounted optical disk D faces the optical pickup 10.

Here, in the case where the ATIP information is detected from the mounted optical disk, the controlling unit 16 judges that the optical disk D is mounted so that the recording side thereof faces the optical pickup 10 and performs controlling for recording on the recording side of the optical disk D recording data fed from the host PC 110 (step Sa2). Since this controlling performed for recording the recording data is the same as is employed for a conventional optical disk recording apparatus (CD-R driving apparatus), its description is omitted.

Figure 12:
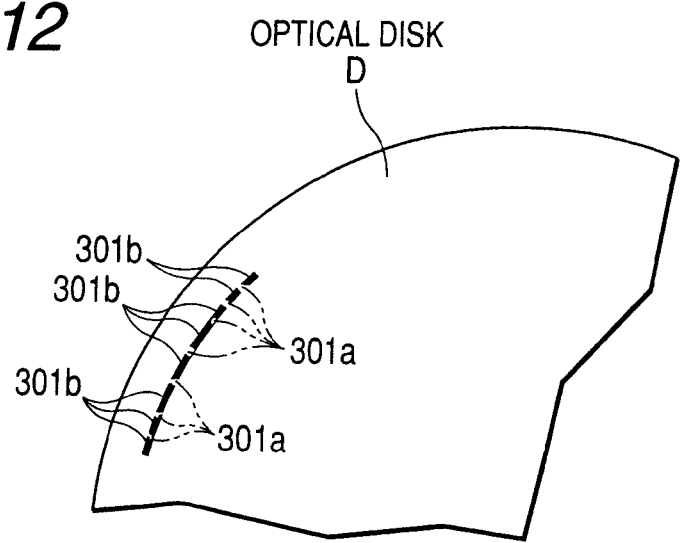
FIG. 12 is a view showing a disk ID recorded in the visible image-recording layer of the optical disk.

On the other hand, in the case where no ATIP information is detected from the mounted optical disk D, the controlling unit 16 judges that the optical disk D is mounted so that the visible image-recording layer thereof faces the optical pickup 10, and judges whether disk ID of the mounted optical disk K can be obtained or not (step Sa3). In this embodiment, the disk ID of the optical disk D is a disk ID recorded in the visible image-recording layer of an optical disk D (see FIG. 1) having both the recording side and the visible image-recording layer. For example, as is shown in FIG. 12, a visible image in accordance with information on coded disk ID is described along the periphery of the outermost portion of the visible image-recording layer side of the optical disk D. In this embodiment, as is shown in FIG. 12, a reflection area 301*a* and a non-reflection area 301*b* each having a length in accordance with the code are formed along the periphery of the outermost portion to describe the disk ID in the visible image-recording layer of the optical disk D. The controlling unit 16 traces the irradiation position of the laser light from the optical pickup 10 along the periphery of the outermost portion of the optical disk D to obtain the disk ID based on the reflected light.

Therefore, in the case where such reflection area 301*a* and non-reflection area 301*b* in accordance with the disk ID are not formed in the outermost peripheral portion of the visible image-recording layer, the optical disk D can be judged to be a common optical disk (CD-R or the like) not having such visible image-recording layer. In the case where no disk ID can be obtained as described above, the controlling unit 16 judges that the optical disk D is an optical disk wherein a visible image can not be formed (step Sa4), and performs a processing of noticing the fact to a user.

On the other hand, in the case where disk ID can be obtained from the optical disk D, the controlling unit waits till an order of forming an image including image data is fed from the host PC 110 (step Sa5) and, upon the order of forming the image being fed, performs initialization for forming the visible image in the visible image-recording layer of the optical disk D (step Sa6). More specifically, the controlling unit 16 controls the servo circuit 13 so that the spindle motor 11 is rotated with a predetermined angular velocity, or feed an order of moving the optical pickup 10 to the initial position of the innermost circumferential side in the diameter direction of the optical disk D to the motor controller 32 to thereby drive the stepping motor 30.

Also, in the controlling of initialization for forming an image, the controlling unit 16 gives the servo circuit 13 a focus control target value which corresponds to irradiation of the visible image-recording layer of the optical disk D with a laser light having a larger beam spot than in performing information recording on the recording side.

A more detail description on the content of focus control upon giving the target value as described above is as follows. As has been described hereinbefore, the focus control by the servo circuit 13 is performed based on the signal outputted from the light-receiving element 56 of the optical pickup 10. Upon recording information on the recording side of the optical disk D, the servo circuit 13 drives the focus actuator 64 (see FIG. 3) so that a circular return light (A in FIG. 13) is received in the center of the four areas 56*a*, 56*b*, 56*c* and 56*d* in the light-receiving element 56 shown in FIG. 13. That is, it drives the focus actuator 64 so that (a+c)−(b+d) becomes 0 wherein a, b, c and d represent the amounts of light received by areas 56*a*, 56*b*, 56*c* and 56*d*, respectively.

Figure 13:
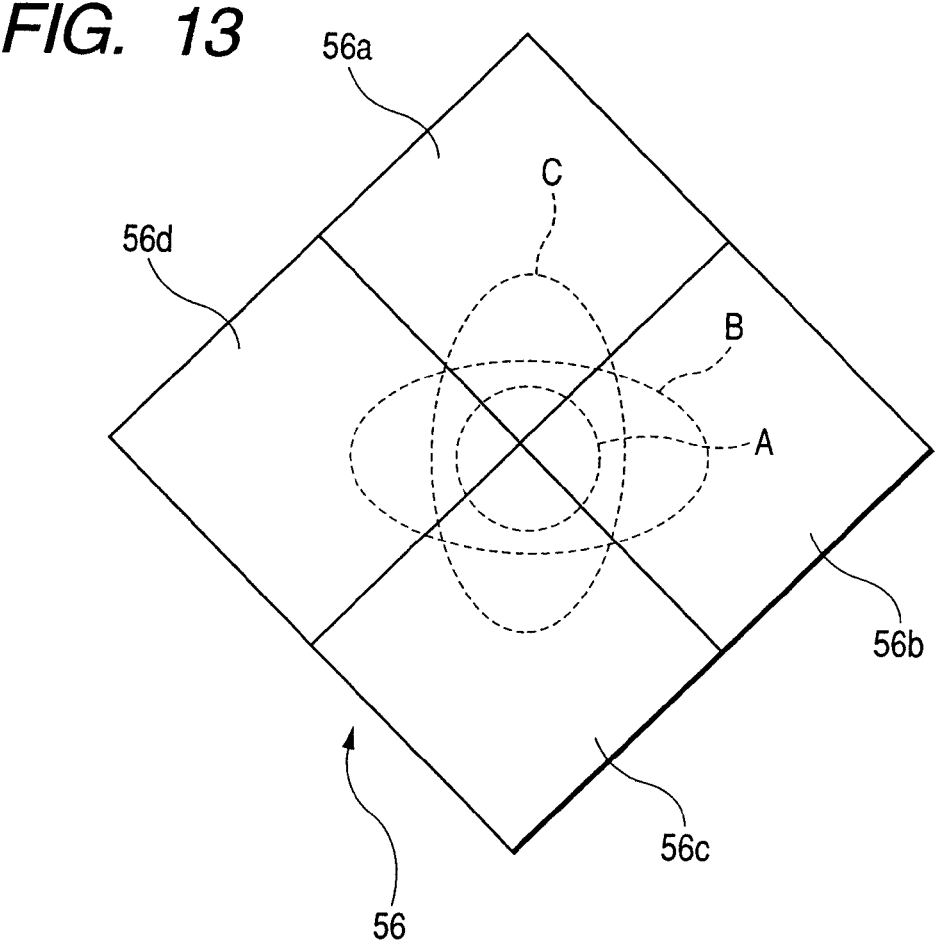
FIG. 13 is a view showing the shape of a return light of a laser light received by a light-receiving element in the optical pickup of the optical disk recording apparatus.

On the other hand, in the case of forming a visible image in the visible image-recording layer of the optical disk D, the focus control is conducted so that the visible image-recording layer is irradiated with a laser light having a larger diameter than is employed upon recording information on the recording side as described above. In the case where the shape of the reflected light received by the light-receiving element 56 shown in FIG. 13 is elliptical (B or C in FIG. 13), the spot size of the laser light is larger than in the case of the circular shape A described above. Hence, the servo circuit 13 drives the focus actuator 64 so that such elliptical return light can be received by the light-receiving element 56. That is, the focus actuator 64 is driven so as to satisfy (a+c)−(b+d)=$\alpha$ ($\alpha \neq 0$). Therefore, in this embodiment, the controlling unit 16 and the servo circuit 13 constitute the beam spot-controlling means.

As is described above, the visible image-recording layer of the optical disk D can be irradiated with a laser light having a larger spot size than the size upon recording information on the recording side by giving $\alpha$ ($\neq 0$) to the servo circuit 13 from the controlling unit 16 in the initialization control for forming the visible image. To irradiate the visible image-recording layer of the optical disk D upon formation of a visible image in the visible image-recording layer with a laser light having a larger spot size than the size upon recording information on the recording side of the optical disk D provides the following advantages. That is, in this embodiment, the optical disk D is to be irradiated with a laser light while the disk is rotated upon forming a visible image as well as upon performing recording information on the recording layer. Therefore, to employ a laser light having a larger beam spot permits formation of a visible image in all areas of the visible image-forming layer of the optical disk D in a shorter time. The reason for this is described below by reference to FIG. 14. As is schematically shown in FIG. 14, comparison of the case where the beam spot diameter BS of a laser light is larger with the case where the beam spot diameter of the laser light is smaller reveals that the larger beam spot diameter BS provides a larger area where the image is to be formed while the optical disk D makes one rotation. Therefore, in the case where the beam spot diameter of the laser light is smaller, the optical disk D must make more rotations in order to irradiate the whole area for forming the visible image (in the example shown in FIG. 14, 4 rotations with the larger spot size, and 6 rotations with the smaller spot size), which requires a longer time for forming the visible image. From the above-mentioned reason, in this optical disk recording apparatus, the visible image-recording layer of the optical disk D is to be irradiated with a laser light having a larger spot diameter than the size upon recording information.

Also, in the initialization control for forming an image, the controlling unit 16 instructs the laser power controlling circuit 20 with each-level target value so that a laser light of the write level or the servo level can be emitted from the optical pickup 10 in accordance with the obtained disk ID. That is, in the ROM of the controlling unit 16, target values to be set as the write level and the servo level for each of the plural kinds of disk IDs are recorded, and the controlling unit 16 reads out the target values of the write level and the servo level in accordance with the obtained disk ID and instructs the laser power controlling circuit 20 with these target values.

It is based on the following reason to set target values of power in accordance with the disk ID as described above. That is, characteristic properties of the dye contained in the visible image-recording layer are considered to vary depending upon kind of the optical disk D, and the variation in the characteristic properties naturally leads to difference in the power of an emitted laser light to cause change in color. Therefore, even when a visible image-recording layer of a certain optical disk D can be enough changed in color in the laser light-irradiated area by irradiating the visible image-recording layer with a laser light of a certain write level, it does not necessarily mean that other optical disk D can also be changed in color in the laser light-irradiated area by irradiating the visible image-recording layer with a laser light of the same write level. Therefore, in this embodiment, the target levels of the write level and the servo level which permit accurate image formation have previously been determined by experiments with respect to each optical disk in accordance with varying disk ID, and the thus-determined target values are stored in ROM correspondingly to respective disk IDs, which serves to perform optimal power control correspondingly to the characteristic properties of the visible image-recording layer of the varying optical disk D.

Figure 11:
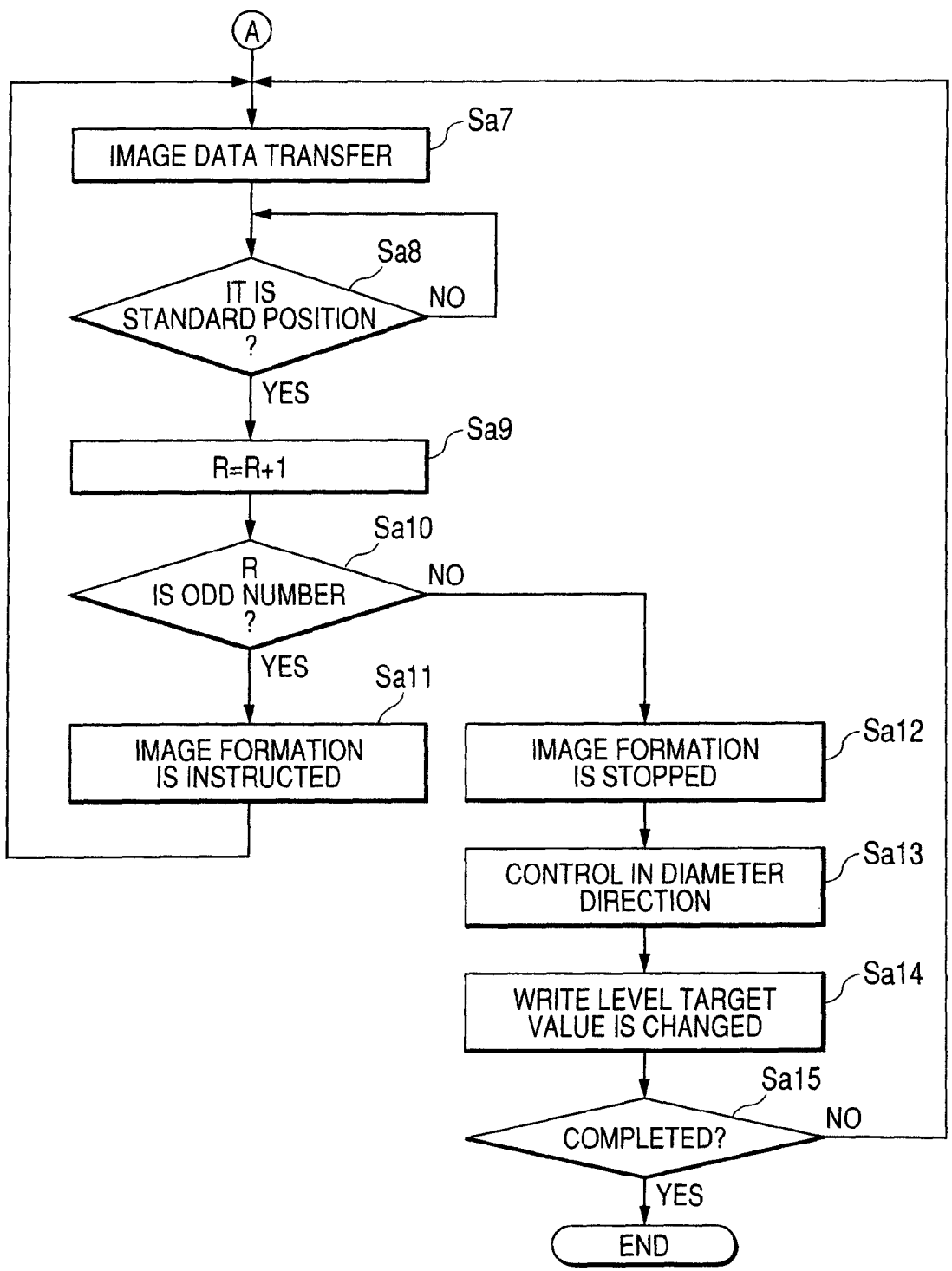
FIG. 11 is a flow chart for illustrating operation of the optical disk recording apparatus.

Subsequent to the above-described initialization control performed by the controlling unit 16, processing for actually forming a visible image in the visible image-recording layer of the optical disk D starts. As is shown in FIG. 11, first, the controlling unit 16 sends image data fed from the host PC110 via the buffer memory 36 to the FIFO memory 34 (step Sa7). The controlling unit 16 then judges, based on the FG pulse signal fed from the frequency generator 21, whether the given standard position of the optical disk D rotated by the spindle motor 11 has passed the laser light radiation position of the optical pickup 10 or not (step Sa8).

Figure 15:
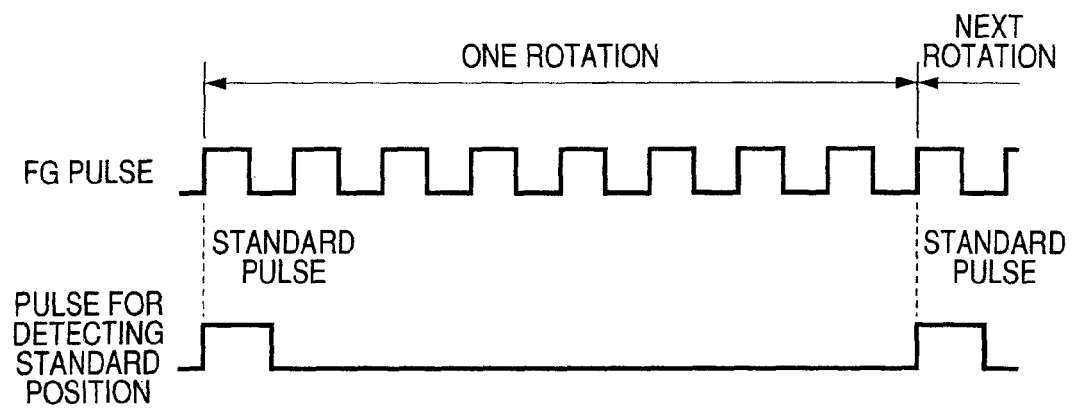
FIG. 15 is a view for illustrating the method of detecting that the laser light irradiation position of the optical disk recording apparatus has passed the standard position of the optical disk.
Figure 16:
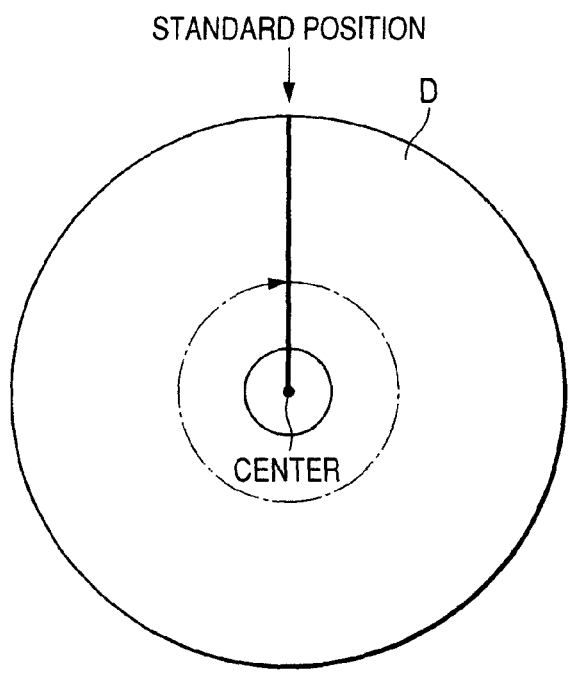
FIG. 16 is a view for illustrating the method of detecting that the laser light irradiation position of the optical disk recording apparatus has passed the standard position of the optical disk.

Here, the method of detecting the given standard position and whether the laser light irradiation position has passed the position or not will be described below by reference to FIGS. 15 and 16. As is shown in FIG. 15, the frequency generator 21 outputs a given number (8 in the shown example) of FG pulses while the spindle motor 11 makes one rotation, i.e., while the optical disk D makes one rotation. Therefore, the controlling unit 16 outputs a pulse for detecting the standard position with synchronizing the rising timing with one of the FG pulses fed from the frequency generator 21, and then generates a pulse signal for detecting the standard position for outputting a pulse for detecting the standard position in synchronicity with the rising timing of a pulse in accordance with one rotation from the standard position-detecting pulse (an $8^{th}$ pulse). Thus, the time when the pulse is generated can be detected as the time when the laser irradiation position of the optical pickup 10 passes the standard position of the optical disk D by generating such pulse for detecting the standard position. That is, as is shown in FIG. 16 wherein the laser irradiation position of the optical pickup 10 at the timing when the first pulse for detecting the standard position is generated is on the thick line (since the optical pickup 10 can move in the diameter direction, the possible irradiation position is represented as a line), the laser light irradiation position of the optical pickup 10 at the time when the standard position-detecting pulse is generated after one rotation is also naturally on the thick line in FIG. 16. Thus, the line in the diameter direction to which the irradiation position of the laser light belongs at the timing when the first pulse for detecting the standard position has been generated forms the standard position, and the controlling unit 16 can detect that the irradiation position of the laser light has passes the standard position of the optical disk D based on the signal for detecting the standard position which is generated every time the optical disk D makes one rotation. Additionally, the dot-and-dash line in FIG. 16 shows one example of a locus of movement of irradiation position of the laser light from generation of a pulse for detecting a certain standard position to generation of a next pulse for detecting the standard position.

When it is detected, after instruction of image formation from the host PC 110, that the standard position of the optical disk D has passed the irradiation position of the laser light in the above-described manner, the controlling unit 16 increments a variable R showing the rotation number by 1 (step Sa9) and judges whether R is an odd number or not. (step Sa10).

Figure 17:
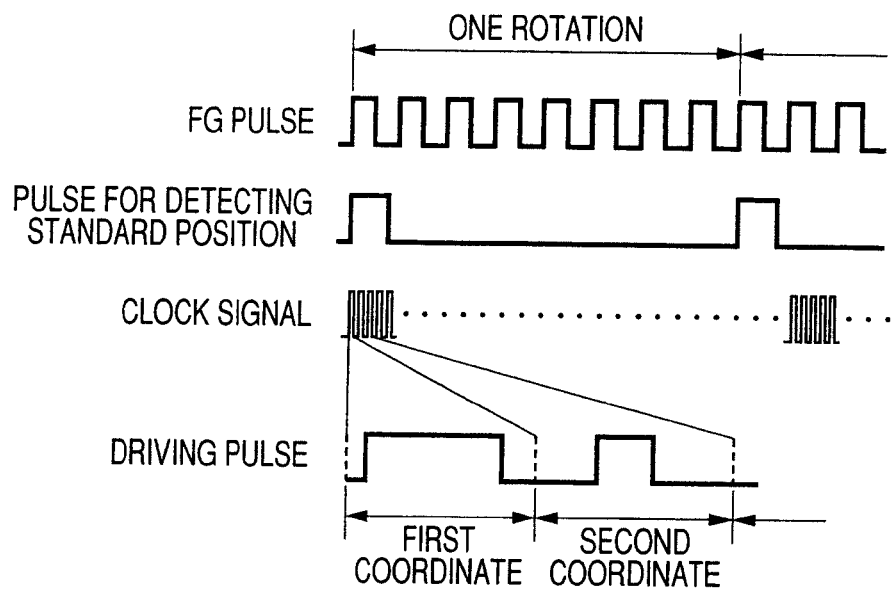
FIG. 17 is a timing chart for illustrating operation of the optical disk recording apparatus upon formation of a visible image by irradiating the visible image-recording layer of the optical disk with a laser light.

Here, when it is detected after instruction of image formation that the irradiation position of the optical disk D has passed the standard position for the first time, R=0 (initial value)+1=1. In this case, R is to be judged as an odd number in the step Sa10. In the case where R is judged as an odd number, the controlling unit 16 performs controlling for forming a visible image by emitting a laser light from the optical pickup 10 toward the visible image-recording layer of the optical disk D (step Sa11). More specifically, the controlling unit 16 initiates controlling of the respective constituents upon receiving the above-mentioned pulse for detecting the standard position so that image data are successively outputted in synchronicity with the clock signal outputted from the PLL circuit 33. As is shown in FIG. 17, as a result of this control, the FIFO memory 34 outputs information showing the gradation degree of one coordinate to the driving pulse generating unit 35 every time a clock pulse is fed from the PLL circuit 33, and the driving pulse generating unit 35 generates a driving pulse having a pulse width in accordance with the gradation degree shown by the information and outputs the pulse to the laser driver 19. As a result, the optical pickup 10 emits the write level laser light to the visible image-recording layer of the optical disk D for a period in accordance with the gradation degree of each coordinate to change the color of the irradiated area, thus a visible image shown in FIG. 18 being formed.

Figure 18:
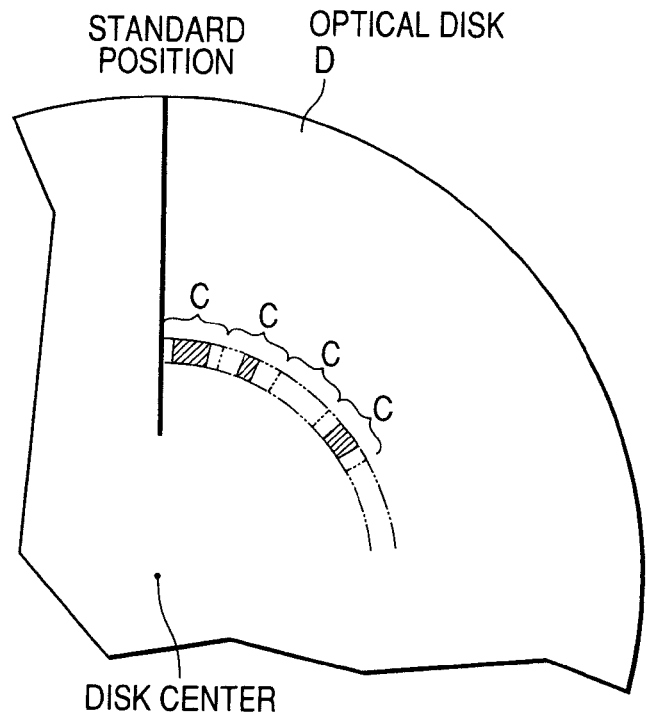
FIG. 18 is a view showing a visible image-recording layer of the optical disk having been irradiated with a laser light by the optical disk recording apparatus.

As is schematically shown in FIG. 18, since the optical disk D is rotated by the spindle motor 11, the irradiation position of the laser light from the optical pickup 10 moves along the circumference by the area shown by C in FIG. 18 during one period of the clock signal (a term from the rising timing of the pulse to the next pulse-rising timing). Each of the areas can be changed in color with a varying area according to the gradation degree which is different among respective areas C. Thus, a visible image according to image data can be formed in the visible image-recording layer of the optical disk D by controlling the time of irradiation with the write level laser light upon passing each area C according to the gradation degree of each coordinate.

When controlling for performing formation of a visible image by irradiating with a laser light controlled according to the image data has been performed, the processing in the controlling unit 16 goes back to the step Sa7, and the controlling unit 16 sends image data fed from the buffer memory 36 to the FIFO memory 34. Then, it is detected whether the laser light irradiation position of the optical pickup 10 has passed the standard position on the optical disk D or not and, in the case where it is detected that the standard position has been passed, the controlling unit 16 increments R by 1. As a result, in the case where R becomes an even number, the controlling unit 16 controls respective constituents so that formation of the visible image by controlling irradiation with the laser light as described above is discontinued (step a12). More specifically, the controlling unit 16 controls the FIFO memory 34 not to output information showing the gradation degree of each coordinate in synchronicity with the clock signal fed from the PLL circuit 33. That is, the controlling unit 16 controls so that, after formation of the visible image by irradiating the visible image-recording layer of the optical disk D with the write level laser light, irradiation with the laser light for changing the color of the visible image-forming layer is not conducted while the optical disk D makes another rotation.

When the controlling unit 16 instructs to discontinue irradiation with a laser light for forming the visible image, it then instructs the motor controller 32 to move the optical pickup 10 by a given amount in the diameter direction toward the outer circumference side (step Sa13), and the motor controller 32 drives the stepping motor 30 via the motor driver 31 according to the instruction, thus the optical pickup 10 being moved by a given amount toward the outer circumference side.

Here, the given amount of movement of the optical pickup 10 in the diameter direction of the optical disk D may properly be decided depending upon the beam spot diameter (see FIG. 14) irradiated from the optical pickup 10 as has been described hereinbefore. That is, upon forming a visible image in the visible image-recording layer of the disk-shaped optical disk D, it is necessary to move the laser light irradiation position of the optical pickup 10 on the surface of the optical disk D with almost no gap for forming an image with higher quality. Therefore, irradiation with the laser light with almost no gap can be performed on the surface of the optical disk D by setting the unit migration amount of the optical pickup 10 in the diameter direction to be about the same amount of length of the beam spot diameter of the laser light to be emitted toward the optical disk D, whereby an image with higher quality being formed. Additionally, in some cases, coloration might occur in a larger area than the irradiated beam spot diameter due to various causes including properties of the visible image-forming layer. In such case, it suffices to determine the unit migration amount so that adjacent coloration areas do not overlap each other in consideration of the width of coloration. In this embodiment, since the beam spot diameter BS is made larger than in recording on the recording side (for example, about 20 μm), the controlling unit 16 controls the motor controller 32 so that the optical pickup 10 is moved by the stepping motor 30 in the diameter direction by the amount of length about the same as the beam spot diameter. Additionally, a recent-year stepping motor 30 can control the migration amount by 10-μm unit utilizing μ-step technology, and thus it is sufficiently realizable to move the optical pickup 10 in the diameter direction by 20-μm unit using the stepping motor 30.

After performing controlling of moving the optical pickup 10 in the diameter direction by a given amount as described above, the controlling unit 16 instructs the laser power controlling circuit 20 with a target write level value to be targeted upon irradiation with the laser light at the write level in order to change the target write level value of the laser light (step Sa14). Since this embodiment employs CAV system of irradiating with a laser light while rotating the optical disk D at a constant angular velocity as a system for forming a visible image, the linear velocity becomes larger as the optical pickup 10 is moved toward the outer circumference side as described above. Therefore, when the optical pickup 10 is moved in the diameter direction (toward the outer circumference side), the target value of the write level is to be changed to a higher level than before to thereby irradiate with a laser light having an enough laser power to change the color of the visible image-recording layer of the optical disk D even when the linear velocity is changed.

After performing the movement control of the optical pickup 10 in the diameter direction and the control of changing the target value of the write level, the controlling unit 16 judges whether there exist non-processed image data for forming a visible image or not, i.e., whether there exist image data not having been fed to the driving pulse generating unit 35 and, if there exist no such image data, it finishes the processing.

On the other hand, in the case where there exist non-processed image data not having been fed to the motor controller 32, the processing goes back to the step Sa7 to continue processing for forming a visible image. That is, image data are send from the controlling unit 16 to the FIFO memory 34 (step Sa7), and it is judged whether the laser light irradiation position has passed the standard position on the optical disk D (step Sa8). And, upon passing the standard position, the variable R showing the rotation number is incremented by 1 (step Sa9), and it is judged whether the incremented R is an odd number or not (step Sa10). Here, in the case where R is an odd number, the controlling unit 16 controls the respective constituents so that irradiation with a laser light is performed for forming a visible image as described above and, in the case where R is an even number, irradiation with a laser light for forming the visible image is discontinued (irradiating with a servo level laser light) and movement control of the optical pickup 10 in the diameter direction and control of changing the target value of the write level are performed. That is, in the case of performing irradiation of the optical disk D with a laser light (including a write level) during a certain rotation, the controlling unit 16 controls so that irradiation with the laser light for forming the image is not conducted in the next rotation, during which it performs movement control of the optical pickup 10 in the diameter direction. Thus, image formation is not performed while irradiation position or power value of the laser light to be emitted vary and, after the irradiation position and the intensity of the laser light become stable, irradiation with the laser light can be performed for forming an image by performing the movement control of the optical pickup 10 and the control of changing the target level of write level during the rotation wherein image formation is not performed. Hence, deterioration of the formed visible image due to the movement control of the optical pickup 10 in the diameter direction as described above can be suppressed.

What has been described is the main operation of the optical disk recording apparatus 100 in accordance with the embodiment. The optical disk recording apparatus 100 enables one to form a visible image in accordance with image data by irradiating a visible image-recording layer of the optical disk D having provided thereon the visible image-recording layer with the laser light without mounting an additional printing means utilizing the respective components of the apparatus such as the optical pickup 10 to be used for recording information on the recording side as much as possible.

In this embodiment, since laser light-irradiating timing is controlled based on the clock signal generated by using the FG pulse generated in accordance with rotation of the spindle motor 11, i.e., the clock signal generated in accordance with the rotation amount of the optical disk D, the optical disk recording apparatus 100 can recognize the laser light irradiation position without obtaining positional information from the side of the optical disk D. Therefore, the optical disk recording apparatus 100 eliminates the necessity of using an optical disk D having been subjected to special processing such as formation of pre-grooves (guide grooves) in the visible image-recording layer and permits formation of a visible image in accordance with image data in a visible image-recording layer wherein pre-groove or positional information is not previously formed.

C. MODIFIED EXAMPLE

Additionally, the invention is not limited only to the above-mentioned embodiment, and various modifications thereof as illustrated below are possible.

Modified Example 1

Figure 19:
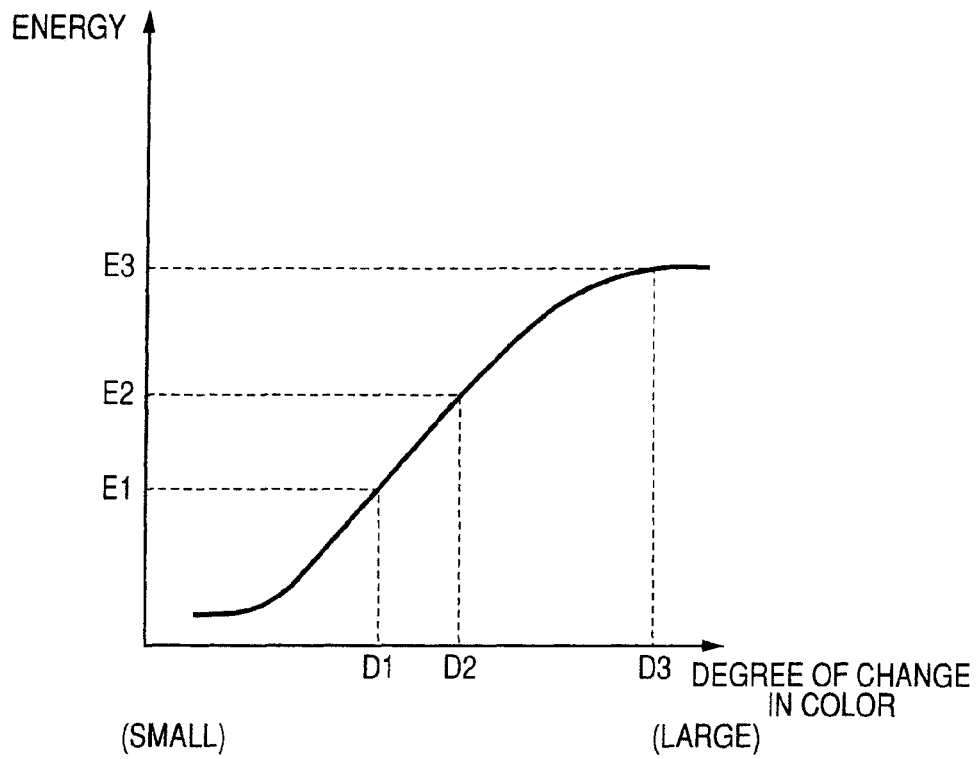
FIG. 19 is a view for illustrating the method of expressing high or low density of a visible image formed in the optical image-recording layer of the optical disk by the optical disk recording apparatus.

While high or low density of a visible image to be formed in the visible image-recording layer of the optical disk D is expressed in the above-mentioned embodiment by controlling the time of irradiating with the laser light in accordance with the gradation degree of each coordinate included in the image data in accordance with the visible image fed from the host PC 110, high or low density of a visible image may also be expressed by changing write level of the laser power irradiated in accordance with information showing gradation degree of each coordinate. For example, when the visible image-forming layer of the optical disk D has such characteristic properties that degree of change in color gradually changes in accordance with the amount of thermal energy to be applied thereto as is shown in FIG. 19, the degree of change in color will change like D1, D2 or D3 by applying thereto a varying energy of E1, E2 or E3. Therefore, with the optical disk D having formed therein the visible image-forming layer of such characteristic properties, each coordinate position in the optical disk D can be changed in color in accordance with the gradation degree by changing the write level of the laser light to be irradiated in accordance with the gradation degree of each coordinate shown by the image data, thus high or low density being expressed.

Figure 20:
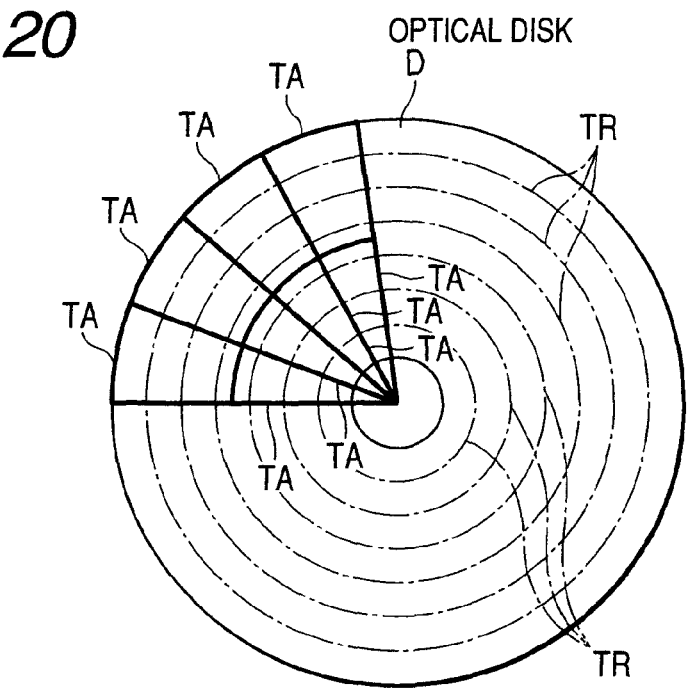
FIG. 20 is a view for illustrating the method of expressing high or low density of a visible image formed in the optical image-recording layer of the optical disk by the optical disk recording apparatus.

In addition to the method of changing the write level in accordance with gradation degree as described above, high or low density of a visible image to be formed in the visible image-forming layer of the optical disk D can be expressed by treating a plurality of adjacent coordinates to be described below as one unit area for expressing the gradation degree and controlling the laser light-irradiating time for each of the plural coordinates belonging to the unit area with reference to each other. More specifically, as is schematically shown in FIG. 20, in the optical disk recording apparatus 100 of this embodiment, the laser light irradiation position of the optical pickup 10 is relatively moved plural times along the circumferential routes TRs shown in FIG. 20 (shown by dot-and-dash lines), and the power value of the laser light is properly changed between the write level and the servo level in accordance with the image data during the movement, thus a visible image being formed.

In this modified example, fan-shaped areas formed by dividing the optical disk D into plural portions and including a given number (3 in the shown example) of the circumferential routes TRs are taken as unit areas TAs (shown by thick lines in FIG. 20), and the irradiation timing of the laser light to be irradiated toward each of the three circumferential routes TRs belonging to the unit area TA is controlled.

Figure 21:
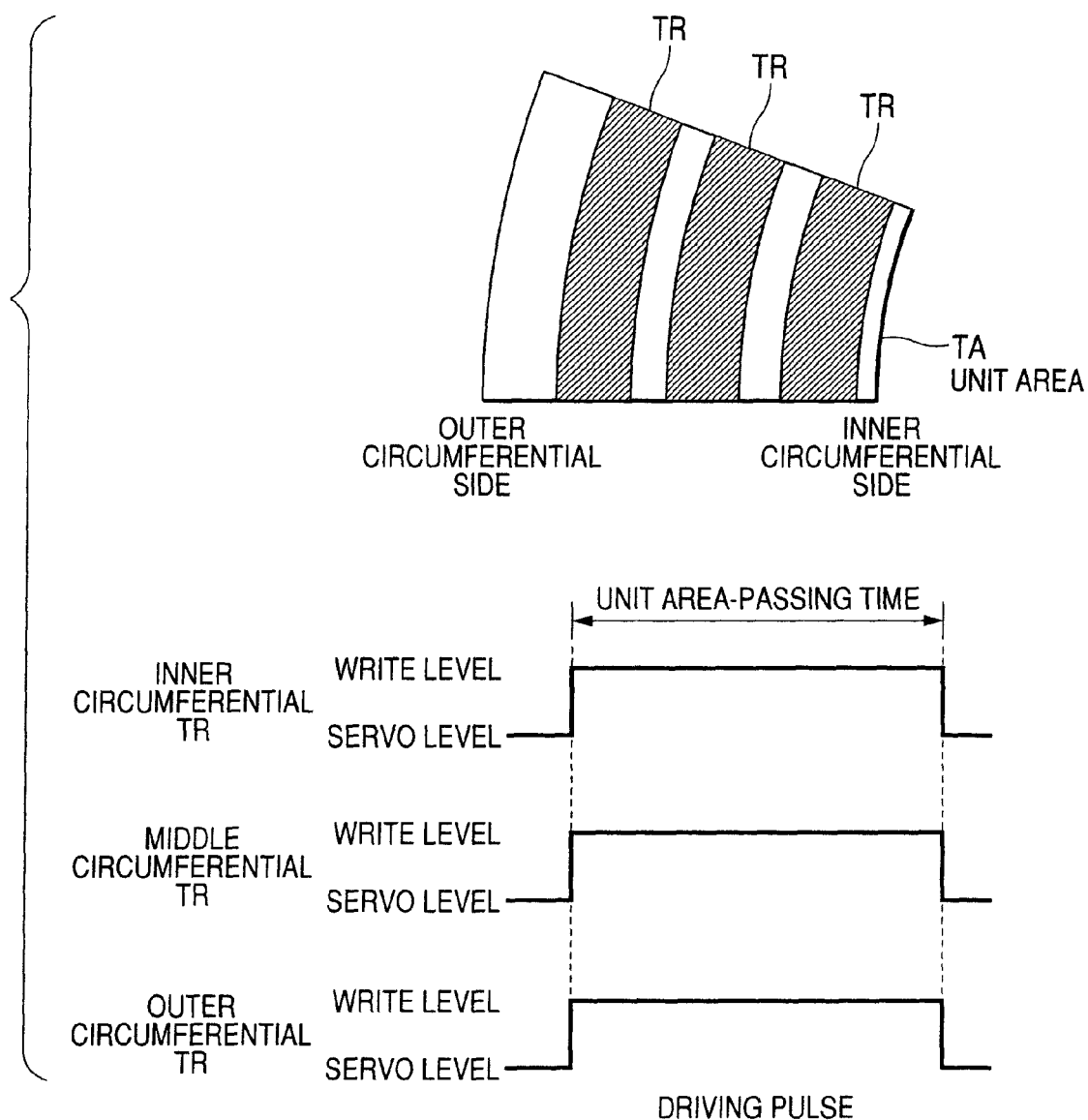
FIG. 21 is a view for illustrating the method of expressing high or low density of a visible image formed in the optical image-recording layer of the optical disk by the optical disk recording apparatus.

For example, in the case of forming an image wherein density of a certain unit area TA is to be expressed in a dark color, the laser light irradiation time is controlled so that all of the three circumferential routes TRs belonging to the unit area TA are changed in color as shown in the upper part of FIG. 21 (color-changed portions being shown in a black color in FIG. 21). That is, image data are previously prepared which render the driving pulse generating unit 35 to generate a driving pulse shown in the lower part of FIG. 21, and such control is conducted that a write level laser light is continuously irradiated during the period wherein the laser light irradiation position passes the three circumferential routes TRs belonging to the unit area TA.

Figure 22:
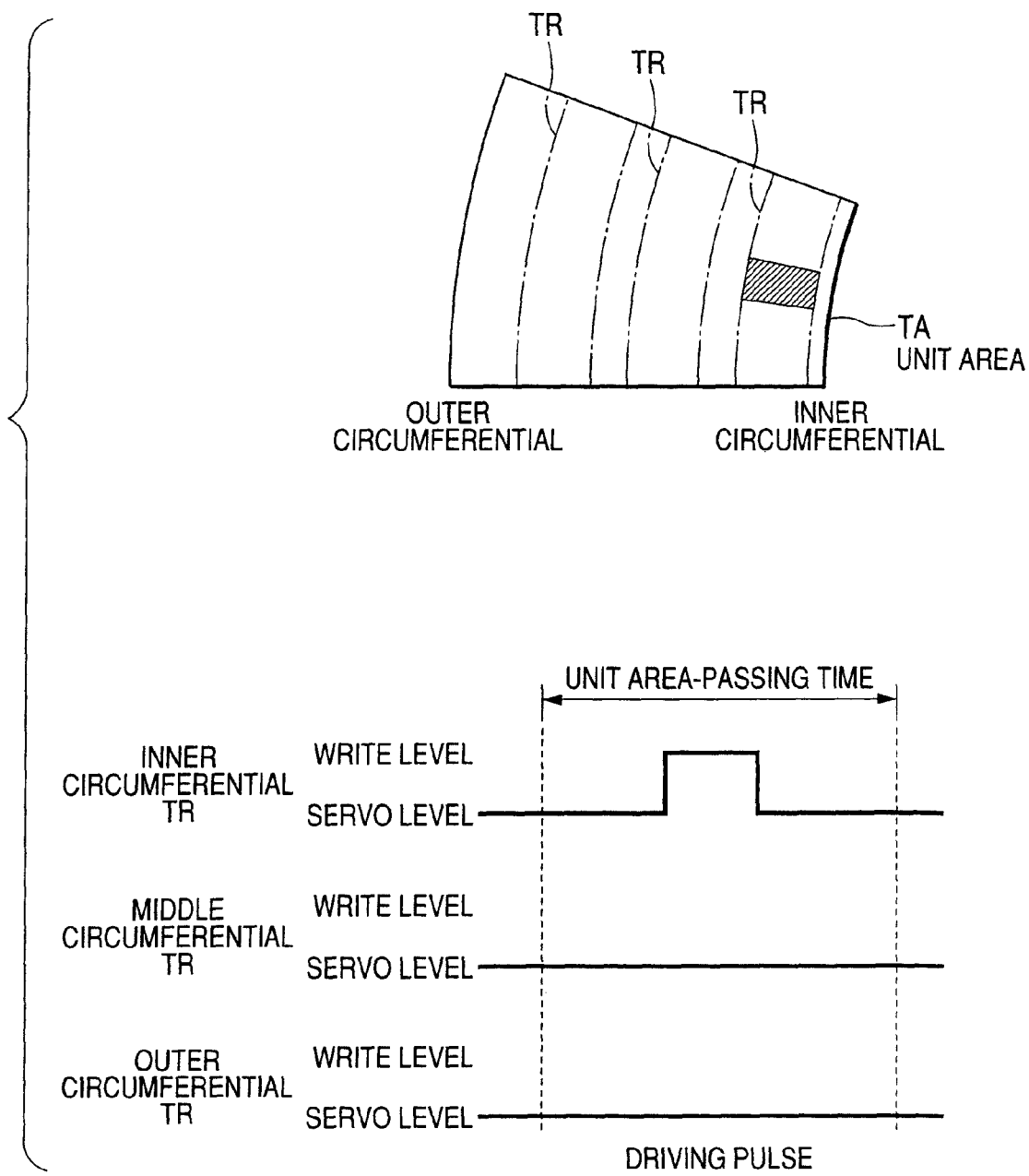
FIG. 22 is a view for illustrating the method of expressing high or low density of a visible image formed in the optical image-recording layer of the optical disk by the optical disk recording apparatus.

On the other hand, in the case of forming an image wherein the unit area TA is in an extremely light color (density not being 0), the laser light irradiation time is controlled so that only a slight portion of the innermost circumferential route TR of the three circumferential routes belonging to the unit area TA is to be changed in color as is shown in the upper part of FIG. 22. That is, image data are previously prepared which render the driving pulse generating unit 35 to generate a driving pulse shown in the lower part of FIG. 22 so that a write level laser light is irradiated for only a part of the period wherein the laser light irradiation position passes the inner-side circumferential route TR.

Figure 23:
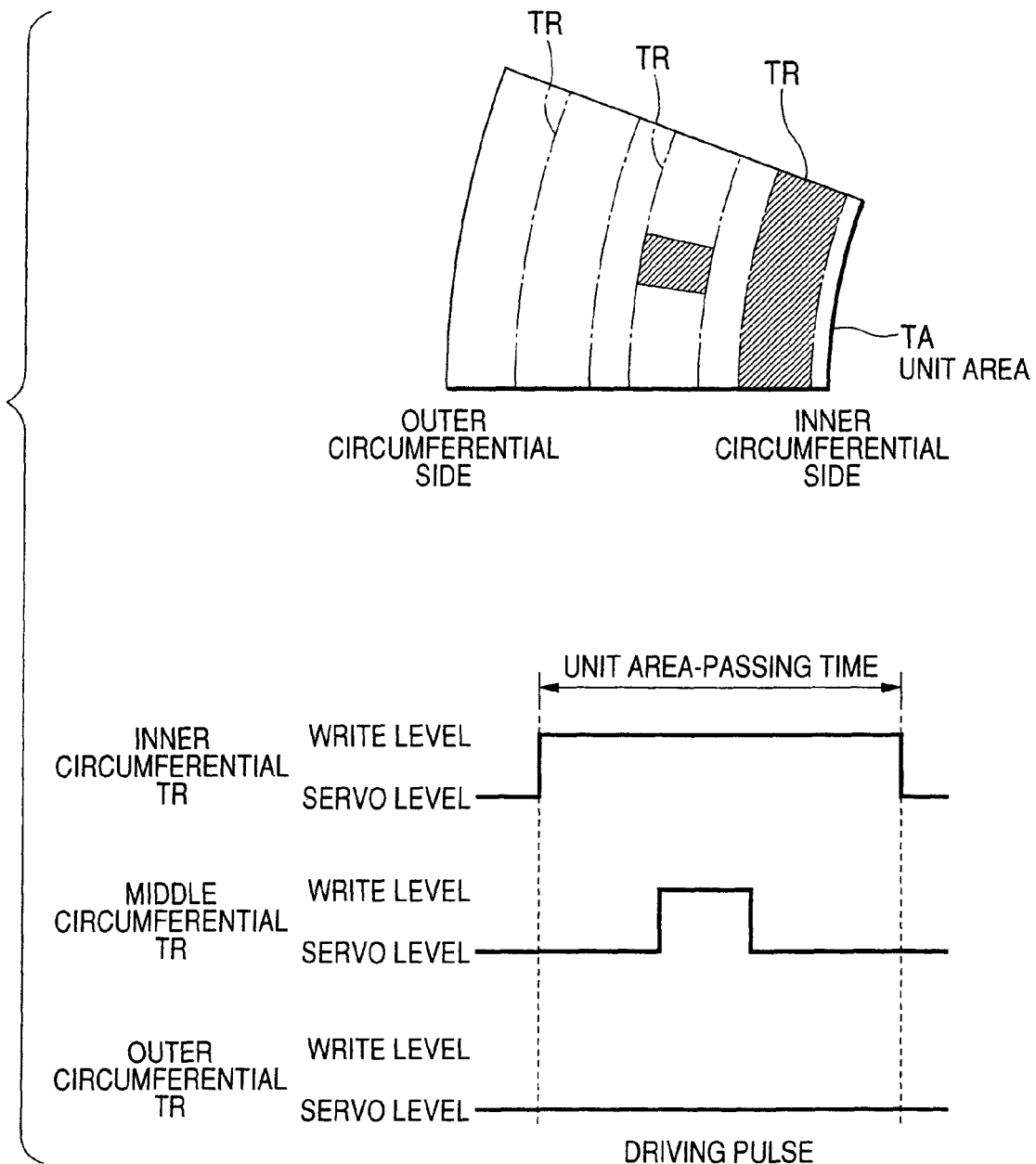
FIG. 23 is a view for illustrating the method of expressing high or low density of a visible image formed in the optical image-recording layer of the optical disk by the optical disk recording apparatus.

Also, in the case of forming an image wherein the density of the unit area TA is at about a middle level, the laser light irradiation time is controlled so that all portion of the innermost circumferential route TR of the three circumferential routes belonging to the unit area TA is to be changed in color and a half portion of the middle circumferential route TR is to be changed in color as is shown in the upper part of FIG. 23. That is, image data are previously prepared which render the driving pulse generating unit 35 to generate a driving pulse shown in the lower part of FIG. 23 so that a write level laser light is irradiated for the period wherein the laser light irradiation position passes the inner-side circumferential route TR and for only a part of the period wherein the laser light irradiation position passes the middle circumferential route TR.

A visible image wherein gradation is expressed per unit area TA as described above can be formed in the visible image-recording layer of the optical disk D by previously generating image data which correspond to the gradation expression per unit area TA as described above in the host PC 110.

Modified Example 2

In the above-described embodiment, the laser light irradiation position is moved so that almost no gap is left all over the surface of the optical disk D by performing feed control of moving the optical pickup 10 in a given amount in the diameter direction on the peripheral side when a visible image is formed by irradiating with the laser light while the optical disk D makes one rotation starting from the standard position. However, there exists a case where the mechanism of driving the optical pickup 10 in the diameter direction cannot control the driving amount in the unit of 20 µm. With an optical disk recording apparatus having such driving mechanism, area of spaces on the optical disk D which cannot be irradiated with the laser light increases and, as a result, quality of the visible image formed in the visible image-recording layer of the optical disk D becomes deteriorated.

Figure 24:
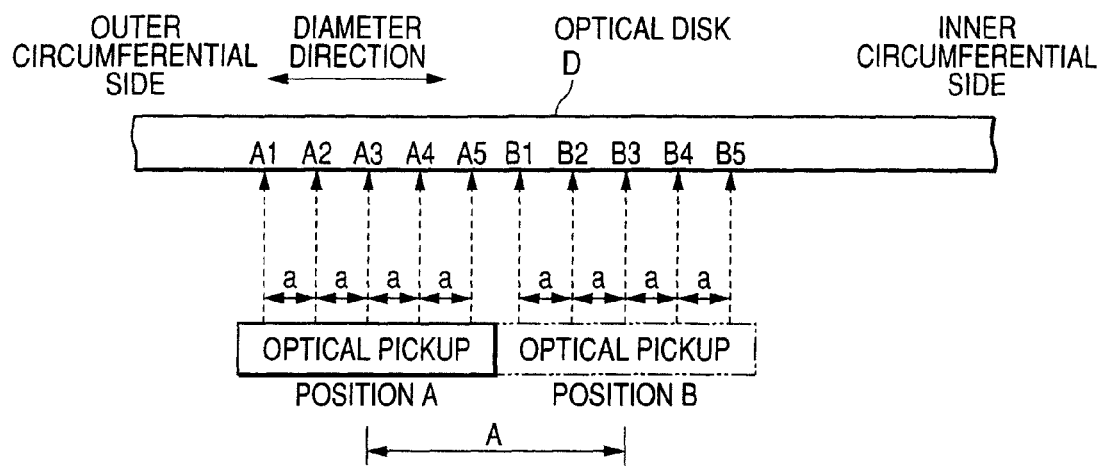
FIG. 24 is a view for illustrating the method of moving the laser light irradiation position in the diameter direction of the optical disk upon formation of a visible image in the visible image-recording layer of the optical disk by the optical disk recording apparatus.

Therefore, in the case where the driving means for moving the optical pickup D in the diameter direction has a small resolving power, it may be possible to control the irradiation position of the laser light in the diameter direction in a smaller unit, for example, 20 µm, by employing both movement control of the optical pickup 10 by the driving means and tracking control of the optical pickup 10. More specifically, as is shown in FIG. 24, the optical pickup 10 is moved to position A by the means for driving in the diameter direction such as a stepping motor. And, while the optical pickup 10 is fixed at this position, the tracking control is performed so that the laser light irradiation position in the diameter direction becomes A1. Formation of a visible image is performed by controlling the laser light while the optical disk D makes one rotation with the irradiation position being fixed at A1. Upon completion of formation of the visible image with the optical pickup 10 being fixed at position A, the laser light irradiation position is moved to the peripheral side with a distance of a by tracking control to adjust the irradiation position to position A2. In this state, the laser light irradiation is performed while the optical disk D makes one rotation to form a visible image. In the subsequent processing, the laser light irradiation position is likewise moved in the order of A3, A4, A5, etc. by the tracking control with the optical pickup 10 being fixed at position A, thereby forming an image.

Upon completion of image formation with the laser light irradiation position being A5, the optical pickup 10 is moved in a distance of A by the driving means to thereby move the optical pickup 10 to position B. Then, the tracking control is performed with the optical pickup 10 being fixed at this position B, to thereby perform formation of an image with moving the laser light irradiation position successively in the order of B1, B2, B3, B4 and B5 toward the peripheral side in a distance of a. Thus, even in the case where the driving means for the optical pickup 10 in the diameter direction performs driving control with a low resolving power, the laser light irradiation position can be moved in a smaller distance unit by employing both the movement control of the optical pickup 10 in the diameter direction and the tracking control.

Modified Example 3

Also, while the optical disk recording apparatus 100 of the above embodiment employs a CAV system wherein the laser light is emitted toward the optical disk D rotated at a constant angular velocity to form a visible image, there may be employed a CLV system wherein the linear velocity of the optical disk D is constant. As has been described hereinbefore, in the case of employing the CAV system, it is necessary to increase the write level of the irradiated laser light as the laser light irradiation position moved toward the peripheral side of the optical disk D in order to form a visible image with high quality. With the CLV system, however, it is not necessary to change the write level value. Therefore, it never occurs that image quality of an image formed in the visible image-recording layer of the optical disk D is deteriorated due to variation of the target laser power value.

Modified Example 4

In the above-described embodiment, the laser power controlling circuit 20 performs the laser power control so that a laser light of a write level target value or a servo level target value is irradiated based on the result of received light of the front monitor diode 53a of the optical pickup 10 (see FIG. 7). And, in the above-mentioned embodiment, in order to control so that the intensity of the laser light emitted from the laser diode 53 coincides with the write level target value, the result of received light of the front monitor diode 53a upon irradiation from the laser diode 53 with the write level as a target is employed. Also, in order to control so that the intensity of the laser light emitted from the laser diode 53 coincides with the servo level target value, the result of received light of the front monitor diode 53a upon irradiation from the laser diode 53 with the servo level as a target is employed.

Figure 25:
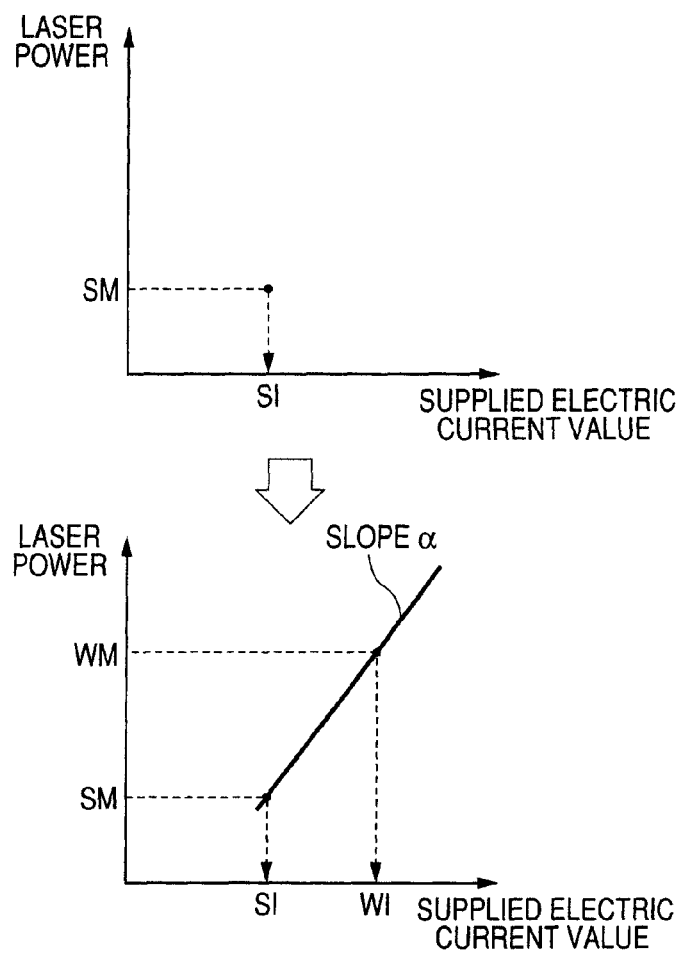
FIG. 25 is a view for illustrating the contents of laser power control performed by the optical disk recording apparatus.

In addition to using the results of receiving a laser light irradiated with the target value of each level upon performing laser power control with each of the write level and the servo level as a target value, it may be possible to use the result of receiving the laser light irradiated with the servo level as a target not only for laser power control with the servo level as a target but for laser power control with the write level as a target. More specifically, laser power controlling circuit 20 determines an electric current value SI to be fed to the laser diode 53 for irradiating from the laser diode 53 a laser light with an intensity of a servo level target value SM from the result (electric current value) of received laser light emitted with the servo level as a target value as shown in the upper part of FIG. 25. When the electric current value SI to be fed for emitting a laser light with a servo level target value SM is determined as described above, the relation (primary function) between the fed electric current value and the power of emitted laser light is determined as shown in the lower part of FIG. 25 based on the electric current value SI and the slope a for representing the relation between the fed electric current value and the irradiated laser power as a primary function which has previously been determined through experiments or the like. Next, the laser power controlling circuit 20 determines an electric current value WI to be fed to the laser diode 53 for emitting a write level laser light based on the determined relation between the two and a write level target value WM set by the controlling unit 16. Upon irradiation with the write level laser light, the laser power controlling circuit 20 controls the laser driver 19 to feed the thus-determined electric current value WI to the laser diode 53. Thus, control of irradiating with the write level laser light can be performed without using the result of receiving a laser light emitted with the write level as a target value.

Additionally, in the above-described embodiment and modified examples, feedback control of the laser power is performed based on the laser light-receiving results from the front monitor diode 53a while a laser light is emitted for forming a visible image. However, in forming the visible image, the laser power control may be conducted without the feedback control by performing a test irradiation with the laser light prior to formation of the visible image and feeding to the laser diode 53 an electric current value based on the laser light-receiving results of the front monitor diode 53 obtained by the test irradiation. In the case where a period necessary for forming an image is short, variation in the optical pickup 10 and in the surrounding environment (e.g., temperature) is small and, in some cases, sufficiently accurate laser power control can be performed without the above-mentioned feedback control. Therefore, an optical disk recording apparatus which can perform image formation in a short time can employ the laser power control not performing the feedback control as described above.

Modified Example 5

In the above-described embodiment, kind of the disk mounted on the optical disk recording apparatus 100 is discriminated by reading out the disk ID recorded in the outermost circumferential portion of the visible image-recording layer of the optical disk D, and laser power control in accordance with the discriminated disk kind is performed (see FIG. 12). It is also possible to read out the disk ID recorded in the read-in area of the recording side of the optical disk D and perform laser power control according to the disk kind discriminated by the disk ID obtained by reading out upon formation of a visible image in the visible image-recording layer of the optical disk D. As described above, it suffices that a user mounts an optical disk D so that the recording side thereof faces the optical pickup 10, and the optical disk recording apparatus 100 reads out the disk ID from the read-in area of the optical disk D mounted on the optical disk recording apparatus 100. Then, the optical disk recording apparatus 100 urges the user to re-insert the disk into the apparatus after turning over the disk over and, when the optical disk D is mounted so that the visible image-recording layer faces the optical pickup 10, laser power control is performed for the visible image-recording layer of the optical disk D according to the disk ID read out from the read-in area to thereby form a visible image.

Modified Example 6

Figure 26:
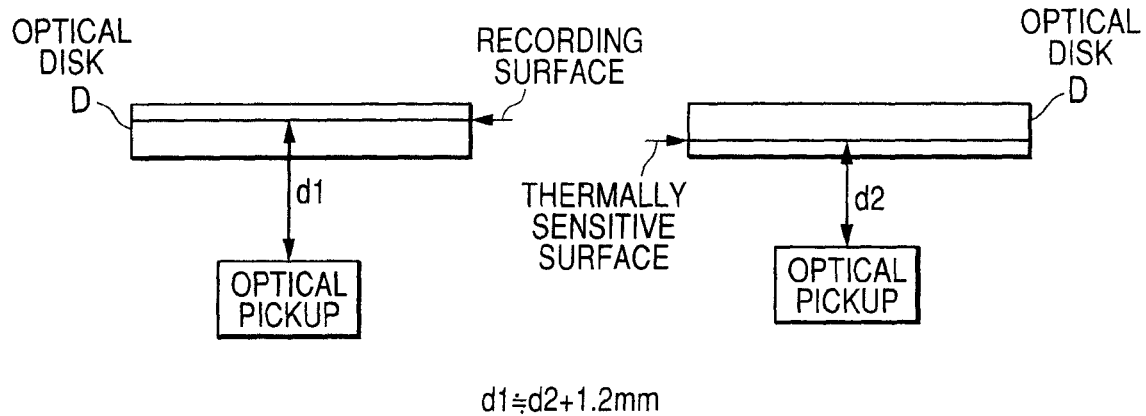
FIG. 26 is a view showing the positional relation between the optical disk and the optical pickup in the case where the optical disk is set so that the visible image-recording layer faces the optical pickup and in the case where the optical disk is set so that the opposite side of the optical disk to the visible image-recording layer side faces the optical pickup.

As has been described with respect to the above-mentioned embodiment, the optical disk recording apparatus 100 is designed so that a visible image can be formed in the visible image-recording layer formed on the opposite side of the optical disk to the recording side utilizing various constituents in the apparatus such as the optical pickup 10 for recording information on the recording side. [By the way, with CD-R, the thickness of the protective layer 201 provided over the recording layer 202 shown in FIG. 1 is 1.2 mm, whereas the thickness of the protective layer 206 provided on the opposite side is extremely small. Therefore, as is shown in FIG. 26, the distance between the position of the layer of the optical disk D to be irradiated with the laser light and the position of the optical pickup 10, d1 or d2 (relative positional relation), varies by about 1.2 mm depending upon which of the recording side and the visible image-recording layer the mounted optical pickup 10 faces.]

With the focus actuator 64 (see FIG. 3) for the optical pickup 10 which is designed on condition that the distance d1 between the recording side of the optical disk D and the optical pickup 10 coincides with the focal length, sufficient focus control becomes in some cases impossible when the distance between the optical pickup 10 and the side to be irradiated coincides with d2. Thus, in the case where the optical disk D is mounted so that the visible image-recording layer faces the optical pickup 10, a mechanism may be provided which can hold the optical disk D at a position shifted by about 1.2 mm in the parting direction so that the distance between the visible image-recording layer and the optical pickup 10 almost coincides with d1.

Figure 27:
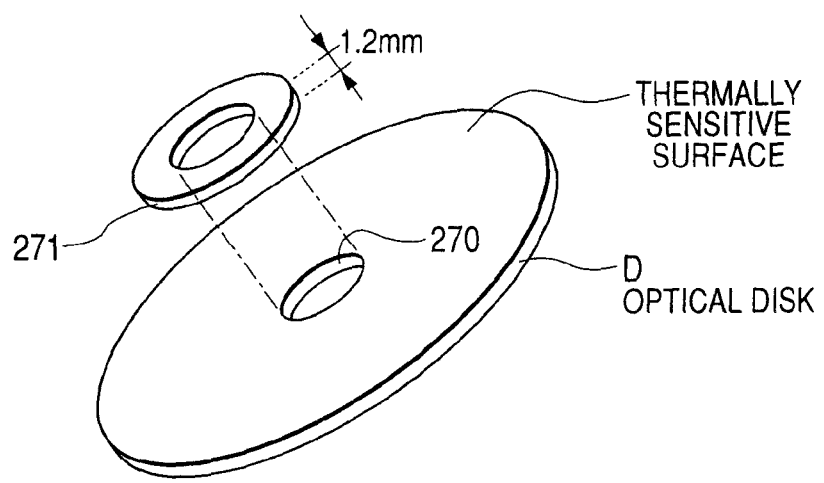
FIG. 27 is a perspective view showing an adapter for adjusting the positional relation between the optical disk and the optical pickup.

As such mechanism, an adapter (relative position-adjusting means) 271 fittable to the chucking portion 270 at the center of the optical disk D may be provided as shown in FIG. 27 which is to be fit to the optical disk D when the optical disk D is mounted on the optical disk recording apparatus 100 with the visible image-recording layer of the optical disk D facing the optical pickup 10.

Alternatively, a mechanism which can move between the vicinity of the position where the optical disk D is to be set in the optical disk recording apparatus 100 and a position spaced from the vicinity and which can change the optical disk D-holding position may be provided in the optical disk recording apparatus 100 for adjusting, only when the optical disk D is set with the visible image-recording layer facing the optical pickup 10, the optical disk D-holding position by moving the mechanism to the vicinity position.

Figure 28:
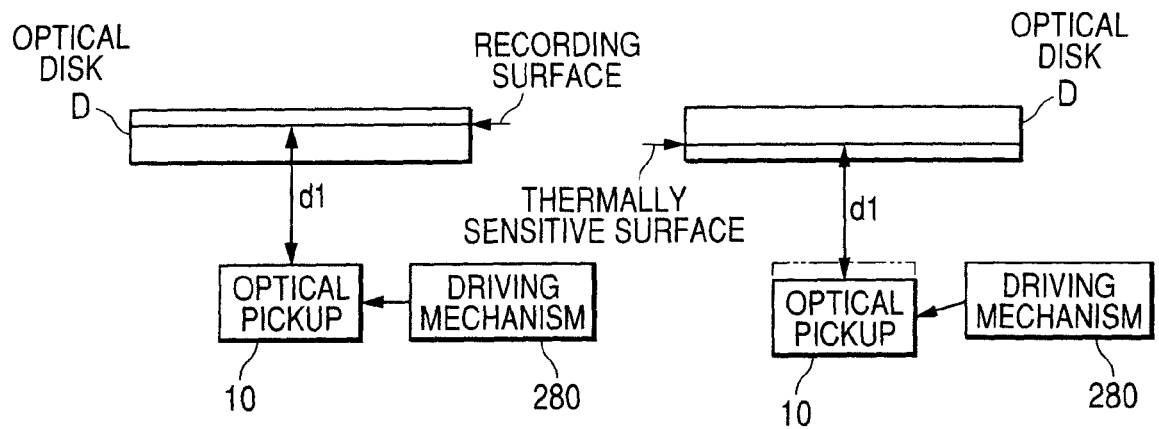
FIG. 28 is a view showing outline constitution of the optical disk recording apparatus equipped with the function of adjusting positional relation between the optical disk and the optical pickup.
Figure 29:
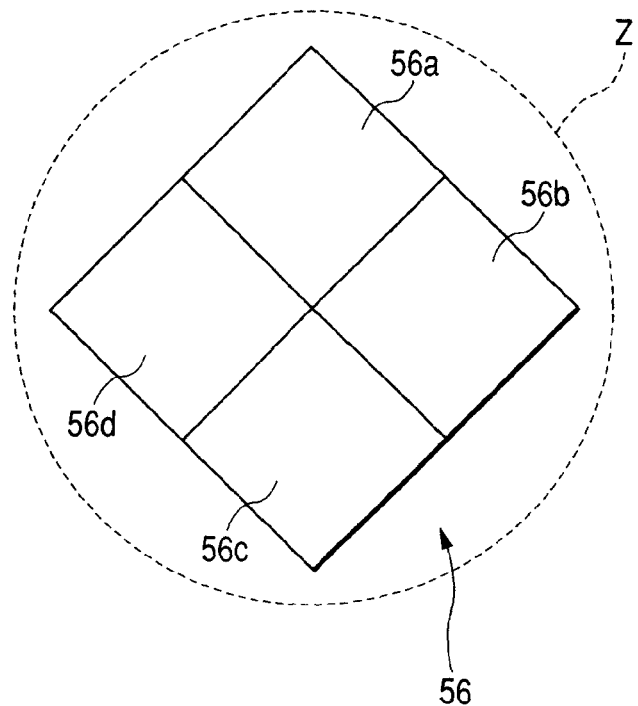
FIG. 29 is a view for illustrating the method of enlarging the beam spot diameter of a laser light emitted to the visible image-recording layer of the optical disk.

In addition to moving the optical disk D-holding position to a position spaced from the optical pickup 10 by using the above-described adapter 271, it is also possible to provide a driving mechanism (relative position-adjusting means) 280 which can move, when the optical disk D is set with the visible image-recording layer facing the optical pickup 10, the position of the optical pickup 10 to a position spaced from the optical disk D so that the distance between the visible image-recording layer and the optical pickup 10 becomes d1, as is shown in FIG. 28.

Modified Example 7

In the above-described embodiment, focus control is performed in accordance with the return light from the optical disk D received by the light-receiving element 56 (see FIG. 3) of the optical pickup 10. In this focus control, the visible image-recording layer of the optical disk D is to be irradiated with a laser light having a larger spot diameter than is employed upon recording on the recording side. In the above-mentioned embodiment, in order to enlarge the spot diameter, the focus actuator 64 is driven so that the light-receiving result of the light-receiving element 56 becomes the elliptical shape B or C shown in FIG. 13. In order to irradiate the visible image-recording layer of the optical disk D with a laser light having a larger spot diameter than in the case where the elliptical shape B or C is obtained as the light-receiving result, it is also possible to perform focus control in accordance with the total amount of received light in all of the four areas, 56a, 56b, 56c and 56d, of the light-receiving element 56 instead of the focus control in accordance with the amount of received light in each of the four areas. That is, when the spot diameter of the laser light to be emitted to the visible image-recording layer of the optical disk D is enlarged, there is obtained a return light having a larger area than the light-receiving area of the light-receiving element 56. That is, the total amount of light received by the light-receiving element 56 becomes smaller. Thus, a laser light with a larger spot diameter can be emitted to the visible image-recording layer of the optical disk D by driving the focus actuator 64 through the servo circuit 13 so that the total amount of received light of the image-receiving element 56 becomes smaller than the total amount of received light in the case where the light-receiving result of the elliptical shape A, B or C shown in FIG. 13.

Modified Example 8

In the case where the visible image-recording layer of the optical disk D used has a high transparency, a pre-groove (guide groove) formed on the recording side of the optical disk D can be detected in the optical disk recording apparatus 100 based on the return light (reflected light) from the optical disk D even when the optical disk D is set so that the visible image-recording layer faces the optical pickup 10. More specifically, the level of a return light upon the pre-groove being irradiated with the laser light is high and the level of a return light upon the land being irradiated with the laser light is low, as is contrary to the case of emitting the laser light to the recording side. Therefore, the pre-groove can be detected by detecting the level of the return light and, as a result, it becomes possible to perform tracking control along the pre-groove.

Figure 30:
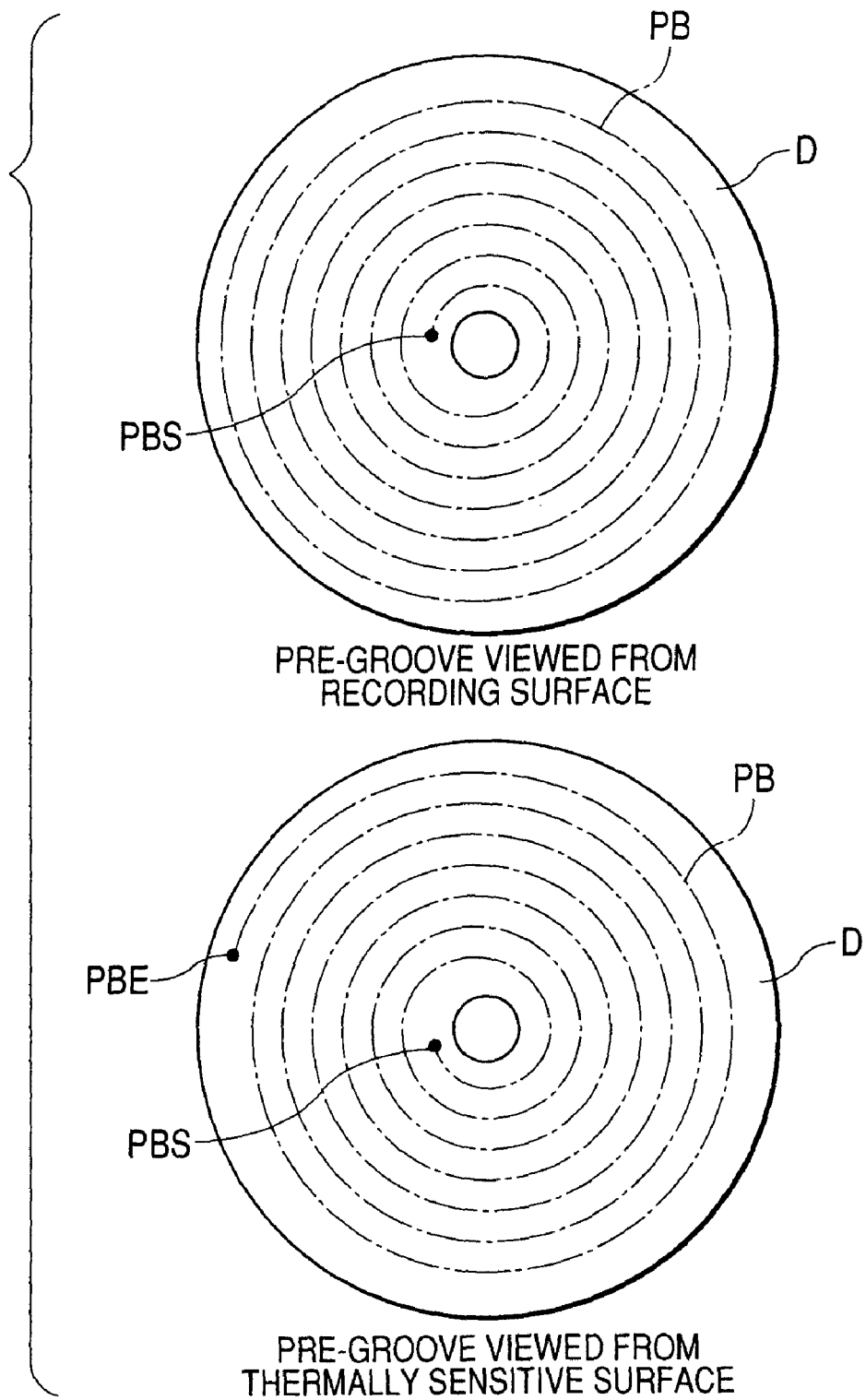
FIG. 30 is a view for illustrating the method of performing formation of the visible image by moving the laser light irradiation position along the pre-groove formed on the opposite side of the optical disk to the visible image-recording layer side.

In the case where tracking control along the pre-groove formed on the opposite recording side is possible upon the optical disk D being set so that the visible image-recording layer faces the optical pickup 10 as described above, it may be possible to perform the laser light irradiation control for forming the visible image while moving the laser light irradiation position along the pre-groove. In the case of detecting the pre-groove formed on the recording side opposite to the visible image-recording layer and performing the tracking control so that the laser light irradiation position moves along the pre-groove as described above, the rotation direction of the spindle motor 11 is made reverse to that upon recording on the recording side to thereby rotate the optical disk D in the reverse direction. Reasons for the reverse rotation are described below with reference to FIG. 30. As is shown in the upper part of FIG. 30, in the case where a clockwise spiral pre-groove PB is formed on the recording side of the optical disk D viewed from the recording surface side, the pre-groove PB is viewed from the visible image-recording layer side which is opposite to the recording surface side as a counter-clockwise spiral form as is shown in the lower part of FIG. 30. Therefore, in the case where the optical disk D is rotated in the same rotation direction as upon recording starting from the innermost circumferential position PBS along the pre-groove PB, it is impossible to move the laser light irradiation position along the pre-groove PB. Thus, in forming a visible image by irradiating the visible image-recording layer of the optical disk D with a laser light by moving the laser light irradiation position along the pre-groove PB, the optical disk D is rotated in the reverse direction to that upon performing recording on the recording side.

Therefore, in the case of performing the same visible image formation as in the above-described embodiment by controlling the laser light irradiation timing and power in accordance with the image data while moving the laser light irradiation position along the pre-groove PB, it suffices for the controlling unit 16 to instruct the servo circuit 13 to rotate the spindle motor 11 in the reverse direction to that upon recording on the recording side.

Also, in the case of forming a visible image in the visible image-recording layer while moving the laser light irradiation position along the pre-groove PB formed on the recording side with starting from the outermost circumferential position PBE of the pre-groove PB, the laser light irradiation position can be moved long the pre-groove PB even when the rotation direction of the optical disk D is the same as that upon recording.

Modified Example 9

Figure 31:
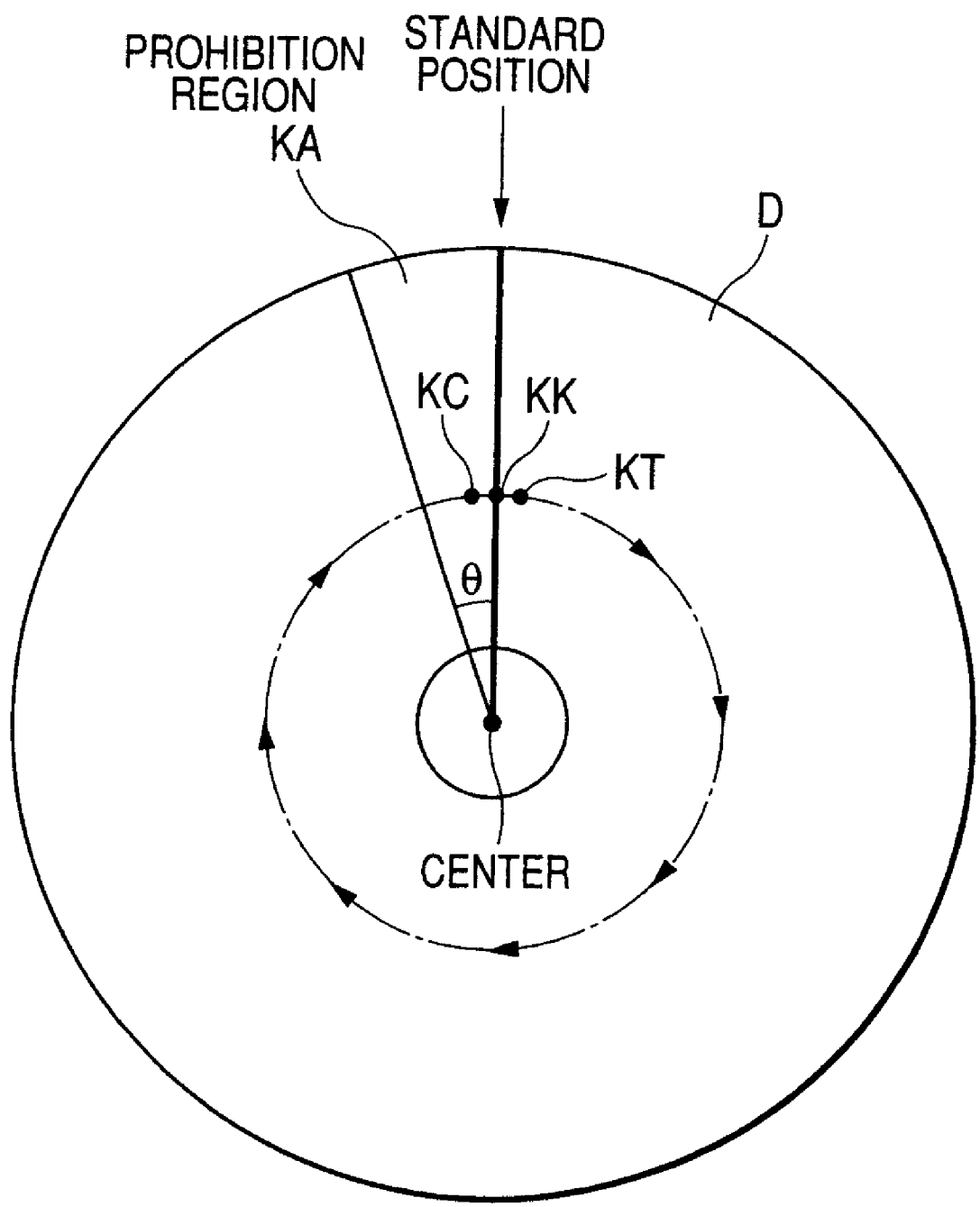
FIG. 31 is a view for illustrating a prohibition region of the optical disk where irradiation with laser light for forming a visible image by the optical disk recording apparatus is prohibited.

In the above-described embodiment, it is also possible for the controlling unit 16 to control so that irradiation with a laser light (at a write level) for forming an image is not performed in a predetermined-prohibition region KA shown in FIG. 31 in the visible image-recording layer of the optical disk D. As is shown in FIG. 31, in the case where the laser light irradiation position is moved in the clockwise direction starting from the standard position (see FIG. 16), the prohibition region KA is a fan-shaped region with a predetermined angle θ in the counterclockwise direction from the standard position. That is, the prohibition region KA is a region which the laser light irradiation position passes immediately before returning to the standard position upon performing irradiation with a laser light for forming a visible image while moving the laser light irradiation position starting from the standard position.

As a control for prohibiting formation of a visible image in the prohibition region KA, it suffices for the controlling unit 16 to perform data conversion so as to change the gradation degree of the coordinate belonging to the prohibition region KA supplied from the host PC 110 to "0". To perform such data conversion prevents irradiation with a write level laser light while the laser light irradiation position passes the prohibition region KA even when the driving pulse-generating section 35 generates a driving pulse with strict fidelity according to the data and, as a result, no visible image is formed in the prohibition region KA.

Prohibition of irradiation with a laser light for forming a visible image in the prohibition region KA as described above provides the following advantage. That is, in the case where image formation is performed in synchronicity with the clock signal fed from the PLL circuit 33 as has been described hereinbefore, the rotation velocity subtly fluctuates and, in some cases, the period of clock signal outputted from the PLL circuit 33 fluctuates accompanying the fluctuation of rotation velocity. After the locus of the laser light irradiation position (shown by the dot-and-dash line in FIG. 31) almost makes one rotation with starting the laser light irradiation from the standard position KK, the fluctuation of the clock signal which functions as a synchronization signal for image formation can cause irradiation of position KT which is located at a position after the standard position with a laser light which should essentially be emitted for expressing an image at the position KC immediately before the standard position. That is, a laser light which should essentially be emitted for expressing an image at the position KC immediately before the standard position is emitted to the position KT in the region which has been irradiated with the laser light for forming a visible image, thus overlapped laser irradiation being performed. As a result, there can result troubles in the thus formed visible image. Thus, even in the case where the clock signal generated by the PLL circuit 33 fluctuates, conversion of the image data so as to provide the above-mentioned prohibition region KA serves to prohibit the trouble that a laser light for forming a visible image is emitted twice to the same position.

Modified Example 10

Figure 32:
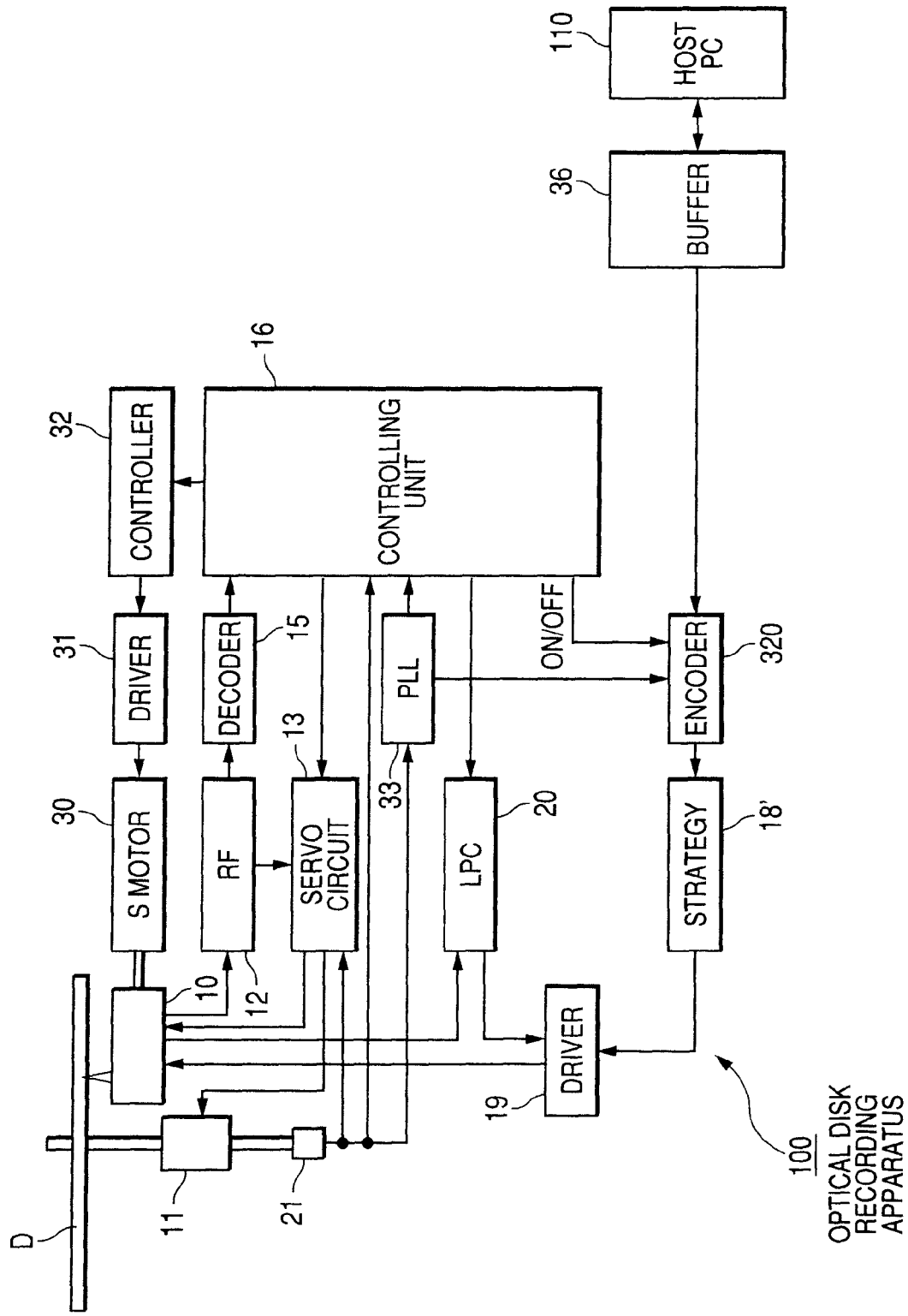
FIG. 32 is a block diagram showing the constitution of a modified example of the optical disk recording apparatus.
Figure 33:
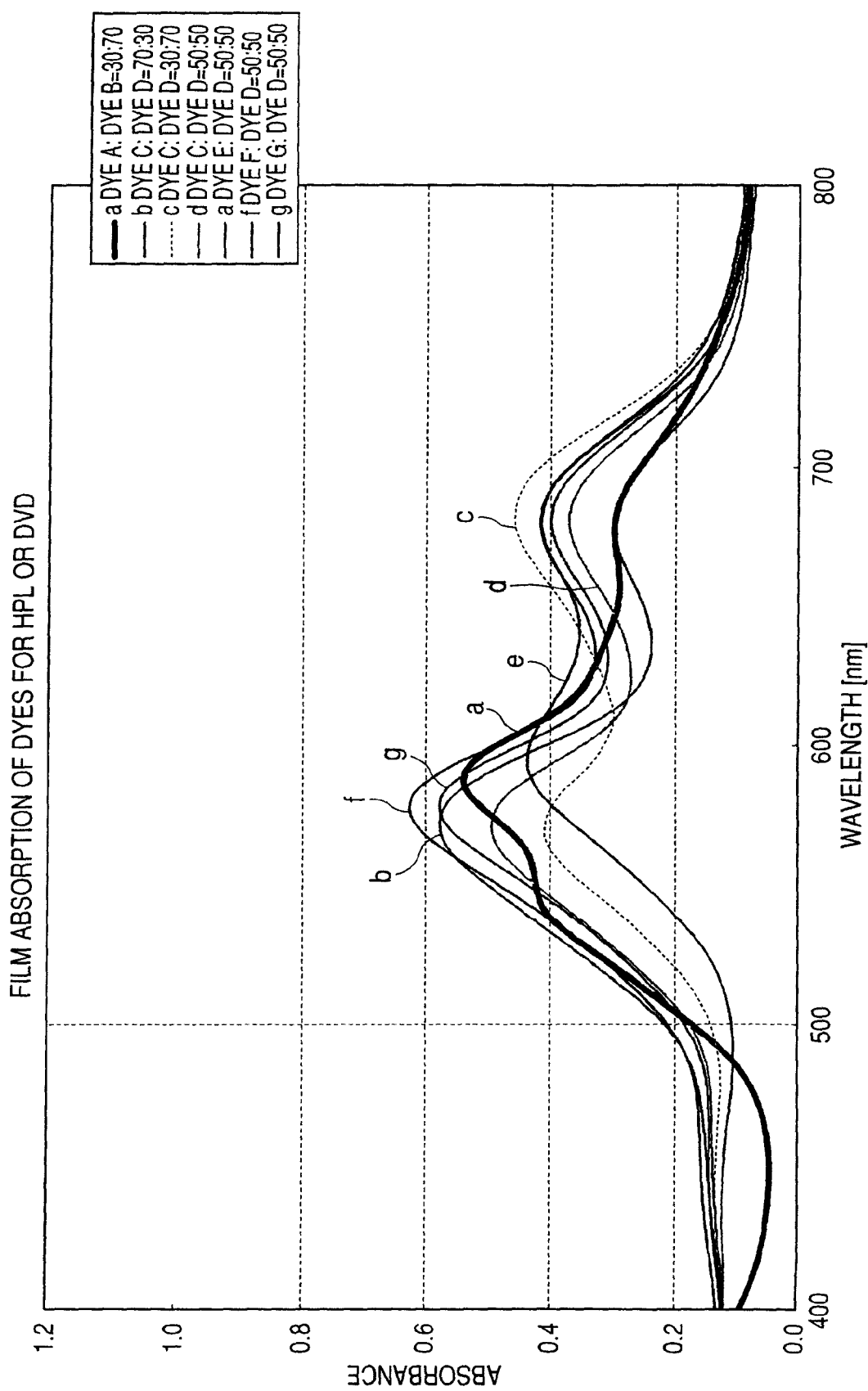
FIG. 33 is a view showing absorbance change of the image-recording layers of the optical disks 1-1 to 1-7.

It is also possible to employ an optical disk recording apparatus 100' having the constitution as shown in FIG. 32 in place of the optical disk recording apparatus 100 in accordance with the above-mentioned embodiment. As is shown in FIG. 32, the difference between this optical disk recording apparatus 100' and the optical disk recording apparatus 100 in the above-described embodiment lies in that the apparatus 100' does not have the FIFO memory 34 and the driving pulse-generating section 35 and that it has an encoder 320 in place of the encoder 17.

The encoder 320 is a circuit which performs EFM modulation or CIRC (Cross Interleave Reed-Solomon Code) conversion on supplied data like the encoder 17 in the above-mentioned embodiment, temporarily stores the supplied data in a memory, performs the above-described modulation processing or the like on the stored data, and outputs to the strategy circuit 18'. Also, the encoder 320 is constituted so that it can switch on or off between performing EFM modulation or the like on data supplied from the buffer memory 36 based on the modulation on/off signal supplied from the controlling unit 16 to output the thus-processed data and outputting the supplied data without performing EFM modulation or the like. And, when a modulation-on signal is supplied from the controlling unit 16, the encoder 320 performs EFM modulation or the like on the data fed from the buffer memory 36 and outputs the thus-processed data to the strategy circuit 18. On the other hand, when a modulation-off signal is fed from the controlling unit 16, the encoder 320 does not perform modulation or the like on the data fed from the buffer memory 36 but outputs the data in synchronicity with the clock signal fed from the PLL circuit 33.

The controlling unit 16 outputs the modulation-on or modulation-off signal to the encoder 320 according to the instruction inputted from a user through a user interface not shown. More specifically, in the case where the controlling unit 16 receives an instruction of conducting a visible image formation in the visible image-recording layer from a user, it outputs the modulation-off signal and, in the case where it receives an instruction of conducting information recording on the recording side, it outputs the modulation-on signal. Additionally, though the controlling unit 16 may outputs the modulation-on or modulation-off signal according to the instruction from the user as described above, the controlling unit 16 may also be constituted so that it outputs the modulation-on or modulation-off signal according to which side of the mounted optical disk D faces the optical pickup 10. In this case, it suffices for the controlling unit 16 to output the modulation-off signal when the optical disk 10 is mounted with the visible image-recording layer facing the optical pickup 10 and output the modulation-on signal when the optical disk 10 is mounted with the recording side facing the optical pickup 10.

In the case where an instruction of performing information recording on the recording side is made from a user, the controlling unit 16 of the above-mentioned constitution outputs a modulation-on signal to the encoder 320. Recording data to be recorded on the recording side of the optical disk D are fed from the host PC 110 to the buffer memory 36, and transferred from the buffer memory 36 to the encoder 320. The encoder 320 having received the modulation-on signal performs EFM modulation or the like on the recording data fed from the buffer memory 36 and outputs the processed data to the strategy circuit 18'. The strategy circuit 18' performs time base correction of the EFM-modulated data, generates a driving pulse for driving the laser driver 19 and outputs it to the laser driver 19. The laser driver 19 supplies a driving electric current to the laser diode 53 (see FIG. 3) of the optical pickup 10 in accordance with the driving pulse to thereby emit a laser light from the optical pickup 10, thus recording data supplied from the host PC 110 being recorded on the recording side of the optical disk D.

On the other hand, when a user makes an instruction of forming a visible image in the visible image-recording layer, the controlling unit 16 outputs the modulation-off signal to the encoder 320. Image data in accordance with the visible image to be formed in the visible image-recording layer of the optical disk D are supplied to the buffer memory 36 from the host PC 110, and the image data are then transferred to a memory contained in the encoder 320. The encoder 320 having received the modulation-off signal does not perform modulation or the like on the data transferred from the buffer memory 36 but outputs the data for each coordinate (information showing gradation) successively to the strategy circuit 18' in synchronicity with the clock signal fed from the PLL circuit 33. The strategy circuit 18' generates a driving pulse based on the successively-fed data showing gradation for each coordinate like the driving pulse-generating section 35 in the above-described embodiment, and outputs the generated driving pulse to the laser driver 19. The laser driver 19 feeds a driving electric current to the laser diode 53 (see FIG. 3) of the optical pickup 10 in accordance with the driving pulse to emit a laser light from the optical pickup 10, thus a visible image being formed in the visible image-recording layer of the optical disk D in accordance with the image data fed from the host PC 110.

As is described above, constituents such as the FIFO memory 34 and the driving pulse-generating section 35 which are used only for formation of a visible image can be omitted by employing the constitution with which the encoder 302 can be instructed whether to perform modulation or not between the case of forming a visible image and the case of performing information recording. Such constitution can impart the optical disk recording apparatus 100 with both the function of forming a visible image and the function of performing information recording in spite of its simplicity.

Modified Example 11

It is also possible to form a visible image on the recording side (recording layer 202) of the optical disk D as well. As is well known, reflectance of areas of the recording layer 202 is changed by irradiating the areas with a laser light having a given intensity or more than that. Therefore, a visible image can be formed by irradiating an area with a laser light, with the area being sufficiently large to visually discriminate it. A recording layer 202 constituted by a material which undergoes change in state, such as formation of cavity or elevation, of the laser light-irradiated area permits formation of a visible image based on such properties of the material. In the case of forming a visible image on the recording side (recording layer 202), it suffices to record data for forming a visible image along the guide groove (pre-groove) formed in the recording layer 202. Alternatively, as is the same with the case of forming a visible image in the visible image-forming layer, the beam spot diameter of the laser light to be emitted to the recording layer 202 may be adjusted to a large diameter so as to perform recording without the aid of the guide groove. That is, the space (track pitch) between the guide grooves is as small as about several μm and, even when recording is performed without following the guide groove, there arises no problems such as deteriorations of resolving power of a formed visible image. Also, since a guide groove is provided on the surface of the recording layer 205, there exists unevenness in a strict sense on the surface. However, the depth of the groove is also so small that, with respect to formation of a visible image, the surface of the recording layer 202 can be treated as a plane surface. In any case, a visible image can be formed not only in the visible image-recording layer but on the recording side without any special apparatus by employing the technology in accordance with the invention.

Modified Example 12

In the case of forming a visible image in the recording layer of the optical disk D, the essential data recording cannot naturally be performed in the area where the visible image is formed. Therefore, an area for forming a visible image may previously be determined in the recording region (recording layer) of the optical disk D. For example, when it is previously determined that the essential data recording is to be performed in the region of from the innermost circumferential position of the disk to a given position (address) and that a visible image is to be formed in a region outer than that, there arises no such inconvenience that no region remains for performing the essential data recording. Alternatively, it is also possible to detect a region where no recording has been performed (unrecorded area) after performing the essential data recording and perform formation of a visible image in the detected unrecorded region.

Modified Example 13

Data (image data) to be recorded for forming a visible image may previously be stored in the memory (not shown) of the optical disk recording apparatus 100. For example, data to be recorded for forming a visible image of numbers of 0 to 9 on the optical disk D are prepared in the memory. When a user instructs the number to be formed on the optical disk D, the recorded data relating to the instructed number are read out from the memory, and then the data are recorded on the optical disk D to form the visible image. It is also possible to automatically form a visible image of time stamp information relating to date and time of recording without the instruction of a user after completion of essential data recording which has started from the inner circumference to the outer circumference of the disk. The time stamp information may be supplied from the outer apparatus (host PC 100) to the optical disk recording apparatus 100. It is also possible to form a visible image relating to signature information showing the name of the user or the contents of recorded data. The signature information may be supplied to the optical disk recording apparatus 100 by user's operation of the host PC 110. Alternatively, the user may directly operate the optical disk recording apparatus 100 to input (register) the signature information.

EXAMPLES

Next, the invention will be described in more detail by reference to Examples which, however, are not to be construed as limiting the invention in any way.

Example 1

This Example is a DVD-R type optical disk wherein two disks are stuck to each other. A method for preparing the optical disk is described below.

A substrate of 0.6 mm in thickness and 120 mm in diameter having a spiral groove (depth: 130 nm; width: 300 nm, track pitch: 0.74 μm) was molded from a polycarbonate resin by injection molding. A coating solution (1) was prepared by dissolving 1.4 g of the following dye C in 100 ml of 2,3,3,3-tetrafluoro-1-propanol, and this coating solution (1) was coated on the groove-formed surface of the substrate by the spin coating method to form an information recording layer. Subsequently, a reflection layer of 120 nm in thickness was formed by sputtering silver on the information recording layer, and then a UV ray-curable resin (SD318; manufactured by Dainippon Ink & Chemicals, Inc.) was coated thereon by spin coating method, followed by irradiating with UV rays to cure, thus a protective layer of 10 μm in thickness being formed. The first disk was prepared by the above-mentioned steps.

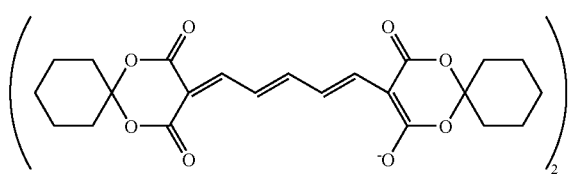

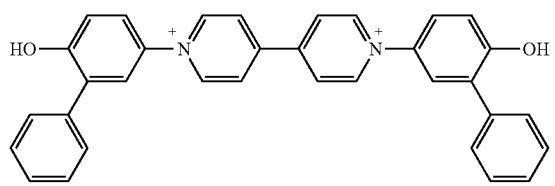

Next, in order to form an image recording layer, a coating solution (2) of 1.5 g of a mixture (30:70 by weight) of the following dye A (cyanine dye) and dye B (phthalocyanine dye) in 100 ml of 2,2,3,3-tetrafluoro-1-propanol was prepared, and this coating solution (2) was coated on the a groove-free substrate, thus the image recording layer being formed. Next, silver was sputtered on the image recording layer to form a reflection layer of 120 nm in thickness, and then a UV ray-curable resin (SD318; manufactured by Dainippon Ink & Chemicals, Inc.) was coated thereon by spin coating method, followed by irradiating with UV rays to cure, thus a protective layer of 10 μm in thickness being formed. The second disk was prepared by the above-mentioned steps.

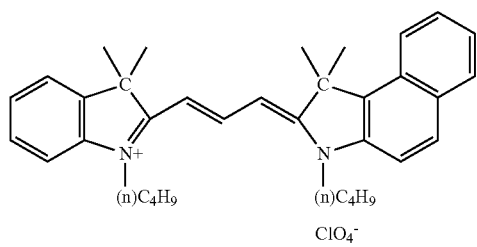

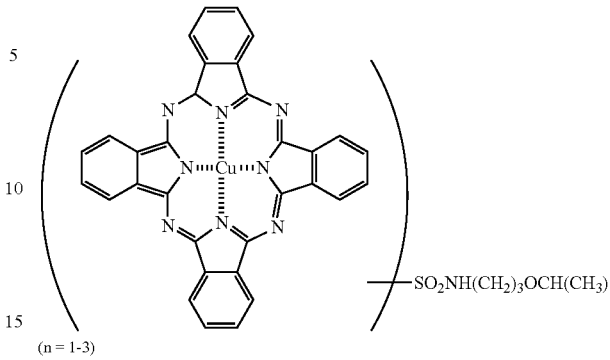

Subsequently, in order to stick the first disk and the second disk to each other to form a single disk, the first and the second disks were subjected to the following steps. First, a cation polymerization type delayed adhesive (SDK7000; manufactured by Sony Chemicals Corporation) was printed by screen printing on both of the protective layers on the two disks. In this printing, the mesh size of the printing plate of screen printing was 300-mesh size. Subsequently, immediately after irradiation with UV rays was conducted by using a metal halide lamp, the first disk and the second disk were stuck to each other with the protective layers inside and the composite was left for 5 minutes with applying a pressure to both sides, thus an optical disk 1-1 of the invention being prepared.

[Optical Disk 1-2 of the Invention]

An optical disk 1-2 of the invention was prepared in the same manner as with the disk 1-1 of the invention except for changing the dye used for forming the image-recording layer of the optical disk 1-1 of the invention to a dye mixture prepared by mixing the dye C (oxonol dye) and the following dye D (oxonol dye) with a mixing ratio of 70:30.

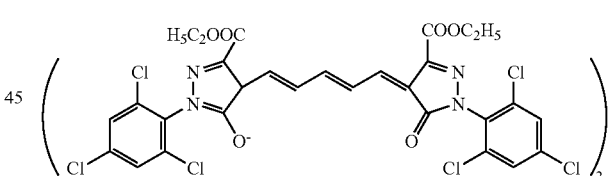

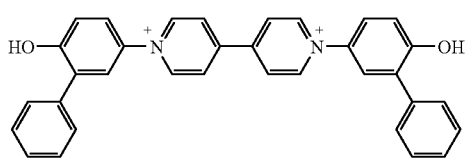

[Optical Disk 1-3 of the Invention]

An optical disk 1-3 of the invention was prepared in the same manner as with the disk 1-1 of the invention except for changing the dye used for forming the image-recording layer of the optical disk 1-1 of the invention to a dye mixture prepared by mixing the foregoing dye C (oxonol dye) and the foregoing dye D (oxonol dye) with a mixing ratio of 70:30.

[Optical Disk 1-4 of the Invention]

An optical disk 1-4 of the invention was prepared in the same manner as with the disk 1-1 of the invention except for changing the dye used for forming the image-recording layer of the optical disk 1-1 of the invention to a dye mixture prepared by mixing the foregoing dye C (oxonol dye) and the foregoing dye D (oxonol dye) with a mixing ratio of 50:50.

[Optical Disk 1-5 of the Invention]

An optical disk 1-5 of the invention was prepared in the same manner as with the disk 1-1 of the invention except for changing the dye used for forming the image-recording layer of the optical disk 1-1 of the invention to a dye mixture prepared by mixing the following dye E oxonol dye) and the foregoing dye D (oxonol dye) with a mixing ratio of 50:50.

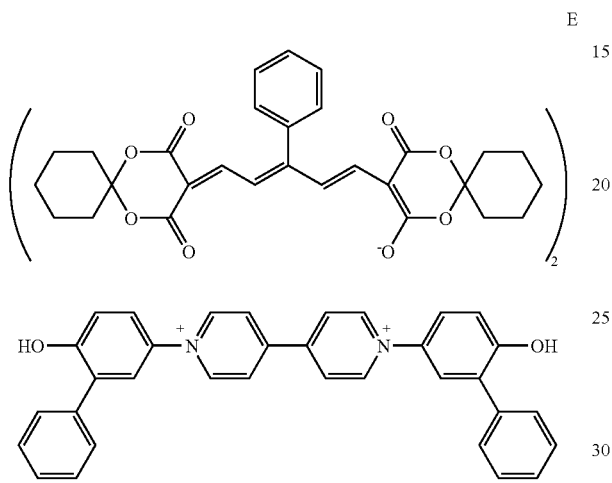

E

[Optical Disk 1-6 of the Invention]

An optical disk 1-6 of the invention was prepared in the same manner as with the disk 1-1 of the invention except for changing the dye used for forming the image-recording layer of the optical disk 1-1 of the invention to a dye mixture prepared by mixing the following dye F oxonol dye) and the foregoing dye D (oxonol dye) with a mixing ratio of 50:50.

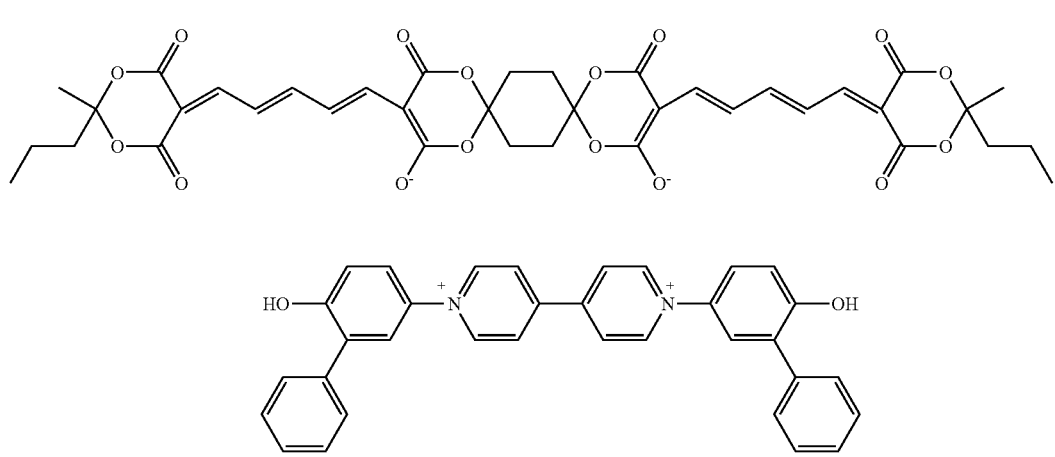

F

[Optical Disk 1-7 of the Invention]

An optical disk 1-7 of the invention was prepared in the same manner as with the disk 1-1 of the invention except for changing the dye used for forming the image-recording layer of the optical disk 1-1 of the invention to a dye mixture prepared by mixing the following dye G oxonol dye) and the foregoing dye D (oxonol dye) with a mixing ratio of 50:50.

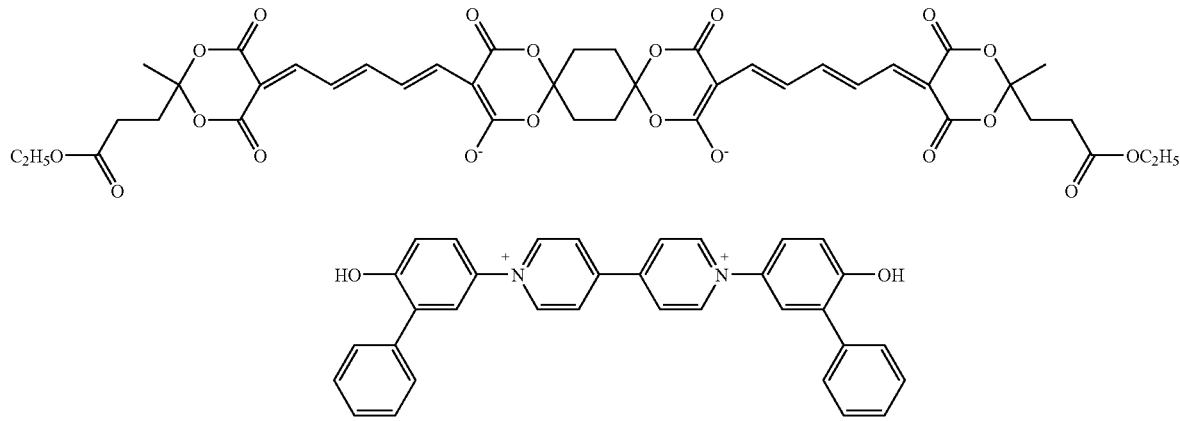

G

[Evaluation]

Absorbance of each of the thus-prepared optical disks was measured. The optical disks of the invention are found to have enough contrast as shown by the graph of FIG. 1 and provide enough viewability.

Example 3

An optical disk of Example 3 was prepared in the same manner as with the optical disk 1-1 of the invention using as a dye a mixture of the foregoing dye A (cyanine dye) and the foregoing dye B (phthalocyanine dye) with a mixing ration of 30:70 (by weight) as is the same with the optical disk 1-1 of the invention except for changing the substrate for forming the image-recording layer to a groove-free substrate and changing the optical density (OD) which is an index of the thickness of the image-recording layer to 0.36.

The image-recording layer was found to show sufficient viewability.

Example 4

An optical disk of Example 4 was prepared in the same manner as with the optical disk 1-1 of the invention except for changing the dye used for forming the image-receiving layer of Example 1 to a mixture of the foregoing dye A (cyanine dye) and the foregoing dye B (phthalocyanine dye) with a mixing ration of 30:70 (by weight) and changing the optical density (OD) which is an index of the thickness of the image-recording layer to 0.40.

The image-recording layer was found to show sufficient viewability.

Examples 5 to 34

Optical disks were prepared in the same manner as in Example 3 except for changing the dye used for forming the image-receiving layer of Example 3 to dyes shown in the following Table 5. Additionally, in Examples 5 to 8 and 30, only one kind of dye is used whereas, in Example 9 and the subsequent Examples (except for Example 30), a combination of two kinds of dyes was used.

Additionally, mixing ratios (by weight) in Examples using a combination of two kinds of dyes are shown in Table 5. In Table 5, the mixing ratio in the left row and the mixing ration in the right row correspond to the dye in the left row and the dye in the right row (for example, with Example 9, dye C:dye E=30:70).

TABLE 5

| | Dye | | Mixing Ratio | |
|---|---|---|---|---|
| Example 5 | Dye C | — | — | — |
| Example 6 | Dye E | — | — | — |
| Example 7 | Dye D | — | — | — |
| Example 8 | Dye G | — | — | — |
| Example 9 | Dye C | Dye E | 30 | 70 |
| Example 10 | Dye C | Dye D | 30 | 70 |
| Example 11 | Dye C | Dye G | 30 | 70 |
| Example 12 | Dye E | Dye D | 50 | 50 |
| Example 13 | Dye E | Dye G | 30 | 70 |
| Example 14 | Dye C | C-42 | 20 | 80 |
| Example 15 | Dye C | C-43 | 20 | 80 |
| Example 16 | Dye C | C-12 | 30 | 70 |
| Example 17 | Dye C | C-28 | 30 | 70 |
| Example 18 | Dye E | C-42 | 80 | 20 |
| Example 19 | Dye E | C-43 | 70 | 30 |
| Example 20 | Dye E | C-12 | 80 | 20 |
| Example 21 | Dye E | C-28 | 70 | 30 |
| Example 22 | Dye D | C-42 | 80 | 20 |
| Example 23 | Dye D | C-43 | 70 | 30 |
| Example 24 | Dye D | C-12 | 70 | 30 |
| Example 25 | Dye D | C-28 | 70 | 30 |
| Example 26 | Dye G | C-42 | 30 | 70 |
| Example 27 | Dye G | C-43 | 30 | 70 |
| Example 28 | Dye G | C-12 | 30 | 70 |
| Example 29 | Dye G | C-28 | 10 | 90 |
| Example 30 | Dye F | — | — | — |
| Example 31 | Dye F | C-42 | 30 | 70 |
| Example 32 | Dye F | C-43 | 30 | 70 |
| Example 33 | Dye F | C-12 | 30 | 70 |
| Example 34 | Dye F | C-28 | 30 | 70 |

Structures of dyes A to G in Table 5 have already been shown. C-12 to C-42 respectively correspond to numbers of already described illustrative compounds of cyanine dyes.

Also, all of the optical disks of Examples 5 to 34 were found to provide sufficient viewability.

INDUSTRIAL APPLICABILITY

According to the invention, there can be provided an optical information recording medium which permits formation of a distinct, highly contrasty visible image in an image recording layer provided in addition to an optical information recording layer (preferably on the opposite side to the recording side) by using a laser light, and an image recording method of recording an image onto an image recording layer of the optical information recording medium, which method can minimize the hardware source for the recording apparatus and enables a general user to record an image with ease using the recording apparatus. The invention permits recording of an image having excellent light and heat fastness. Also, the medium has a high recording sensitivity and permits writing at a high speed.

The invention claimed is:

1. An optical information recording medium comprising:
    a recording layer capable of recording and reproducing information by irradiation with a laser light; and
    an image recording layer capable of recording a visible image and containing a dye as a major component,
    wherein the dye is a cyanine dye represented by formula (2')

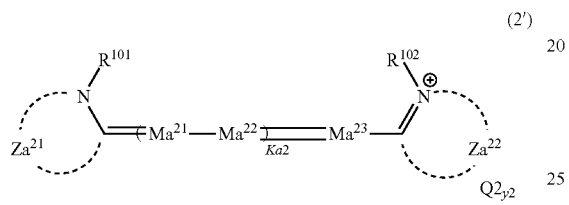

(2')

wherein $Za^{21}$ and $Za^{22}$ each independently represents atoms forming a hetero ring, $Ma^{21}$, $Ma^{22}$ and $Ma^{23}$ each independently represents a substituted or unsubstituted methine group, ka2 represents an integer of from 0 to 3, and, when ka2 represents 2 or more, plural $Ma^{21}$s and $Ma^{22}$s may be the same or different from each other, Q2 represents an ion for neutralizing charge, y2 represents a number necessary for neutralizing charge, and $R^{101}$ and $R^{102}$ each independently represents a substituent selected from the group consisting of substituted or unsubstituted alkyl group, a substituted or unsubstituted aryl group, a substituted or unsubstituted alkenyl group, a substituted or unsubstituted alkynyl group, and a substituted or unsubstituted hetero ring group.

2. An image recording method of recording an image in an image recording layer of the optical information recording medium described in claim 1,
    wherein the same laser light as that used for recording optical information in the recording layer is used for recording a visible image in the image recording layer.

3. A method of utilizing the dye described in claim 1 in an image recording layer of an optical information recording medium.

* * * * *